US011635068B2

(12) United States Patent
Foster et al.

(10) Patent No.: US 11,635,068 B2
(45) Date of Patent: Apr. 25, 2023

(54) MODULAR POWER END

(71) Applicant: Kerr Machine Co., Sulphur, OK (US)

(72) Inventors: Kelcy Jake Foster, Ardmore, OK (US); Micheal Cole Thomas, Ardmore, OK (US); Christopher Todd Barnett, Stratford, OK (US); Nicholas Son, Davis, OK (US); John Keith, Ardmore, OK (US); Mark S. Nowell, Ardmore, OK (US); Guy J. Lapointe, Sulphur, OK (US); Michael Eugene May, Ardmore, OK (US)

(73) Assignee: Kerr Machine Co., Sulphur, OK (US)

( * ) Notice: Subject to any disclaimer, the term of this patent is extended or adjusted under 35 U.S.C. 154(b) by 0 days.

(21) Appl. No.: 17/550,453

(22) Filed: Dec. 14, 2021

(65) Prior Publication Data

US 2022/0106951 A1   Apr. 7, 2022

Related U.S. Application Data

(63) Continuation-in-part of application No. 16/951,844, filed on Nov. 18, 2020, now Pat. No. 11,208,996.
(Continued)

(51) Int. Cl.
*F04B 39/00* (2006.01)
*F16H 57/02* (2012.01)
(Continued)

(52) U.S. Cl.
CPC .......... *F04B 39/0094* (2013.01); *F04B 15/02* (2013.01); *F16H 57/02* (2013.01); *E21B 43/2607* (2020.05); *F16H 2057/0203* (2013.01)

(58) Field of Classification Search
CPC .. F04B 39/0094; F04B 15/02; E21B 43/2607; F16H 57/02; F16H 2057/0203
See application file for complete search history.

(56) References Cited

U.S. PATENT DOCUMENTS

| 677,137 A | 6/1901 | Leavitt |
| 1,316,539 A | 9/1919 | Ford |

(Continued)

FOREIGN PATENT DOCUMENTS

| CN | 207974953 U | 10/2018 |
| EP | 2494140 B1 | 5/2017 |

(Continued)

OTHER PUBLICATIONS

Bolt Science, The Use of Two Nuts to Prevent Self Loosening, Jan. 9, 2015, https://www.boltscience.com/pages/twonuts.htm (Year: 2015).*
(Continued)

*Primary Examiner* — Connor J Tremarche
(74) *Attorney, Agent, or Firm* — Tomlinson McKinstry, P.C.

(57) ABSTRACT

A power end assembly includes a crankshaft section, a crosshead section, and a connector section coupled together by one, two, or more sets of stay rods. The power end may include one or more support plates that are coupled to the crankshaft section and/or crosshead section. The crosshead section includes a plurality of individual crosshead frames. The connector section may include a plurality of individual connector plates or may be a unitary connector plate. The power end is configured to be coupled to a fluid end assembly by coupling the fluid end assembly to the connector plates.

12 Claims, 89 Drawing Sheets

Related U.S. Application Data

(60) Provisional application No. 63/217,566, filed on Jul. 1, 2021, provisional application No. 63/191,619, filed on May 21, 2021, provisional application No. 63/175,692, filed on Apr. 16, 2021, provisional application No. 63/172,398, filed on Apr. 8, 2021, provisional application No. 63/171,866, filed on Apr. 7, 2021, provisional application No. 63/124,945, filed on Dec. 14, 2020, provisional application No. 63/089,882, filed on Oct. 9, 2020, provisional application No. 63/076,587, filed on Sep. 10, 2020, provisional application No. 63/053,797, filed on Jul. 20, 2020, provisional application No. 63/046,826, filed on Jul. 1, 2020, provisional application No. 63/040,086, filed on Jun. 17, 2020, provisional application No. 63/033,244, filed on Jun. 2, 2020, provisional application No. 63/027,584, filed on May 20, 2020, provisional application No. 63/019,789, filed on May 4, 2020, provisional application No. 63/018,021, filed on Apr. 30, 2020, provisional application No. 63/008,036, filed on Apr. 10, 2020, provisional application No. 62/990,817, filed on Mar. 17, 2020, provisional application No. 62/968,634, filed on Jan. 31, 2020, provisional application No. 62/960,194, filed on Jan. 13, 2020, provisional application No. 62/960,366, filed on Jan. 13, 2020, provisional application No. 62/959,570, filed on Jan. 10, 2020, provisional application No. 62/957,489, filed on Jan. 6, 2020, provisional application No. 62/953,763, filed on Dec. 26, 2019, provisional application No. 62/940,513, filed on Nov. 26, 2019, provisional application No. 62/936,789, filed on Nov. 18, 2019.

(51) Int. Cl.
 *F04B 15/02* (2006.01)
 *E21B 43/26* (2006.01)

(56) References Cited

U.S. PATENT DOCUMENTS

| | | | |
|---|---|---|---|
| 1,662,725 A | 3/1928 | Toney, Jr. | |
| 1,822,682 A | 9/1931 | Weiger | |
| 1,836,498 A * | 12/1931 | Pielstick | F02F 1/102 92/147 |
| 2,495,880 A | 1/1950 | Volpin | |
| 2,713,522 A | 7/1955 | Petch | |
| 2,756,960 A | 7/1956 | Church | |
| 2,771,846 A | 11/1956 | Horton et al. | |
| 2,783,810 A * | 3/1957 | Wrigley | F16B 39/282 411/956 |
| 2,828,696 A | 4/1958 | Wright | |
| 2,856,857 A | 10/1958 | Saalfrank | |
| 2,957,422 A | 10/1960 | Loeber | |
| 3,005,412 A | 10/1961 | Camp | |
| 3,053,500 A | 9/1962 | Atkinson | |
| 3,146,724 A | 9/1964 | Cornelsen | |
| 3,152,787 A | 10/1964 | Timmons | |
| 3,173,648 A | 3/1965 | McGuire et al. | |
| 3,179,121 A | 4/1965 | Bredtschneider et al. | |
| 3,244,424 A | 4/1966 | Cope | |
| 3,257,952 A | 6/1966 | McCormick | |
| 3,301,197 A | 1/1967 | Dodson | |
| 3,309,013 A | 3/1967 | Bauer | |
| 3,373,695 A | 3/1968 | Yohpe | |
| 3,427,988 A | 2/1969 | Redman et al. | |
| 3,463,527 A | 8/1969 | Baker | |
| 3,474,808 A | 10/1969 | Elliott | |
| 3,508,849 A | 4/1970 | Weber | |
| 3,589,387 A | 6/1971 | Raymond | |
| 3,679,332 A | 7/1972 | Yohpe | |
| 3,702,624 A | 11/1972 | Fries | |
| 3,746,483 A | 7/1973 | Hindel et al. | |
| 3,756,229 A * | 9/1973 | Ollivier | A61M 16/00 128/204.26 |
| 3,887,305 A | 6/1975 | Ito | |
| 4,047,850 A | 9/1977 | Berthelot | |
| 4,170,214 A | 10/1979 | Gill et al. | |
| 4,174,194 A | 11/1979 | Hammelmann | |
| 4,363,463 A | 12/1982 | Moon, Jr. | |
| 4,388,050 A | 6/1983 | Schuller | |
| 4,467,703 A | 8/1984 | Redwine et al. | |
| 4,470,771 A | 9/1984 | Hall et al. | |
| 4,494,415 A * | 1/1985 | Elliston | F04B 9/045 92/255 |
| 4,518,329 A | 5/1985 | Weaver | |
| 4,520,837 A | 6/1985 | Cole et al. | |
| 4,616,983 A | 10/1986 | Hanafi | |
| 4,768,933 A | 9/1988 | Stachowiak | |
| 4,771,801 A | 9/1988 | Crump et al. | |
| 4,773,833 A | 9/1988 | Wilkinson et al. | |
| 4,778,347 A | 10/1988 | Mize | |
| 4,861,241 A | 8/1989 | Gamboa et al. | |
| 4,878,815 A | 11/1989 | Stachowiak | |
| 4,891,241 A | 1/1990 | Hashimoto et al. | |
| 4,948,349 A | 8/1990 | Koiwa | |
| 4,984,970 A | 1/1991 | Eickmann | |
| 5,059,101 A | 10/1991 | Valavaara | |
| 5,061,159 A | 10/1991 | Pryor | |
| 5,073,096 A | 12/1991 | King et al. | |
| 5,088,521 A | 2/1992 | Johnson | |
| 5,127,807 A | 7/1992 | Eslinger | |
| 5,145,340 A | 9/1992 | Allard | |
| 5,207,242 A | 5/1993 | Daghe et al. | |
| 5,226,445 A | 7/1993 | Surjaatmadja | |
| 5,230,363 A | 7/1993 | Winn, Jr. et al. | |
| 5,253,987 A | 10/1993 | Harrison | |
| 5,299,921 A | 4/1994 | Ritcher | |
| 5,302,087 A | 4/1994 | Pacht | |
| 5,362,215 A | 11/1994 | King | |
| 5,370,148 A | 12/1994 | Shafer | |
| 5,507,219 A | 4/1996 | Stogner | |
| 5,524,902 A | 6/1996 | Cornette | |
| 5,605,449 A | 2/1997 | Reed | |
| 5,636,975 A | 6/1997 | Tiffany et al. | |
| D383,053 S | 9/1997 | Schrader et al. | |
| 5,848,880 A | 12/1998 | Helmig | |
| 6,164,318 A | 12/2000 | Dixon | |
| 6,167,959 B1 | 1/2001 | Bassinger et al. | |
| 6,231,323 B1 | 5/2001 | Jezek | |
| 6,257,626 B1 | 7/2001 | Campau | |
| 6,382,940 B1 | 5/2002 | Blume | |
| 6,419,459 B1 | 7/2002 | Sibbing | |
| 6,544,012 B1 | 4/2003 | Blume | |
| 6,641,112 B2 | 11/2003 | Antoff et al. | |
| 6,910,871 B1 | 6/2005 | Blume | |
| 7,140,211 B2 | 11/2006 | Tremblay | |
| 7,168,440 B1 | 1/2007 | Blume | |
| 7,186,097 B1 | 3/2007 | Blume | |
| 7,290,560 B2 | 11/2007 | Orr et al. | |
| 7,296,591 B2 | 11/2007 | Moe et al. | |
| 7,335,002 B2 | 2/2008 | Vicars | |
| 7,506,574 B2 | 3/2009 | Jensen et al. | |
| 7,513,483 B1 | 4/2009 | Blume | |
| 7,513,759 B1 | 4/2009 | Blume | |
| 7,591,450 B1 | 9/2009 | Blume | |
| D616,966 S | 6/2010 | Angell | |
| 7,789,133 B2 | 9/2010 | McGuire | |
| 7,828,053 B2 | 11/2010 | McGuire et al. | |
| 7,845,413 B2 | 12/2010 | Shampine et al. | |
| D631,142 S | 1/2011 | Angell | |
| 7,866,346 B1 | 1/2011 | Walters | |
| 7,963,502 B2 | 6/2011 | Lovell et al. | |
| 8,083,504 B2 | 12/2011 | Williams et al. | |
| 8,100,407 B2 | 1/2012 | Stanton et al. | |
| 8,141,849 B1 | 3/2012 | Blume | |
| 8,240,634 B2 | 8/2012 | Jarchau et al. | |
| 8,317,498 B2 | 11/2012 | Gambier et al. | |

(56) References Cited

U.S. PATENT DOCUMENTS

| | | | |
|---|---|---|---|
| 8,360,094 B2 | 1/2013 | Steinbock et al. | |
| 8,365,754 B2 | 2/2013 | Riley et al. | |
| 8,528,462 B2 | 9/2013 | Pacht | |
| 8,528,585 B2 | 9/2013 | McGuire | |
| 8,701,546 B2 | 4/2014 | Pacht | |
| 9,010,412 B2 | 4/2015 | McGuire | |
| D731,035 S | 6/2015 | Lo Cicero | |
| D737,497 S | 8/2015 | Burgess et al. | |
| 9,188,121 B1 | 11/2015 | Dille | |
| D748,228 S | 1/2016 | Bayyouk et al. | |
| 9,260,933 B2 | 2/2016 | Artherholt et al. | |
| 9,291,274 B1 | 3/2016 | Blume | |
| 9,328,745 B2 | 5/2016 | Bartlok et al. | |
| 9,371,919 B2 | 6/2016 | Forrest et al. | |
| 9,416,887 B2 | 8/2016 | Blume | |
| 9,435,454 B2 | 9/2016 | Blume | |
| 9,470,226 B2 | 10/2016 | Johnson et al. | |
| 9,534,473 B2 | 1/2017 | Morris et al. | |
| 9,631,739 B2 | 4/2017 | Belshan | |
| D787,029 S | 5/2017 | Bayyouk et al. | |
| 9,670,922 B2 | 6/2017 | Pacht | |
| 9,732,746 B2 | 8/2017 | Chandrasekaran et al. | |
| 9,791,082 B2 | 10/2017 | Baxter et al. | |
| 9,822,894 B2 | 11/2017 | Bayyouk et al. | |
| D806,241 S | 12/2017 | Swinney et al. | |
| 10,184,470 B2 | 1/2019 | Barnett, Jr. | |
| 10,221,847 B2 | 3/2019 | Dyer | |
| 10,240,597 B2 | 3/2019 | Bayyouk et al. | |
| 10,352,321 B2 | 7/2019 | Byrne et al. | |
| 10,393,113 B2 | 8/2019 | Wagner | |
| 10,677,380 B1 | 6/2020 | Surjaatmadja et al. | |
| 10,711,778 B2 | 7/2020 | Buckley | |
| 10,760,567 B2 | 9/2020 | Salih et al. | |
| 10,767,773 B2 | 9/2020 | Lee | |
| 10,871,227 B1 | 12/2020 | Belshan et al. | |
| 11,162,479 B2 | 11/2021 | Thomas | |
| 11,261,863 B2 | 3/2022 | Beisel et al. | |
| 2002/0166588 A1 | 11/2002 | Dean | |
| 2004/0170507 A1 | 9/2004 | Vicars | |
| 2004/0234404 A1 | 11/2004 | Vicars | |
| 2006/0002806 A1 | 1/2006 | Baxter et al. | |
| 2006/0027779 A1 | 2/2006 | McGuire et al. | |
| 2008/0006089 A1 | 1/2008 | Adnan et al. | |
| 2008/0008605 A1 | 1/2008 | Bauer et al. | |
| 2008/0093361 A1 | 4/2008 | Kennedy et al. | |
| 2008/0181798 A1* | 7/2008 | Folk | F04B 17/03 417/410.1 |
| 2008/0279705 A1 | 11/2008 | Wago et al. | |
| 2008/0279706 A1 | 11/2008 | Gambier et al. | |
| 2009/0194717 A1 | 8/2009 | Jarchau et al. | |
| 2010/0129249 A1* | 5/2010 | Bianchi | F04B 39/12 417/521 |
| 2010/0243255 A1 | 9/2010 | Luharuka et al. | |
| 2011/0079302 A1 | 4/2011 | Hawes | |
| 2011/0173814 A1 | 7/2011 | Patel | |
| 2011/0189040 A1 | 8/2011 | Vicars | |
| 2011/0206546 A1 | 8/2011 | Vicars | |
| 2011/0206547 A1 | 8/2011 | Kim et al. | |
| 2011/0236238 A1 | 9/2011 | Cordes et al. | |
| 2012/0063936 A1 | 3/2012 | Baxter et al. | |
| 2012/0141308 A1 | 6/2012 | Saini et al. | |
| 2012/0187321 A1 | 7/2012 | Small | |
| 2012/0272764 A1 | 11/2012 | Pendleton | |
| 2013/0020521 A1 | 1/2013 | Byrne | |
| 2013/0045123 A1 | 2/2013 | Roman et al. | |
| 2013/0105175 A1 | 5/2013 | Mailand et al. | |
| 2013/0112074 A1 | 5/2013 | Small | |
| 2013/0202458 A1 | 8/2013 | Byrne et al. | |
| 2013/0263932 A1 | 10/2013 | Baxter et al. | |
| 2013/0319220 A1 | 12/2013 | Luharuka et al. | |
| 2014/0127062 A1 | 5/2014 | Buckley et al. | |
| 2014/0196570 A1 | 7/2014 | Small et al. | |
| 2014/0196883 A1 | 7/2014 | Artherholt et al. | |
| 2014/0348677 A1 | 11/2014 | Moeller et al. | |
| 2015/0071803 A1 | 3/2015 | Huang | |
| 2015/0084335 A1 | 3/2015 | Farrell et al. | |
| 2015/0132152 A1 | 5/2015 | Lazzara | |
| 2015/0132157 A1 | 5/2015 | Whaley et al. | |
| 2015/0144826 A1 | 5/2015 | Bayyouk et al. | |
| 2015/0147194 A1 | 5/2015 | Foote | |
| 2015/0159647 A1* | 6/2015 | Dille | F04B 53/144 92/169.1 |
| 2015/0211641 A1 | 7/2015 | Pacht | |
| 2015/0219096 A1 | 8/2015 | Jain et al. | |
| 2015/0300332 A1 | 10/2015 | Kotapish et al. | |
| 2016/0025082 A1* | 1/2016 | Byrne | B21K 23/00 29/888.03 |
| 2016/0123313 A1 | 5/2016 | Simmons | |
| 2016/0160848 A1 | 6/2016 | Toppings et al. | |
| 2016/0281699 A1 | 9/2016 | Gnessin et al. | |
| 2016/0369792 A1 | 12/2016 | Wagner | |
| 2017/0002947 A1 | 1/2017 | Bayyouk et al. | |
| 2017/0089473 A1 | 3/2017 | Nowell et al. | |
| 2017/0204852 A1 | 7/2017 | Barnett, Jr. | |
| 2017/0211565 A1 | 7/2017 | Morreale | |
| 2017/0218951 A1 | 8/2017 | Graham et al. | |
| 2018/0017173 A1 | 1/2018 | Nowell et al. | |
| 2018/0045187 A1 | 2/2018 | Nagel et al. | |
| 2018/0058447 A1 | 3/2018 | Foster | |
| 2018/0313456 A1 | 11/2018 | Bayyouk et al. | |
| 2019/0011051 A1 | 1/2019 | Yeung | |
| 2019/0017503 A1 | 1/2019 | Foster et al. | |
| 2019/0032685 A1 | 1/2019 | Foster | |
| 2019/0049052 A1 | 2/2019 | Shuck | |
| 2019/0063427 A1 | 2/2019 | Nowell et al. | |
| 2019/0120389 A1 | 4/2019 | Foster et al. | |
| 2019/0128104 A1 | 5/2019 | Graham et al. | |
| 2019/0136842 A1 | 5/2019 | Nowell et al. | |
| 2019/0145391 A1 | 5/2019 | Davids | |
| 2019/0277279 A1 | 9/2019 | Byrne et al. | |
| 2019/0277341 A1 | 9/2019 | Byrne et al. | |
| 2019/0368619 A1 | 12/2019 | Barnett et al. | |
| 2020/0182240 A1 | 6/2020 | Nowell et al. | |
| 2020/0191146 A1 | 6/2020 | Rinaldi et al. | |
| 2020/0232455 A1 | 7/2020 | Blume | |

FOREIGN PATENT DOCUMENTS

| | | |
|---|---|---|
| WO | 2014144113 A2 | 9/2014 |
| WO | 2015077001 A1 | 5/2015 |
| WO | 2017096488 A1 | 6/2017 |
| WO | 2017139348 A1 | 8/2017 |
| WO | 2018197458 A1 | 11/2018 |

OTHER PUBLICATIONS

International Searching Authority, "PCT International Search Report", dated Mar. 2, 2021, 4 pages.
International Searching Authority, "PCT Written Opinion of the International Searching Authority", dated Mar. 2, 2021, 6 pages.
International Searching Authority, "PCT International Search Report", dated Mar. 2, 2021, 5 pages.
International Searching Authority, "PCT Written Opinion of the International Searching Authority", dated Mar. 2, 2021, 9 pages.
International Searching Authority, "PCT International Search Report", dated Mar. 8, 2021, 3 pages.
International Searching Authority, "PCT Written Opinion of the International Searching Authority", dated Mar. 8, 2021, 8 pages.
International Searching Authority, "PCT International Search Report", dated Mar. 2, 2021, 3 pages.
U.S. Patent and Trademark Office, "Office Action Summary" dated Jun. 10, 2021, 42 pages, Alexandria, VA.

* cited by examiner

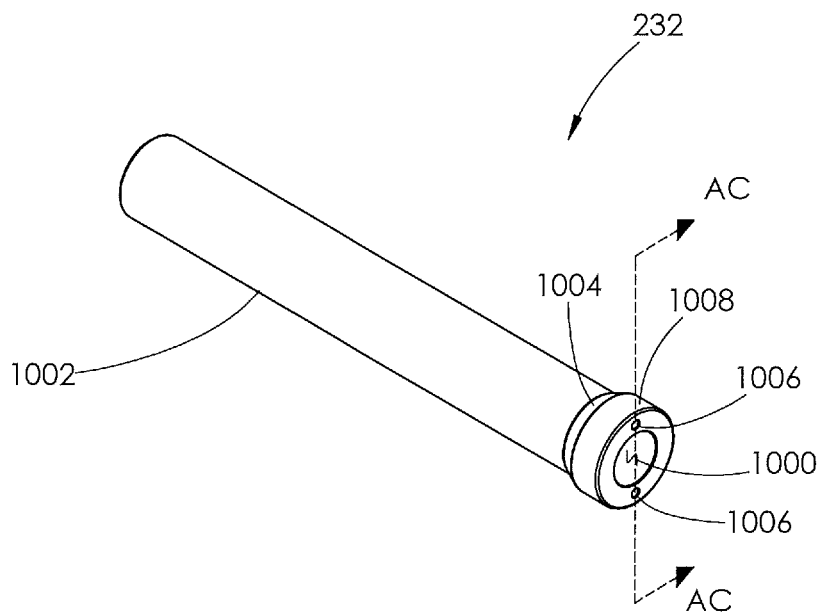
FIG. 10
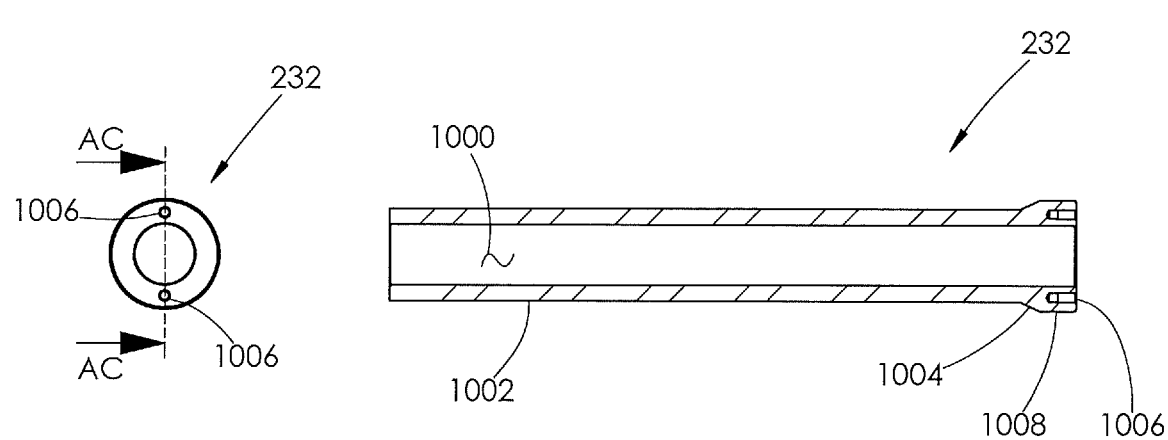
FIG. 11
FIG. 12

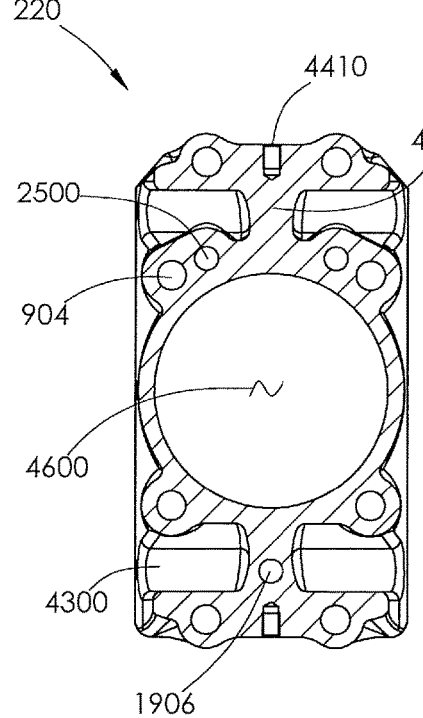
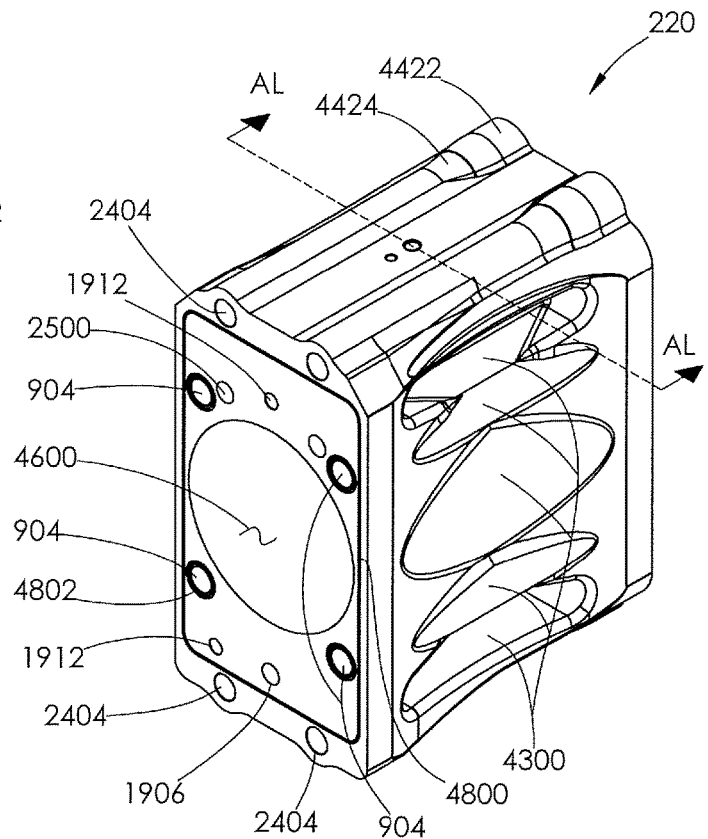
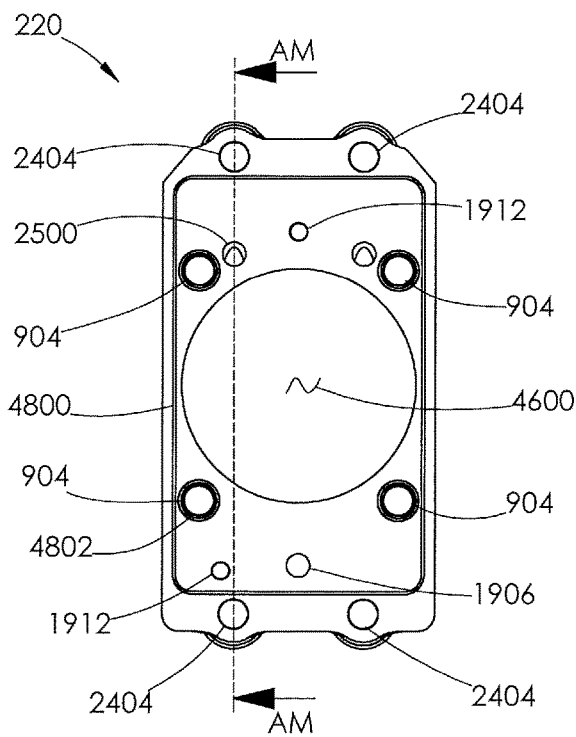
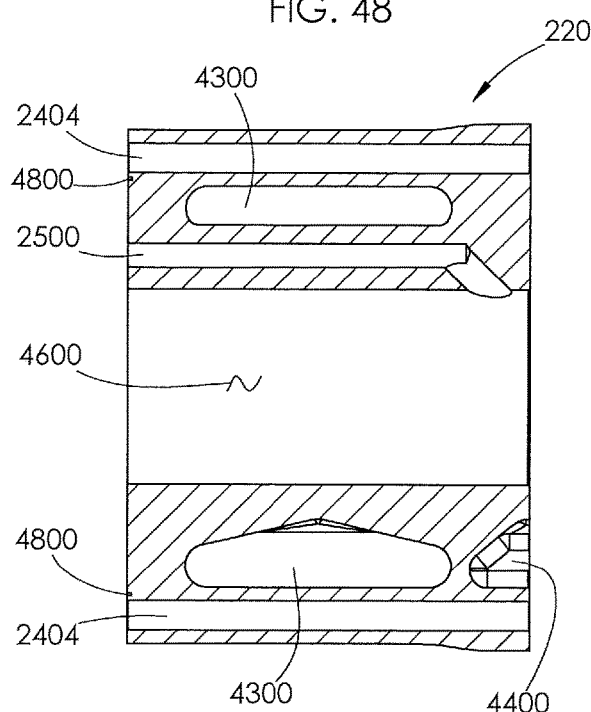
FIG. 47
FIG. 48
FIG. 49
FIG. 50

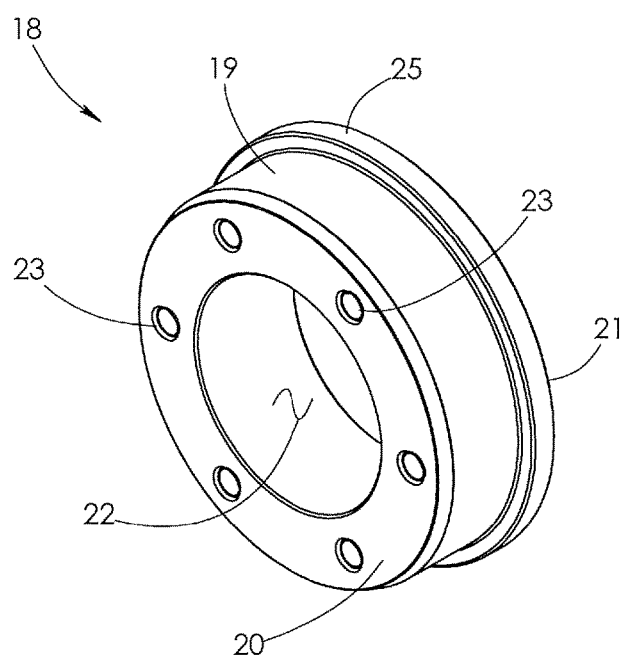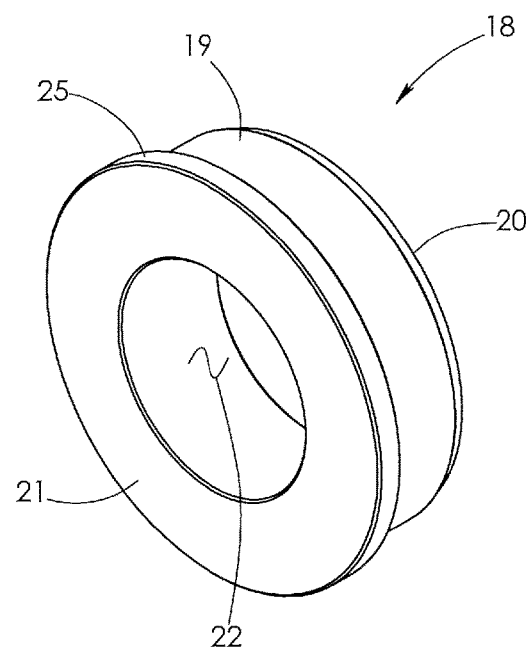
FIG. 67      FIG. 68
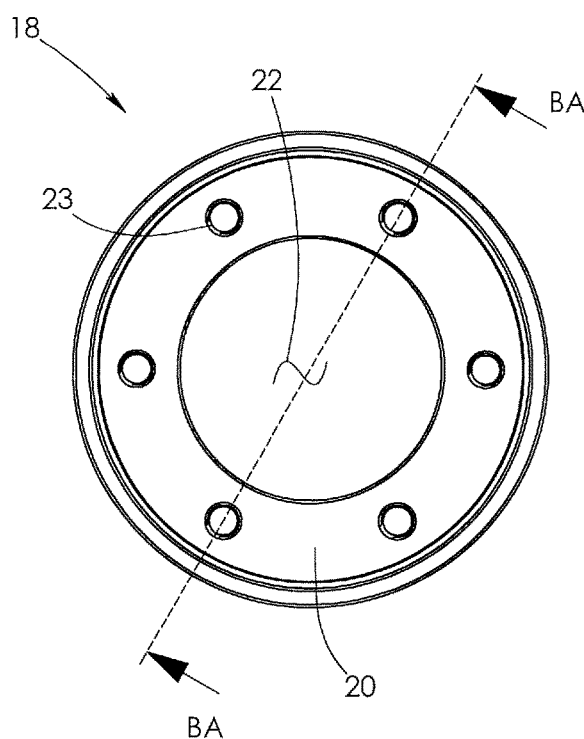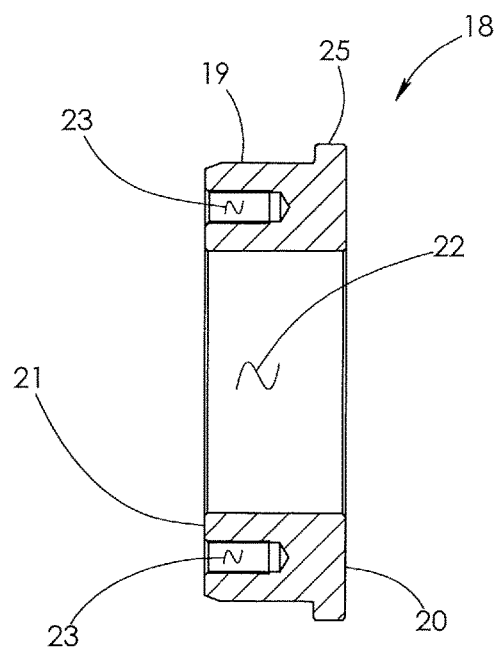
FIG. 69      FIG. 70

MODULAR POWER END

RELATED APPLICATIONS

This application is a Continuation-in-Part of U.S. Ser. No. 16/951,844, authored by Foster et al. and filed on Nov. 18, 2020; and also claims the benefit of the following provisional patent applications: Ser. No. 62/936,789, authored by Thomas et al. and filed on Nov. 18, 2019; Ser. No. 62/940,513, authored by Thomas et al. and filed on Nov. 26, 2019; Ser. No. 62/953,763, authored by Thomas et al. and filed on Dec. 26, 2019; Ser. No. 62/957,489, authored by Foster et al. and filed on Jan. 6, 2020; Ser. No. 62/959,570, authored by Thomas et al. and filed on Jan. 10, 2020; Ser. No. 62/960,194, authored by Foster et al. and filed on Jan. 13, 2020; Ser. No. 62/960,366, authored by Foster et al. and filed on Jan. 13, 2020; Ser. No. 62/968,634, authored by Foster et al. and filed on Jan. 31, 2020; Ser. No. 62/990,817, authored by Thomas et al. and filed on Mar. 17, 2020; Ser. No. 63/008,036, authored by Thomas et al. and filed on Apr. 10, 2020; Ser. No. 63/018,021, authored by Thomas et al. and filed Apr. 30, 2020; Ser. No. 63/019,789, authored by Thomas et al. and filed on May 4, 2020; Ser. No. 63/027,584, authored by Thomas et al. and filed on May 20, 2020; Ser. No. 63/033,244, authored by Thomas et al. and filed Jun. 2, 2020; Ser. No. 63/040,086, authored by Thomas et al. and filed on Jun. 17, 2020; Ser. No. 63/046,826, authored by Thomas et al. and filed on Jul. 1, 2020; Ser. No. 63/053,797, authored by Thomas et al. and filed on Jul. 20, 2020; Ser. No. 63/076,587, authored by Thomas et al. and filed on Sep. 10, 2020; and Ser. No. 63/089,882, authored by Thomas et al. and filed on Oct. 9, 2020. The entire contents of all of the above listed provisional and non-provisional patent applications are incorporated herein by reference.

This application also claims the benefit of the following provisional patent applications: Ser. No. 63/124,945, authored by Foster et al. and filed on Dec. 14, 2020; Ser. No. 63/171,866, authored by Foster et al. and filed on Apr. 7, 2021; Ser. No. 63/172,398, authored by Foster et al. and filed on Apr. 8, 2021; Ser. No. 63/175,692, authored by Foster et al. and filed on Apr. 16, 2021; Ser. No. 63/191,619, authored by Foster et al. and filed on May 21, 2021; Ser. No. 63/217,566, authored by Foster et al. and filed on Jul. 1, 2021. The entire contents of all of the above listed provisional patent applications are incorporated herein by reference.

BACKGROUND

Technical Field

This disclosure relates generally to hydraulic fracturing pumps, and in particular power ends for hydraulic fracturing pumps.

Description of the Related Art

Various industrial applications may require the delivery of high volumes of highly pressurized fluids. For example, hydraulic fracturing (commonly referred to as "fracking") is a well stimulation technique used in oil and gas production, in which highly pressurized fluid is injected into a cased wellbore. When hydraulic fracturing is employed during oil and gas production, the pressured fluid flows through perforations in a casing in a well bore and creates fractures in deep rock formations. Pressurized fluid is delivered to the casing through a wellhead supported on the ground surface. Sand or other small particles (commonly referred to as "proppants") are normally delivered with the fluid into the rock formations. The proppants help hold the fractures open after the fluid is withdrawn. The resulting fractures facilitate the extraction of oil, gas, brine, or other fluid trapped within the rock formations.

Fluid ends are devices used in conjunction with a power end to pressurize the fluid used during hydraulic fracturing operations. Together, the fluid end and power end function as a reciprocating pump. A single fracking operation may require the use of two or more pumps at one time. The pumps are typically positioned on a truck bed at the wellsite so that they may be easily moved, as needed. The fluid and proppant mixture to be pressurized is normally held in large tanks at the wellsite. An intake piping system delivers the fluid and proppant mixture from the tanks to each fluid end. A discharge piping system transfers the pressurized fluid from each fluid end to the wellhead, where it is delivered into the casing.

BRIEF DESCRIPTION OF THE DRAWINGS

FIG. 10 is a rear perspective view of one embodiment of a spacer used with the power end assembly shown in FIG. 9

FIG. 11 is a rear elevational view of the spacer shown in FIG. 10.

FIG. 12 is a cross-sectional view of the spacer shown in FIG. 11, taken along line AC-AC.

FIG. 47 is a cross-sectional view of the crosshead frame shown in FIG. 48, taken along line AL-AL.

FIG. 48 is a rear perspective view of the crosshead frame shown in FIG. 44.

FIG. 49 is a rear elevational view of the crosshead frame shown in FIG. 44.

FIG. 50 is a cross-sectional view of the crosshead frame shown in FIG. 49, taken along line AM-AM.

FIG. 67 is a front perspective view of a crosshead insert installed within the crosshead shown in FIG. 65.

FIG. 68 is a rear perspective view of the crosshead insert shown in FIG. 67.

FIG. 69 is a front elevational view of the crosshead insert shown in FIG. 67.

FIG. 70 is a cross-sectional view of the crosshead insert shown in FIG. 69, taken along line BA-BA.

DETAILED DESCRIPTION

Figure 1:
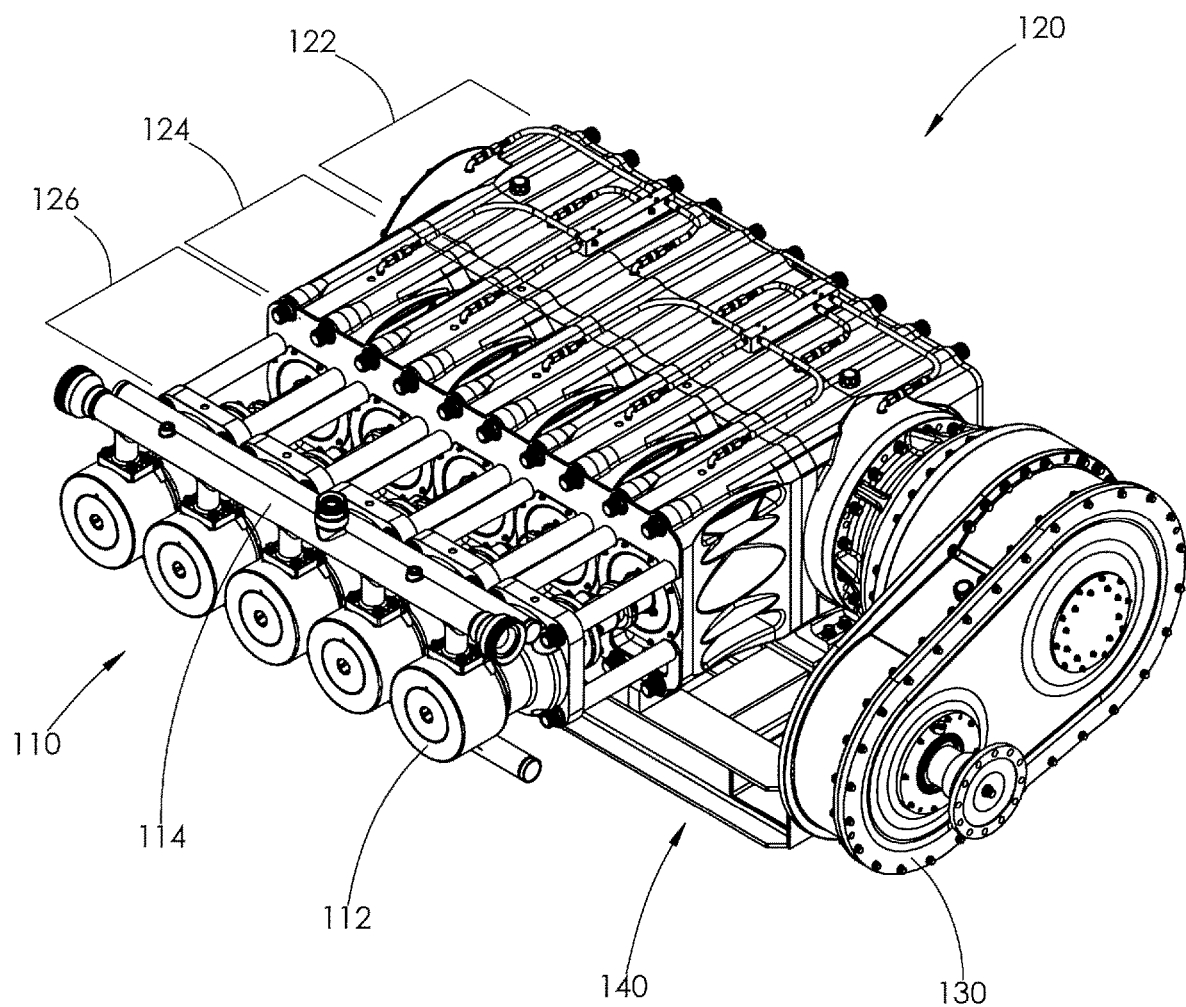
FIG. 1 is a front right-side perspective view of an embodiment of a high-pressure hydraulic fracturing pump.

High pressure hydraulic fracturing pumps typically comprise a fluid end assembly attached to a power end assembly. Fluid end assemblies are typically used in oil and gas operations to deliver highly pressurized corrosive and/or abrasive fluids to piping leading to the wellbore. The assemblies are typically attached to power ends run by engines. The engine crankshaft is attached to a transmission input shaft, the transmission output shaft is connected to a gearbox input shaft, and the gearbox output shaft is attached to the power end crankshaft. The power end crankshaft reciprocates plungers within the fluid end assembly to pump fluid through the fluid end.

Fluid ends operate under notoriously extreme conditions, enduring the same pressures, vibrations, and abrasives that are needed to fracture deep rock formations at a well site. Fluid ends may operate at pressures of 5,000-15,000 pounds per square inch (psi) or greater. However, the pressure may reach up to 22,500 psi. The power end used with the fluid end typically has a power output of at least 2,250 horsepower during hydraulic fracturing operations. A single fluid end typically produces a fluid volume of about 185-690 gallons per minute or 4-15 barrels per minute during a fracking operation. When a plurality of fluid ends is used together, the fluid ends collectively deliver about 4,600 gallons per minute or 100 barrels per minute to the wellbore.

Power end assemblies known in the art typically use a one-piece frame fabricated from steel plate and/or castings to provide a structure to mount the crankshaft, drive apparatus, and fluid end. The one-piece frame is also used to attach the entire high-pressure hydraulic fracturing pump to a trailer or truck bed for transport and use in the field. The one-piece frame is very heavy due to the size of the material needed to withstand the forces applied during operation and because of the large mount areas needed to attach the various components.

Power ends often fail at the mount plate, the point the fluid end connects to the power end. Fluid ends are attached to the mount plate using stay rods. The stay rods are typically torqued into threaded holes in the mount plate of the power end and the fluid end is attached to the protruding end of the stay rods. This produces an area of stress concentration at the threaded holes of the mount plate. Typical failures include the mount plate breaking out around the threads, weld failures in the area where the mount plate is welded to the other components of the one-piece power end, and thread failure. All these failures require major repair to, or complete replacement of, the power end.

Other common failures in power ends occur due to poor lubrication of the moving parts. It is known in the art to lubricate the main bearings and connecting rod bearings by forcing pressurized lubricant through a center bore and intersecting cross bores in the crankshaft. It is also known in the art to lubricate the wrist pin, connecting rod end, thrust seat and crosshead by forcing pressurized lubricant into the crosshead bore and intersecting cross bores through the crosshead, thrust seat, and crosshead end of the connecting rod. The problem is that the entire lubrication system is a single system. One lubrication pump pressurizes a manifold to which all lubrication circuits are attached.

During operation components wear and clearances between the components increase. This increase in the clearances reduces the amount of resistance to lubricant flow resulting in higher lubricant flow in that area. While higher lubricant flow results in reduced wear in that circuit, the other circuits will experience reduced flow and higher wear. The reduced lubricant flow will accelerate the wear in another area increasing clearances until it receives enough lubricant to stop eroding. This alternating wear and lubrication cycle repeats causing uneven and accelerated wear in the components of the power end reducing maintenance intervals. A lack of modularity in the current industry designs mean that the entire system is replaced or undergoes repair.

To reduce, mitigate, or eliminate the failures listed above, the inventors propose a novel power end assembly with modular construction. Such modular construction also reduces the physical dimensions and weight of the power end assembly in various embodiments. The power end assemblies disclosed herein include some or all of the following features and advantages in various embodiments:

- Modular construction of the power end includes individual connect plates, individual crosshead frames, and/or individual crosshead assemblies that may be individually replaced, which allows failed components to be replaced without discarding other components.
- The power end assembly is held together by one or more sets of stay rods that may be disengaged and reengaged using nuts to facilitate replacement of components without cutting or welding.
- Tension on the one or more sets of stay rods causes compression on the power end assembly to preload the power end assembly against working loads and/or to apply compression to components made of materials that benefit from compression.
- Using a plurality of sets of stay rods enables the stay rods to be vertically offset such that deflection and stress from driving the fluid end can be reduced by moving the set of stay rods that couple the connector section to the power end assembly closer to the cylindrical axes of the plungers reciprocating in the fluid ends.
- Compression from the one or more sets of stay rods is distributed throughout the power end using one or more unitary plates. The one or more unitary plates also reduces stress on and displacement of modular components due to static and working loads.
- Different components of the power end assembly are made of different materials that are suited to different purposes. For example, components housing moving components such as the crosshead frames and crank frame may be made of ductile iron that is being compressed by plates made of high-alloy steel. Compressing the ductile iron components increases their performance (e.g., resistance to wear, working life) in various embodiments. Other components may be made of high-alloy steel for strength. The use of different materials may also reduce weight and cost of materials.
- Weight is strategically reduced throughout the power end by using individual crosshead frames and through the use of weight-reducing features in the crosshead section, crank section, and various plates.
- Blind nuts and/or threaded receivers in one or more of the plates allows nuts to be installed at the proper amount of torque without measuring an amount of exposed thread extending from the nuts.
- Feet in the crank frame anchor the crank frame to the base section at each bearing journal location and in line with bearing loads that are transferred to the feet and then to the base section.
- Longer connecting arms and wider crossheads lower pressure-velocity loading of the crosshead assembly on the crosshead frames.
- Using pony rod seal housings that hold the pony rod seal partially inside the crosshead frame increases the clearance around the pony rod clamp on the backstroke of the power end assembly.
- Lubrication is applied at the top of the power end at both the crosshead section and the crank section, collected through a plurality of drains in the crank section, and reused in a closed lubrication system.
- Spacers maintain the distance between the connect plates and the crosshead frames.
- Use of seals positioned in grooves cut into components instead of gaskets avoids common problems with gaskets such as saturation and over compression.
- Various bores in the crosshead frames facilitate the flow of air and lubricant from the crosshead frames to the crank section.
- Various alignment dowel pins, countersunk holes, and/or sleeves facilitate alignment of components during assembly (or reassembly) of the power end assembly.

The advantages conferred by the previously described improvements are listed here for convenience. This is not an exhaustive list and it is expected that other benefits will be realized as the improvements are implemented. Omission from this list does not preclude the identification of additional benefits.

High-Pressure Hydraulic Fracturing Pump Assembly with Two Sets of Stay Rods

Referring individually to FIG. 1, a perspective view of an embodiment of a high-pressure hydraulic fracturing pump 100 is shown. FIG. 1 shows the pump 100 which includes a fluid end assembly no and a power end assembly 120. The fluid end assembly no includes a plurality of fluid end sections 112. The power end assembly 120 includes a crank section 122, a crosshead section 124, a drive section 130, and a base section 140. The fluid end assembly 110 may be attached to the power end assembly 120 using a connector section 126.

For the sake of clarity, as used herein "front" or "front side" refer to portions of power end assembly 120 that are proximate to fluid end assembly no along a longitudinal axis and "rear" or "rear side" refer to portions of power end assembly 120 that are distal from fluid end assembly no along the longitudinal axis. Similarly, as used herein "top" or "top side" refer to portions of high-pressure hydraulic fracturing pump 100 that are distal from base section 140 along a vertical axis and "bottom" or "bottom side" refer to portions of high-pressure hydraulic fracturing pump 100 that are proximate to base section 140 along the vertical axis.

Accordingly, in the embodiment shown in FIGS. 1-9, for example, the connector section 126 is in front of the crosshead section 124, which in turn is in front of the crank section 122, and the fluid end assembly 110 and the power end assembly 120 are coupled to the top of the base section 140.

The fluid end assembly 110 includes a plurality of fluid end sections 112 coupled together by one or more manifolds 114. Fluid end assembly 110 (as well as how fluid end assembly 110 is integrated with power end assembly 120 to form pump 100) is discussed in further detail in U.S. patent application Ser. No. 16/951,605, authored by Thomas et al., filed on Nov. 18, 2020, and titled "Fluid Routing Plug", and U.S. patent application Ser. No. 16/951,741, authored by Thomas et al., filed on Nov. 18, 2020, titled "Fluid End", each of which is incorporated herein in their entirety. As discussed herein and in related applications, fluid end assembly 110 is configured to receive a fluid (e.g., fracking fluid) which is then pressurized using power end assembly 120 and discharged under increased pressure.

The power end assembly 120 includes the crank section 122, the crosshead section 124, and the connector section 126. The crank section 122 is configured to receive rotational motion (e.g., from drive section 130). As discussed herein, crank section 122 includes a crank frame (e.g., crank frame 210 shown in FIG. 2), a crankshaft (e.g., crankshaft 212 shown in FIG. 2), and various components that facilitate the rotation of the crankshaft within the crank frame (e.g., the components shown in FIG. 53) and the coupling of crank section 122 to crosshead section 124, drive section 130, and base section 140.

As used herein, "a first means for receiving rotational motion" or "means for translating rotational motion into linear motion" includes the crank section 122 and its components and the equivalents therefore. The crank section 122 and its various components are discussed herein in further detail in reference to FIGS. 53-63.

The crosshead section 124 is configured to couple to the crank section 122 and to provide reciprocal movement of a plurality of plungers 800. The crosshead section 124 includes a plurality of individual crosshead frames (e.g., crosshead frames 220 shown in FIG. 2) and a plurality of crosshead assemblies (e.g., crosshead assemblies 1700 shown in FIG. 17). As recited herein, crosshead section 124 (and its equivalents) and its components (and their equivalents). may be referred to as "a means for reciprocating the plungers." Crosshead section 124 and its various components are discussed herein in further detail in reference to FIGS. 37-52.

The connector section 126 is configured to couple to fluid end assembly 110 (e.g., by coupling to individual fluid end sections 112) such that the linear motion is applied to fluid end assembly 110. The connector section 126 includes one or more connect plates (e.g., individual connect plates 230 shown in FIG. 2) and one or more spacers (e.g., spacers 232 shown in FIG. 2). As recited herein, connector section 126 (and its equivalents) and its various components (and their equivalents) may be referred to as "a means for coupling to a fluid end assembly 110." The connector section 126 and its various components are discussed herein in in further detail in reference to FIGS. 8-23.

Figure 2:
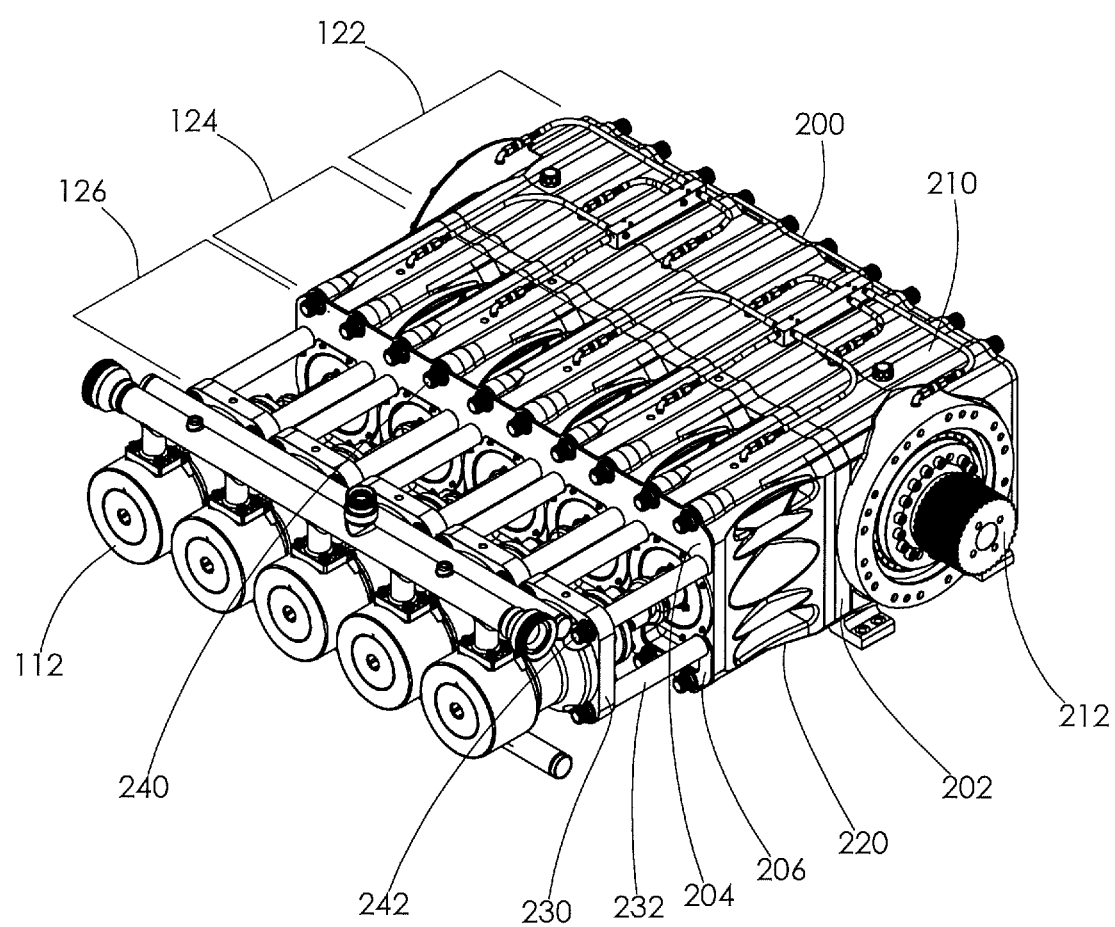
FIG. 2 is the front right-side perspective view of the pump shown in FIG. 1 with the drive section and base section removed.
Figure 9:
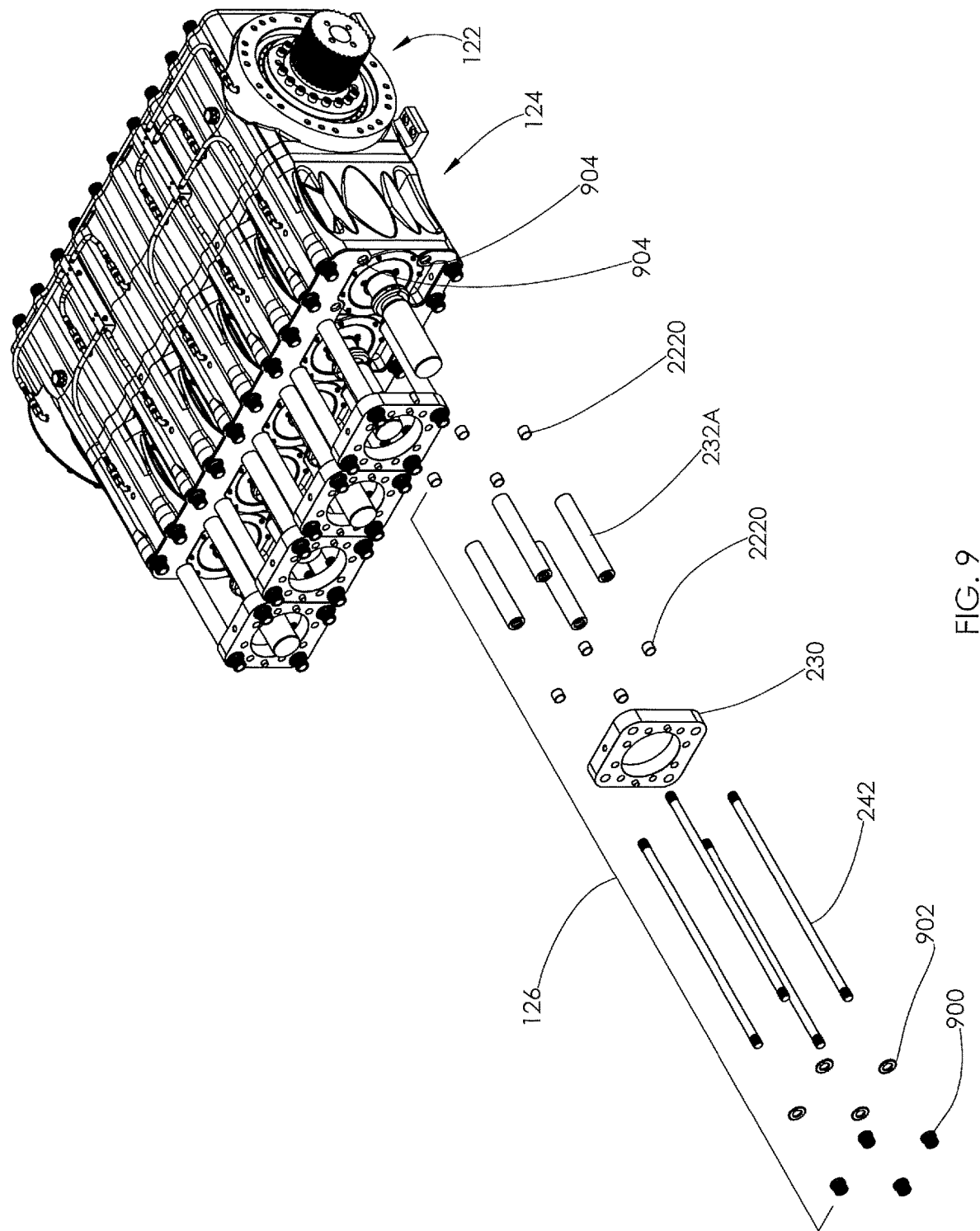
FIG. 9 is an exploded view of the power end assembly and connect plates shown in FIG. 8
Figure 13:
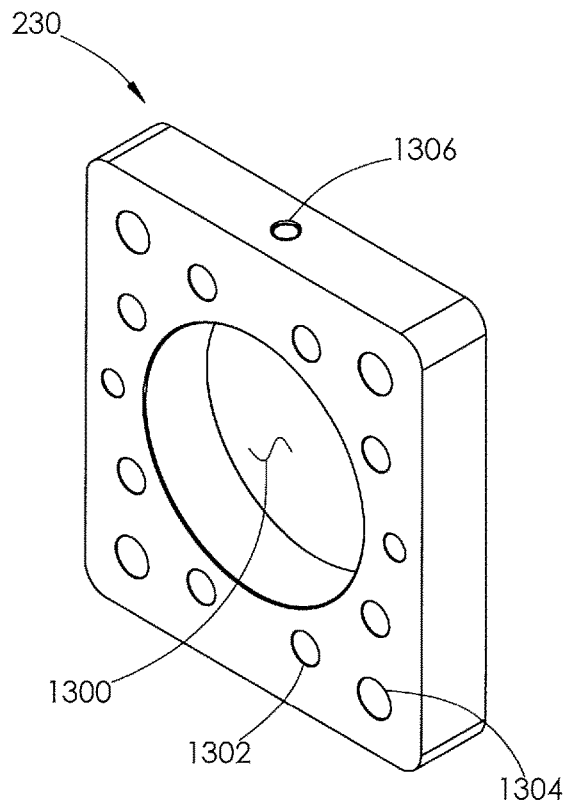
FIG. 13 is a front perspective view of one of the connect plates shown in FIG. 8.
Figure 24:
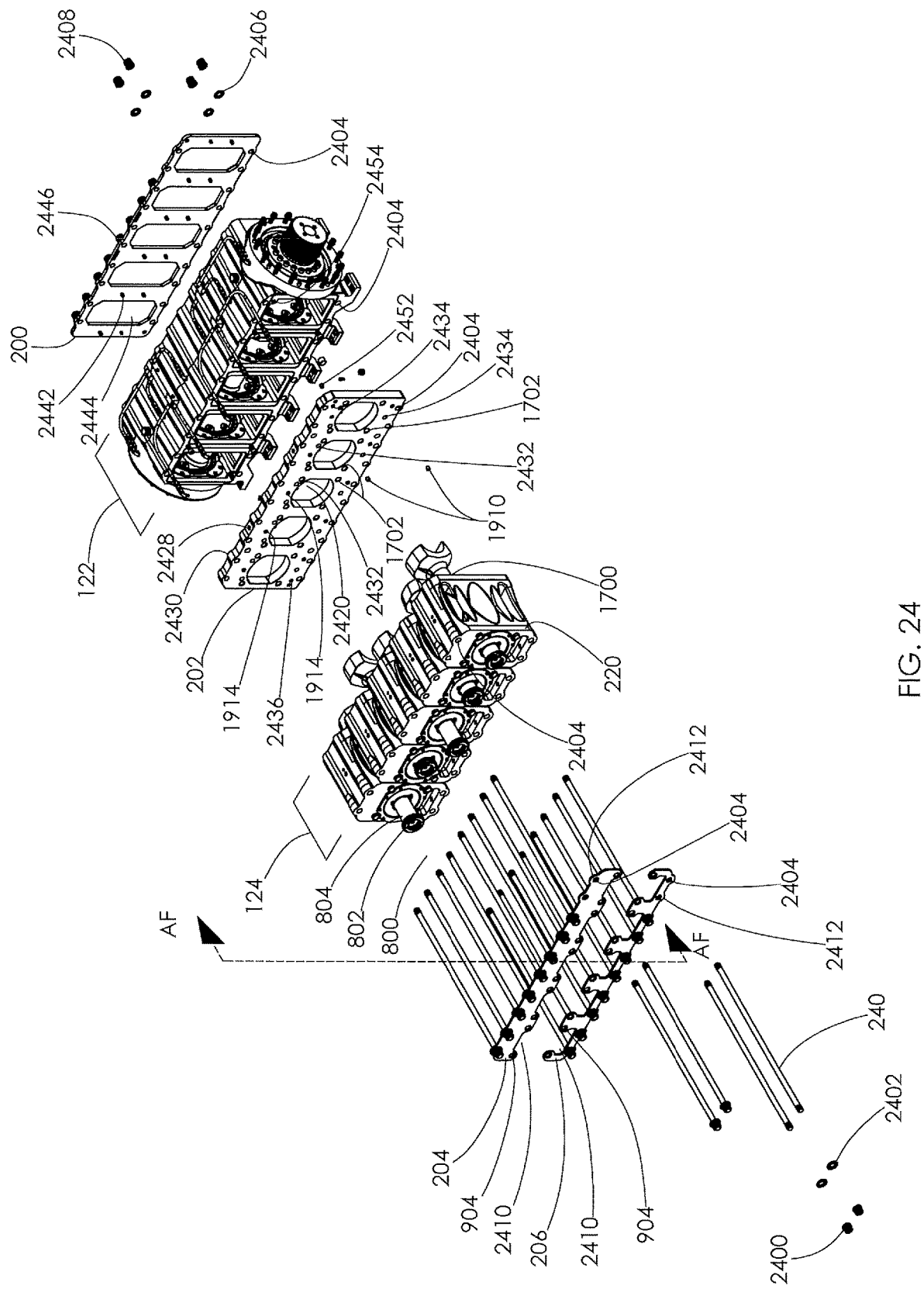
FIG. 24 is a front perspective exploded view of the crosshead section and the crank section of the power end assembly shown in FIG. 7.

The power end assembly 120 is held together by one or more plates (e.g., plates 200, 202, 204, and 206 shown in FIG. 2), one or more sets of stay rods (e.g., first set of stay rods 240 and second set of stay rods 242 shown in FIG. 2), and one or more sets of washers and nuts (e.g., shown in FIGS. 9 and 24). Collectively these components (and their equivalents) may be referred to as a "means for coupling together a power end assembly" as recited herein.

The pump 100 is powered using one or more drive sections 130. The drive section 130 includes a planetary gearset, although any other suitable gear configuration could be used. The drive section 130 may be powered by a diesel motor (not shown) and applies rotational motion to crank section 122 at one end. In other embodiments, the drive section 130 is powered by one or more electrical motors and applies rotational motion to crank section 122 at one end or by a dual drive section 130 in which rotational motion is applied at both ends of crank section 122.

The pump 100 includes base section 140 that is configured to couple to various components of crank section 122 and/or crosshead section 124. The base section 140 provides support for the crosshead section 124, crank section 122 and drive section 130 during operation. Further, the base section 140 may be coupled to a truck or a trailer (not shown), such that pump 100 may be moved to a drill site or around the drill site. Base section 140 is discussed in further detail here in reference to FIG. 64.

Power End Assembly 120

Referring now to FIGS. 2-7, the pump 100 includes a plurality of plates and rods that couple the crank section 122, crosshead section 124, and connector section 126 together. As shown in FIG. 2, such plates include a rear support plate 200 (also referred to herein as a crank section support plate), a central support plate 202 (also referred to herein as a center support plate), and one or more front support plates such as a top front support plate 204 and a bottom front support plate 206.

The rear support plate 200 is coupled to a rear side of the crank section 122, the central support plate 202 is coupled to a front side of crank section 122 and a rear side of crosshead section 124 (and is thus disposed between crank section 122 and crosshead section 124), and the top front support plate 204 and bottom front support plate 206 are coupled to the front of crosshead section 124.

In the embodiment shown in FIGS. 1-9, two sets of stay rods (also referred herein as sets of rods) hold high-pressure hydraulic fracturing pump 100 together: a first set of rods 240 (also referred to herein as crank stay rods 240 and stay rods 240) and a second set of rods 242 (also referred to herein as connect plate stay rods 242 and stay rods 242).

In the embodiment shown in FIGS. 1-9, (a) the first set of rods 240 couples together top front support plate 204 and bottom front support plate 206, crosshead section 124, central support plate 202, crank section 122, and rear support plate 200, and (b) second set of rods 242 couples together connector section 126, top front support plate 204 and bottom front support plate 206, crosshead section 124, and central support plate 202.

As discussed herein, in various embodiments, fewer than two sets of stay rods may be used (e.g., one set of stay rods), more than two sets of stay rods may be used (e.g., three sets of stay rods), and/or the sets of stay rods may be used to couple the crank section 122, crosshead section 124, and connector section 126 differently than shown in FIGS. 2-7.

In further various embodiments, the various plates 200, 202, 204, and 206 may have different top and bottom profiles to match the shape of various embodiments of crank section 122 and crosshead section 124. Additionally, various embodiments of high-pressure hydraulic fracturing pump discussed herein do not include some or all of plates 200, 202, 204, and 206 (e.g., the embodiments may not include plates 202, 204, and 206).

The second set of rods 240 are discussed in further detail herein in reference to FIGS. 8-23. The first set of rods 240 are discussed in further detail herein in reference to FIGS. 24-35. The rear support plate 200 is discussed in further detail herein in reference to FIGS. 24 and 54. The central support plate 202 is discussed in further detail herein in reference to FIGS. 24 and 37. The one or more front support plates (e.g., top front support plate 204, bottom front support plate 206) are discussed in further detail herein in reference to FIGS. 24 and 36.

Figure 5:
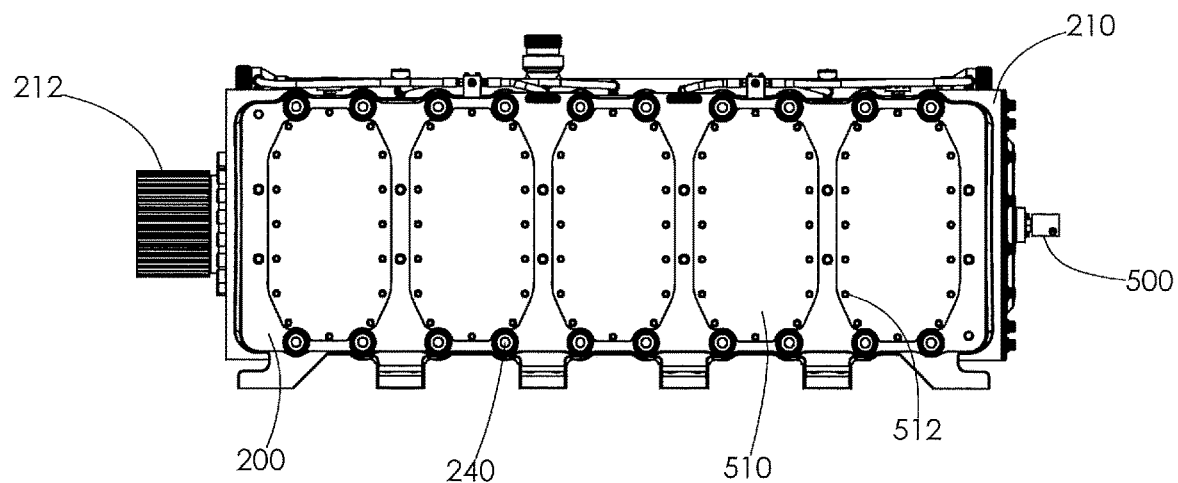
FIG. 5 is a rear elevational view of the pump shown in FIG. 2.
Figure 6:
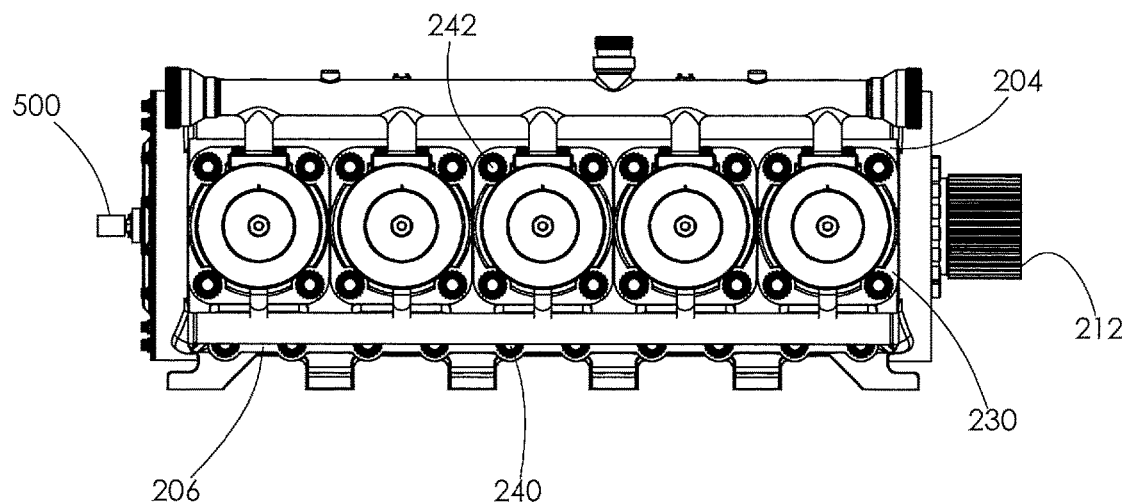
FIG. 6 is a front elevational view of the pump shown in FIG. 2.

The crank section 122 includes a crank frame 210 and crankshaft 212. As discussed herein, rotational motion is applied to crankshaft 212 (e.g., by drive section 130), which in turn rotates within crank frame 210. Referring now to FIG. 5 individually, in various embodiments in which crank section 122 is driven by a drive section 130 on one side (as shown in FIG. 1), crank section 122 includes a lubrication inlet 500, which is configured to attach to the crank section 122 at the side that is opposite to drive section 130 to facilitate lubrication of crankshaft 212.

In the embodiments shown in FIG. 5, the crank section 122 includes a plurality of maintenance covers 510 secured to rear support plate 200 by a plurality of fasteners 512 (e.g., machine screws that may be driven by a hex driver). The various components of crank section 122, crank frame 210, and crankshaft 212 are discussed in further detail herein in reference to FIGS. 53-63.

The crosshead section 124 includes a plurality of individual crosshead frames 220. In such embodiment, the individual crosshead frames 220 house respective crosshead assemblies (e.g., crosshead assembly 1700 shown in FIG. 17) configured to translate rotational motion from crankshaft 212 into linear motion useable to drive a plunger of a fluid end section 112 (e.g., plunger 800 shown in FIG. 8). The various components of crosshead section 124 and crosshead frames 220 are discussed in further detail herein in reference to FIGS. 36-52.

Figure 3:
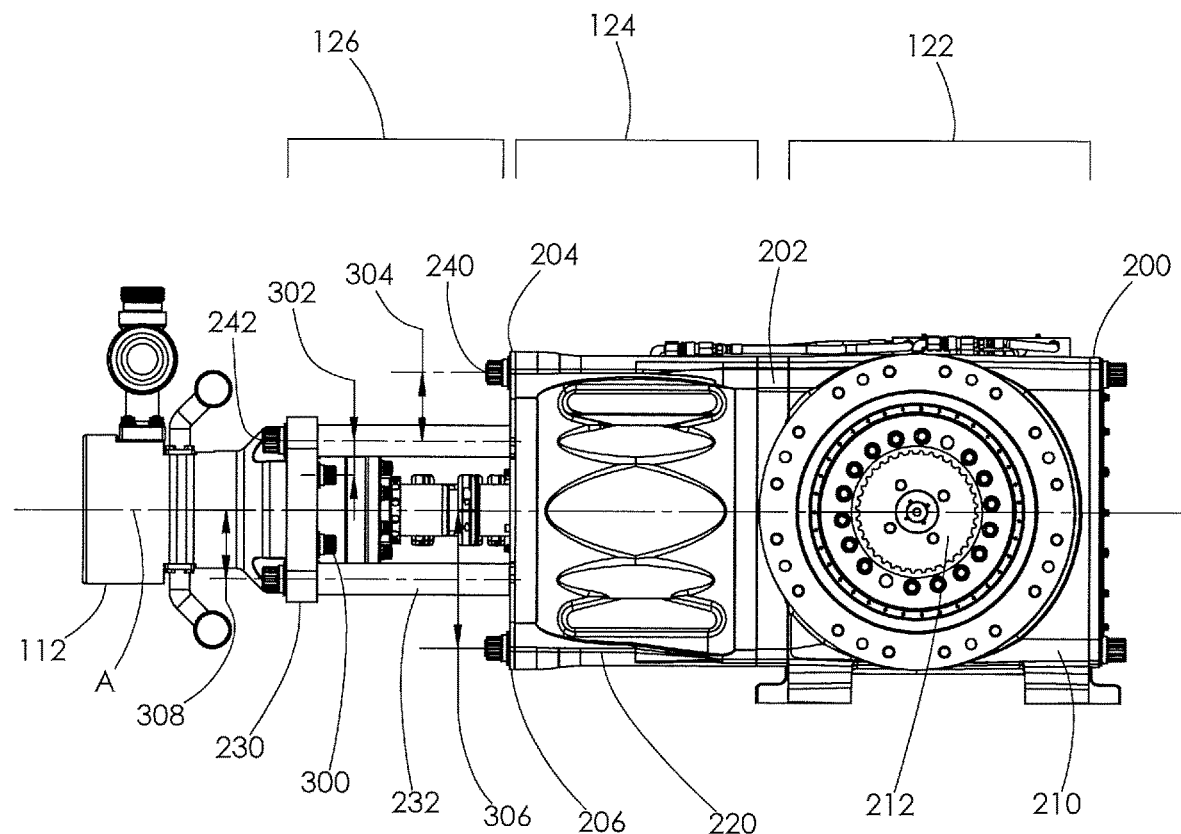
FIG. 3 is a right-side elevational view of the pump shown in FIG. 2.
Figure 4:
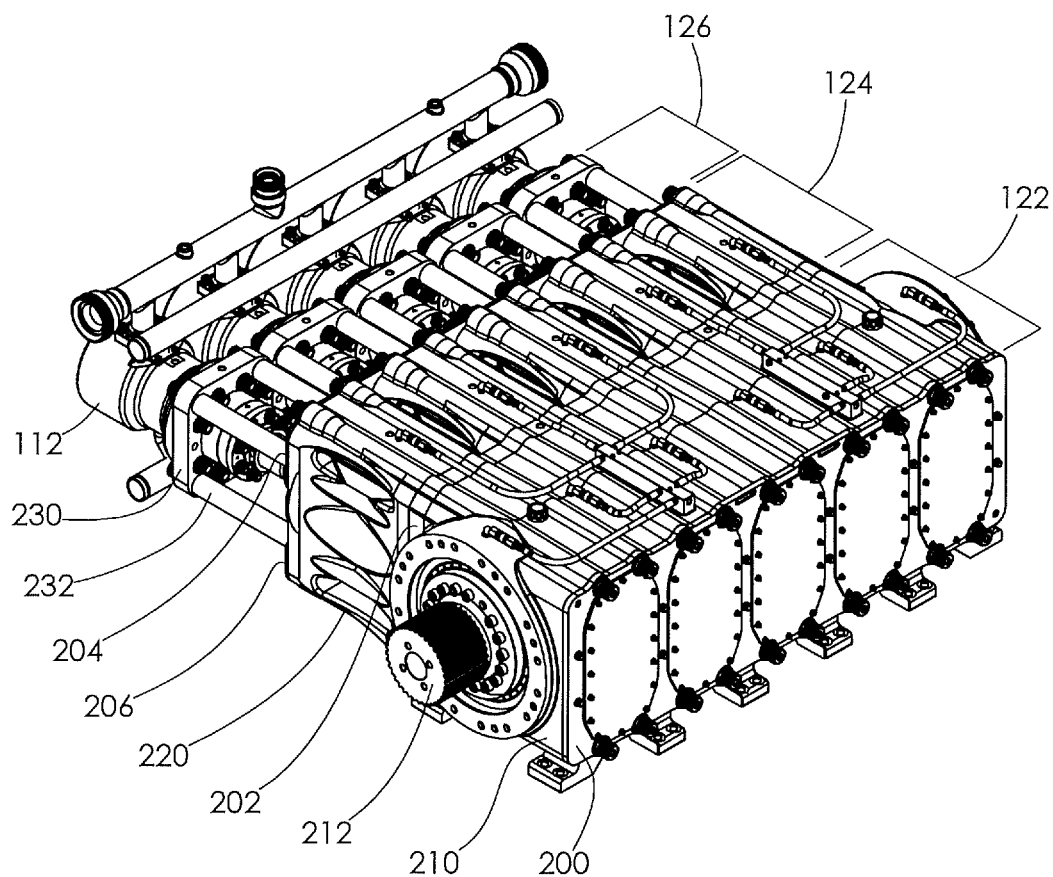
FIG. 4 is a rear right-side perspective view of the pump shown in FIG. 2.

The connector section 126 includes a plurality of individual connect plates 230 and a plurality of spacers 232. Referring now to FIG. 3, the individual connect plates 230 are configured to couple to respective fluid end sections 112 using a series of fasteners 300 (e.g., a stud received by fluid end section 112 and inserted through bores through connect plate 230 and secured by a washer and nut). The number of individual connect plates 230 (and the number of crosshead frames 220) preferably corresponds to the number of fluid end plungers (e.g., plunger 800 discussed in reference to FIG. 8) that power end assembly 120 is powering.

Some embodiments of spacers 232 are discussed below in reference to FIGS. 10-12, and an alternative embodiment of spacers 232A is discussed below in reference to FIG. 22A.

In various embodiments of power end assembly 120, either of spacers 232 or spacers 232A may be used with corresponding modifications to connect plate 230 and plates 204 and 206.

In various embodiments such as those shown in FIGS. 1-7, the fluid end assembly 110 includes a plurality of individual fluid end sections 112 that each have their own plunger. In such embodiments, each individual fluid end section 112 has a corresponding individual connect plate 230 and crosshead frame 220 (e.g., in embodiments with five fluid end sections 112, there are five individual connect plates 230 and crosshead frames 220).

In other embodiments, however, fluid end assembly 110 may include a solid block having more than one plunger (e.g., a fluid end with five plungers). In some other embodiments, the connector section 126 includes one or more connect plates (not shown) corresponding to more than one plunger (e.g., a single connect plate for a fluid end having five plungers).

As shown in FIG. 3, the fasteners 300 are vertically offset from second set of rods 242 by vertical offset 302, and second set of rods 242 are vertically offset from first set of rods 240 by vertical offset 304. The vertical offset 302 may be between 2 and 4 inches and vertical offset 304 may be between 5 and 7 inches. As shown in FIG. 3, the vertical offset 306 between the first set of rods 240 and a longitudinal centerline A of the power end assembly 120 is greater than the vertical offset 308 between the second set of rods 242 and the centerline A. The vertical offset 306 may be between 12 and 14 inches and vertical offset 308 may be between 5 and 7 inches.

The connections coupling the power end assembly 120 together and coupling the power end assembly 120 to fluid end assembly 110 may be referred to collectively as "step down connections." The stay rods 240 connect the crank section 122 to the crosshead section 124, compressing the central support plate 202 plate between them.

The second set of stay rods 242 connect the crosshead section 124 to the connect plates 230. The connect plates 230 are connected to the fluid end sections 112 using the fasteners 300. As the connections get closer to the front of the pump 100 they get closer together vertically, or they "step down."

The vertical distance between the lowest stay rod 240 and highest stay rod 240 (i.e., vertical offset 306 doubled) is larger than the vertical distance between the lowest connect plate stay rod 242 and the highest connect plate stay rod 242 (i.e., vertical offset 308 doubled). In like manner, the vertical distance between the lowest connect plate stay rod 242 and the highest connect plate stay rod 242 is greater than the vertical distance between the lowest fastener 300 and the highest fastener 300. These step downs minimize flexure in the entire assembly, allow for ease of assembly and disassembly, and generate a better fit between components in various embodiments.

The first set of rods 240 couple together the top front support plate 204 and the bottom front support plate 206, the crosshead section 124, the central support plate 202, the crank section 122, and the rear support plate 200. The components are coupled such that when the first set of rods 240 is in a state of tension (e.g., by applying torque to the nuts 2400 shown in FIG. 24), the top front support plate 204 and the bottom front support plate 206, the crosshead section 124, the central support plate 202, the crank section 122, and the rear support plate 200 are compressed.

Similarly, the second set of rods 242 couples together the connector section 126, the top front support plate 204 and the bottom front support plate 206, the crosshead section 124, and the central support plate 202. The components are coupled such that when the second set of rods 242 is in a state of tension (e.g., by applying torque to the nuts 900 shown in FIG. 9) the individual connect plates 230, the spacers 232, the top front support plate 204 and the bottom front support plate 206, and the crosshead section 124 are compressed.

Further, because each of the first set of rods 240 extends all of the way through the top and bottom of the crosshead section 124 and the crank section 122, the individual crosshead frames 220 and crank frame 210 are compressed. Accordingly, these components in compression are preloaded above working loads (e.g., deflection and stress on the individual connect plates 230 from reciprocating plungers of fluid end assembly 110) and from the force of gravity on the fluid end assembly 110.

Figure 64:
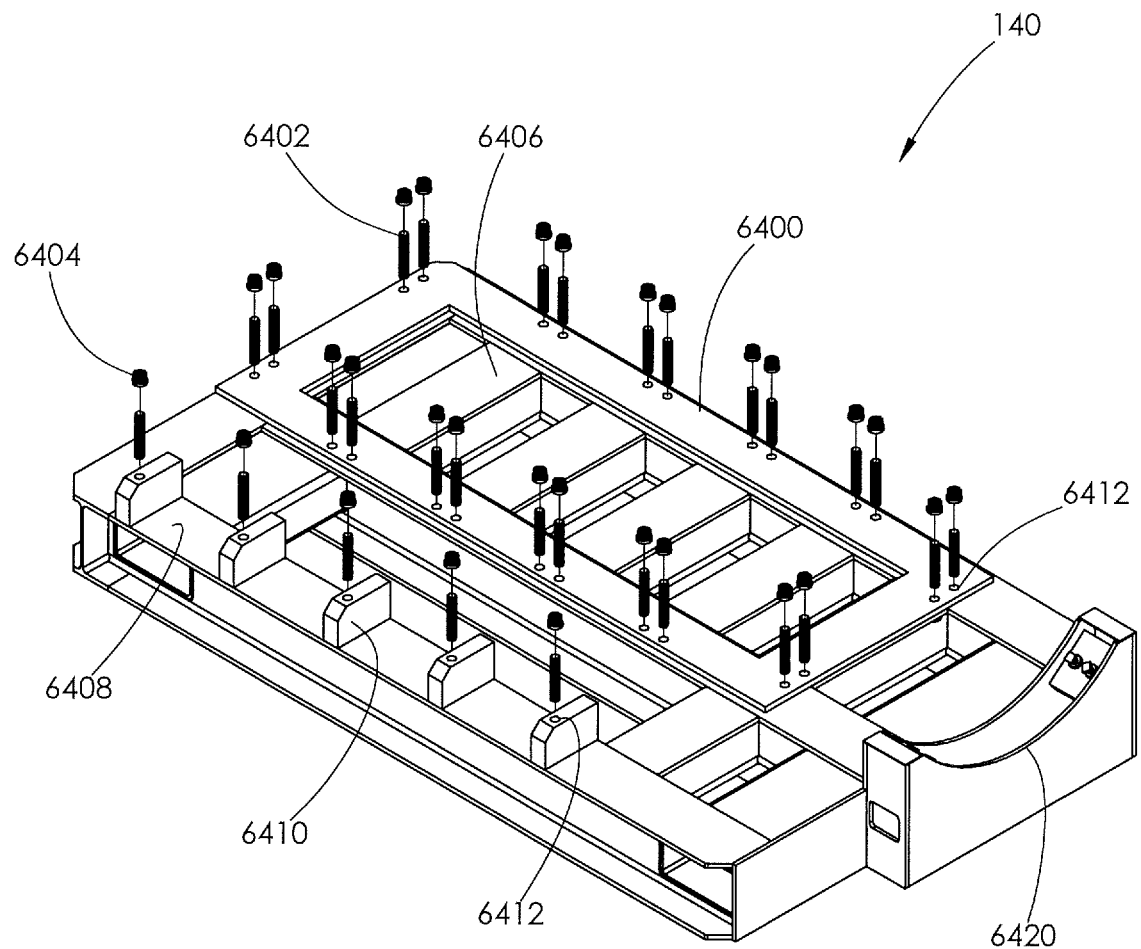
FIG. 64 is a top perspective and partially exploded view of the base section used with the pump shown in FIG. 1.

Thus, in the embodiments discussed in reference to FIGS. 1-64, the first set of rods 240 couples together the top front support plate 204 and the bottom front support plate 206, the crosshead section 124, the central support plate 202, the crank section 122, and the rear support plate 200. The second set of rods 242 couples together the connector section 126, the top front support plate 204 and the bottom front support plate 206, the crosshead section 124, and the central support plate 202. Other arrangements of stay rods may be employed in different embodiments, however, while still including other aspects of the disclosure (e.g., individual connect plates 230, individual crosshead frames 220, single-plunger fluid end sections 112, blind nuts 2408 shown in FIG. 24, various alignment pins and lubrication features discussed herein).

For example, embodiments may use a single set of stay rods with different embodiments of individual connect plates and crosshead frames. Another embodiment having two sets of stay rods but with different embodiments of individual connect plates, individual crosshead frames, and single-plunger fluid end sections may be used. Embodiments having three sets of stay rods and different embodiments of individual connect plates, individual crosshead frames, and single-plunger fluid end sections may also be used. Another embodiment having two sets of stay rods but with different embodiments of individual connect plates, individual crosshead frames, and single-plunger fluid end sections may also be used.

The individual crosshead frames 220 and the crank frame 210 may be made (at least in part) of ductile iron. The first set of stay rods 240, the second set of stay rods 242, the rear support plate 200, the central support plate 202, the top front support plate 204, and the bottom front support plate 206 may be made (at least in part) of high alloy steel.

By using different materials in different applications, different beneficial properties of the different materials can be used to improve the overall performance of power end assembly 120. As will be understood, ductile iron (also referred to as ductile cast iron, spheroidal graphite cast iron, or nodular cast iron) has improved impact and fatigue resistance, elongation, and wear resistance due to the spherical (round) graphite structures in the metal.

Further, as the individual crosshead frames 220 and crank frame 210 are subjected to wear, the graphite embedded in the ductile iron may act as an additional dry lubricant around the crankshaft 212 and the crosshead assembly as they move. Additionally, the geometry of crank frame 210 and the individual crosshead frames 220 may be easier to manufacture with ductile iron because the crank frame 210 and the individual crosshead frames 220 can be cast from molten ductile iron, which may be easier and less expensive than machining the crank frame 210 and the individual crosshead frames 220 from blocks of high alloy steel.

In contrast, high alloy steel (compared to ductile iron or carbon steel) has greater properties of strength, hardness, toughness, wear resistance, corrosion resistance, hardenability, and hot hardness. Thus, a high alloy steel is better able accept and distribute stress from tension on the first set of rods 240 and the second set of rods 242, and from deflection from the reciprocating plunger and individual connect plates 230.

Further, because the rear support plate 200, the central support plate 202, the top front support plate 204, and the bottom front support plate 206 are plates with various bores and cutouts discussed herein, machining them from larger plates is a relatively easier and less expensive than it would be to machine the crank frame 210 and the individual crosshead frames 220 from blocks of high alloy steel. In alternative embodiments, the first set of rods 240, the second set of rods 242, the connect plates 230, the spacers 232, and/or the fasteners 300 may also be made (at least in part) of high alloy steel.

By using two sets of rods 240 and 242, the functions performed by the rods 240 and 242 may be applied more precisely (i.e., compared to embodiments in which a single set of stay rods are used to couple together connector section 126, crosshead section 124, and crank section 122). In such embodiments, the second set of rods 242 is configured to remove high deflection and high stress in the connect plate 230 that might not be as effectively removed in an embodiment having a single set of stay rods because the single set of stay rods would be spaced too far from the cylindrical axis of the plunger (i.e. centerline A shown in FIG. 3) to effectively eliminate the deflection and stress if they were the only set of stay rods used. In contrast, by being closer to centerline A, the second set of rods 242 decreases deflection and stress on the individual connect plates 230, the spacers 232, and the second set of rods 242 is decreased because the vertical offset 306 is closer to centerline A. As a result, the service life of these components may be increased.

Figure 7:
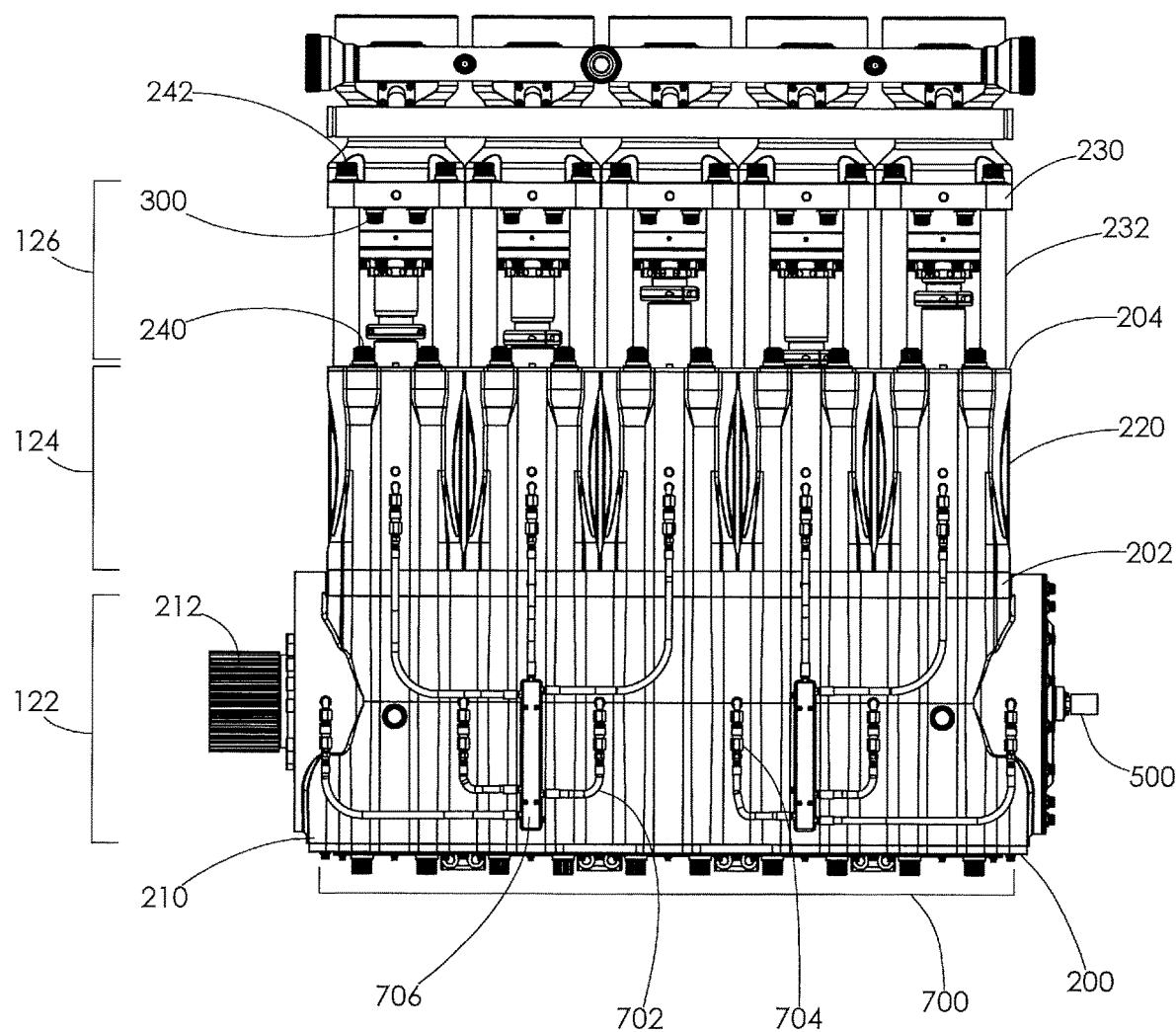
FIG. 7 is a top plan view of the pump shown in FIG. 2.

Referring now to FIG. 7 individually, power end assembly 120 includes a lubrication system 700 and a plurality of fluid end mounting fasteners 300 that are configured to secure fluid end assembly 110 to connector section 126. The fluid end mounting fasteners 300 may be any of a number of suitable fasteners such as an assembly of a stud, washer, and nut as shown in FIG. 7. As discussed in further detail in reference to FIGS. 13-16, the fluid end mounting fasteners 300 are configured to pass through connect plates 230 and are received by corresponding holes in fluid end section 112 such that when the fluid end mounting fasteners 300 are tightened, fluid end section 112 is secured to connect plate 230.

The lubrication system 700 includes a lubrication distribution manifold 706 that is coupled to the lubrication conduits 702 and the connectors 704. The lubrication distribution manifold 706 receives lubricant from a lubrication system (not shown) and distributes lubricant to the crank section 122 and the crosshead section 124 via the lubrication conduits 702 and the connectors 704. The lubrication system 700 for the power end assembly 120 is coupled to a lubrication pump (not shown) to provide pressure to the lubricant to carry the pressurized lubricant to the different input locations on the power end assembly 120 corresponding to the connectors 704.

As discussed in further detail in reference to FIGS. 17-53, during operation, lubricant is provided to inlet ports of the crosshead section 124 at each crosshead frame 220 to lubricate the crosshead section 124 (e.g., lubrication inlet bore 1900 shown in FIG. 19) as the crosshead (e.g., crosshead assembly 1700 shown in FIG. 17) reciprocates. As discussed in further detail in reference to FIGS. 54-63, lubricant is provided to the crank section 122 on both ends of the crankshaft 212 and at each bearing journal in the crank frame 210 (e.g., at lubrication ports 5422 shown in FIG. 54) to provide lubrication to the crankshaft 212 and the corresponding portions of the crank frame 210. Further, lubricant is allowed to flow out of the crosshead section 124 and into the crank section 122. After lubricating the crank section 122 and the crosshead section 124, lubricant drains out of the bottom of the crank section 122 (e.g., through drains 1908 shown in FIG. 19). This lubricant can be collected, filtered, supplemented as needed, and recirculated through the lubrication system 700 in various embodiments.

The lubrication of the power end assembly's 120 moving components is accomplished with a closed lubrication system 700. In this description, a closed lubricant system is defined as the lubricant being separate and distinct from the fluid being pumped. A closed lubricant system is further defined to reuse the lubricant. Reuse of the lubricant involves gathering the lubricant after use, filtering it, and reusing it. Periodic addition of makeup lubricant is allowed.

Second Set of Rods 242, Connector Section 126, and Lubrication System 700

Referring now to FIGS. 8-23, the power end assembly 120 and components thereof (with a particular focus on the second set of rods 242, the connector section 126, and the lubrication system 700) are shown in further detail.

Figure 8:
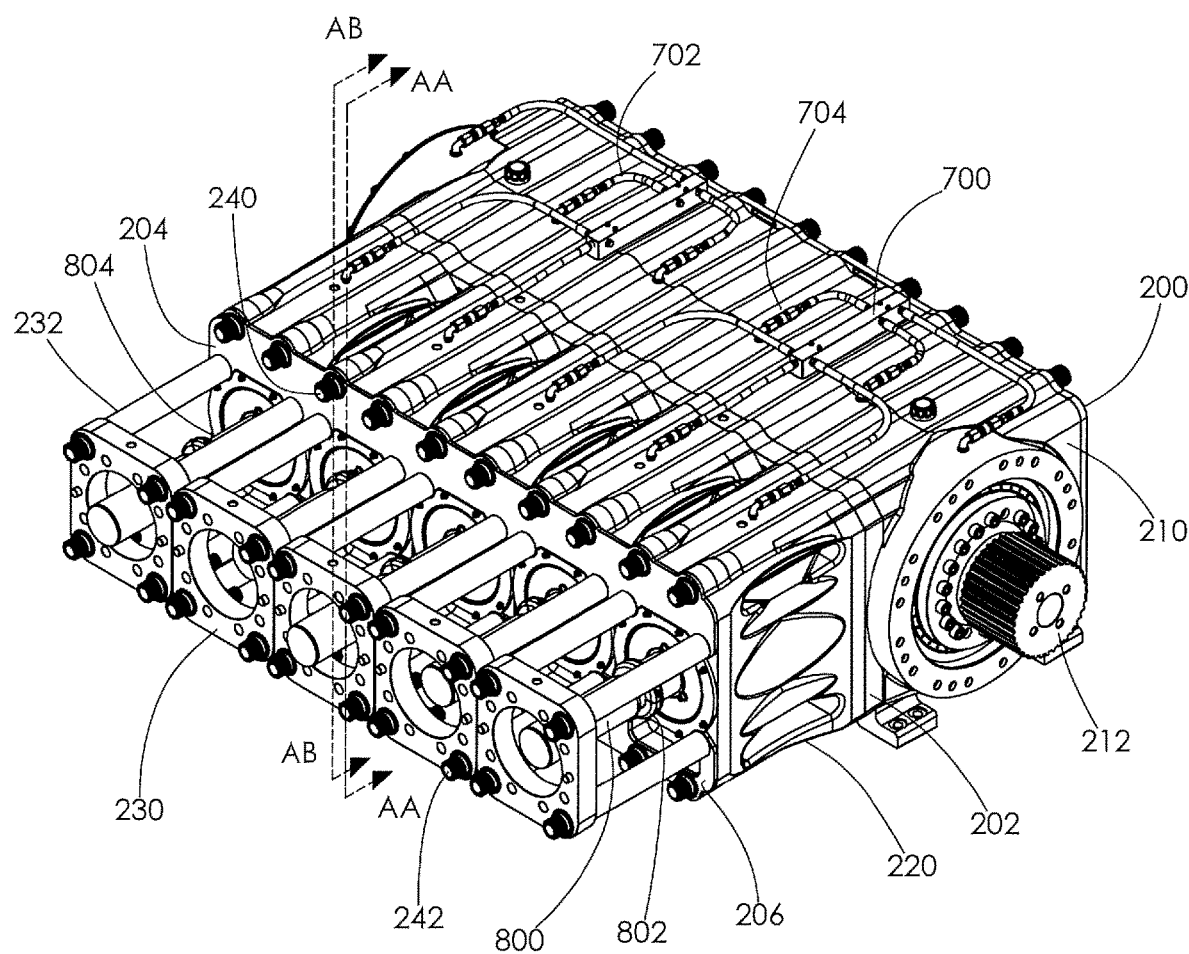
FIG. 8 a front right-side perspective view of the power end assembly shown in FIG. 2. A plurality of connect plates are shown attached to the power end assembly.

Referring individually to FIG. 8, the power end assembly 120 is shown with the fluid end assembly 110 removed. With fluid end assembly no removed, the plurality of plungers 800 that reciprocate within the fluid end assembly 110 are easier to view. The individual plungers 800 are coupled to a pony rod 804 by a pony rod clamp 802. As discussed in further detail herein, the pony rod 804 is a part of the crosshead assembly (e.g., crosshead assembly 1700 shown in FIG. 17) that reciprocates as a result of the crankshaft 212 rotating.

Returning to FIG. 9, when the power end assembly 120 is assembled, individual rods 242 of the second plurality of rods 242 are disposed through bores in connect plate 230 (e.g., through holes 1304 shown in FIG. 13), through spacers 232A, and through connect plate stay rod holes 904. In the embodiments shown in the figures, both ends of the rods 242 are threaded. The individual rods 242 are secured by threaded connect plate stay rod holes (e.g., threaded connect plate stay rod holes 1702 shown in FIG. 17) and by nuts 900 and washers 902.

The nuts 900 are 12-pt nuts (although other numbers of sides may be used such as 6 or 8). The washers 902 are washer assemblies such as the HYTORC Washer™ that eliminate the need for a torque reaction arm when engaging nuts 900. The washers 902 also include a lock washer to prevent nuts 900 from backing off due to vibration. During assembly, the washers 902 are placed on the protruding threaded end of the rods 242, and nuts 900 are torqued to between 2500 lb.-ft. and 4000 lb.-ft. The spacers 232 are aligned to the top front support plate 204 and the bottom front support plate 206 using a plurality of alignment dowels 906 (shown in FIG. 22) that are received by corresponding recesses in spacers 232 and plates 204 and 206. In various other embodiments, the spacers 232A are aligned to the connect plate 230, the top front support plate 204, the bottom front support plate 206 using a plurality of sleeves 2220 (discussed in reference to FIG. 22A).

With reference to FIGS. 10-12, the spacer 232 includes a connect plate stay rod through hole 1000, a smaller diameter linear section 1002, a conical transition section 1004, a larger diameter linear section 1008, and a plurality of alignment dowel pin holes 1006.

In the embodiment shown in FIGS. 13-16, the connect plate 230 is a generally square plate that includes a through bore 1300, a plurality of fluid end section mounting holes 1302, and a plurality of connect plate stay rod through holes 1304. Referring briefly back to FIG. 8, the plunger 800 is configured to reciprocate through the bore 1300.

Referring briefly back to FIG. 7, the fluid end mounting fasteners 300 are configured to pass through the plurality of fluid end section mounting holes 1302 and are configured to be torqued down to secure fluid end section 112 to connect plate 230. Referring briefly back to FIG. 9, a rod 242 is configured to pass through each of the four connect plate stay rod through holes 1304.

While the embodiments shown in FIGS. 13-16 include four connect plate stay rod through holes 1304 and eight fluid end section mounting holes 1302, it will be understood that other numbers of each may be present (e.g., six connect plate stay rod through holes 1304 and twelve fluid end section mounting holes 1302).

Figure 14:
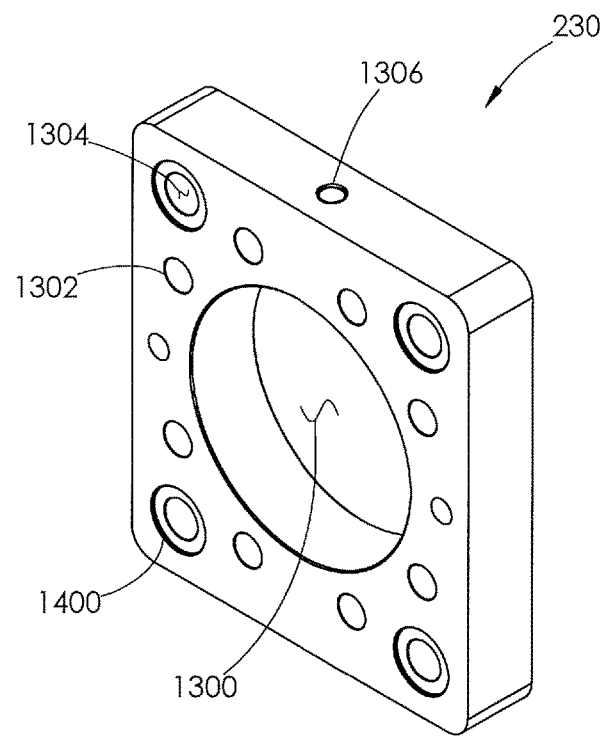
FIG. 14 is a rear perspective view of the connect plate shown in FIG. 13.
Figure 15:
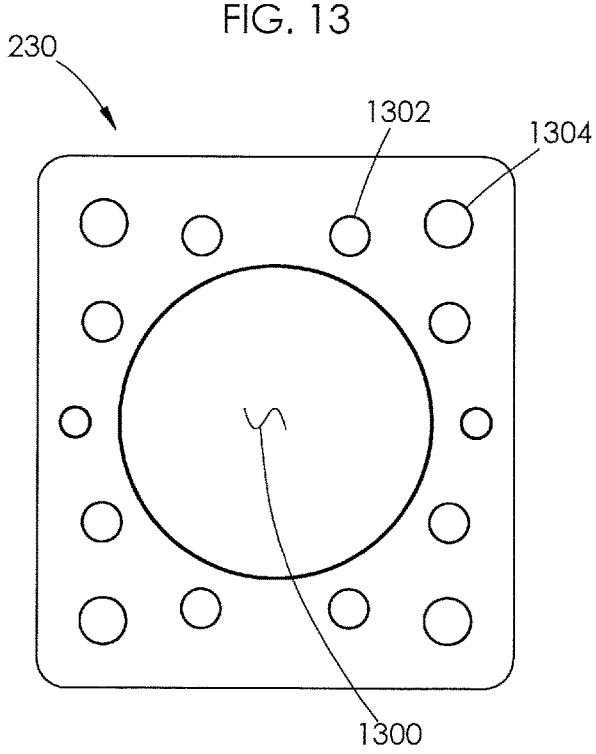
FIG. 15 is a front elevational view of the connect plate shown in FIG. 13.
Figure 16:
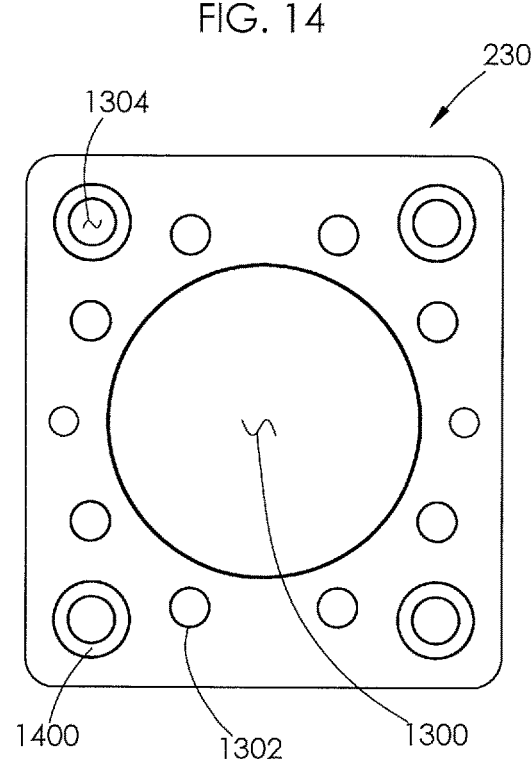
FIG. 16 is a rear elevational view of the connect plate shown in FIG. 13.

The connect plate 230 includes a lifting eye hole 1306 that is configured to facilitate movement of a subassembly of a fluid end section 112 and a connect plate 230 (e.g., to lift away the subassembly to facilitate replacement of a crosshead frame 220 as discussed herein). As shown in FIGS. 14 and 16, the holes 1304 have counterbores 1400 on the back face. The diameter of the counterbore 1400 is the same as the outside diameter of the smaller diameter linear section 1002 of the spacer 232.

In comparison to an embodiment in which stay rods coupling connector section 126 to the rest of power end assembly 120 were vertically further away from the fluid end mounting fasteners 300 and fluid end section mounting holes 1302 (e.g., a single stay rod embodiments), using a second plurality of stay rods 242 allows the connect plate stay rod through holes 1304 to be placed closer, vertically, to the fluid end section mounting holes 1302. This reduced distance between the two mounting points significantly reduces the deflection of the connect plate 230 during operation, particularly about the transverse axis.

While the connect plate 230 shown in FIGS. 13-16 is a substantially flat plate, it will be understood that connect plate 230 may be concave or convex. Further, in some embodiments, the connect plate 230 may include counterbores around the connect plate stay rod through holes 1304 such that at least part of nut 900 and washer 902 are disposed within the counterbore.

Figure 17:
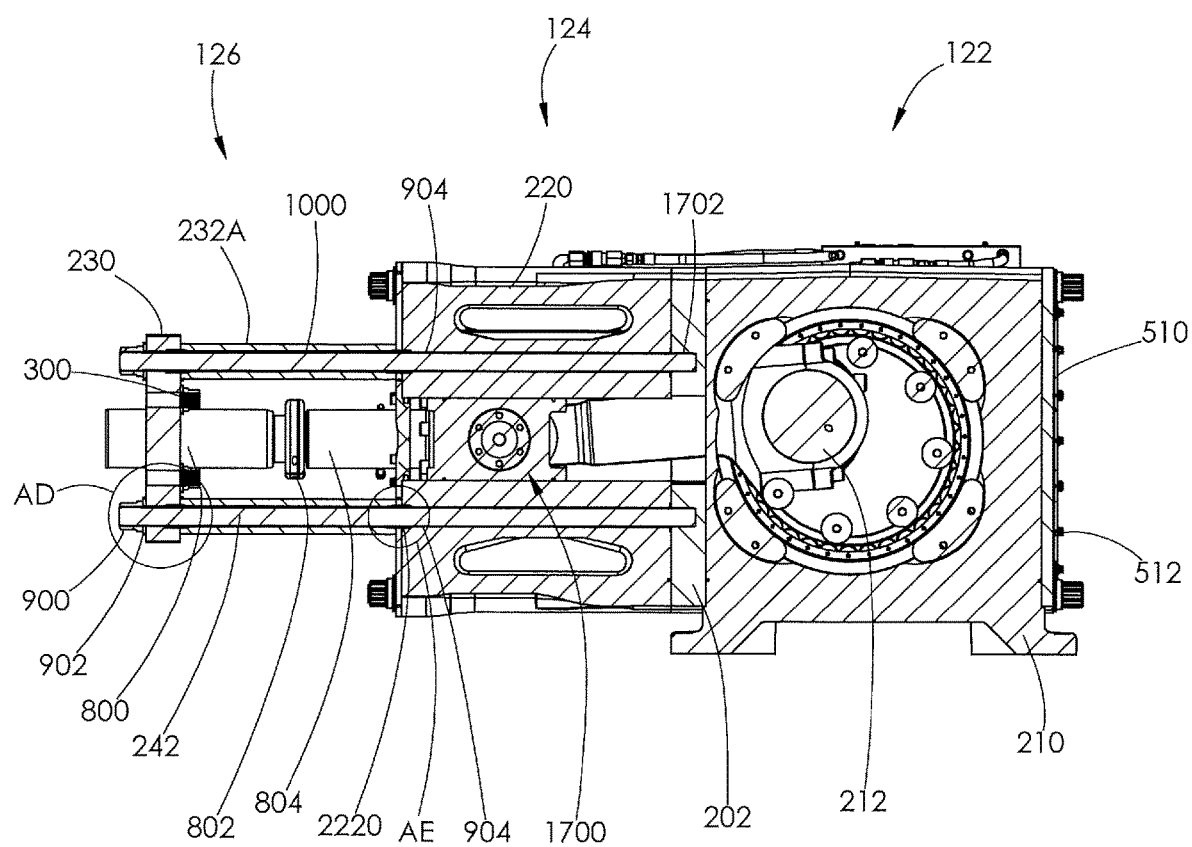
FIG. 17 is a cross-sectional view of the power end assembly and connect plates shown in FIG. 8, taken along line AA-AA.
Figure 18:
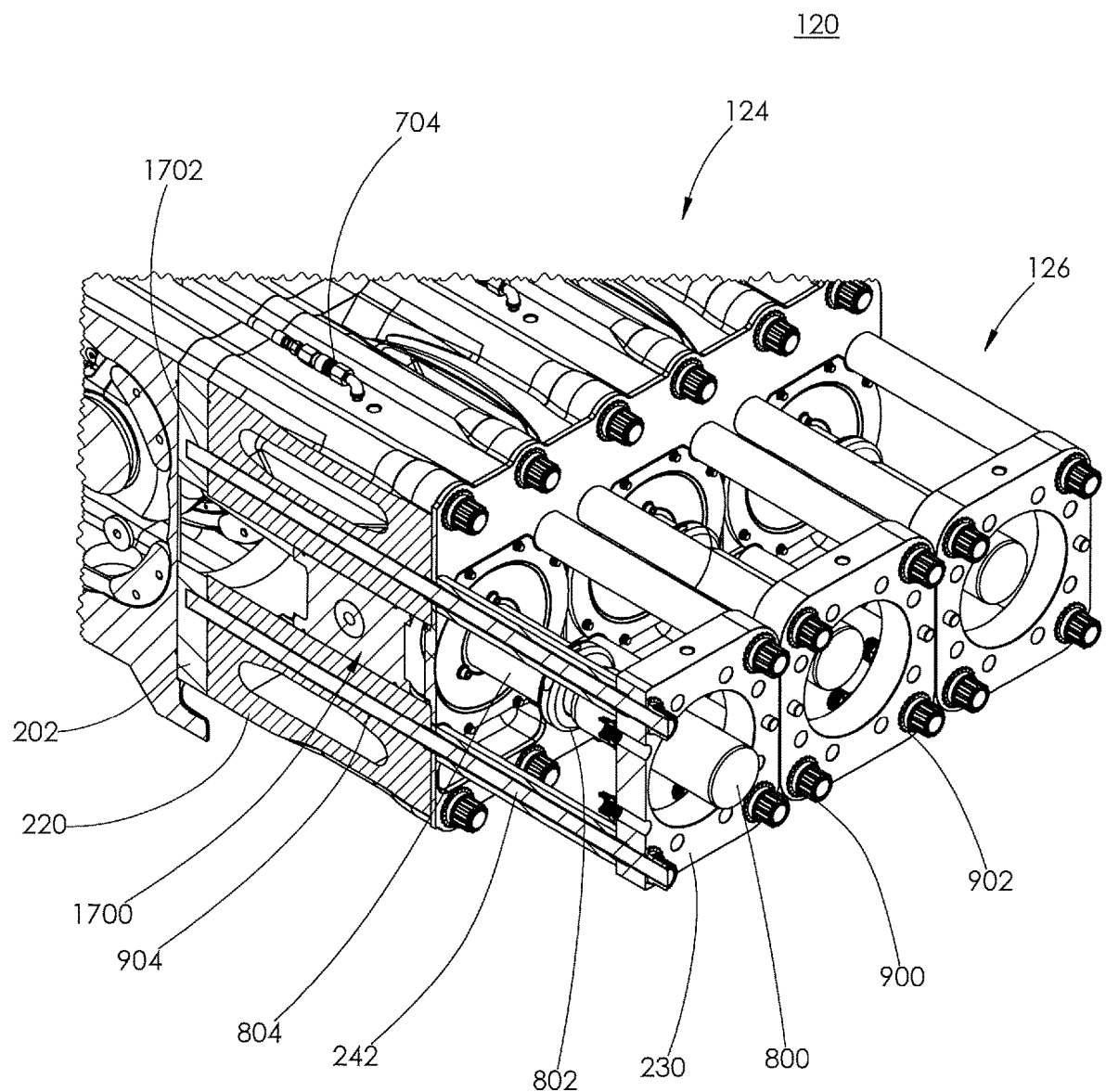
FIG. 18 is a front perspective view of a portion of the cross-sectional view of the power end assembly and connect plates shown in FIG. 17.

Referring now to FIGS. 17 and 18, the connect plate stay rod holes 904 extend all of the way through the plates 204, 206 and the crosshead frame 220 such that the rods 242 pass through the connect plate 230, the spacers 232, the connect plate stay rod holes 904 and end within threaded connect plate stay rod holes 1702 in the central support plate 202.

The threaded connect plate stay rod holes 1702 are female threaded recesses within central support plate 202 and are configured to receive a threaded end of a rod 242. The rods 242 are torqued down such that the rods are "fully engaged" with threaded connect plate stay rod holes 1702. As used herein, "fully engaged" means that a rod 242 has been torqued such that the end of rod 242 inserted into the threaded connect plate stay rod hole 1702 is in contact with the base of threaded connect plate stay rod hole 1702 (also referred to "bottoming out").

The rods 242 have their full tensile load when the nuts 900 have been torqued between 2500 lb.-ft. and 4000 lb.-ft. As shown in FIG. 17, a crosshead assembly 1700 driving pony rod 804 is disposed within the crosshead section 124, the central support plate 202, and the crank section 122. The crosshead assembly 1700 is discussed in further detail with reference to FIGS. 38, 39, 51, and 52. FIG. 17 also includes areas AD and AE, which in various embodiments, includes additional features discussed in reference to FIGS. 21 and 22, respectively.

Figure 19:
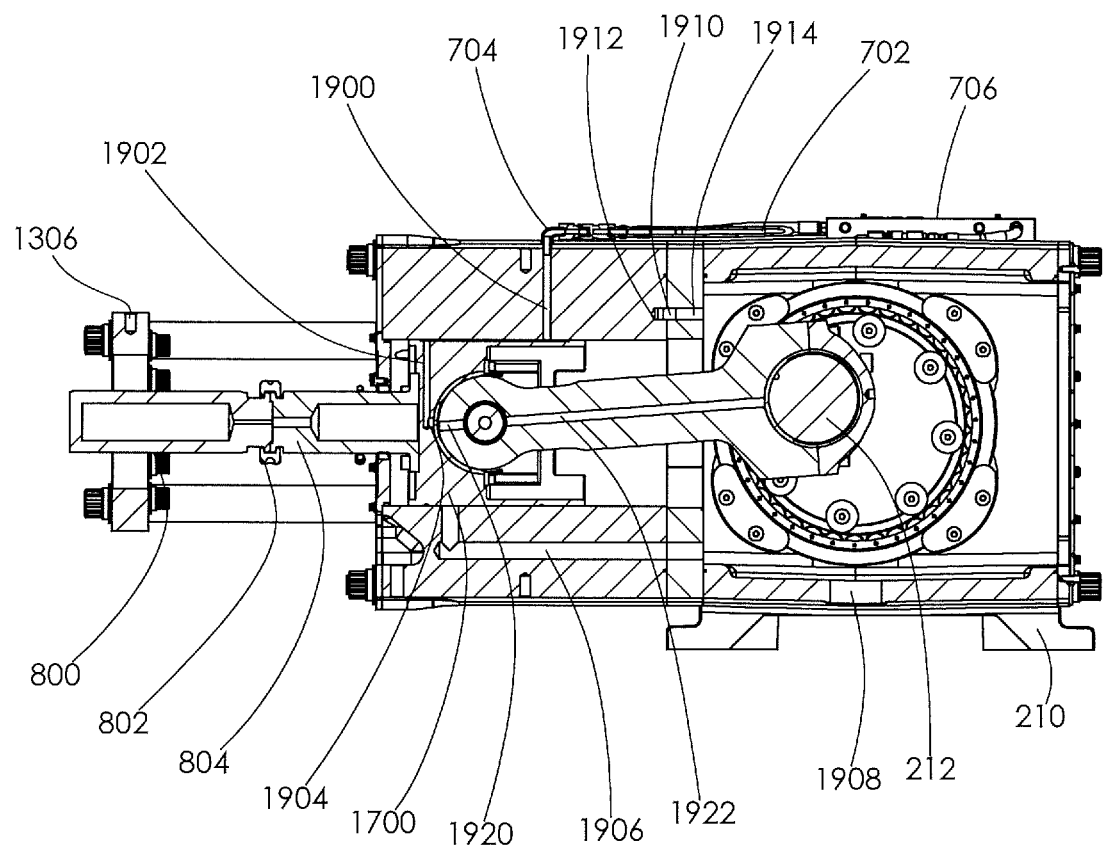
FIG. 19 is a cross-sectional view of the power end assembly and connect plates shown in FIG. 8, taken along line AB-AB.
Figure 20:
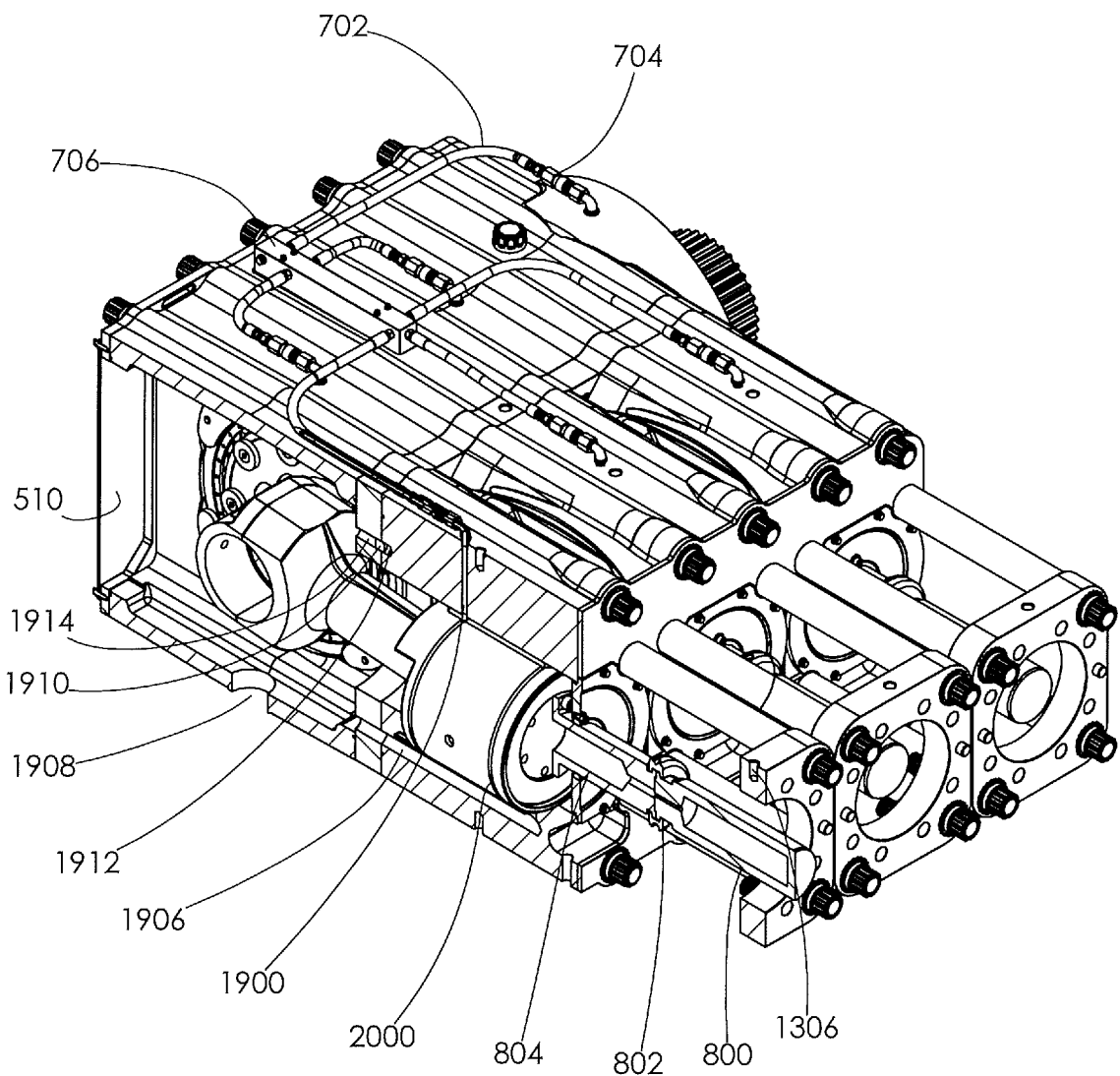
FIG. 20 is a front perspective view of the cross-sectional view of the power end assembly and connect plates shown in FIG. 19, but a crosshead and attached connecting rod are not shown in cross-section.

Referring now to FIGS. 19 and 20, various embodiments of how lubrication system 700 distributes lubrication within power end assembly 120 are shown. In the embodiments shown in FIGS. 19 and 20, the crosshead frame 220 includes a lubrication inlet bore 1900 that is coupled to the lubrication system 700 to receive lubricant during operation.

As the crosshead assembly 1700 moves within the crosshead frame 220, lubricant flows along groove 2000 on the exterior of crosshead assembly 1700 and through channels 1902 and 1904 within crosshead assembly 1700. The channel 1902 is a vertical bore that intersects with horizontal channel 1904. As shown in additional detail in FIG. 52, the channel 1902 begins behind the front face at the top and center of the crosshead (e.g., crosshead 3810 discussed in reference to FIG. 38) and continues vertically down until it intersects the horizontal channel 1904 at the center of the crosshead.

Figure 52:
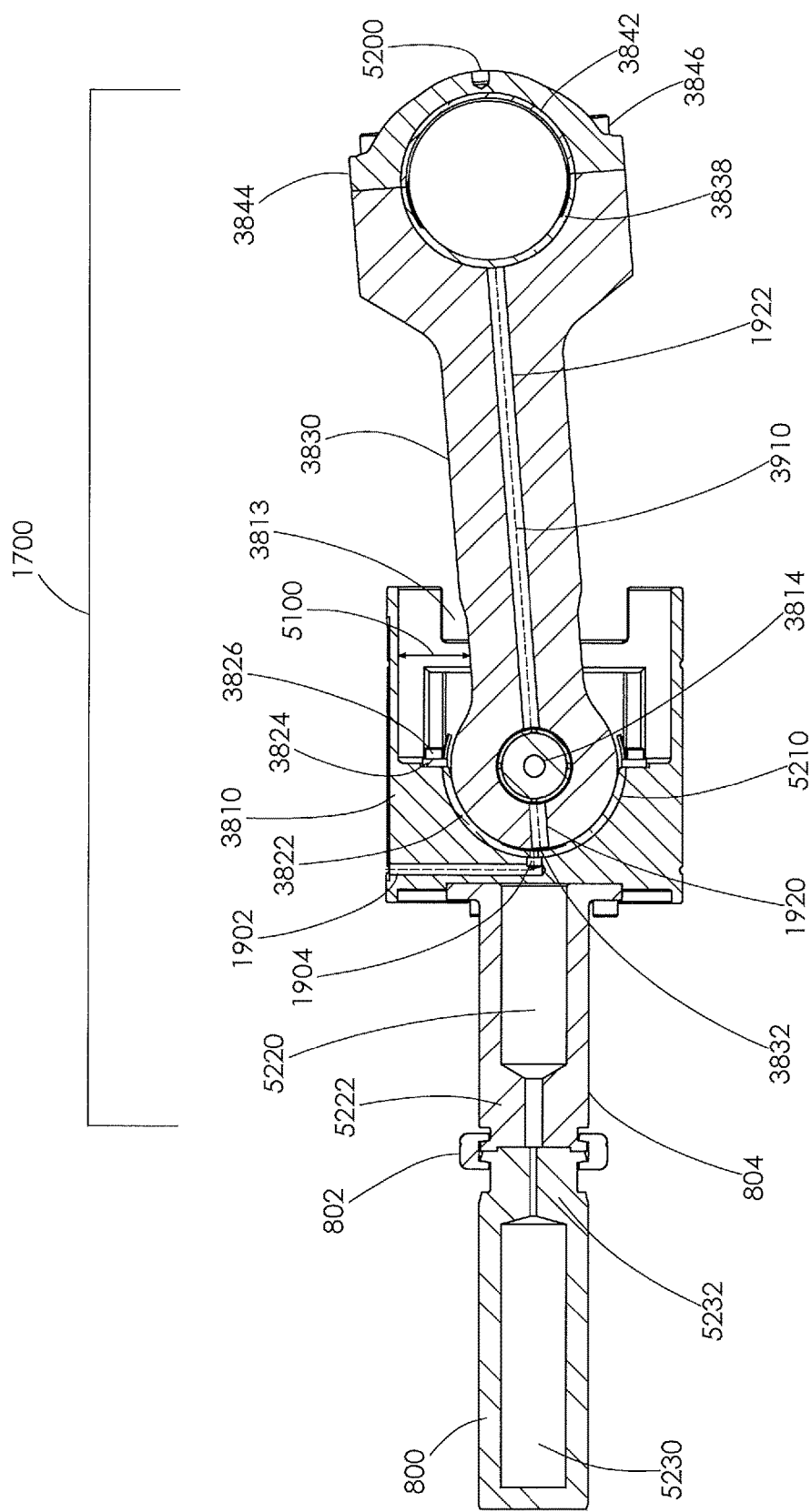
FIG. 52 is a cross-sectional view of the crosshead assembly and piston shown in FIG. 51.

As shown in FIG. 19, channel 1904 begins at the base of the curved inner portion of the crosshead (e.g., thrust seat bearing mount 5210 discussed in reference to FIG. 52) on the central longitudinal axis of the crosshead and continues until it intersects channel 1902. The channel 1904 does not intersect the front face of the crosshead in the embodiment shown in FIG. 19. Lubrication is then able to pass through lubrication through bore 1920 and 1922 of the connecting rod of the crosshead assembly (e.g., connecting rod 3830 discussed herein in reference to FIG. 38).

As discussed in further detail in reference to FIGS. 38, 39, 51, and 52, various components of the crosshead assembly 1700 move relative to each other such that lubricant is necessary to prevent seizing or damage to the crosshead assembly. Lubricant can flow from the crosshead frame 220 and through a hole in the central support plate 202 via a channel 1906 formed in crosshead frame 220. From there, lubricant from the crosshead section 124 joins with lubricant flowing through the crankshaft section 122 (discussed in reference to FIGS. 53-63) and flows through a drain 1908 in the base of crank frame 210.

As discussed in further detail in reference to FIGS. 53-63, the crank frame 210 includes a plurality of drains 1908, each of which is surrounded by a portion of crank frame 210 that is angled towards drains 1908 to allow lubricant to drain into a sump tank (not shown) from which it is filtered and recirculated in various embodiments. Additionally, in the embodiments shown in FIGS. 19 and 20, a cross-section along line AB, shown in FIG. 8, also exposes the alignment dowels 1910 useable to align crosshead frame 220 with central support plate 202. As shown in FIGS. 19 and 20, alignment dowel 1910 is received by corresponding dowel pin holes 1912 and 1914 in crosshead frame 220 and central support plate 202, respectively.

Figure 21:
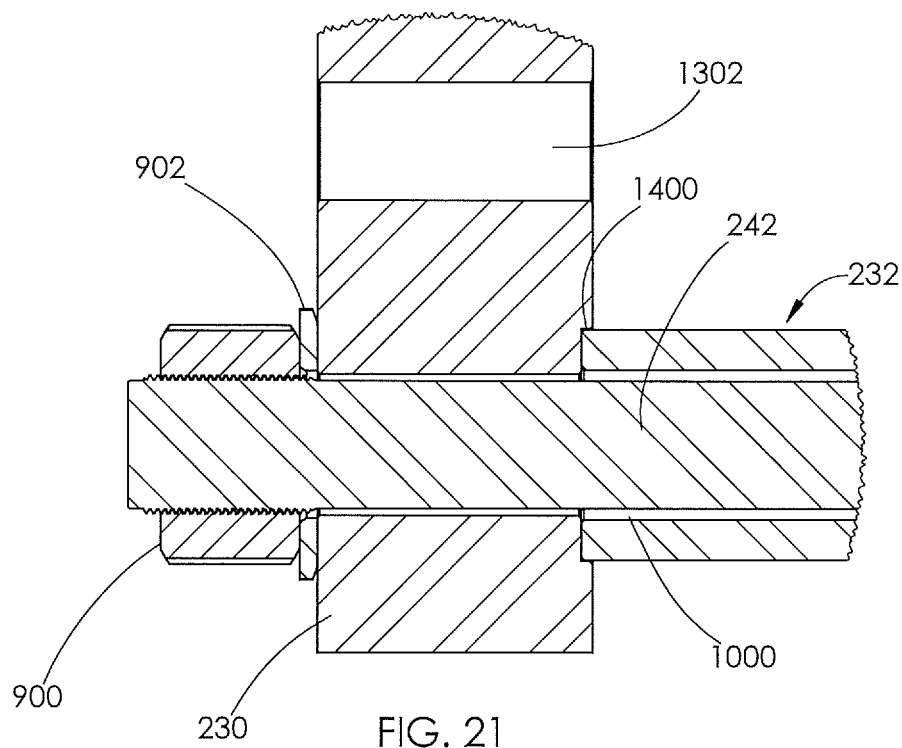
FIG. 21 is an enlarged view of area AD shown in FIG. 17.

Referring now to FIG. 21, detail AD from FIG. 17 is shown in greater detail. As can be seen in FIG. 21, the spacer 232 is received in the counterbore 1400 in connect plate 230, the rod 242 is disposed within the nut 900, the washer 902, the connect plate 230 (e.g., by connect plate stay rod through holes 1304), and the spacer 232 (e.g., by connect plate stay rod through hole 1000). A fluid end section mounting hole 1302 is disposed above rod 242.

Figure 22:
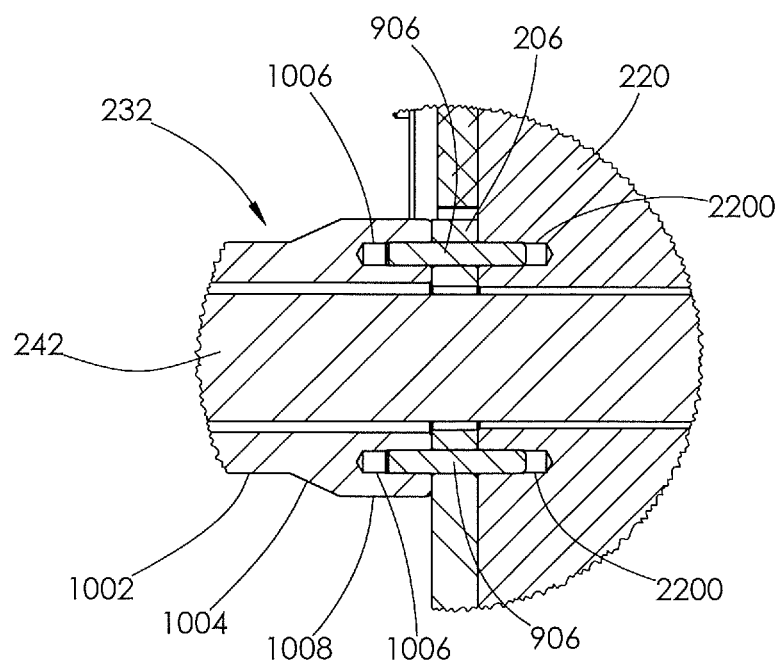
FIG. 22 is an enlarged view of area AE shown in FIG. 17.

Referring now to FIG. 22, detail AE from FIG. 17 is shown in greater detail. As can be seen in FIG. 22, the spacer 232 is coupled to bottom front support plate 206 and the crosshead frame 220 by a pair of alignment dowels 906 that are received by corresponding alignment dowel pin holes 1006 in the spacer 232 and by alignment dowel pin holes 2200 in the bottom front support plate 206 and the lower portion of crosshead frame 220. The spacers 232 are similarly coupled to top front support plate 204 and the upper portion of crosshead frame 220 by alignment dowels 906 and corresponding alignment dowel pin holes 1006 and 2200 (not shown).

Figure 22A:
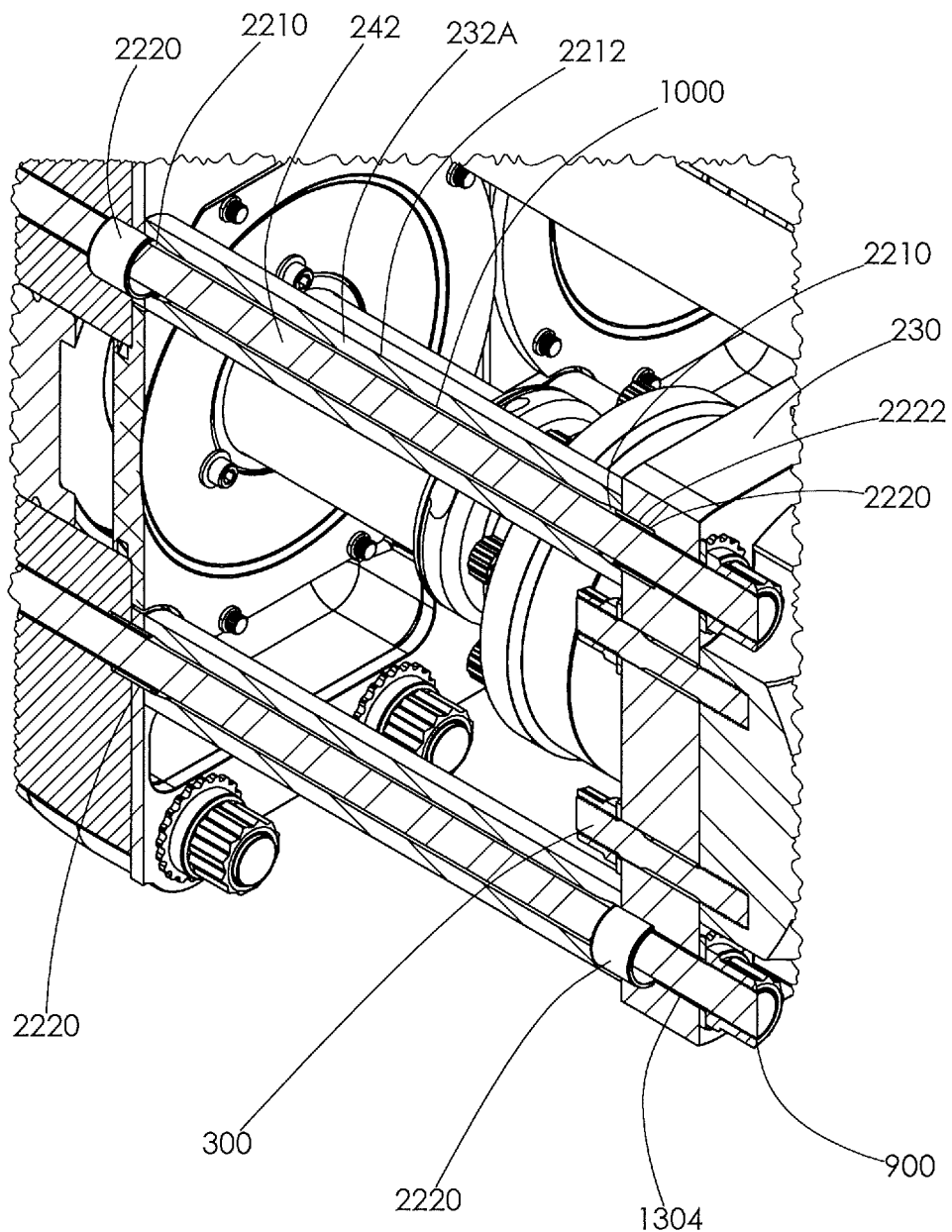
FIG. 22A is a front perspective view of a portion of the cross-sectional view of the power end assembly and connect plates shown in FIG. 18, but shows another embodiment of a spacer.

Referring now to FIG. 22A, a perspective cutaway view is shown of an alternative embodiment of power end assembly 120 taken along line AA shown in FIG. 8. In the embodiment shown in FIG. 22A, rather than the spacer 232 and alignment dowels 906 discussed in FIGS. 21 and 22, alternative spacers 232A and a set of sleeves 2220 to facilitate alignment of spacers 232A are used. In this embodiment, rather than a spacer 232 with a connect plate stay rod through hole 1000, a smaller diameter linear section 1002, a conical transition section 1004, a larger diameter linear section 1008, and a plurality of alignment dowel pin holes 1006 (shown in FIGS. 10-12), spacer 232A has a connect plate stay rod through hole 1000 with two larger diameter interior sections 2210 and a single exterior diameter 2212.

In the embodiment shown in FIG. 22A, the through holes 1304 of connect plate 230 include a larger diameter interior section 2222 and the connect plate stay rod holes 904 of the plates 204 and 206 are slightly larger (relative to the embodiment shown in FIG. 22). In the embodiment shown in FIG. 22A, sleeves 2220 are disposed within larger diameter interior section 2222 of connect plate 230, within larger diameter interior sections 2210 of spacers 232A, and within the larger diameter interior section 2222 of the connect plate stay rod holes 904 to facilitate alignment of spacer 232A with plates 204, 206, and connect plate 230. In such embodiments, the connect plate 230 does not include counterbore 1400 and spacer 232A touches but is not received by connect plate 230.

Figure 23:
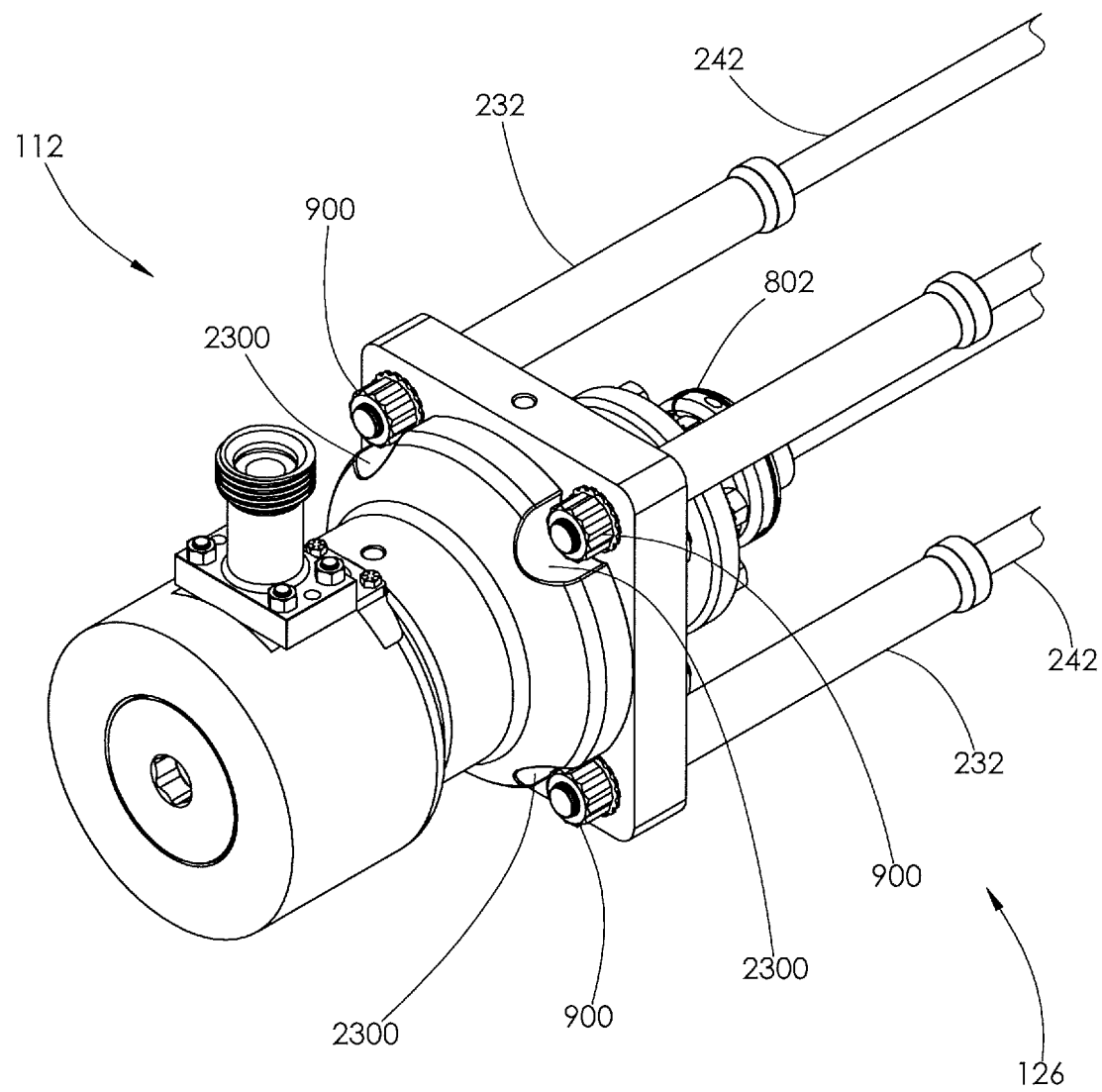
FIG. 23 is a front right-side perspective view of a fluid end section and connect plate of the pump shown in FIG. 1. A plurality of spacers and second set of stay rods are shown attached to the connect plate.

Referring now to FIG. 23, a front perspective view of a fluid end section 112 coupled to a connect plate 230 is shown. As discussed herein, in various embodiments, fluid end section 112 is coupled to connect plate 230 by fluid end mounting fasteners 300 that are disposed through fluid end section mounting holes 1302 (not visible in FIG. 23). The fluid end section 112 includes a plurality of stay rod cut-outs 2300 around rods 242. In such embodiments, stay rod cut-outs 2300 allow access to the nuts 900 without removing the fluid end section 112. Thus, if maintenance is required on the crosshead section 124, the fluid end section 112 and connect plate 230 may be removed as one unit simplifying the maintenance process.

To assemble the connector section 126 to the central support plate 202, a first end of each stay rod 242 is inserted through the connect plate stay rod holes 904 of the plates 204 and 206, and the connect plate stay rod holes 904 of a crosshead frame. The stay rods 242 are torqued into the threaded holes 1702 of the central support plate 202. The spacers 232 are placed over the corresponding rods 242 and coupled to the top front support plate 204 or bottom front support plate 206, using alignment dowels 906 to ensure proper alignment. A connect plate 230 is then placed over the spacers 232 and the rods 242, using counterbores 1400 to ensure proper alignment. The washers 902 and nuts 900 are then placed over the protruding ends of ends of the connect plate stay rods 242 and the nuts 900 are torqued on the second end of the stay rods 242 placing the connect plate stay rods 242 in tension and providing a clamping force to the components between the central support plate 202 and the nut 900 on the second end of the stay rod 242.

First Set of Rods 240, Front Support Plates 204, 206, and Central Support Plate 202

Referring now to FIGS. 24-35, power end assembly 120 and components thereof (with a particular focus on first set of rods 240) are shown in further detail. The crank section 122 and the crosshead section 124 are assembled to each other using the first set of stay rods 240, nuts 2400 and 2408, washers 2402 and 2406, as shown in FIGS. 24-27.

Referring individually to FIG. 24, a front perspective exploded view of power end assembly 120 is shown. As shown in FIG. 24, the connector section 126, the second set of stay rods 242, and maintenance covers 510 have been removed. In the embodiment shown in FIG. 24, twenty rods 240 couple the rear support plate 200 to the crank section 122, couple crank section 122 to the central support plate 202, couple the central support plate 202 to the crosshead section 124, and couple the crosshead section 124 to the top front support plate 204 and the bottom front support plate 206.

The rods 240 are secured by nuts 2400, first washers 2402, second washers 2406, and second nuts 2408. As shown in FIG. 24, the rods 240 are received by corresponding stay rod through holes 2404 located along the top and bottom periphery of the front support plate 204, the bottom front support plate 206, the individual crosshead frames 220, the central support plate 202, the crank frame 210, and the rear support plate 200.

To assemble the crank section 122 to the crosshead section 124, the second nuts 2408 are threaded on a first end of each stay rod 240 and then the second end of each stay rod 240 is inserted through a second washer 2406, the stay rod through holes 2404 of the rear support plate 200, the stay rod through holes 2404 of the crank frame 210, the stay rod through holes 2404 of the central support plate 202, the stay rod through holes 2404 of an individual crosshead frame 220, the stay rod through holes 2404 of either top front support plate 204 or bottom front support plate 206, and finally first washer 2402.

Once all the stay rods 240 are inserted in the components, nuts 2400 are threaded on the second end of the stay rods 240 and the specified torque (e.g., between 2500 lb.-ft. and 4000 lb.-ft in various embodiments) is applied to the nuts 2400. Once the specified torque is applied to the nuts 2400 the stay rods 240 are in tension and provide a clamping force to the components between the nuts 2400 and 2408.

When assembled, the top front support plate 204 and the bottom front support plate 206 are disposed in front of the crosshead section 124. As discussed herein, the crosshead section 124 includes a plurality of crosshead frames 220. The profiles of the top front support plate 204 and the bottom front support plate 206 correspond to the profiles of the crosshead frames 220.

In particular, the bottom of top front support plate 204 includes cutaways 2410 around the center bore of the crosshead frames 220 and the top of top front support plate 204 includes wider portions 2412 surrounding its stay rod through holes 2404. Similarly, the top of bottom front support plate 206 includes cutaways 2410 around the center bore of the crosshead frames 220 and the bottom of bottom front support plate 206 includes wider portions 2412 surrounding its stay rod through holes 2404.

By having variable profiles corresponding to the top and bottom of crosshead frames 220, weight can be reduced from the top front support plate 204 and the bottom front support plate 206 while still providing adequate surface area to withstand clamping forces from nuts 2400 and 2408.

The top front support plate 204 and the bottom front support plate 206 are made of high alloy steel and are between 0.490 inches and 0.530 inches thick. The top front support plate 204 and the bottom front support plate 206 are separate pieces of metal rather than being a unitary piece of metal like rear support plate 200. By not including metal joining top front support plate 204 and bottom front support plate 206, weight can further be reduced. Thus, top front support plate 204 and bottom front support plate 206 are substantial enough to reduce deflection of individual components and reduce relative movement between components (e.g., movement between the individual crosshead frames 220), particularly about the transverse and vertical axes, without unnecessarily increasing weight or material cost in various embodiments.

When assembled, the central support plate 202 is disposed between the crosshead section 124 and the crank section 122. The central support plate 202 is a generally rectangular plate with a plurality of stay rod through holes 2404 located along the top and bottom periphery. The central support plate 202 further includes a plurality of the following features: lifting eye holes 2428; a variable top and bottom profile with raised portions 2430 around stay rod through holes 2404; vacuum relief through bores 2432, threaded connect plate stay rod holes 1702, lubricant drain through bores 2434, dowel pin holes 1914 useable for alignment with crosshead section 124, crosshead ports 2420, and dowel pin holes 2436 useable for alignment with crank section 122.

The lifting eye holes 2428 are configured to facilitate lifting of central support plate 202 during assembly. The vacuum relief through bores 2432 are configured to allow air from the individual crosshead frames 220 to pass from crosshead frame 220 to crank section 122. The lubricant drain through bores 2434 are configured to allow lubricant to flow from the individual crosshead frames 220 to crank section 12, and the dowel pin holes 2436 are configured to receive alignment dowel 2452 which are also received by dowel pin holes 2454 in crank frame 210.

Similar to the variable profile of the top front support plate 204 and the bottom front support plate 206, the variable profile of central support plate 202 includes a plurality of raised portions 2430 around stay rod through holes 2404. By having a variable profile, weight can be reduced from central support plate 202 while still providing adequate surface area to withstand clamping forces from the nuts 2400 and 2408. The central support plate 202 is made of high alloy steel and is between 2.980 inches and 3.020 inches thick. Thus, central support plate 202 is substantial enough to reduce deflection of individual components and reduce relative movement between components (e.g., movement between the individual crosshead frames 220), particularly about the transverse and vertical axes, without unnecessarily increasing weight or material cost in various embodiments.

When assembled, the rear support plate 200 is coupled to the back of the crank section 122. The rear support plate 200 is a generally rectangular plate with a plurality of stay rod through holes 2404 located along the top and bottom periphery. The rear support plate 200 includes maintenance openings 2444, bolt holes 2442, and a variable top and bottom profile with raised portions 2446 around stay rod through holes 2404.

The bolt holes 2442 are configured to receive bolts (not shown in FIG. 24) that hold the center webs of the rear support plate 200 to the crank frame 210 independently of the first set of rods 240 and prevent the rear support plate 200 from bowing under load from the first set of rods 240. The maintenance openings 2444 are configured to be covered by maintenance covers 510 such that when a maintenance cover 510 is removed a portion of crankshaft 212 is exposed and can be serviced without removing rear support plate 200. By having a variable profile, weight can be reduced from rear support plate 200 while still providing adequate surface area to withstand clamping forces from the nuts 2400 and 2408.

The rear support plate 200 is made of high alloy steel and is between 1.00 inches and 1.02 inches thick. Thus, rear support plate 200 is substantial enough to reduce deflection of individual components and reduce relative movement between component, particularly about the transverse and vertical axes, without unnecessarily increasing weight or material cost in various embodiments.

Figure 25:
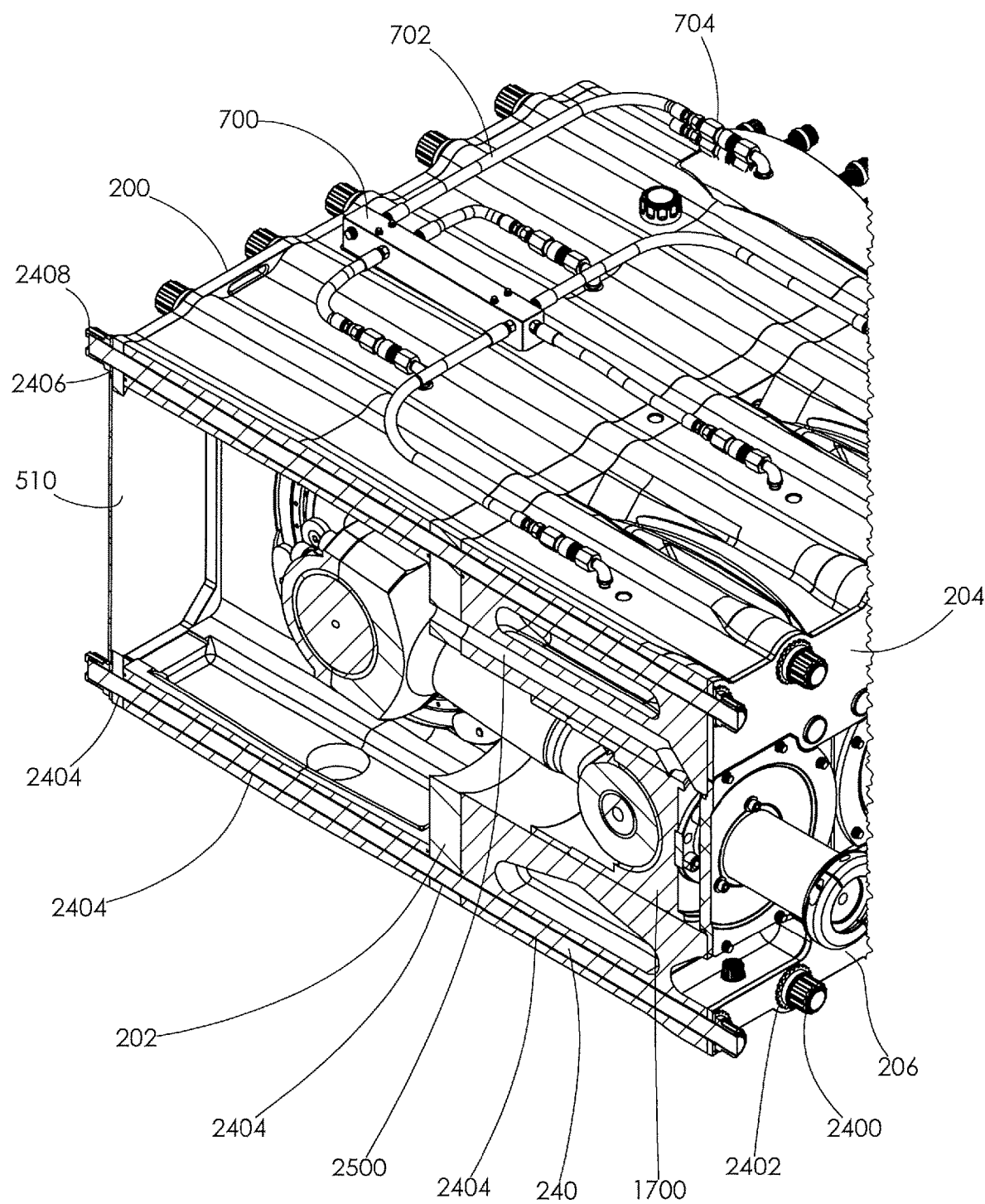
FIG. 25 is a perspective cross-sectional view of the power end assembly shown in FIG. 24, taken along line AF-AF, but the power end assembly is shown assembled.
Figure 26:
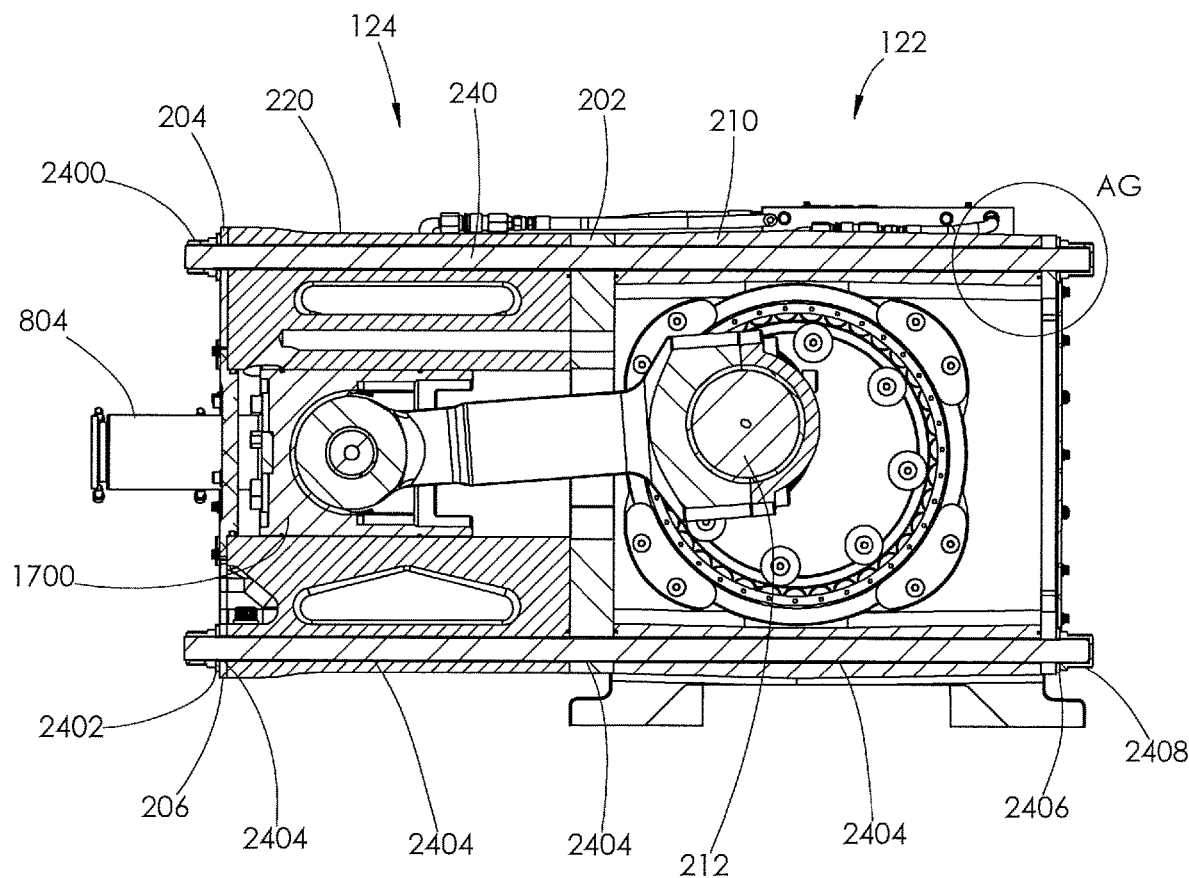
FIG. 26 is a side elevational, cross-sectional view of the power end assembly shown in FIG. 25.
Figure 27:
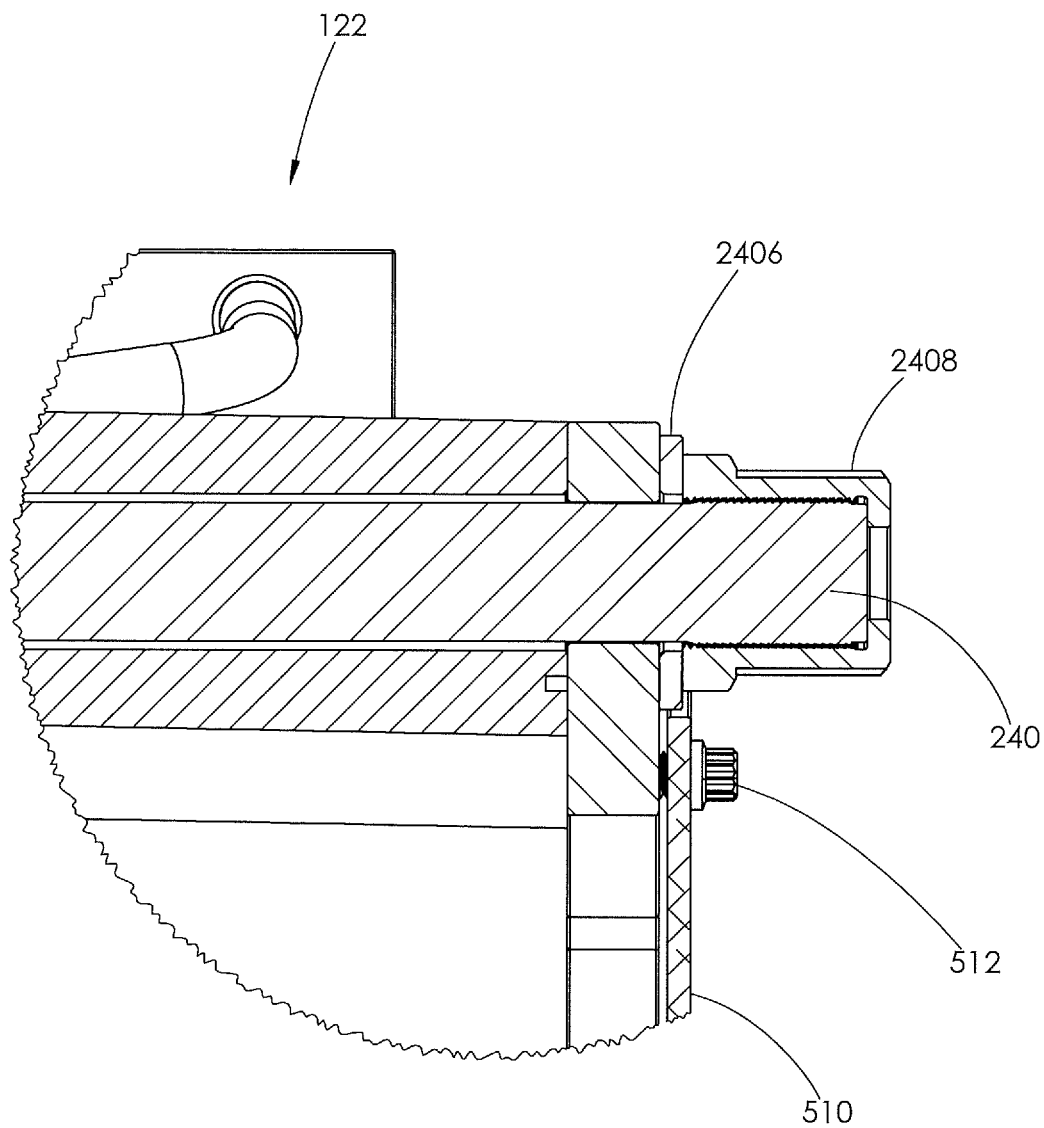
FIG. 27 is an enlarged view of area AG shown in FIG. 26.
Figure 28:
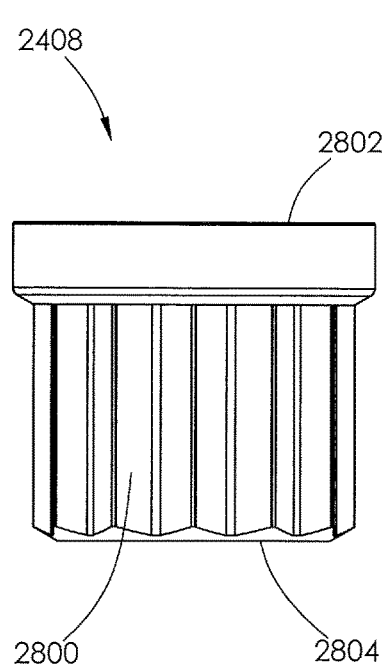
FIG. 28 is a top plan view of the blind nut shown in FIG. 27.
Figure 29:
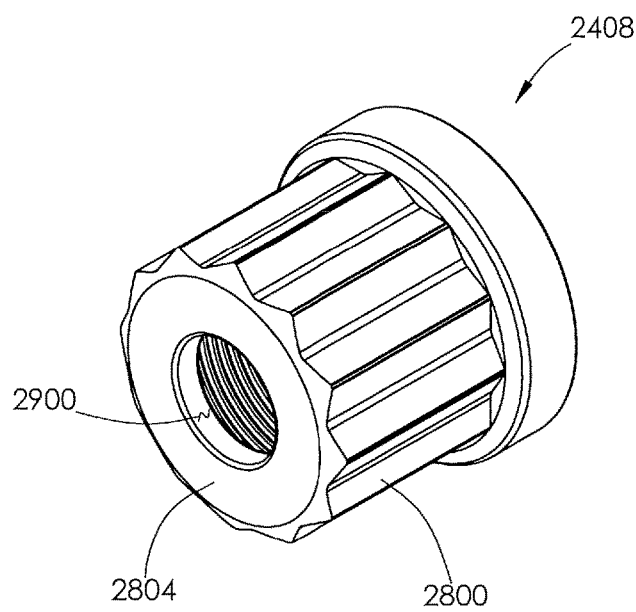
FIG. 29 is a rear perspective view of the blind nut shown in FIG. 28.
Figure 30:
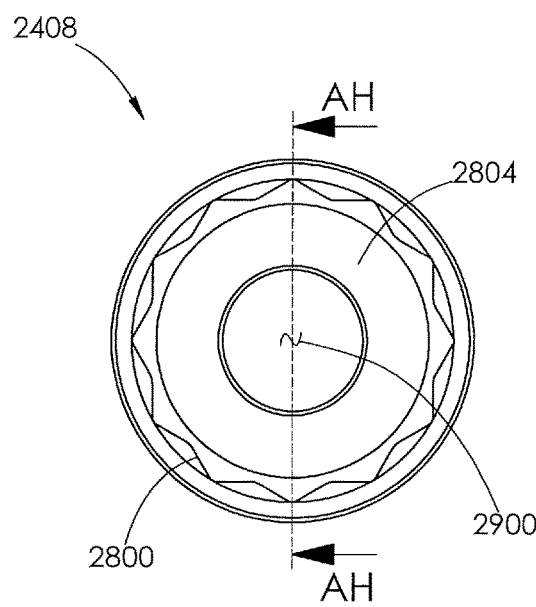
FIG. 30 is a rear elevational view of the blind nut shown in FIG. 28.
Figure 31:
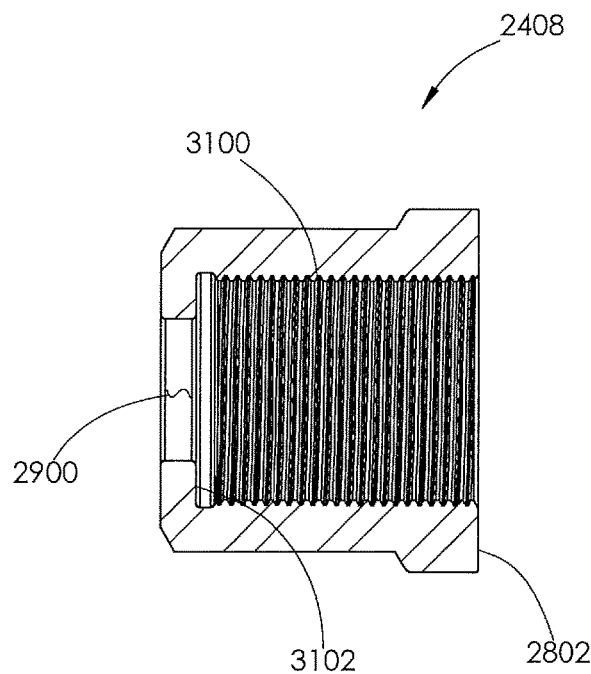
FIG. 31 is a is a cross-sectional view of the blind nut shown in FIG. 30, taken along line AH-AH.
Figure 32:
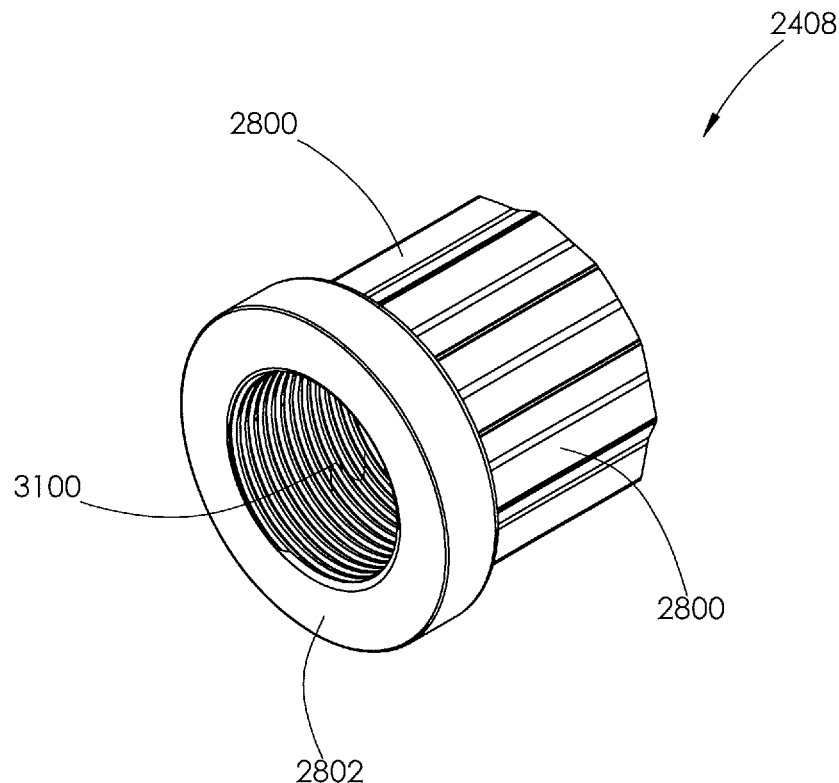
FIG. 32 is a front perspective view of the blind nut shown in FIG. 28.
Figure 33:
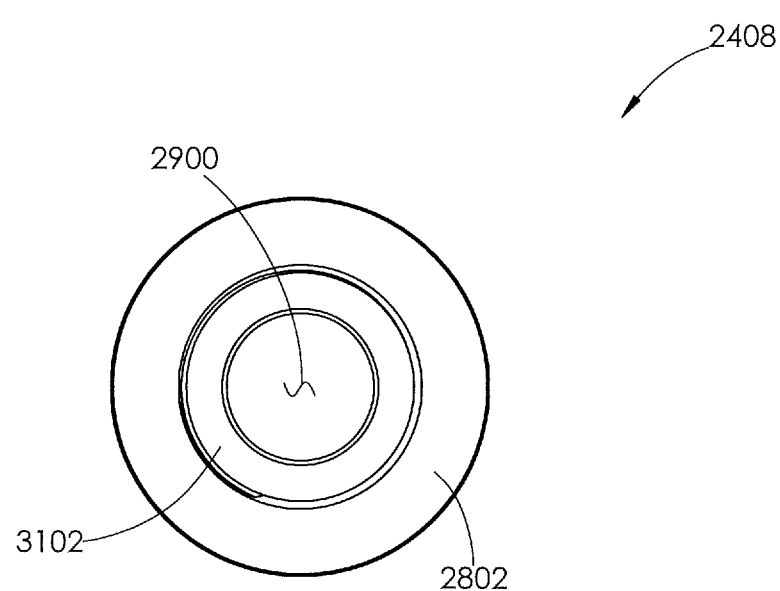
FIG. 33 is a front elevational view of the blind nut shown in FIG. 28.
Figure 34:
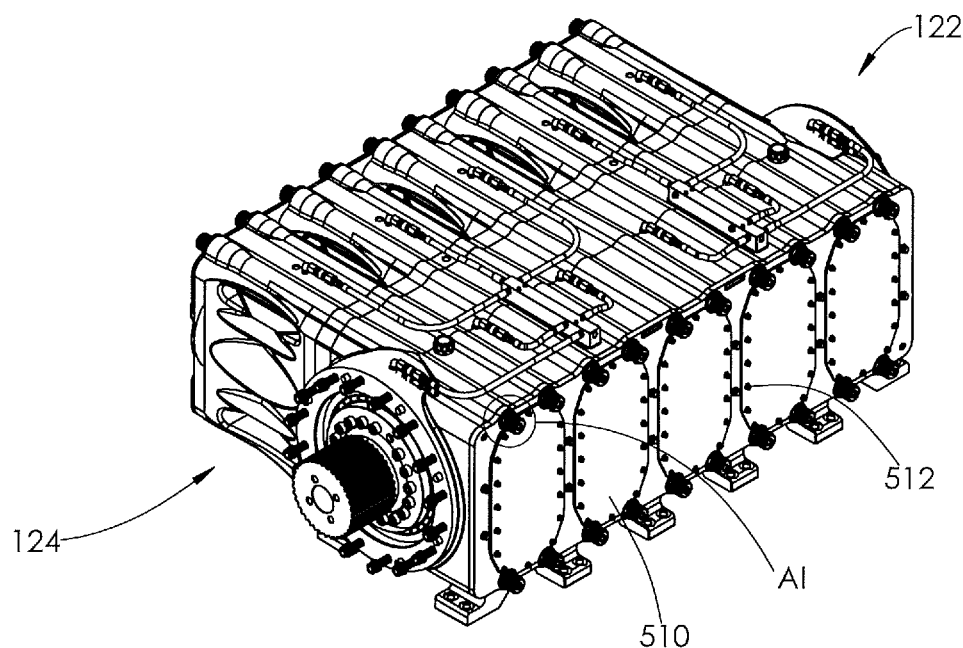
FIG. 34 is a rear perspective view of the power end assembly shown in FIG. 24, but the power end assembly is shown assembled.
Figure 35:
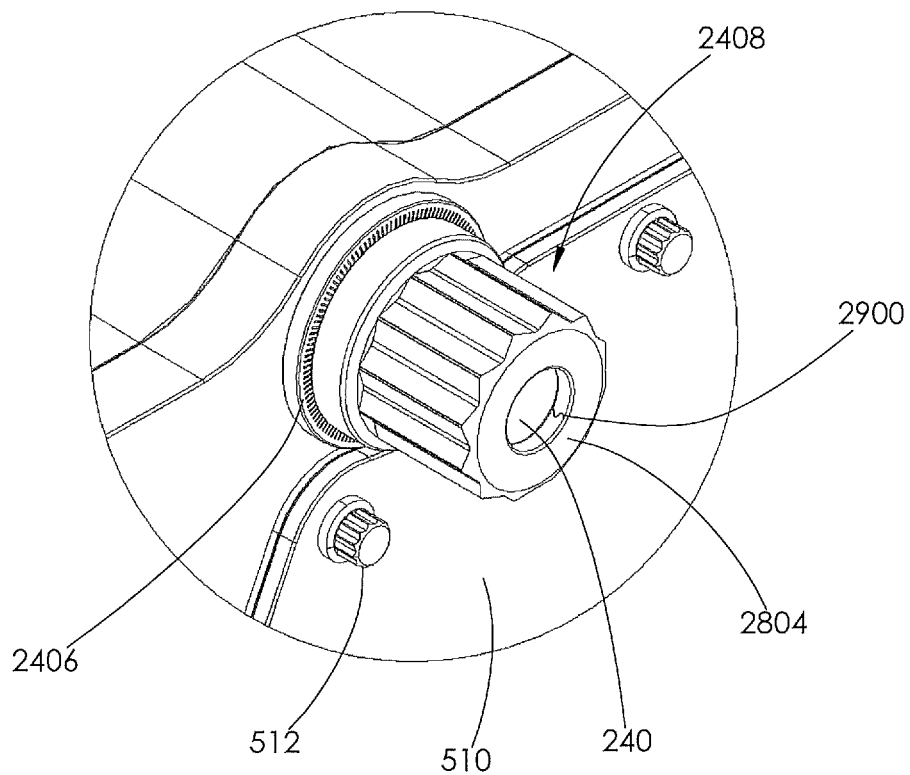
FIG. 35 is an enlarged view of area AI shown in FIG. 34.

Referring now to FIGS. 25-27, as shown in FIG. 25, a channel 2500 is defined in the crosshead frame 220 above the crosshead assembly 1700. The channel 2500 is configured to allow air to flow between the crank section 122 and the crosshead section 124 to release air that is pressurized by a forward stroke by the crosshead assembly 1700 and to relieve a vacuum that is created by a back stroke by the crosshead assembly 1700.

Referring now to FIGS. 28-35, the second nuts 2408 may be blind nuts. As used herein, a "blind nut" is a nut with a threaded interior and that includes an opening to receive a threaded end of a bolt or rod (e.g., a rod 240) on one side of the threaded interior and a barrier on the other side of the threaded interior that prevents the threaded end of the bolt or rod from advancing all of the way through the threaded interior. As discussed herein, advancing the threaded end of the bolt or rod until the bolt or rod contacts the barrier and the threaded end of the bolt or rod cannot be further advanced is referred to as the threaded end of the bolt or rod "bottoming out" such that the bolt or rod is "fully engaged" with the blind nut.

Referring now to FIGS. 28-35, the blind nut 2408 is a 12-point nut, but the blind nut 2408 could have any number of points (e.g., 6, 8, 10, etc.). In the embodiments shown in FIGS. 28-35, the blind nut 2408 is a 12-point blind nut that has a generally cylindrical shape and includes flats 2800, an internally threaded section 3100, a base 3102, an inspection bore 2900, a front face 2802, and a back face 2804. When torqued onto the threaded portion at the back end of the stay rod 240, the blind nut 2408 will continue to thread on the stay rod 240 until the back end of the stay rod 240 contacts the base 3102 of blind nut 2408. The position of the stay rod 240 can be confirmed visually by observation through the inspection bore 2900. It may also be confirmed by measurement with a depth gauge (not shown).

The fixed position of blind nut 2408 relative to the end of the stay rod 240 reduces the possibility of an inadequate thread engagement between the two components. This positioning also provides a known length of the portion of the stay rod 240 that is inserted through the components to be assembled. Specifically, it provides a known length of threads extending from the front side of the front support plates 204 and 206. This known length of thread extension gives confidence that full thread engagement will occur between the first nut 2400 and the threaded front end of the stay rod 240. Put another way, because the length of rods 240 is constant and the engagement with rods 240 by blind nut 2408 is constant (provided blind nut 2408 is installed fully engaged and has not backed off), torqueing the first nuts 2400 to the designated amount will result in a constant amount of thread on rod 240 extending through the first nuts 2400. The visible inspection of this exposed thread may be indicative of backing off by either the first nut 2400 and/or the blind nut 2408, which may improve ease of maintenance. If either the first nut 2400 or the blind nut 2408 are observed to be loosening, these nuts 2400, 2408 may be retorqued before causing a failure.

To assemble the crank section 122 to the crosshead section 124, the blind nut 2408 is torqued onto the threaded portion at the back end of a stay rod 240 until the blind nut 2408 is fully engaged. The other, or front, end of the stay rod 240 is then inserted through the second washer 2406, the stay rod through holes 2404 of plate 200 and crank frame 210, the stay rod through holes 2404 of the central support plate 202, the stay rod through holes 2404 of the crosshead frame 220, the stay rod through holes 2404 of the either the top front support plate 204 or bottom front support plate 206, and first washer 2402. A first nut 2400 is then torqued on the protruding threaded front end of the stay rod 240. This process is repeated for each of the plurality of stay rods 240. However, all of the nuts 2400 may not be fully torqued until each stay rod is installed.

Crosshead Section 124

Figure 36:
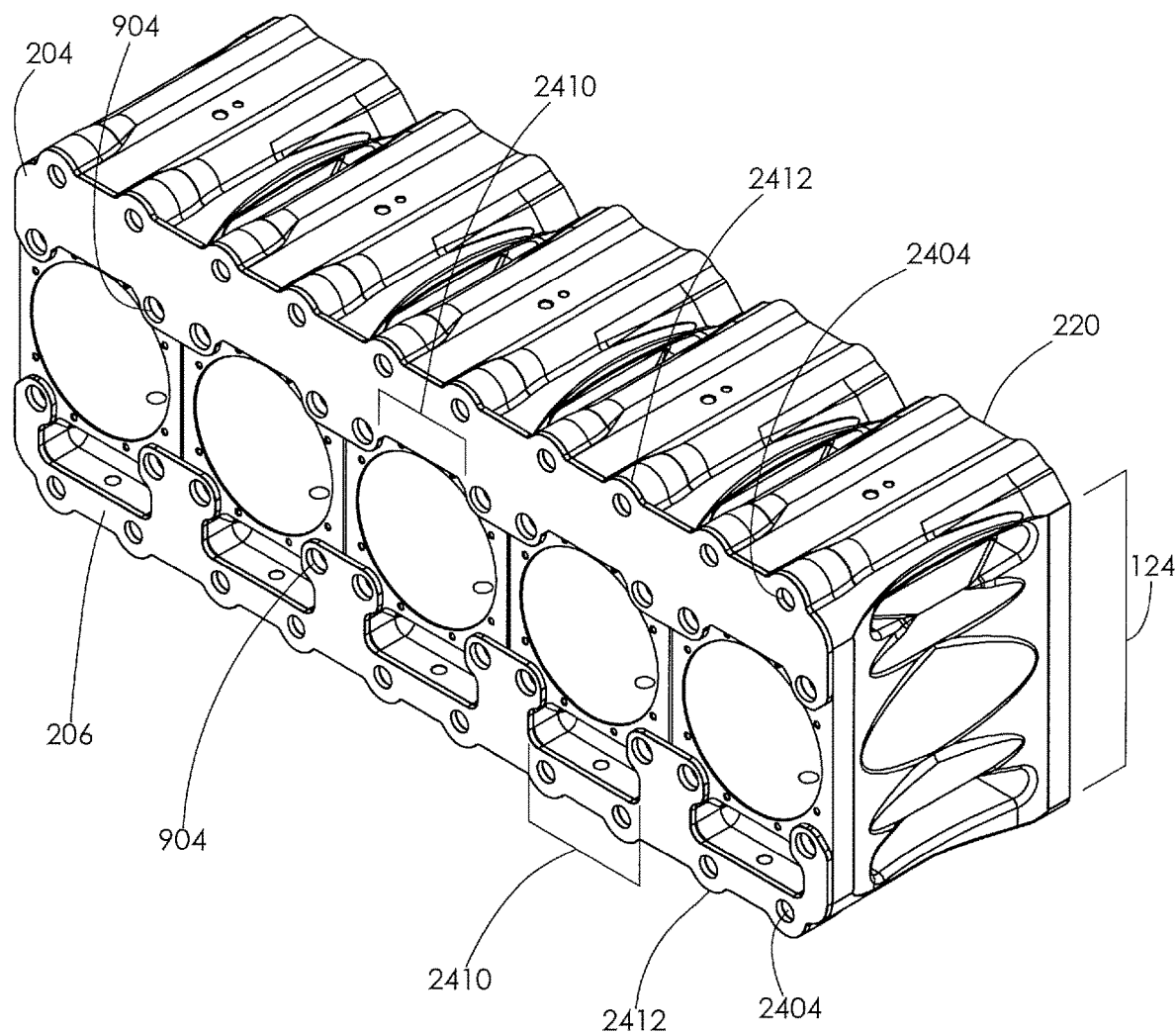
FIG. 36 is a front perspective view of the crosshead section shown in FIG. 24, but the inner components have been removed. The plurality of front support plates also shown in FIG. 24 are shown positioned on the crosshead section.

Referring now to FIGS. 36-52, the fronts of the crosshead section 124, the top front support plate 204, and the bottom front support plate 206 are shown in FIG. 36. As shown in FIG. 36, the crosshead assembly 1700 has been removed. As can be seen in FIG. 36, the top profile of top front support plate 204 corresponds with the top profile of the plurality of crosshead frames 220 and the cutaways 2410 of the top front support plate 204 corresponds to the central opening of the plurality of crosshead frames 220.

Similarly, the bottom profile of the bottom front support plate 206 corresponds with the bottom profile of the plurality of crosshead frames 220 and the cutaways 2410 of the bottom front support plate 206 correspond to the central opening of the plurality of crosshead frames 220 and the recess disposed beneath each central opening (e.g., base section attachment clearance 4400 discussed in connection to FIGS. 43-50).

Figure 37:
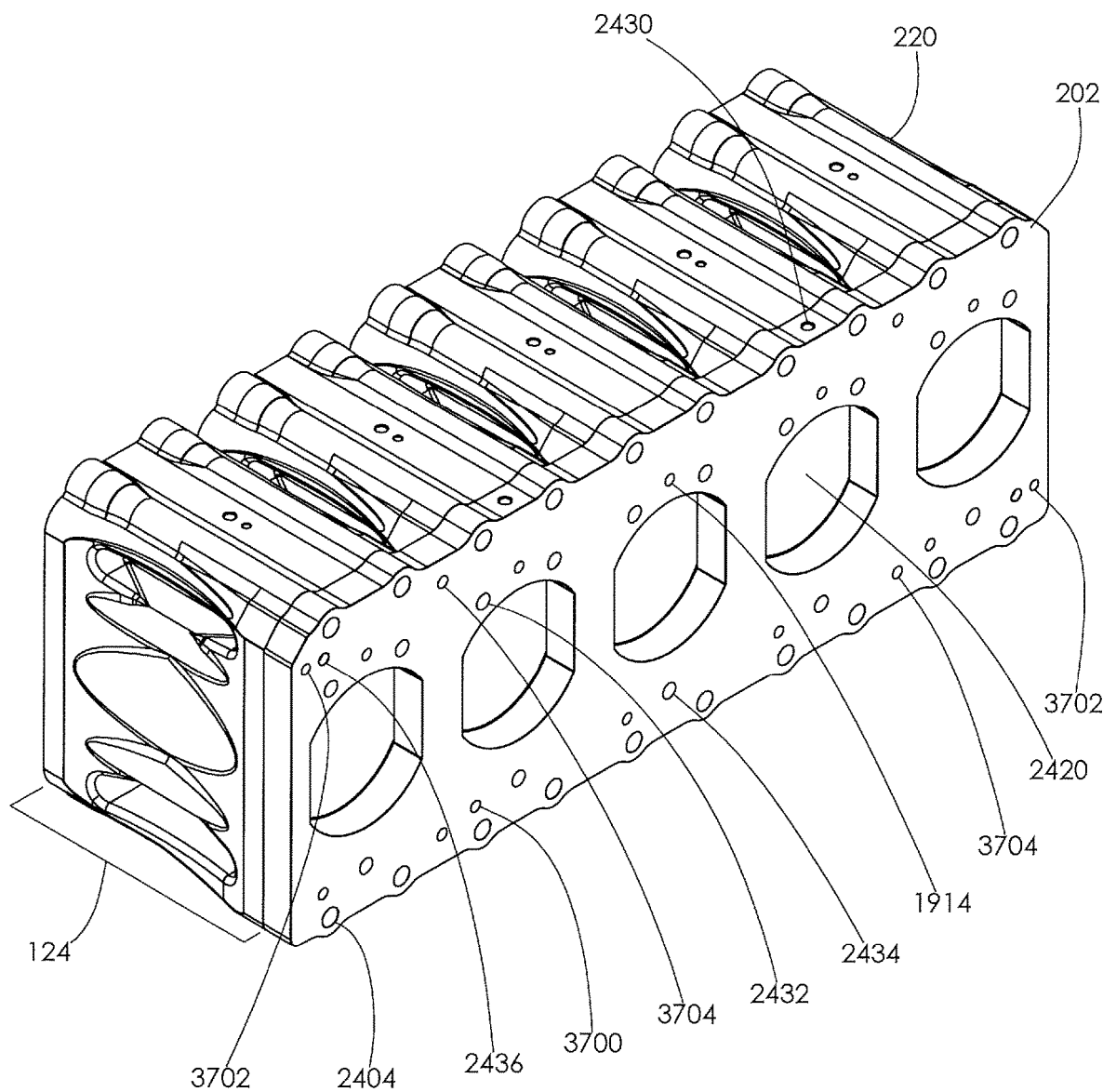
FIG. 37 is a rear perspective view of the crosshead section shown in FIG. 36, with the central support plate shown in FIG. 24 positioned on the crosshead section.

Referring now to FIG. 37, the backs of the crosshead section 124 and the central support plate 202 are shown. As shown in FIG. 37, the top and bottom profile of the central support plate 202 corresponds with the top and bottom profile of the plurality of crosshead frames 220. As discussed elsewhere herein, various holes in the central support plate 202 correspond with holes in the plurality of crosshead frames 220 (e.g., stay rod through holes 2404; vacuum relief through bores 2432, threaded connect plate stay rod holes 1702, lubricant drain through bores 2434, dowel pin holes 1914, crosshead ports 2420, and dowel pin holes 2436).

In the embodiment shown in FIG. 37, the central support plate 202 also includes a lower dowel hole 3700, a threaded jack bolt hole 3702 and a mounting hole 3704. In such embodiments, the dowel hole 3700 is configured to receive an alignment dowel 1910 to facilitate alignment with the crosshead frames 220. The threaded jack bolt hole 3702 is configured to receive a jack bolt to facilitate disengagement of the central support plate 202 and crosshead frames 220. The mounting hole 3704 is configured to receive a fastener to mount the central plate support plate 202 to the crank frame 210.

Figure 38:
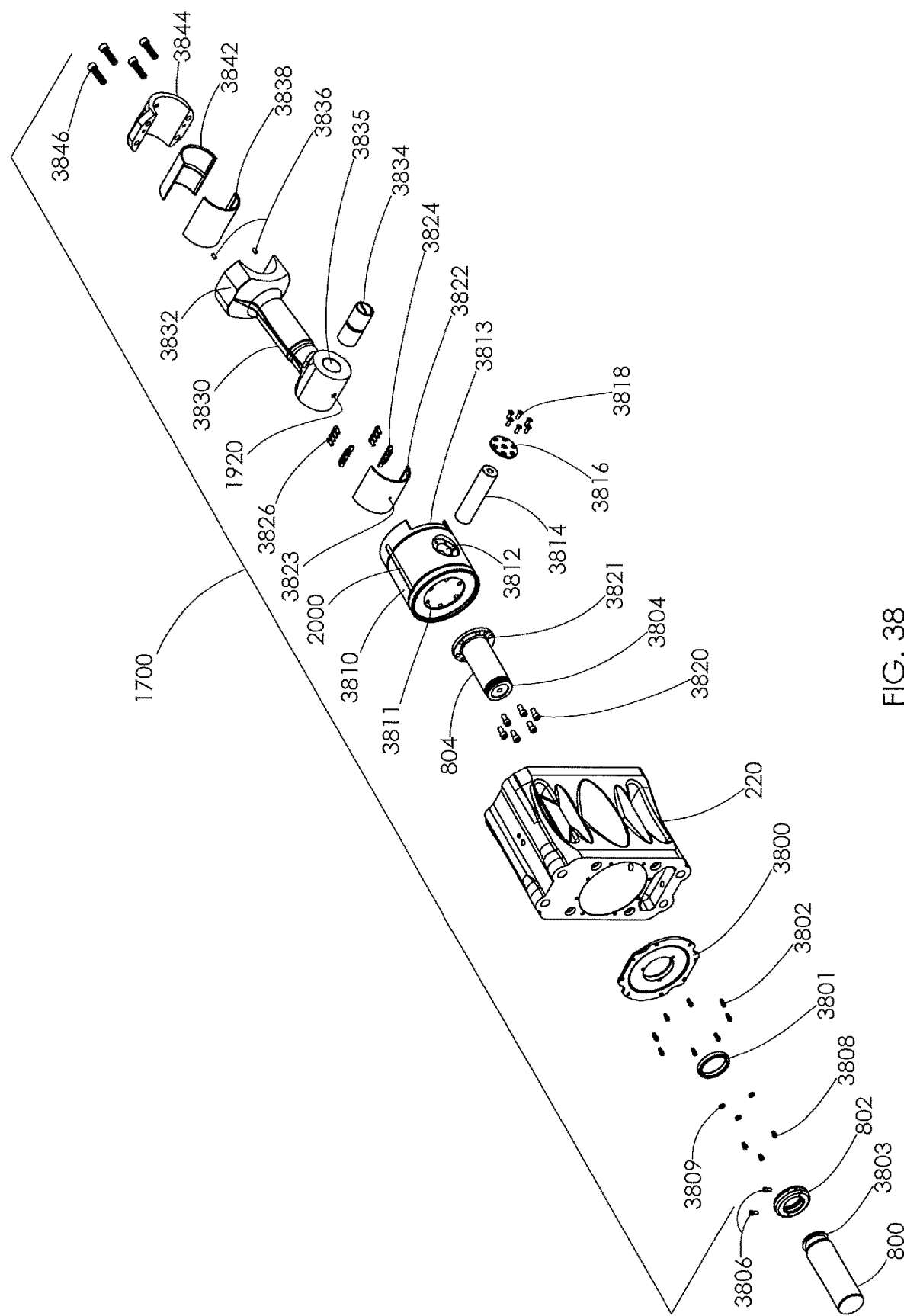
FIG. 38 is a front perspective exploded view of one of the crosshead assemblies and crosshead frames shown in FIG. 24. A piston is also shown exploded from the crosshead assembly.
Figure 39:
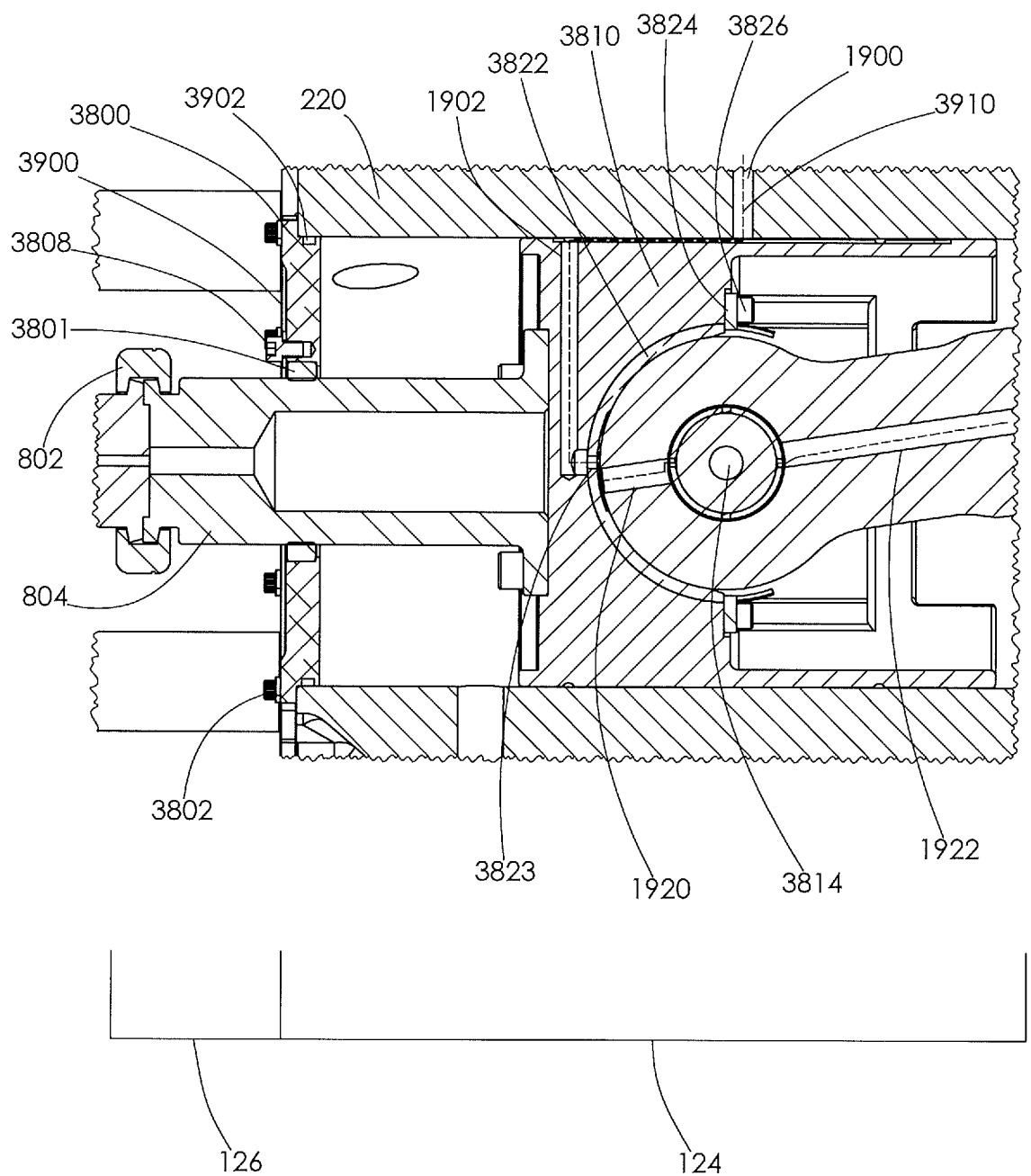
FIG. 39 is an enlarged cross-sectional view of a portion of the power end assembly shown in FIG. 19, but the crosshead has moved rearwardly from its position shown in FIG. 19.

Referring now to FIGS. 38 and 39, the crosshead assembly 1700 includes the pony rod clamp 802, the pony rod seal housing 3800, the pony rod 804, the crosshead 3810, the connecting rod 3830 and various fasteners and bearings. As used herein, the crosshead assembly 1700 includes the pony rod 804 and the pony rod clamp 802, but does not include the plunger 800. As shown in FIG. 39, portions of crosshead assembly 1700 (e.g., pony rod 804 and crosshead 3810) reciprocate within the central bore of the crosshead frame 220 (e.g., central bore 4600 discussed in reference to FIGS. 43-50). The internal structure of crosshead assembly 1700 is discussed in further detail herein in reference to FIG. 52.

As discussed herein, the pony rod 804 is coupled to the plunger 800 by the pony rod clamp 802. The pony rod clamp 802 is a ring-shaped clamp that is configured to couple the plunger 800 to the pony rod 804. The pony rod clamp 802 is configured to couple to the plunger 800 and the pony rod 804 by receiving a flange 3803 of the plunger 800 and a flange 3804 of the pony rod 804. The flanges 3803 and 3804 are retained using a set of bolts 3806 that are disposed in corresponding holes in the pony rod clamp 802.

Figure 45:
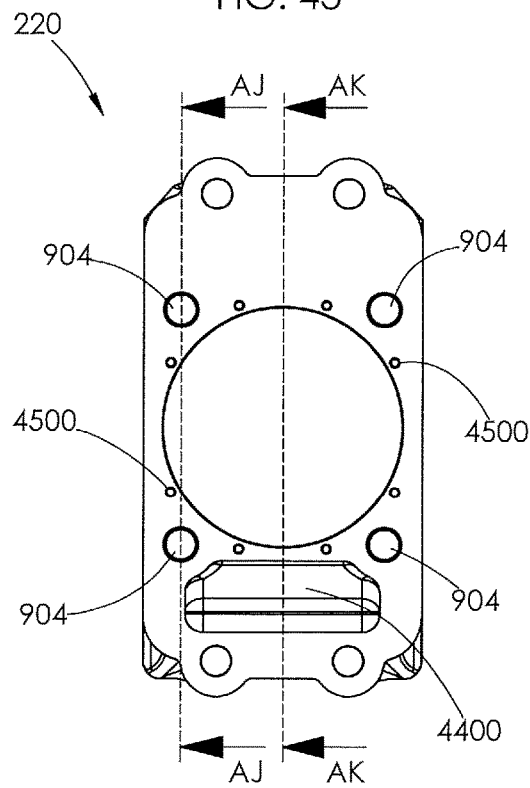
FIG. 45 is a front elevational view of the crosshead frame shown in FIG. 44.

As shown in FIG. 38, the pony rod seal housing 3800 is secured to the crosshead frame 220 by inserting a set of fasteners 3802 through the pony rod seal housing 3800 and into corresponding holes in the crosshead frame 220 (e.g., threaded holes 4500 shown in FIG. 45). The pony rod 804 is coupled to the crosshead 3810 by the fasteners 3820 that are disposed though a mounting flange 3821 of the pony rod 804 and into corresponding bores 3811 of the crosshead 3810.

A pony rod seal 3801 is a ring-shaped radial seal that is received by the pony rod seal housing 3800 and secured within the pony rod seal housing 3800 by the fasteners 3808 that are disposed within corresponding holes in the pony rod seal housing 3800. The washers 3809 are disposed between fasteners 3808 and pony rod seal housing 3800. The pony rod seal 3801 seals against the pony rod 804 as it reciprocates (e.g., sealing lubricant from crosshead frame 220 from flowing out of the front of the central bore of crosshead frame 220, preventing liquids, dust, sand, etc. from entering the central bore of crosshead frame 220).

The crosshead 3810, as shown in FIGS. 38, 39, 51 and 52, is a generally cylindrical prism. The crosshead 3810 includes a blind bore on the longitudinal axis that begins at the back face of the crosshead 3810. The bore may be to a depth of up to half the length of the crosshead 3810 and the diameter may be large enough to leave a relatively thin wall.

The crosshead 3810 includes a pair of main bearing clearance cut outs 3813. The main bearing clearance cut outs 3813 have a generally rectangular shape as viewed from either side. The crosshead 3810 includes a wrist pin bore 3812. In such embodiments, the wrist pin bore 3812 is a through bore with a transverse axis and is approximately longitudinally centered on the crosshead 3810. The wrist pin 3814 is disposed inside the wrist pin bore 3812 and secured with a bracket 3816 and fasteners 3818 disposed through bracket 3816 and into corresponding bores set in a counterbore around wrist pin bore 3812.

The thrust seat bearing 3822 is disposed within crosshead 3810 (e.g., on a thrust seat bearing mount 5210 shown in FIG. 52) and secured by the thrust seat bearing keepers 3824 and fasteners 3826 extending through thrust seat bearing keepers 3824 and into corresponding threaded bores in crosshead 3810. As discussed herein in reference to FIG. 20, a set of grooves 2000 are formed in the outer cylindrical surface of the crosshead 3810 in various embodiments. In such embodiments, the grooves 2000 include two circumferential grooves connected by a longitudinal groove 2000, as shown in FIG. 38. In various embodiments, neither the two circumferential grooves nor the longitudinal groove 2000 intersect the front or the back face of the crosshead 3810.

The thrust seat bearing 3822 has the general form of a thin walled hollow semi-cylinder and includes a through hole 3823 and a plurality of axial grooves and a partial circumferential groove located on the inner surface (not shown). These axial grooves are formed at an angle to the longitudinal axis of the thrust seat bearing 3822 but generally extend from just inside one end wall to just inside the opposite end wall and do not intersect the end walls. The partial circumferential groove is centered longitudinally and intersects every axial groove. The through hole 3823 is disposed in the center of the circumferential groove.

The thrust seat bearing keeper 3824 is generally shaped like a rectangular prism with the upper corners at each end of its longitudinal face removed. The thrust seat bearing keeper 3824 includes two through slots and two through holes originating on the front face, each of which is configured to receive a fastener 3826. The two holes are spaced equidistant from the longitudinal center and centered vertically, and the two slots are also spaced equidistant from the longitudinal center but are spaced farther apart than the holes and centered vertically.

A wrist pin bushing 3834 is disposed around the wrist pin 3814. The wrist pin bushing 3834 is a thin walled cylinder that is configured to be coupled to the connecting rod 3830 such that the connecting rod 3830 and the wrist pin bushing 3834 are able to rotate around the wrist pin 3814 as crosshead assembly 1700 operates.

The connecting rod 3830 generally appears as a first cylinder having a shorter second cylinder formed on one end and a shorter semi-cylinder formed on the opposite end. The longitudinal axes of the second cylinder and the semi-cylinder are parallel to each other and transverse to the longitudinal axis of the first cylinder.

The connecting rod 3830 includes: a first end proximate to the wrist pin and a second end proximate to the crankshaft 212, a wrist pin bore 3835, and a lubrication through bore 1920. The first end includes a curved exterior thrust seat that faces the front of power end assembly 120. The wrist pin bore 3835 is a through bore through the center of the first end. The wrist pin bore 3835 axis is transverse to the connecting rod 3830 longitudinal axis.

The lubrication conduit 1920 has a longitudinal axis and is centered transversely on the thrust seat. The lubrication through bore 1920 begins at the thrust seat and continues into the wrist pin bore 3835. The lubrication through bore 1920 is aligned with a lubrication through bore in the second end (e.g., lubrication through bore 1922 shown in FIGS. 19 and 39). At the second end, connecting rod 3830 includes a crankshaft bearing mount surface 3832.

The crankshaft bearing mount surface 3832 is semi-cylindrical with an axis transverse to the longitudinal axis of the connecting rod and parallel to the wrist pin bore 3835 axis. The connecting rod 3830 is a unitary body that is more than 24.5 inches long center-to-center (e.g., from wrist pin bore 3835 to the center of crankshaft bearing mount surface 3832). In some embodiments, the connecting rod 3830 is 26.75 inches long center-to-center. The connecting rod 3830 is more than three times longer than the stroke of the power end assembly (i.e., the amount of movement of plunger 800 between the furthest extent of a forward stroke of crosshead assembly 1700 and the furthest extent of a back stroke of crosshead assembly 1700).

The connecting rod 3830 is coupled to the crankshaft 212 using a two-piece connecting rod bearing that includes a connecting rod bearing (rod side) 3838 and connecting rod bearing (cap side) 3842. In such embodiments, the two-piece connecting rod bearing is secured to the connecting rod 3830 by a connecting rod cap 3844 that is secured using a plurality of fasteners 3846 that are disposed through connecting rod cap 3844 and into corresponding bores in the walls of crankshaft bearing mount surface 3832. The alignment pins 3836 are also received by connecting rod 3830 and connecting rod cap 3844 to aid alignment. The connecting rod bearing (cap side) 3842 and the connecting rod bearing (rod side) 3838 have a general shape of a hollow semi-cylinder. In various embodiments, connecting rod bearing (rod side) 3838 includes a lubricant through hole (not shown) that, when installed, is aligned with the lubrication through bore 1922 of connecting rod 3830.

Referring now individually to FIG. 39, a spatial relationship between various embodiments of the pony rod 804 and other portions of the crosshead assembly 1700, the pony rod seal 3801, the pony rod seal housing 3800, and the crosshead frame 220 are shown. As shown in FIG. 39, the pony rod 804 is disposed through the pony rod seal 3801 and the pony rod seal housing 3800 such that the pony rod seal 3801 seals against the pony rod 804.

The pony rod seal housing 3800 is disposed on a front face of the crosshead frame 220 and includes a circumferential groove that receives a seal 3902 that seals the outer circumference of pony rod seal housing 3800 against the wall that defines the central bore 4600 of the crosshead frame 220. The pony rod seal housing 3800 includes a recess 3900 configured to provide additional clearance for pony rod clamp 802 as it reciprocates within connector section 126. Further, FIG. 39 illustrates as a dotted line 3910 a path that lubrication is able to flow through crosshead assembly 1700 in the various conduits discussed herein.

Figure 40:
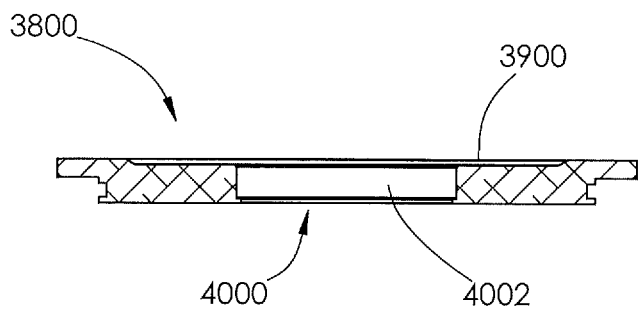
FIG. 40 is a cross-sectional view of the pony rod seal shown in FIG. 42.
Figure 41:
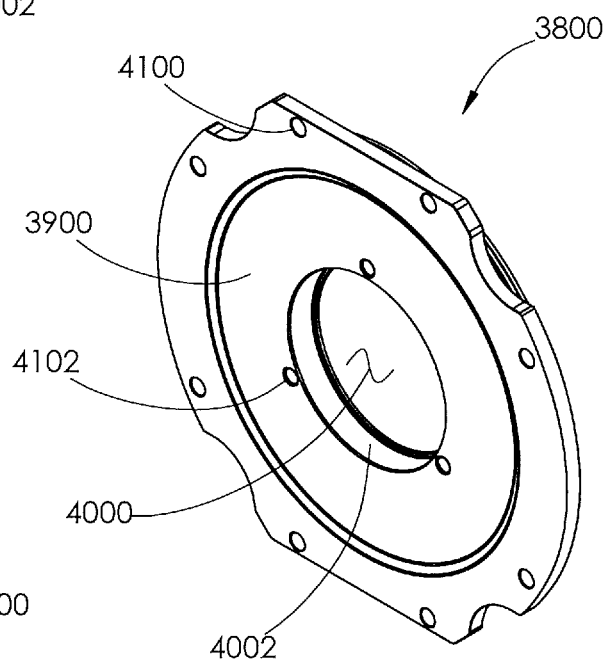
FIG. 41 is a front perspective view of the pony rod seal shown in FIG. 38.
Figure 42:
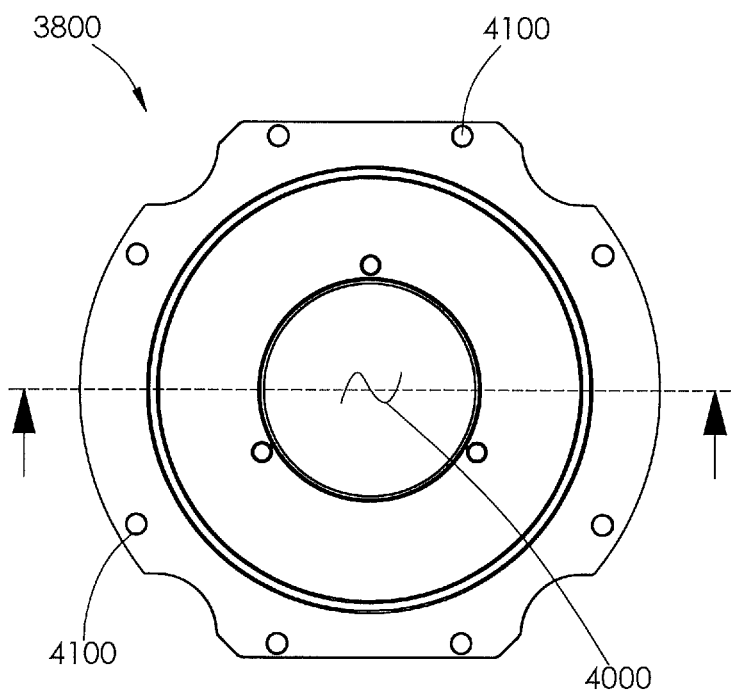
FIG. 42 is a front elevational view of the pony rod seal shown in FIG. 41.
Figure 43:
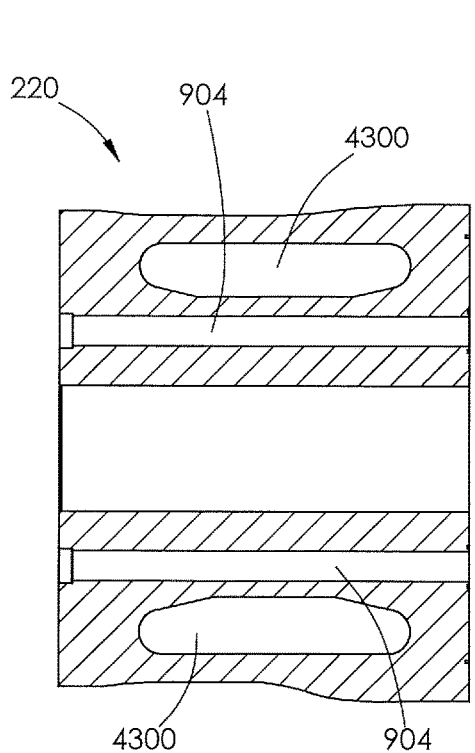
FIG. 43 is a cross-sectional view of crosshead frame shown in FIG. 45, taken along line AJ-AJ.

Referring now to FIGS. 40-42, the pony rod seal housing 3800 is a generally flat plate with a generally octagonal shape. In the embodiments shown in FIGS. 40-42, pony rod seal housing 3800 includes recess 3900, a central through hole 4000, a seal groove 4002, a plurality of through holes 4100, and a plurality of through holes 4102. The seal groove 4002 is a circumferential groove in the wall of the central through hole 4000 and is configured to receive at least a portion of pony rod seal 3801. The plurality of through holes 4100 have longitudinal axes and may be spaced around the circumference of the pony rod seal housing 3800. The through holes 4100 receive fasteners 3802 to couple pony rod seal housing 3800 to crosshead frame 220. The plurality of through holes 4102 are positioned around the central through hole 4000 and are configured to receive the fasteners 3808 to secure the pony rod seal 3801 within seal groove 4002.

Referring now to FIGS. 43-50, the individual crosshead frames 220 are generally rectangular prisms defining a plurality of bores including connect plate stay rod holes 904, stay rod through holes 2404, a central bore 4600, a plurality of weight reducing cut out sections 4300, a center web support 4602, a base section attachment clearance 4400, and various other bores configured to receive alignment dowels, fasteners, or permit the flow of air or lubricant as discussed herein. As discussed herein, the crosshead frame 220 is preferably made of cast ductile iron.

The central bore 4600 is centered on the front face of the crosshead frame 220 and is a through bore configured to receive a portion of the crosshead assembly 1700 (e.g., pony rod 804, crosshead 3810, etc.). As shown in FIGS. 43-50, the central bore 4600 is much larger than the various other bores in the crosshead frame 220. The walls of the crosshead frame that define the central bore 4600 maintain at least a minimum thickness (e.g., at least 0.5 inches thick) throughout but also define various weight reduction features such as the weight reducing cut out sections 4300.

Each individual crosshead frame 220 defines four connect plate stay rod holes 904 and four stay rod through holes 2404. The connect plate stay rod holes 904 and the stay rod through holes 2404 are smooth bores through crosshead frame 220. As discussed herein, the connect plate stay rod holes 904 are located near the center of crosshead frame 220 and the stay rod through holes 2404 are located close to the top and bottom of crosshead frame 220 as shown in FIGS. 43-50.

The walls of crosshead frame that defines the connect plate stay rod holes 904 and the stay rod through holes 2404 maintain at least a minimum thickness (e.g., at least 0.5 inches thick) throughout but also define various weight reduction features. Such weight reduction features include the weight reducing cut out sections 4300, the base section attachment clearance 4400, and/or the variable top and bottom profile of crosshead frame 220 in various embodiments.

The walls of crosshead frame 220 that define the connect plate stay rod holes 904 and the stay rod through holes 2404 are thicker at the front of crosshead frame 220 than at the back the of crosshead frame 220 to transfer compression from the first nuts 2400 and the nuts 900. For example, the walls of the crosshead frame 220 around the connect plate stay rod holes 2404 at the top and bottom of the crosshead frame 220 define ribs that include a thicker portion 4422, a thinner portion 4426, and a transition portion 4424 in between.

For example, the walls of the thicker portion 4422 are twice as thick as the walls of the thinner portion 4426. Between the ribs defining the connect plate stay rod holes 2404 is a recessed portion 4428, and on the sides of the walls defining the connect plate stay rod holes 2404 are corners 4430. In contrast to a crosshead frame in which all of the top and bottom of crosshead frame is as thick as thicker portion 4422, by defining the thinner portion 4426, the transition portion 4424, the recessed portion 4428, and the corners 4430, material can be omitted from crosshead frame 220, thereby reducing its weight in various embodiments. Further, because the crosshead frame 220 is cast, these features also reduce the material cost of the crosshead frame 220.

The crosshead frame 220 includes a plurality of weight reducing cut out sections 4300 in the sides of crosshead frame 220. There is preferably a weight reducing cut out section 4300 on either side of the crosshead frame 220. As discussed herein, the walls of crosshead frame 220 maintain a minimum thickness around the central bore 4600, the connect plate stay rod holes 904, and the stay rod through holes 2404. The weight reducing cut out sections 4300 are shaped such that this minimum thickness is maintained while weight is removed.

Figure 44:
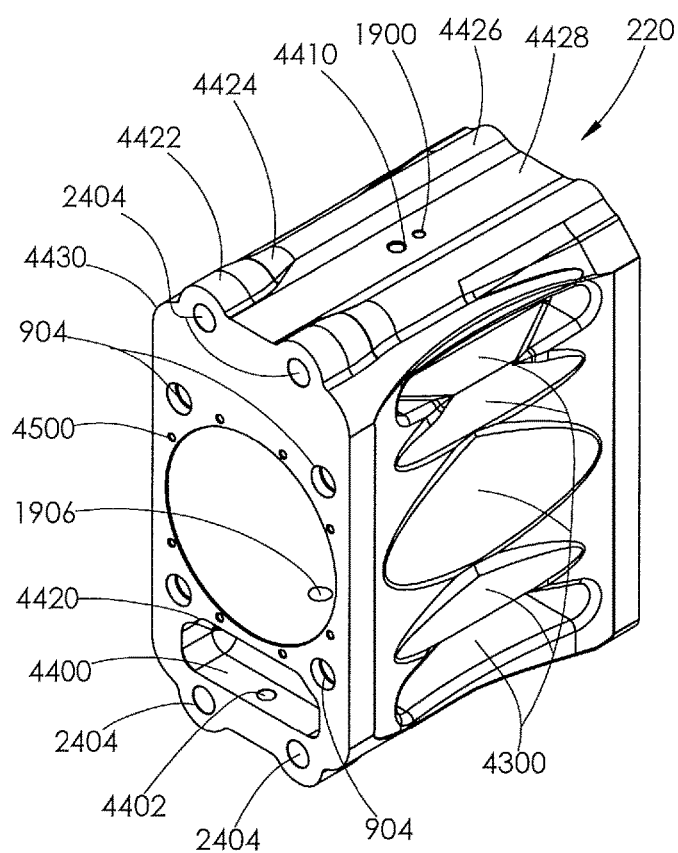
FIG. 44 is a front perspective view of the crosshead frame shown in FIG. 38.

Further, because the crosshead frame 220 is cast, the weight reducing cut out sections 4300 also reduce the material cost of the crosshead frame 220. As shown in FIGS. 44, 47, and 48, the front and rear faces of the crosshead frame 220 are thicker than interior portions in various embodiments. In such embodiments, by having the front and rear faces be relatively thicker, compression on crosshead frame 220 can be distributed through out the interior portions of crosshead frame. The weight reducing cut out sections 4300 preferably do not extend from one side of crosshead frame 220 to the other, and have a center web support 4602 between them at the top and the walls of crosshead frame 220 defining channel 1906 between them at the bottom.

Figure 46:
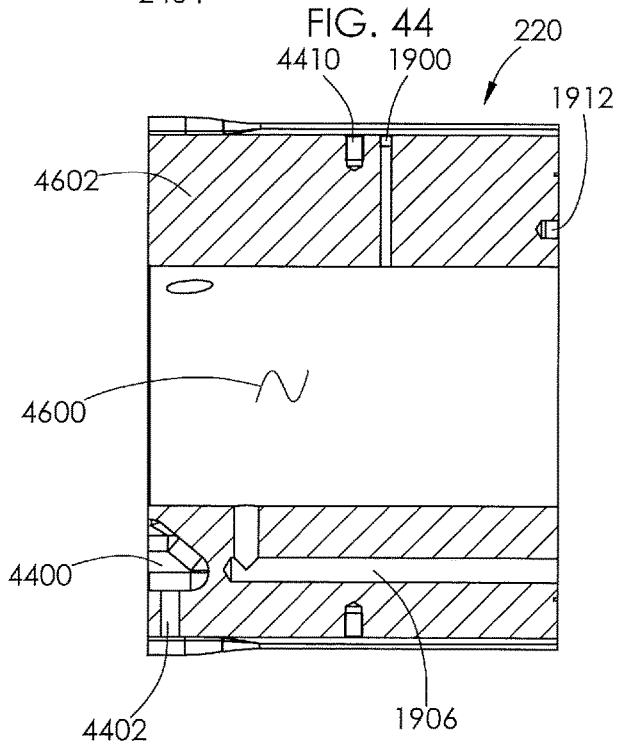
FIG. 46 is a cross-sectional view of the crosshead frame shown in FIG. 45, taken along line AK-AK.

Referring individually to FIGS. 44-46, the crosshead frame 220 includes a base section attachment clearance 4400. The base section attachment clearance 4400 is a generally triangular-shaped recess with a blunted interior corner. A base section attachment hole 4402 is defined in the bottom of base section attachment clearance 4400 and is configured to receive a fastener (e.g., a stud 6402 and a nut 6404 shown in FIG. 64) that secures the crosshead frame 220 to the base section 140.

The base section attachment clearance 4400 is shaped to enable sufficient room for a tool (e.g., a wrench) to access a fastener disposed in the base section attachment hole 4402 such that the crosshead frame 220 may be removed from the base section 140 or installed on base section 140. The base section attachment clearance 4400 also serves to further reduce the weight of the crosshead frame 220. The top corners 4420 of base section attachment clearance 4400 extend toward the interior of crosshead frame 220 to ensure the minimum thickness of connect plate stay rod holes 904.

Referring to FIGS. 47-50, the crosshead frame 220 includes a seal 4800 around the various holes and bores discussed herein (other than holes 2404). The seal 4800 engages with the central support plate 202 to help prevent lubrication from leaking out of the crosshead frame 220 at the joint with the central support plate 202. The seal 4800 is an extruded and spliced seal that is positioned in a groove formed in the rear side of the crosshead frame 220. By using a seal 4800 instead of a gasket, various drawbacks associated with gaskets (e.g., saturation, over compression) may be avoided. The crosshead frame 220 also includes seals 4802 around the connect plate stay rod holes 904. The seals 4802 engage with the central support plate 202 to prevent lubrication from entering the connect plate stay rod holes 904 and leaking out of the crosshead frame 220.

The front face of crosshead frame 220 includes a plurality of threaded holes 4500 disposed around the central bore 4600. As discussed herein, the threaded holes 4500 receive the fasteners 3802, thereby securing the pony rod seal housing 3800 to the front of central bore 4600. The top of crosshead frame 220 includes at least two holes: the lubrication inlet bore 1900 that is coupled to lubrication conduit 702 to receive lubricant during operation as discussed herein, and a lifting eye bore 4410 which is configured to facilitate lifting of crosshead frame 220 during assembly.

The lubrication inlet bore 1900 is partially threaded at the top. The threaded portion begins at the top surface and may extend to half the bore depth. The threaded portion is configured to receive the connector 704 from the lubrication system 700. A conduit may be disposed within the lubrication inlet bore 1900 to facilitate lubrication. In addition to the lubrication inlet bore 1900, the crosshead frame 220 also defines channel 1906 configured to allow lubrication to flow into the crank section 122 and the channel 2500. The channel 2500 allows air to flow between the crank section 122 and the crosshead section 124 to release air that is pressurized by a forward stroke by crosshead assembly 1700 and to relieve a vacuum that is created by a back stroke by crosshead assembly 1700. The channel 1906 and the channel 2500 open to the central bore 4600 and the rear face of the crosshead frame 220, but neither of the channel 1906 nor the channel 2500 open to the front face of the crosshead frame 220.

Employing individual crosshead frames 220 allows for further weight reduction relative to a unitary crosshead section. For example, if two crosshead frames 220 are arranged side-by-side, the weight reducing cut out sections 4300 of the adjacent sides of the crosshead frames 220 result in at least some of the area between the central bores 4600 of the crosshead frames 220 to be negative space rather than solid material that would connect a unitary crosshead section. Additionally, using individual crosshead frames 220 means that if a single crosshead frame 220 in a crosshead section 124 fails (e.g., because crosshead 3810 has eroded central bore 4600 of the crosshead frame 220), the failed crosshead frame 220 may be individually replaced rather than replacing the entire crosshead section 124.

Replacement may be further aided by the various alignment pins discussed herein helping to align the replacement with the rest of the power end assembly 120. Further, because replacing an individual crosshead frame 220 with a new crosshead frame 220 will take less time than repairing a damaged crosshead frame, the power end assembly 120 may be brought back into service faster relative to repairing a unitary crosshead section. It is also easier and/or less costly to cast a smaller piece such as an individual crosshead frame 220 rather than a unitary crosshead section. Constructing a crosshead section 124 using a plurality of individual crosshead frames 220 may result in weight reduction, cost savings, less down time, and various other improvements relative to a unitary crosshead section.

Figure 51:
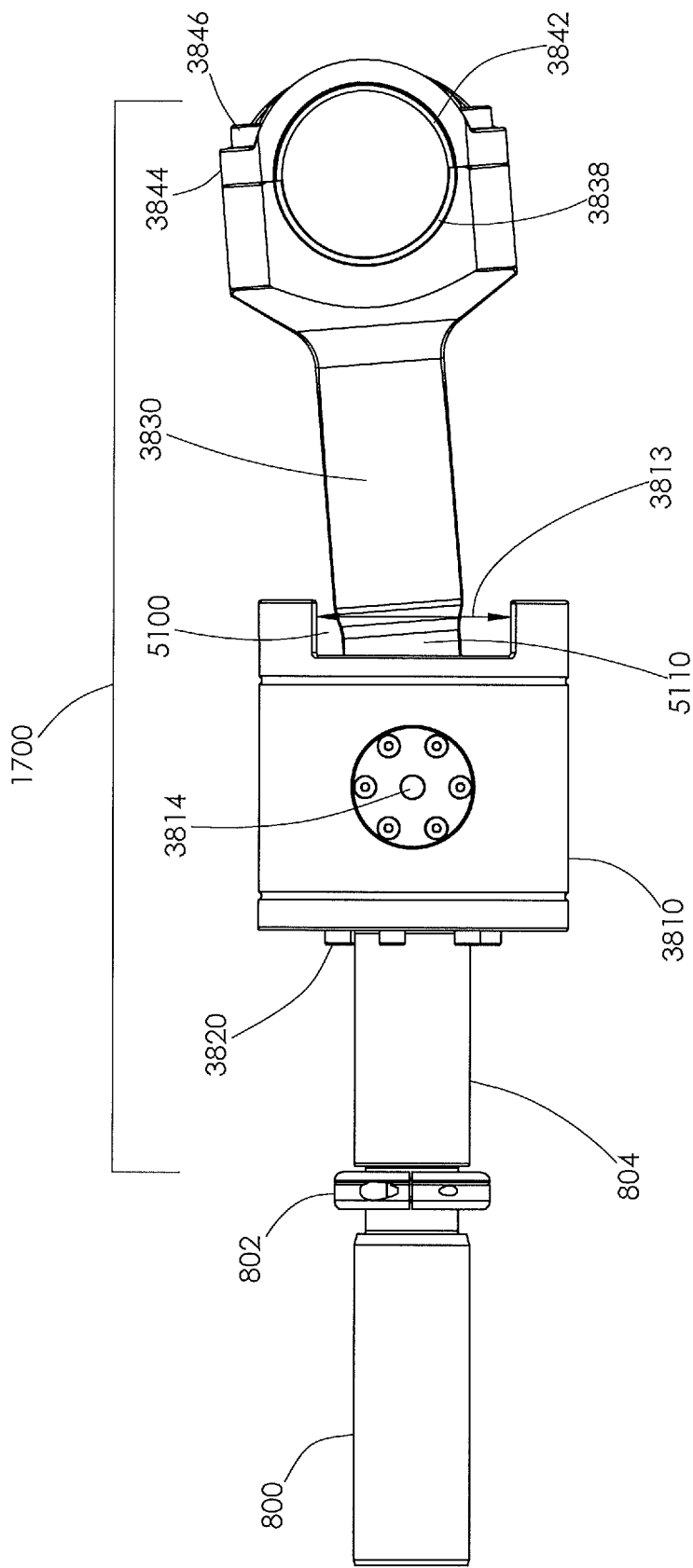
FIG. 51 is a side elevational view of the crosshead assembly and piston shown in FIG. 38, but the crosshead assembly is shown assembled and attached to the piston.

Referring now to FIGS. 51 and 52, the spatial relationship between a narrow portion 5110 of the connecting rod 3830 and a wider portion of the connecting rod 3830 results in the clearance 5100 between the connecting rod 3830 and the crosshead 3810. By reducing weight in the sides of the crosshead 3810 (e.g., with main bearing clearance cut outs 3813), overall weight of the crosshead 3810 is reduced without reducing the amount of material on the top and bottom of the crosshead 3810. Because the top and bottom of the crosshead 3810 contact the walls of the crosshead frame 220 that define the central bore 4600 as the crosshead assembly 1700 reciprocates, it is on the top and bottom of the crosshead 3810 and the corresponding portions of the crosshead frame 220 that experience the most wear.

Further, clearance 5100 allows more room such that the connecting rod 3820 can be longer. Compared to crossheads used in other types of power ends, the crosshead 3810 is both longer and has a wider diameter. Additionally, as discussed herein, the connecting rod 3830 is longer than connecting rods in other power ends. As a result, pressure-velocity loading on the linear portions of the crosshead assembly 1700 and the crosshead frame 220 can be reduced. Further, the main bearing clearance cut outs 3813 also provide clearance around the crankshaft 212 when the crosshead assembly 1700 is backstroking. Additionally, the connecting rod 3830 is made of a single piece, which may reduce manufacturing and labor costs compared a connecting rod made of multiple pieces.

Referring now to FIG. 52, a cutaway sideview of the plunger 800 and the crosshead assembly 1700 is shown. As shown in FIG. 52, the connecting rod cap 3844 is coupled to the back of the connecting rod 3830, trapping a connecting rod bearing (rod side) 3838 and a connecting rod bearing (cap side) 3842, which are wrapped around crankshaft 212 (not shown in FIG. 52). The connecting rod cap 3844 includes a threaded hole 5200 configured to facilitate separating the connecting rod cap 3844 from the crosshead assembly 1700.

As shown in FIG. 52, an interior surface of the crosshead 3810 defines a thrust seat bearing mount 5210 that receives the thrust seat bearing 3822 and the fasteners 3826 are attached to the interior of the crosshead 3810. Both the plunger 800 and the pony rod 804 are hollow. In the embodiment shown in FIG. 52, the pony rod 804 includes a thinner-walled portion 5220 proximate to the crosshead 3810 and a thicker walled portion 5222 proximate to the plunger 800. Similarly, the plunger 800 includes a thinner-walled portion 5230 proximate to fluid end assembly 110 and a thicker-walled portion 5232 proximate to the pony rod 804. In other embodiments, however, either or both of the plunger 800 and the pony rod 804 may be solid (i.e., the hollow areas defined by thinner-walled portion 5220 and thicker walled portion 5222 in pony rod 804 and thinner-walled portion 5230 and thicker-walled portion 5232 of plunger 800 are not present).

FIG. 52 also includes dotted line 3910 that illustrates the path that lubrication is able to flow through the crosshead assembly 1700 in the various conduits discussed herein. As shown in FIG. 52, lubrication is able to flow from the crosshead 3810 to the connecting rod 3830 and then to lubricate the connecting rod bearing (rod side) 3838 and the connecting rod bearing (cap side) 3842.

Crank Section 122

Figure 53:
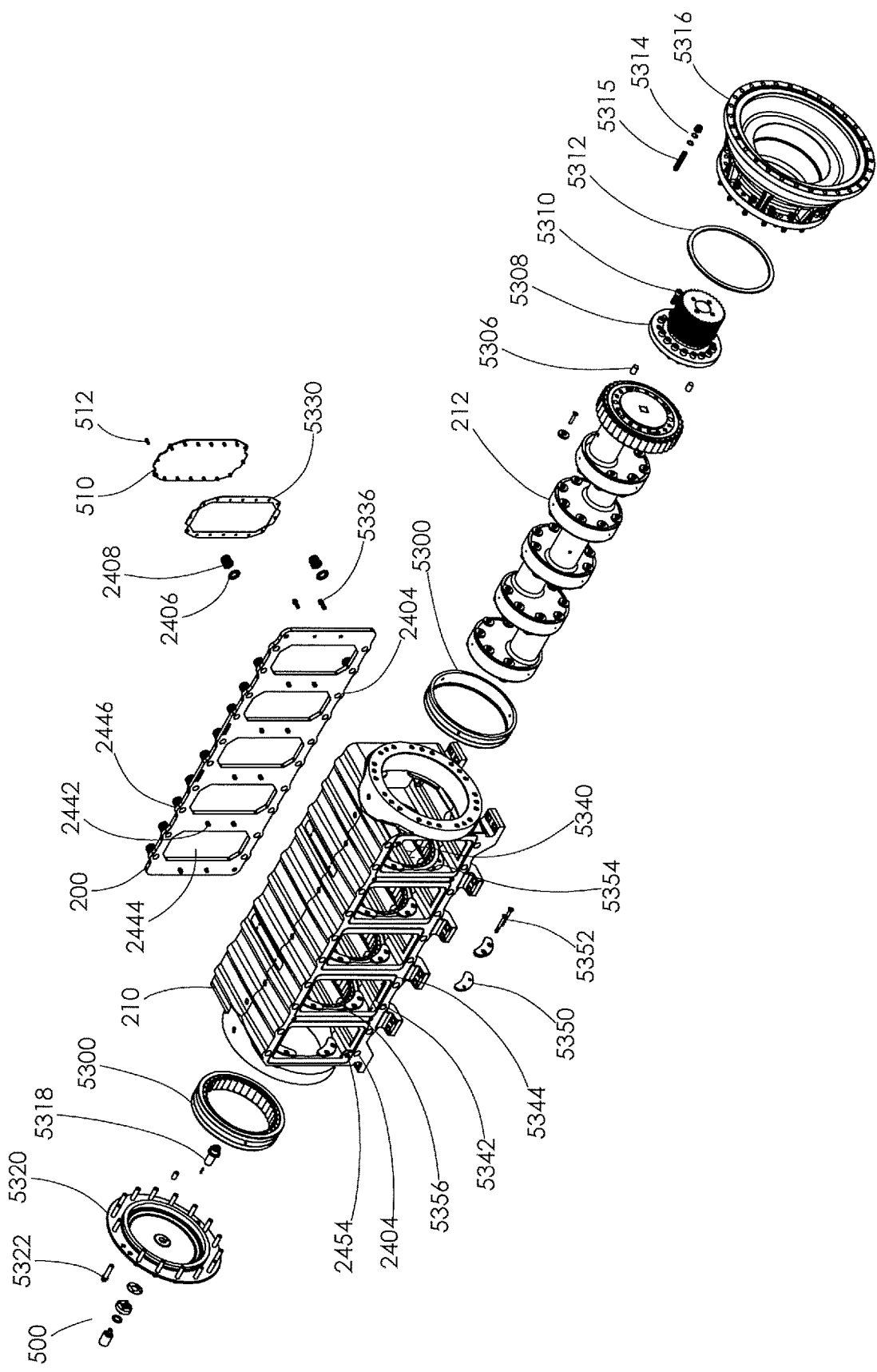
FIG. 53 is a front perspective exploded view of the crank section and the rear support plate shown in FIG. 7.
Figure 54:
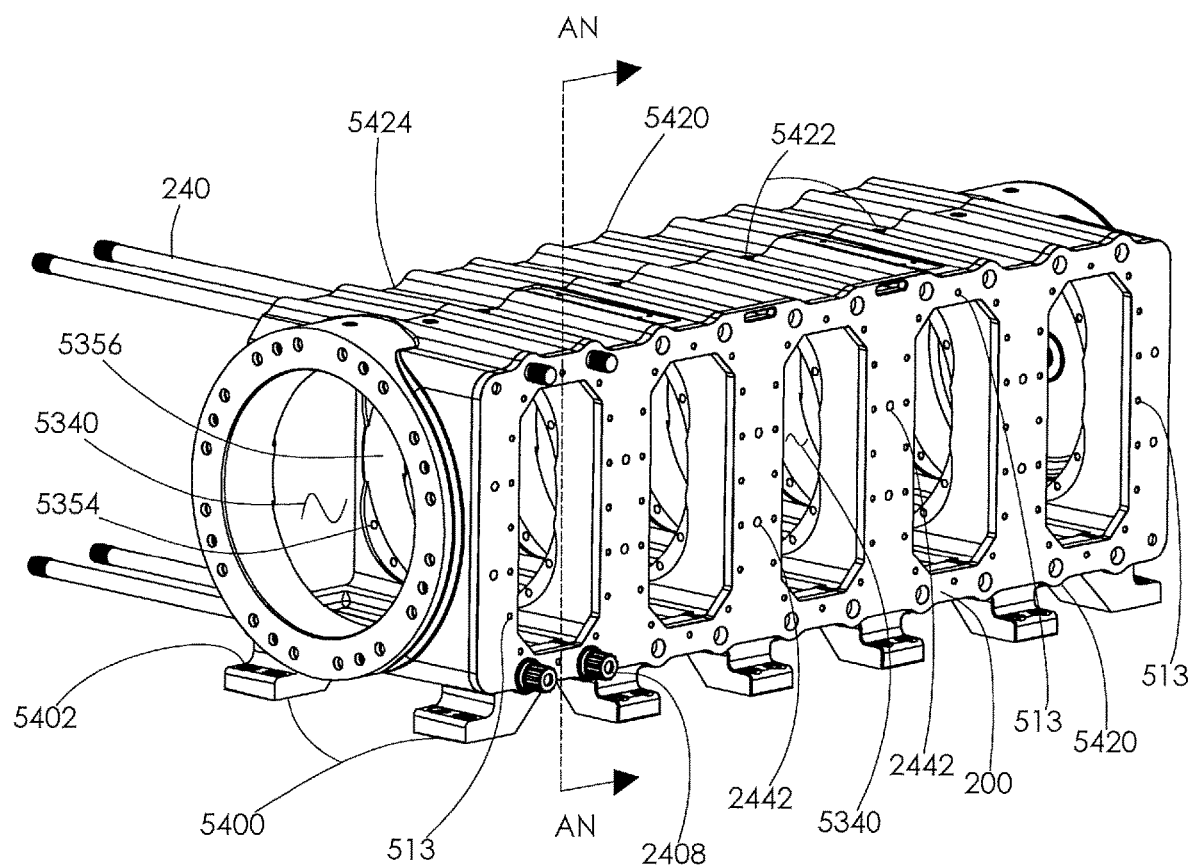
FIG. 54 is a rear perspective view of the crank frame shown in FIG. 53. A rear support plate is shown positioned on the crank frame and a set of first stay rods are shown installed within the crank frame and the rear support plate and projecting from a front surface of the crank frame.

Referring now to FIGS. 53-63, power end assembly 120 and components thereof (with a particular focus on crank section 122) are shown in further detail. Referring now to FIG. 53, the crank section 122 includes the crank frame 210 and a crankshaft 212 made of various subcomponents and coupled to the crank frame 210 by brackets and fasteners. In the embodiment shown in FIG. 53, the rear support plate 200 is configured to couple to the back of the crank section 122 (e.g., using first plurality of rods 240) and in turn has a plurality of components coupled to its back.

In the embodiment shown in FIG. 53, the crank section 122 includes the crank frame 210, a plurality of main bearings 5300, a plurality of sets of brackets 5350 and the fasteners 5352, and the crankshaft 212. The main bearings 5300 include an inner race, a roller cage, and an outer race. The outer race includes one or more radial holes to allow lubricant access to the inner race and roller cage. The outer race includes one or more grooves that act as reservoirs for lubricant.

In the embodiment shown in FIG. 53, an endplate 5320 is attached to the crank frame 210 by a plurality of fasteners 5322. The endplate 5320 covers the exterior facing side of the outer main bearings 5300. This reduces contamination in the main bearings 5300 and keeps lubricant contained in the crank frame 210 so that it may exit through the drains 1908 instead of leaking out of the crank frame 210 requiring replacement lubricant be added to the power end lubrication system 700.

As shown in FIG. 53, a lubrication inlet 500 includes an interior portion 5318 that is received by a hole through endplate 5320. The lubrication inlet 500 is stationary as the crankshaft 212 rotates while the interior portion 5318 rotates with crankshaft 212.

In the embodiment shown in FIG. 53, on the opposite side of the crank frame 210 from the endplate 5320, a connecting adapter 5308 is coupled to the crankshaft 212 by a plurality of fasteners 5310. One or more locating pins 5306 is configured to aid in the alignment of connecting adapter 5308. A fixed bearing retention ring 5312 is disposed around a fixed center main bearing 5300 and prevents transverse crankshaft 212 movement, and a gearbox adapter flange 5316 coupled to the crank frame 210.

The plurality of fasteners 5314 and a plurality of studs 5315 are received by corresponding holes formed in the side of the crank frame 210 (holes 5700 and 5702, respectively shown in FIG. 57) and corresponding holes in the gearbox adapter flange 5316 to secure the gearbox adapter flange 5316 to crank frame 210 and to prevent failures in the crank frame 210 (e.g., due to misalignment), respectively. The gearbox adapter flange 5316 and the connecting adapter 5308 are configured to attach to drive section 130 such that the drive section 130 turns the connecting adapter 5308 to cause the crankshaft 212 to rotate within the crank frame 210 on the main bearings 5300.

The crank frame 210 is a unitary body that receives the crankshaft 212 and facilitates the operation of the crankshaft 212 within the crank frame 210. The crank frame 210 is roughly shaped as a rectangular prism with flat front and rear surfaces that couple to the plates 202 and 200, respectively, and roughly square left and right surfaces with protruding flat circular surfaces that couple to the drive section 130 on one or both sides. As discussed herein, the crank frame 210 defines the main bearing bore 5340 and receives the crankshaft 212 and the main bearings 5300.

The crank frame 210 protects the crankshaft 212 by preventing damage to the various moving parts of the crankshaft 212 and facilitates the operations of the crankshaft 212. The main bearings 5300 may be secured within a plurality of bearing support walls 5356 that are evenly spaced transversely across the crank frame 210. Each bearing support wall 5356 defines a main bearing bore 5340 and includes a plurality of through holes 5354. The main bearing bore 5340 is centered in the bearing support walls 5356 and bored transversely through them, and the through holes 5354 are located around the edge of the main bearing bore 5340. The main bearing 5300 is disposed within the main bearing bore 5340 at each bearing support wall 5356.

The main bearings 5300 are secured by sets of brackets 5350 and fasteners 5352. The sets of four brackets 5350 secure the main bearings 5300 at both ends of the crank frame 210 and sets of eight brackets 5350 secure the main bearings 5300 between the two ends. The main bearings are secured by the brackets 5350 trapping the main bearings 5300 within the main bearing bore 5340 and are secured by the fasteners 5352 that are received by corresponding holes through the brackets 5350 and the holes 5354.

The crank frame 210 includes a plurality of connecting rod cut outs 5342 between the bearing support walls 5356 through which the crosshead assembly 1700 (not shown in FIG. 53) reciprocates. A plurality of seals 5344 are disposed around the connecting rod cut outs 5342 (e.g., to prevent lubricant from leaking out of the power end assembly 120 and to prevent contaminants from entering the power end assembly 120). In such embodiments, the seals 5344 are extruded and spliced seals and are positioned in grooves around each connecting rod cut out 5342. By using a seal 5344 instead of a gasket, various drawbacks associated with gaskets (e.g., saturation, over compression) may be avoided. The front of the crank frame 210 includes one or more dowel pin holes 2454 useable to facilitate alignment of the central support plate 202 and the various crosshead frames 220 as discussed herein.

The rear support plate 200 is coupled to the back of crank section 122. The rear support plate 200 is a generally rectangular plate with a plurality of stay rod through holes 2404 located along the top and bottom periphery. The rear support plate 200 includes the maintenance openings 2444, the openings 2442, a plurality of blind holes 513, and a variable top and bottom profile with raised portions 2446 around stay rod through holes 2404. The holes 513 are configured to receive fasteners 512 to facilitate covering of maintenance openings 2444 by maintenance covers 510 such that when a maintenance cover 510 is removed a portion of crankshaft 212 is exposed and can be serviced without removing rear support plate 200.

A maintenance cover gasket 5330 is coupled to the rear support plate 200 by the fasteners 5336, and the maintenance cover 510 is in turn coupled to the maintenance cover mounting gasket 5330 and the rear support plate 200 by the fasteners 512. In such embodiments, the maintenance cover gasket 5330 includes a molded seal on a metal sheet backing and is configured to seal the joint between the rear support plate 200 and the maintenance covers 510. In such embodiments, therefore, common drawbacks with other types of gaskets (e.g., saturation, over compression) may be avoided. In other embodiments, no maintenance cover gasket 5330 is present and the maintenance cover 510 is coupled directly to the rear support plate 200 (e.g., by fasteners 512). In such embodiments, grooves are cut around the maintenance openings 2444 and a seal is positioned in the grooves to seal against maintenance covers 510.

The maintenance covers 510 are generally flat plates with a plurality of holes around the periphery to access the fasteners 512. There is one maintenance cover 510 (and in some embodiments, one maintenance cover gasket 5330) for each maintenance opening 2444.

Referring now to FIGS. 54-60, the crank frame 210 is a generally hollow rectangular prism with the long sides perpendicular to the defined longitudinal axis and a plurality of evenly spaced bearing support walls 5356. As discussed herein, the crank frame 210 and the rear support plate 200 include a plurality of stay rod through holes 2404 located along the top and bottom periphery that are configured to receive the rods 240. The crank frame 210 includes a plurality of feet 5400 at various positions around the base of the crank frame 210, a plurality of lubrication ports 5422, and/or a plurality of weight-reduction recesses discussed herein.

Referring now to FIGS. 54 and 56-60, the crank frame 210 preferably defines twenty stay rod through holes 2404 and various weight reducing features. The stay rod through holes 2404 are smooth bores through the crank frame 210. As discussed herein, the stay rod through holes 2404 are located close to the top and the bottom of the crank frame 210. The walls of crank frame 210 that define the stay rod through holes 2404 maintain at least a minimum thickness (e.g., at least 0.750 inches thick) throughout but also define various weight reduction features.

Such weight reduction features include weight-reduction recesses in the bearing support walls 5356 (not shown) and 5900 (shown in FIG. 59) and/or the variable top and bottom profile of crank frame 210 (shown in 54 and 56-59) in various embodiments. The weight-reduction recesses 5900 are areas of decreased wall thickness that may be cast into the crank frame 210 or machined out after casting. The weight reduction features may be defined in the bearing support walls 5356 as areas of reduced wall thickness but are not defined by perforating the bearing support walls 5356. Cutting out these weight-reduction recesses rather than casting them, may be more cost effective and ensure better quality control (e.g., ensuring the integrity of bearing support walls 5356).

Figure 59:
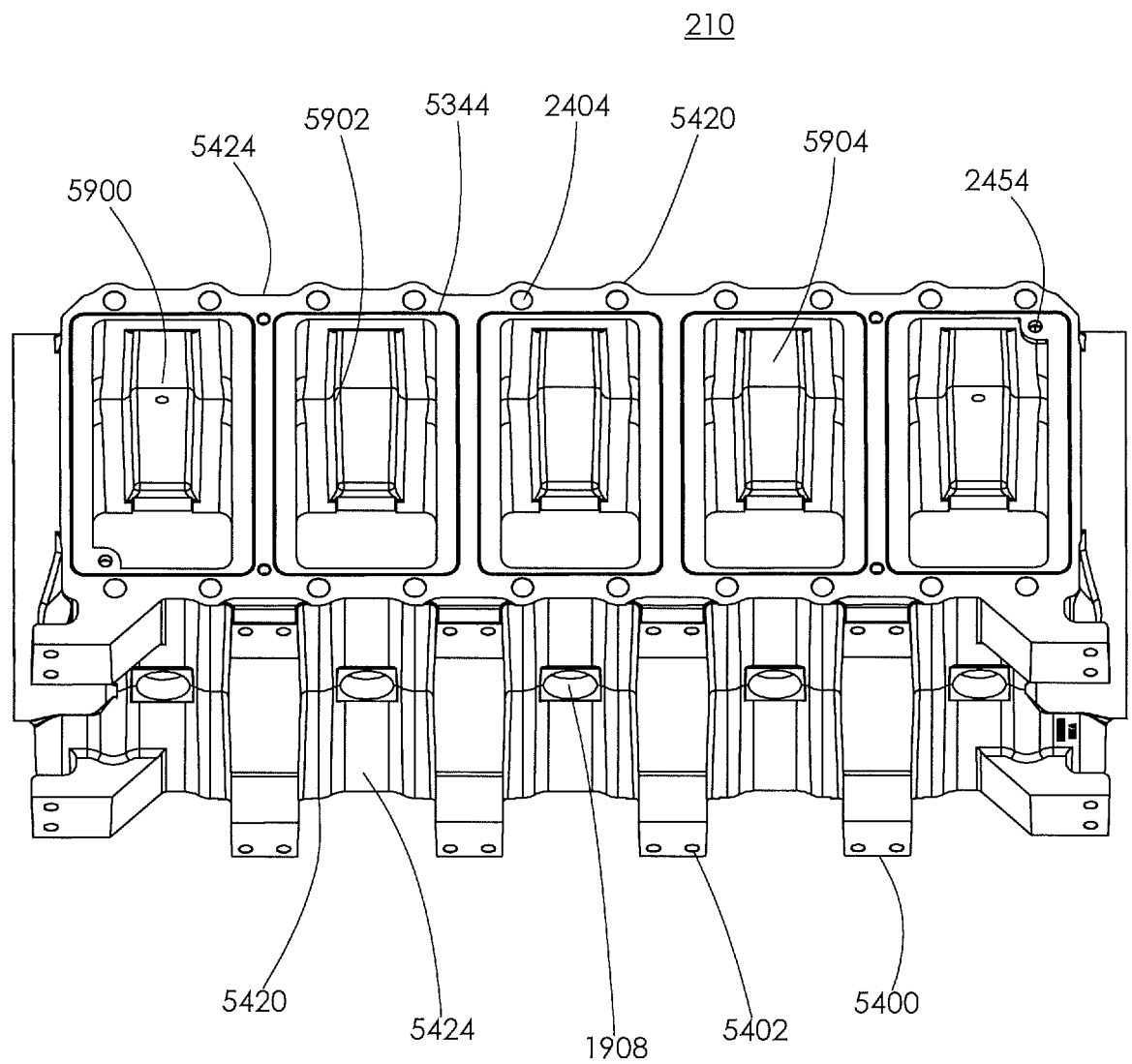
FIG. 59 is a rear bottom perspective view of the crank frame shown in FIG. 56.

The walls of the crank frame 210 that define the stay rod through holes 2404 define raised ribs 5420 separated by recessed portions 5424. Referring now to FIG. 59, the weight-reduction recesses 5900 correspond to the opposite side of the recessed portions 5424. In the embodiment shown, a weight-reduction recess 5900 is disposed between each bearing support wall 5356 and is defined by a deeper portion 5904 and a transition portion 5902 corresponding to each stay rod through hole 2404 to ensure the minimum wall thickness discussed herein. Therefore, various weight reduction features are defined in the crank frame 210 between the bearing support walls 5356 and within the bearing support walls 5356. Further, because the crank frame 210 is cast, these features also reduce the material cost of the crank frame 210.

The top of crank frame 210 includes a plurality of lubrication ports 5422 disposed between the raised ribs 5420. The lubrication ports 5422 are centered longitudinally and spaced transversely such that they are positioned directly over the outer race of each main bearing 5300 when mounted in the crank frame 210. The lubrication ports 5422 may be threaded to accept a lubrication hose (not shown) of lubrication system 700.

Figure 57:
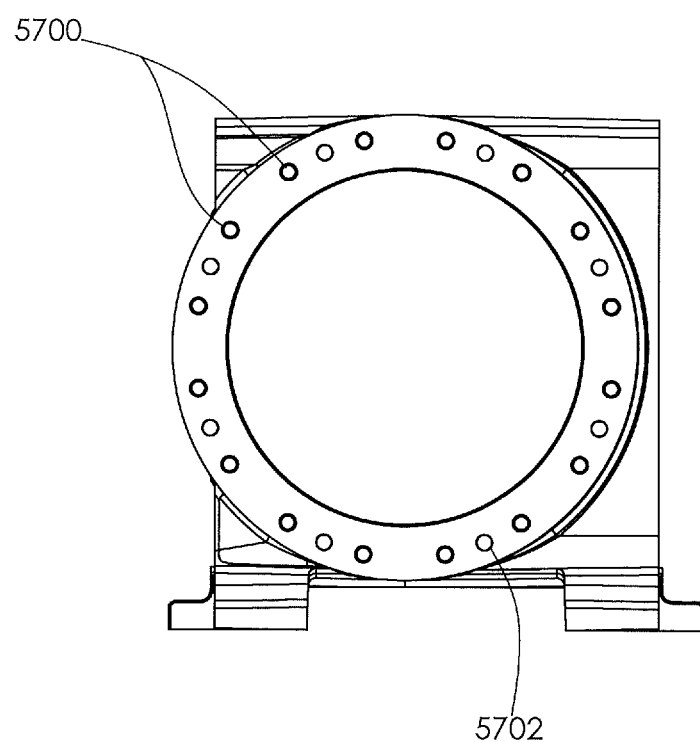
FIG. 57 is a side elevational view of the crank frame shown in FIG. 56.

Referring now individually to FIG. 57, a plurality of holes 5700 and 5702 are formed in the side of the crank frame 210. The holes 5700 are configured to receive the studs 5315 using fasteners 5314 to secure the gearbox adapter flange 5316 to the crank frame 210. The holes 5702 are configured to receive the alignment dowels (not shown) which are used to align the crank frame 210 with the gearbox adapter flange 5316 to prevent misalignment between the gearbox adapter flange 5316 and the crank frame 210, which might result the failure of either or both.

Referring to FIGS. 54 and 56-60, a plurality of feet 5400 are disposed at various positions around the base of the crank frame 210. A pair of feet 5400 correspond to each main bearing 5300. Each foot 5400 includes a pair of holes 5402 configured to receive a fastener (e.g., a stud 6402 secured by a nut 6404 as shown in FIG. 64) that couples the foot 5400 to the base section 140.

Figure 58:
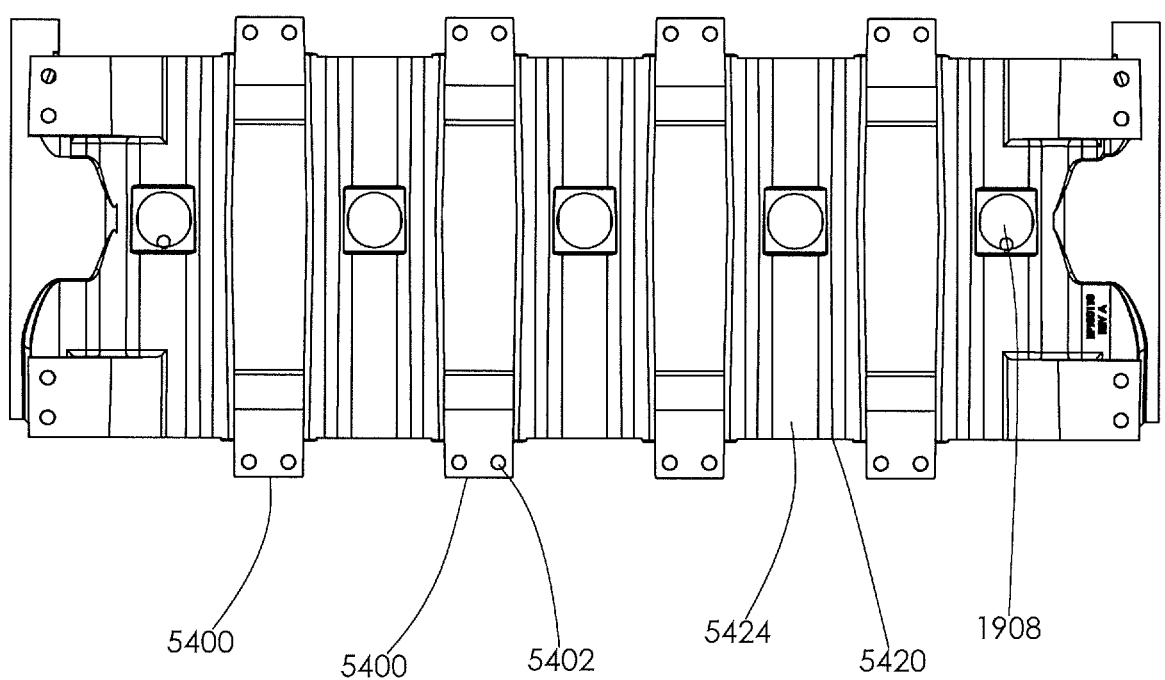
FIG. 58 is a bottom plan view of the crank frame shown in FIG. 56.

As shown in FIG. 58, each foot 5400 at the front of the crank frame 210 corresponds to a foot 5400 at the rear of the crank frame 210 with a raised rib between them. However, various other configurations of feet may be used in various embodiments. For example, the crank frame 210 may include more feet, fewer feet, or even no feet.

Figure 55:
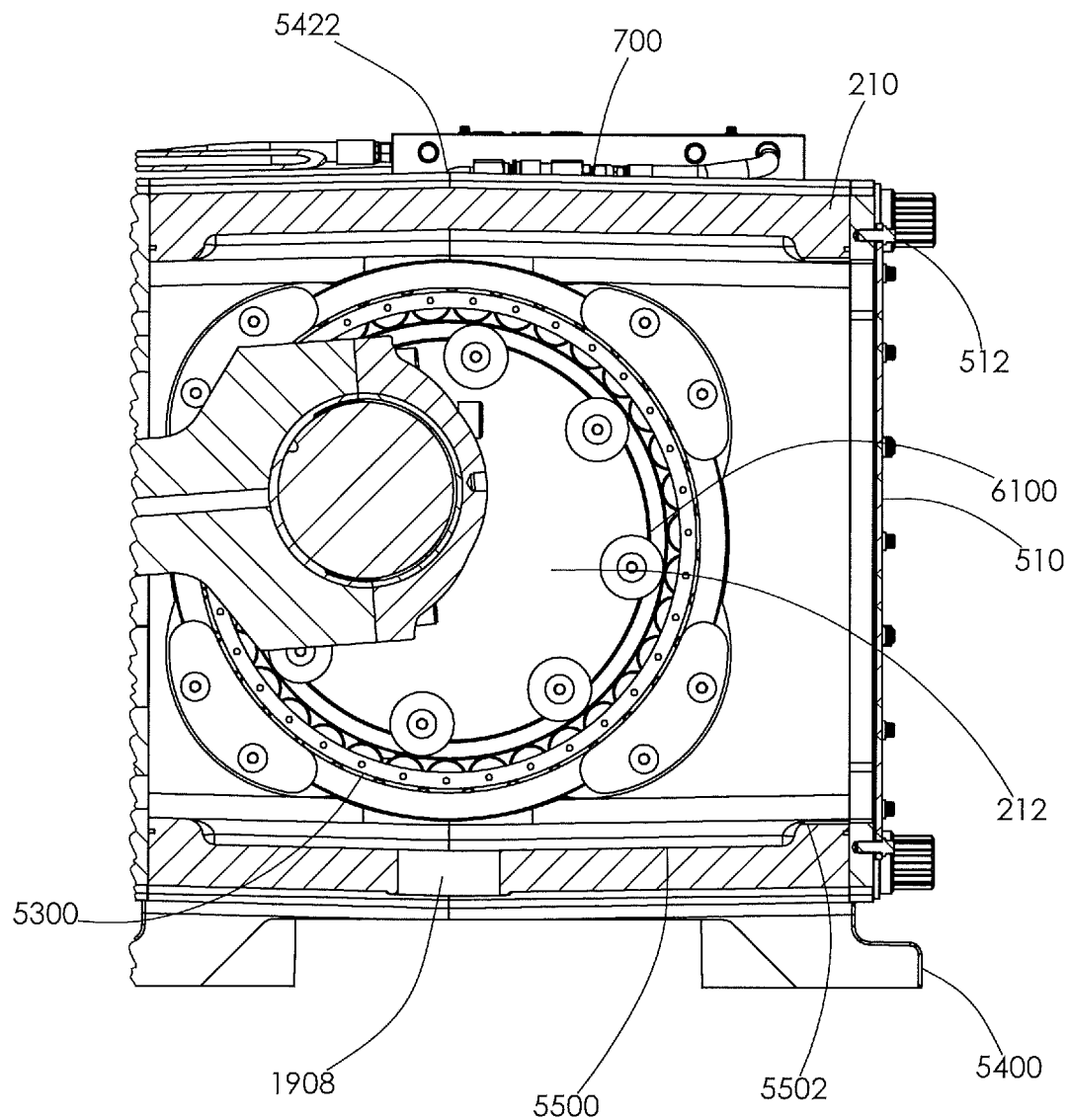
FIG. 55 is an enlarged cross-sectional view of a portion of the power end assembly shown in FIG. 19.

Referring now to FIG. 55, a portion of lubrication system 700 coupled to the top of crank frame 210 is shown. As discussed herein, the lubrication system 700 distributes lubricant to the main bearings 5300 and to the crankshaft 212. After circulating through the main bearings 5300 and the crankshaft 212, lubricant exits the crank frame 210 at a plurality of drains 1908 (also shown in FIGS. 58 and 59). As shown in FIG. 55, the drains 1908 are disposed roughly equidistant between the front and rear of the crank frame 210, and roughly equidistant between the main bearings 5300.

As shown in FIG. 55, the drains 1908 define an exit port though the bottom of the crank frame 210 with journaling defining a slope 5500 between the drain 1908 and the highest portion 5502 of the interior base surface of the crank frame 210. Accordingly, if the crank frame 210 is level, lubricant will flow from various parts of the crank section 122 down through the drains 1908.

Figure 61:
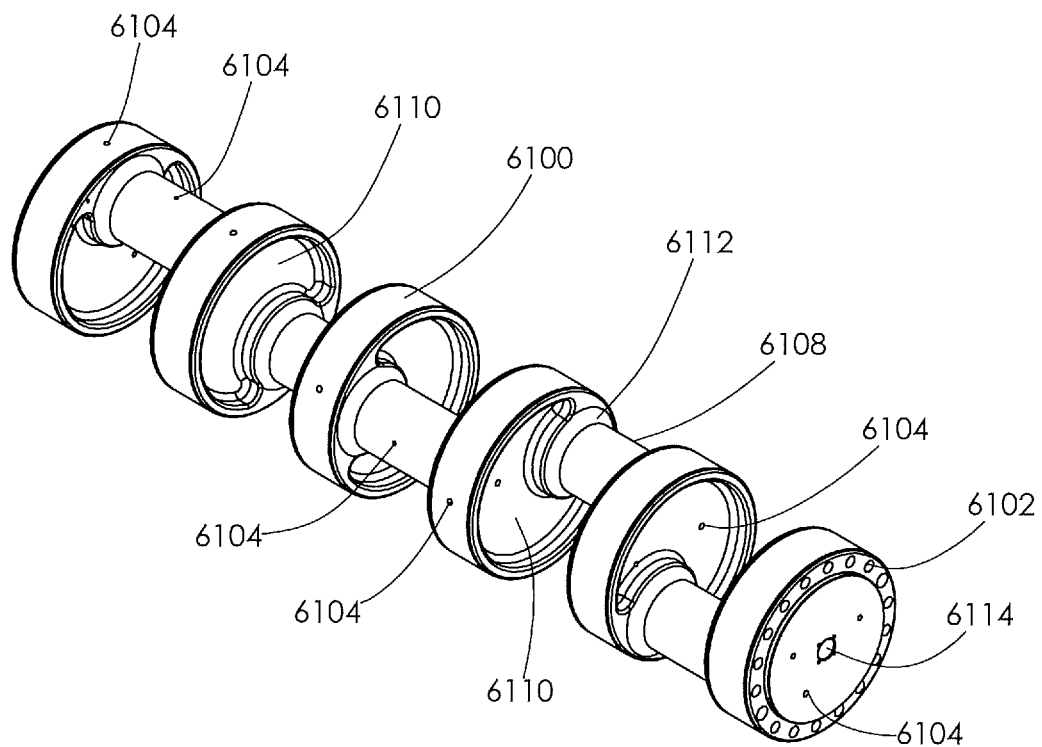
FIG. 61 is a perspective view of another embodiment of a crankshaft.
Figure 62:
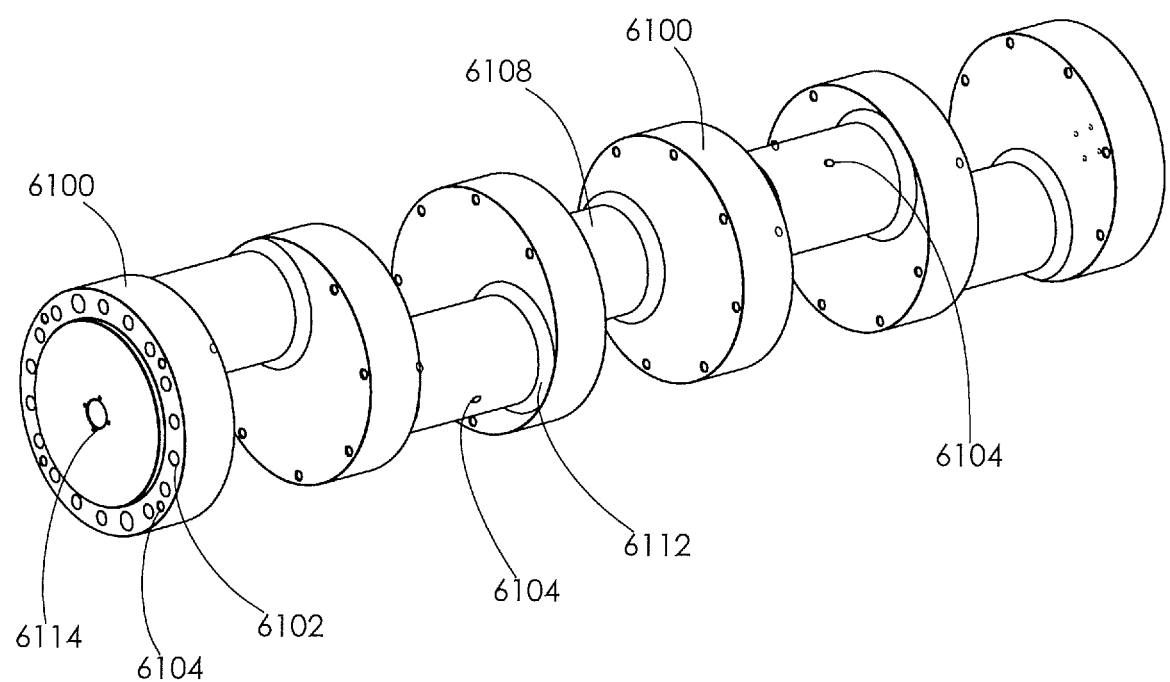
FIG. 62 is a perspective view of the crankshaft shown in FIG. 53.
Figure 63:
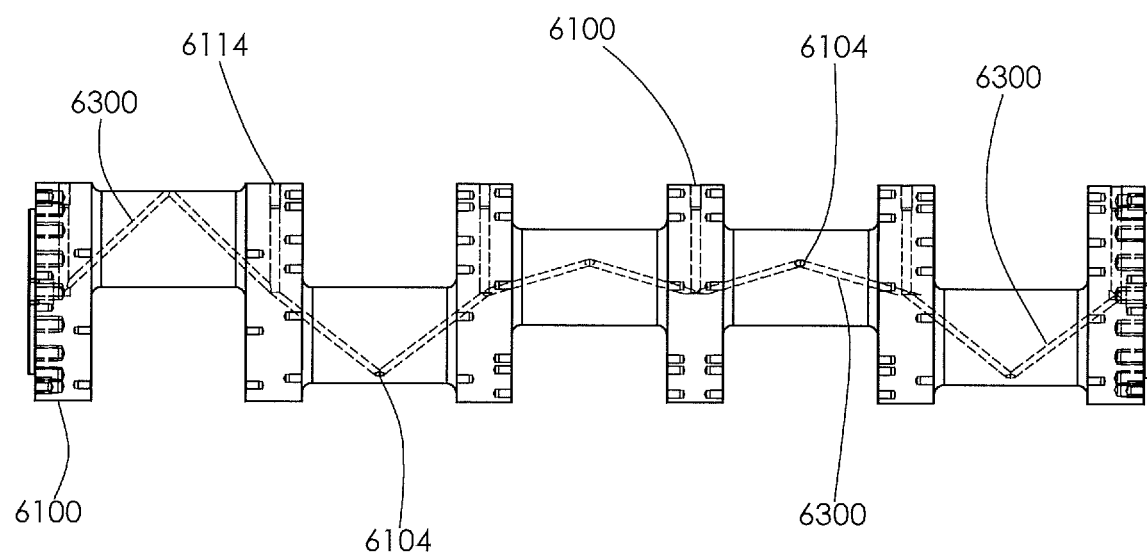
FIG. 63 is side view of the crankshaft shown in FIG. 62 with dashed lines showing various internal structures.

Referring now to FIGS. 61-63, various views of crankshaft 212 are shown. FIG. 61 relates to a first embodiment of crankshaft 212 that is labeled crankshaft 212A. FIGS. 62 and 63 relate to a second embodiment of crankshaft 212 that is labeled crankshaft 212B. As discussed in additional detail herein, crankshaft 212A and crankshaft 212B include internal mechanisms for receiving and distributing lubricant and primarily differ by having different weight reduction features.

Referring now to FIG. 61, a first embodiment of the crankshaft 212A includes a plurality of bearing journals 6100, bearing journal cut outs 6110, crank journals 6108, crank journal radii 6112, threaded holes 6102, and outlet ports 6104. The crankshaft 212A includes a lubrication conduit 6300 (shown in FIG. 63), inlet ports 6114, outlet ports 6104, and plugs (not shown) that are also components of the power end lubrication system.

In various embodiments, the outside diameter of the bearing journals 6100 are sized to have an interference fit with the inner race of the main bearings 5300, as shown in FIG. 55. As shown in FIG. 61, the bearing journal cut outs 6110 are non-perforating recesses that reduce the weight of the crankshaft 212A.

Continuing with FIGS. 61-63, the crank journal radii 6112 are the radii in the transition between the crank journal 6108 and the bearing journal 6100. In prior art crankshafts, these radii do not exist or are not fully formed because the position of the outside diameter of the crank journal 6108 is close to the position of the outside diameter of the bearing journal 6100. This position is measured radially from the central rotation axis of the crankshafts 212A and 212B which is parallel to the transverse axis of the power end assembly 120. This lack of a full crank journal radius 6112 in the prior art generates a stress concentration at this point and is a common failure point of crankshafts. The ability to form a full crank journal radius 6112 at this point eliminates the stress concentration present in the prior art increasing the service life of the crankshafts 212A and 212B.

The threaded holes 6102 receive the fasteners 5310 to mount the connecting adapter 5308 to the crankshaft 212A/212B. There may be threaded holes 6102 on one or both ends of the crankshaft 212A/212B depending on whether it is known if the power end assembly 120 will be driven from one end or both ends. One or more of the holes 6102 may not be threaded but instead receive locating pins 5306 (shown in FIG. 53) to aid in the attachment of any connecting adapters 5308.

Referring now to FIG. 62, a view of the crankshaft 212A showing lubrication distribution bores through crankshaft 212 is shown. A lubrication conduit 6300 formed by bores between the inlet ports 6114 and the outlet ports 6104. For simplicity, only lubrication conduit 6300 is shown in FIG. 63 in order to illustrate the lubricant path. Other bores through crankshaft 212A that are not a part of the lubricant conduit 6300 are omitted for clarity.

To fabricate the lubrication conduit 6300, the intersecting bores 303 are made diagonally from the outside diameter of the bearing journal 6100 to the center of each crank journal 6108. The inlet ports 6114 are at the center of the bearing journals 6100. Inlet ports 6114 are attached to the power end lubrication system 700 (not shown). The outlet ports 6104 are centered axially on each crank journal 6108 so that as lubricant is forced out of the outlet port 6104 it will lubricate the area between the crank journal 6108 and connecting rod bearing (cap side) 3842, shown in FIG. 52.

Base Section 140

Referring now to FIG. 64, base section 140 of power end assembly 120 is shown in further detail. The embodiment of base section 140 shown in FIG. 64 includes a frame 6400, a plurality of studs 6402, a plurality of nuts 6404, and a drive section support 6420. The frame 6400 may made from any type of structural steel and includes various structural components 6406 between transverse bars 6408, mount blocks 6410, and threaded stud holes 6412. The size and location of each of these components will vary based on the specific mounting needs of the particular embodiment of the high-pressure hydraulic fracturing pump 100.

The crosshead section 124 and the crank section 122 are secured to the base section 140 by each crosshead frame 220 (e.g., using base section attachment hole 4402 that receives a stud 6402 that is secured by a nut 6404) and each foot (e.g., foot 5400) of the crank frame 210 (e.g., using holes 5402 that receive respective studs 6402 that are secured by a respective nut 6404). In some embodiments, however, not every crosshead frame 220 or each foot of the crank frame 210 are secured to base section 140. In some embodiments, some or all of the plates 202, 204, and 206 may be secured to base section 140 (e.g., via flanges extending from the various plates) (not shown).

The drive section support 6420 is a saddle-shaped feature on which drive section 130 rests. The drive section support 6420 is integral to the rest of the base section 140, but in other embodiments the drive section support 6420 may be bolted and/or welded on. The drive section 130 accounts for about 20% of the total weight of the pump 100. If this weight is left hanging off the side of the crank section 122, undue stress may be placed on the side of the crank frame 210. Accordingly, the drive section support 6420 is configured to carry the full weight of the drive section 130. The drive section support 6420 includes a plurality of set screws usable to adjust contact with the drive section 130 (e.g., to ensure a proper fit).

Assembly of Power End Assembly 120

In accordance with various embodiments discussed herein, the power end assembly 120 may be assembled as follows: a crankshaft 212 is inserted into a crank frame 210 to form the crank section 122, a rear support plate 200 is coupled to the back of the crank frame 210, and a plurality of crosshead assemblies 1700 are coupled to the crankshaft 212.

The crosshead assembly 1700 is coupled to the crankshaft 212 by installing components through the front of the crank section 122 and through the rear (e.g., through maintenance openings 2444). A central support plate 202 is coupled to the front of crank section 122 (using the alignment dowels 2452) such that the crosshead assemblies 1700 are disposed through the crosshead ports 2420 of the central support plate 202.

The crosshead section 124 is formed by coupling a plurality of crosshead frames 220 to the central support plate 202 (using alignment dowels 1910) such that the crosshead assemblies 1700 are disposed within the central bores 4600 of the crosshead frames 220 and the pony rod clamp 802 is disposed outside the crosshead frames 220 and the pony rod 804 is sealed using the pony rod seal 3801.

The washers 2406 and the nuts 2408 are disposed around a first set of rods 240, and the nuts 2408 are tightened on one end of each of the first set of rods 240 such that the nuts 2408 are fully engaged. The other ends of the first set of rods 240 are inserted through the rear support plate 200, through the crank section 122, through the central support plate 202, and through the individual crosshead frames 220. A top front support plate 204 and bottom front support plate 206 are placed over the ends of the first set of rods protruding from the crosshead frames 220.

The washers 2402 and the nuts 2400 are then placed over the ends of the first set of rods 240 protruding from a top front support plate 204 and bottom front support plate 206, and the nuts 2400 are torqued down as discussed herein. As a result, the first set of rods 240 are in a state of tension and the plates 200, 202, 204, and 206 as well as the crank section 122 and the crosshead section 124 are compressed.

Then a second set of rods 242 are inserted through the top front support plate 204, the bottom front support plate 206, and the crosshead frames 220 and torqued into threaded the connect plate stay rod holes 1702 in the central support plate 202 such that the second set of rods 242 are fully engaged with the central support plate 202.

A plurality of spacers 232 are installed (using alignment pins 906) around the protruding ends of the second set of rods 242 followed by a plurality of individual connect plates 230. The washers 902 and the nuts 900 are then placed over the ends of the second set of rods 242 protruding from the individual connect plates 230 and are torqued down as discussed herein. As a result, the second set of rods 242 are in a state of tension and the plates 204, and 206, as well as the crosshead section 124 and the connect section 126, are compressed.

The lubrication system 700 is coupled to the power end assembly 120, and the fluid end assembly 110 is coupled to the power end assembly 120 by coupling the various fluid end sections 112 to the individual connect plates 230 and coupling the plungers 800 of the fluid end assembly 110 to the pony rod clamp 802.

Maintenance of Power End Assembly 120

As discussed herein, in contrast to prior power end assemblies, the power end assembly 120 employs a modular design in which various individual components may be removed and replaced as needed (e.g., when a component wears out or fails). In particular, the crosshead frames 220, the crosshead assemblies 1700, the connect plates 230, and the spacers 232 may be replaced. As discussed herein, stresses on these components that result from compressing fluid in the fluid end assembly 110 may result in wear and failure to these pieces. Additionally, if the lubrication system 700 fails (e.g., a line becomes clogged), a crosshead frame 220 and/or a crosshead assembly 1700 might be damaged. Accordingly, by replacing various modular components, the power end assembly 120 may be more quickly brought back into service by loosening nuts (e.g., nuts 900, 2400), installing a replacement component, and torquing down nuts. In contrast, prior power end assemblies might have required field welding or other more labor-intensive repairs.

Thus, in accordance with various embodiments discussed herein, the power end assembly 120 may be disassembled as follows: a plurality of nuts 900 are disengaged and at least a portion of connector section 126 is removed (e.g., connect plate 230, spacers 232). If the connecter section 126 was the only reason for maintenance, then replacement connect plates 230 or spacers 232 may be installed and the nuts 900 may be installed and torqued down as discussed herein. If a particular connect plate 230 does not need to be replaced, the fluid end section 112 that is coupled thereto does not need to be disengaged from that particular connect plate 230.

If components of crosshead section 124 are to be replaced, the nuts 2400 are disengaged, the plates 204 and 206 are removed, and one or more crosshead frames 220 are removed. Repairs may be made to the crosshead assembly 1700 if required from the front and/or from the rear (e.g., by removing the maintenance cover 510). A replacement crosshead frame 220 may be installed, and plates 204 and 206 may be replaced. The nuts 2400 may then be reengaged and the connector section 126 and the second set of rods 242 may be replaced.

Other Alternative Embodiments

With reference to FIGS. 65-73, an alternative embodiment of a crosshead 10 for use with the crosshead assembly 1700 is shown. The crosshead 10 is identical to the crosshead 3810, shown in FIGS. 38 and 39, with a few exceptions. Like the crosshead 3810, the interior of the crosshead 10 comprises a thrust seat bearing mount surface 11. The thrust seat bearing mount surface 11 is identical to that shown in FIG. 38. A wrist pin bore 12 is formed within the crosshead 10 for receiving the wrist pin 3814, shown in FIG. 38.

Figure 66:
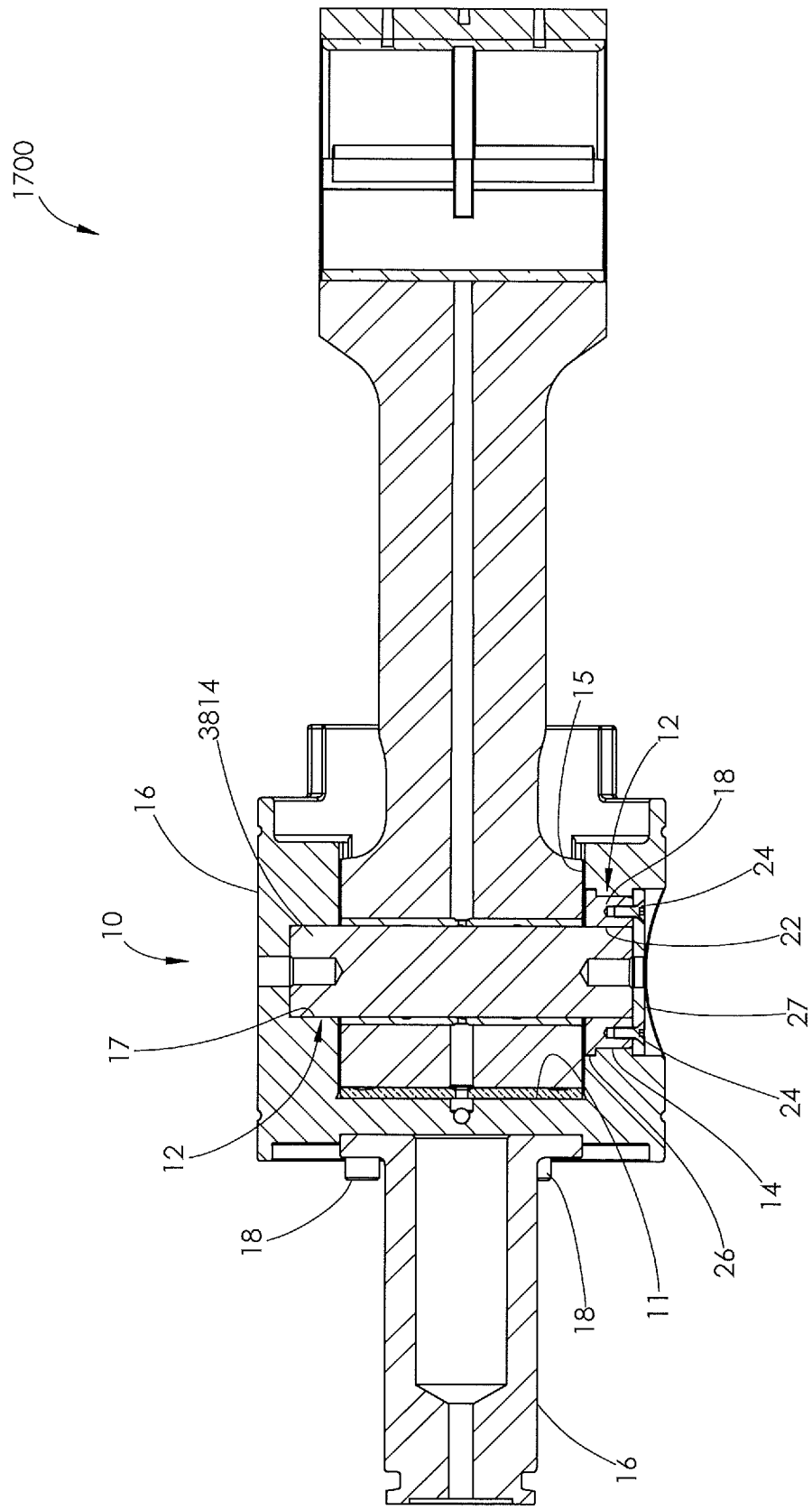
FIG. 66 is a cross-sectional view of the crosshead assembly shown in FIG. 65, taken along line B-B.

Continuing with FIG. 66, a first end 14 of the wrist pin bore 12 completely bisects the sidewalls of the crosshead 10 and interconnects interior and exterior surfaces 15 and 16 of the crosshead 10. In contrast, a second end 17 of the wrist pin bore 12 extends only partially into the sidewalls of the crosshead 10.

The crosshead 10 and 3810 are larger in size from crossheads known in the art. As a result, the thrust seat bearing mount surface 11 is formed using special tooling. To provide clearance for such tooling, the first end 14 of the wrist pin bore 12 formed within the crosshead 10 is widened, as compared to the same end of the wrist pin bore 3812 in the crosshead 3810. Following formation of the thrust bearing mount surface 11, the diameter of the first end 14 of the bore 12 is reduced to its normal size using a crosshead insert 18.

Turning to FIGS. 67-70, the crosshead insert 18 comprises a generally cylindrical body 19 having opposed first and second outer surfaces 20 and 21. The surfaces 20 and 21 are interconnected by a central wrist pin passage 22. The wrist pin passage 22 is sized to receive the wrist pin 3814. A plurality of threaded holes 23 are formed in the first surface 20 of the insert 18 and surround the wrist pin passage 22. The threaded holes 23 are configured to receive a plurality of fasteners 24, as shown in FIG. 66.

Figure 71:
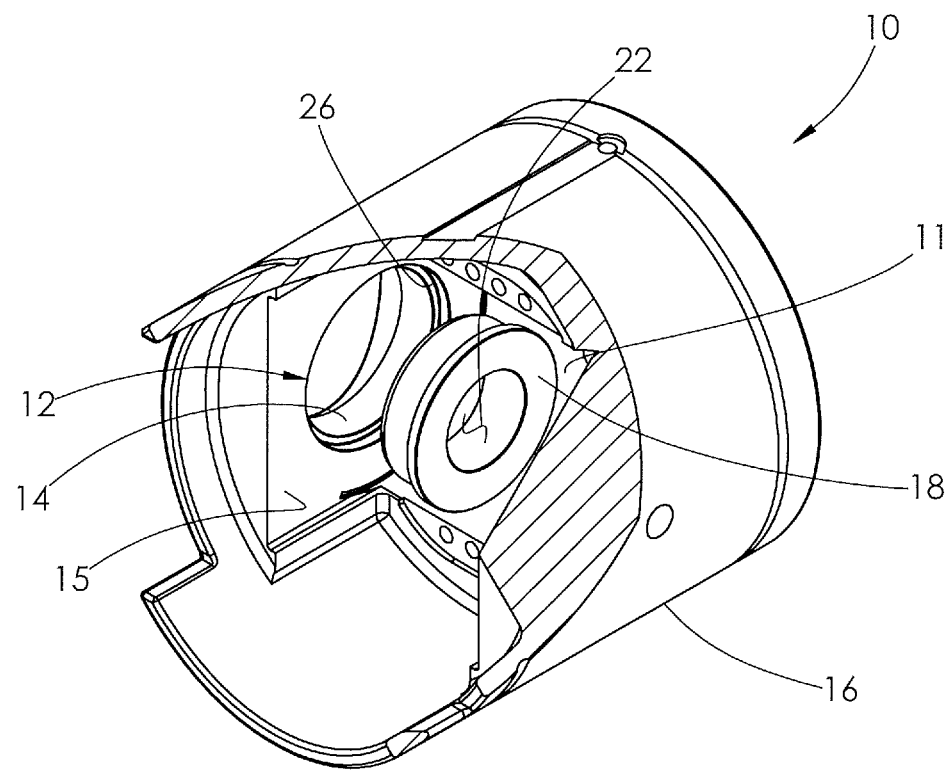
FIG. 71 is a rear sectional view of the crosshead shown in FIG. 65. The crosshead insert is shown exploded from the crosshead.
Figure 72:
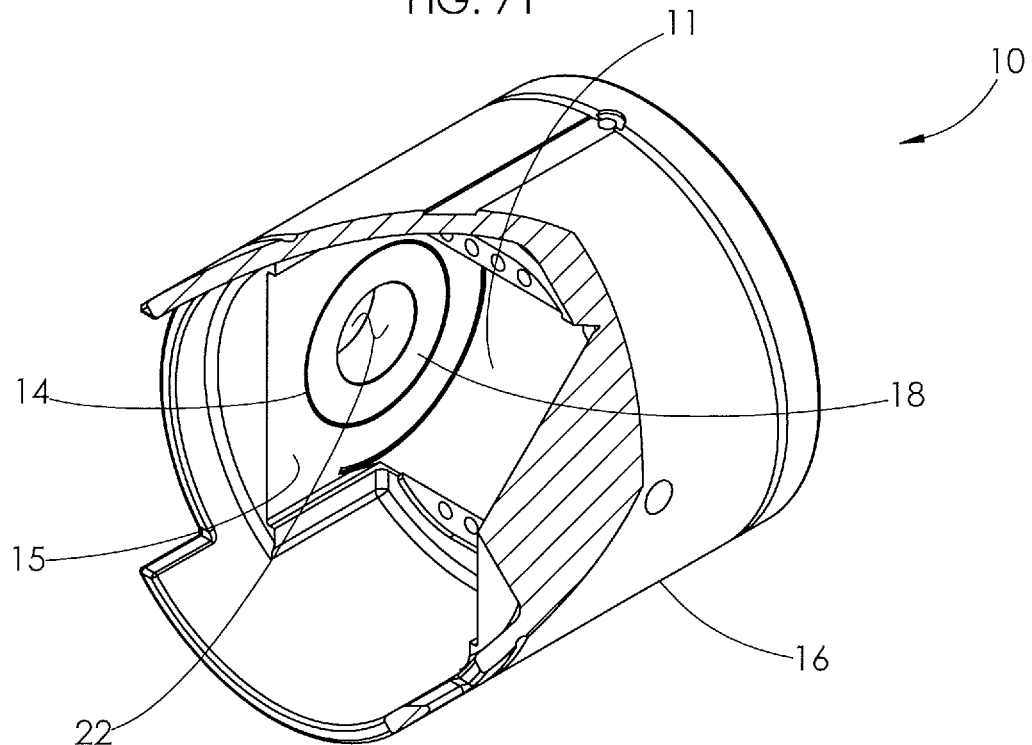
FIG. 72 is the rear sectional view of the crosshead shown in FIG. 71 with the crosshead insert installed within the crosshead.

The second surface 21 of the body 19 has a slightly larger outer diameter than the first surface 20 such that a flange 25 is formed at the second surface 21 of the body 19. The flange 25 is sized to be tightly received within a counterbore 26 formed in first end 14 of the wrist pin bore 12 adjacent the interior surface 15 of the crosshead 10, as shown in FIGS. 66 and 71. The insert 18 is installed within the first end 14 of the bore 12 through the interior of the crosshead 10. The insert 18 may be press-fit within the bore 12. When installed, the flange 25 prevents the insert 18 from axial movement towards the exterior surface 16 of the crosshead 10 and the wrist pin passage 22 aligns with the second end 17 of the wrist pin bore 12, as shown in FIG. 66.

Alignment of the wrist pin 3814 to the longitudinal axis of the crosshead assembly 1700 is critical to the life of the fluid end assembly 110. Accurate alignment is best achieved by forming the wrist pin passage 22 and second end 17 of the wrist pin bore 12 at the same time. Thus, during manufacture of the crosshead 10, the crosshead insert 18 is preferably installed within the crosshead 10 prior to forming the wrist pin passage 22 within the crosshead insert 18 and prior to forming the second end 17 of the wrist pin bore 12 within the crosshead 10.

Figure 65:
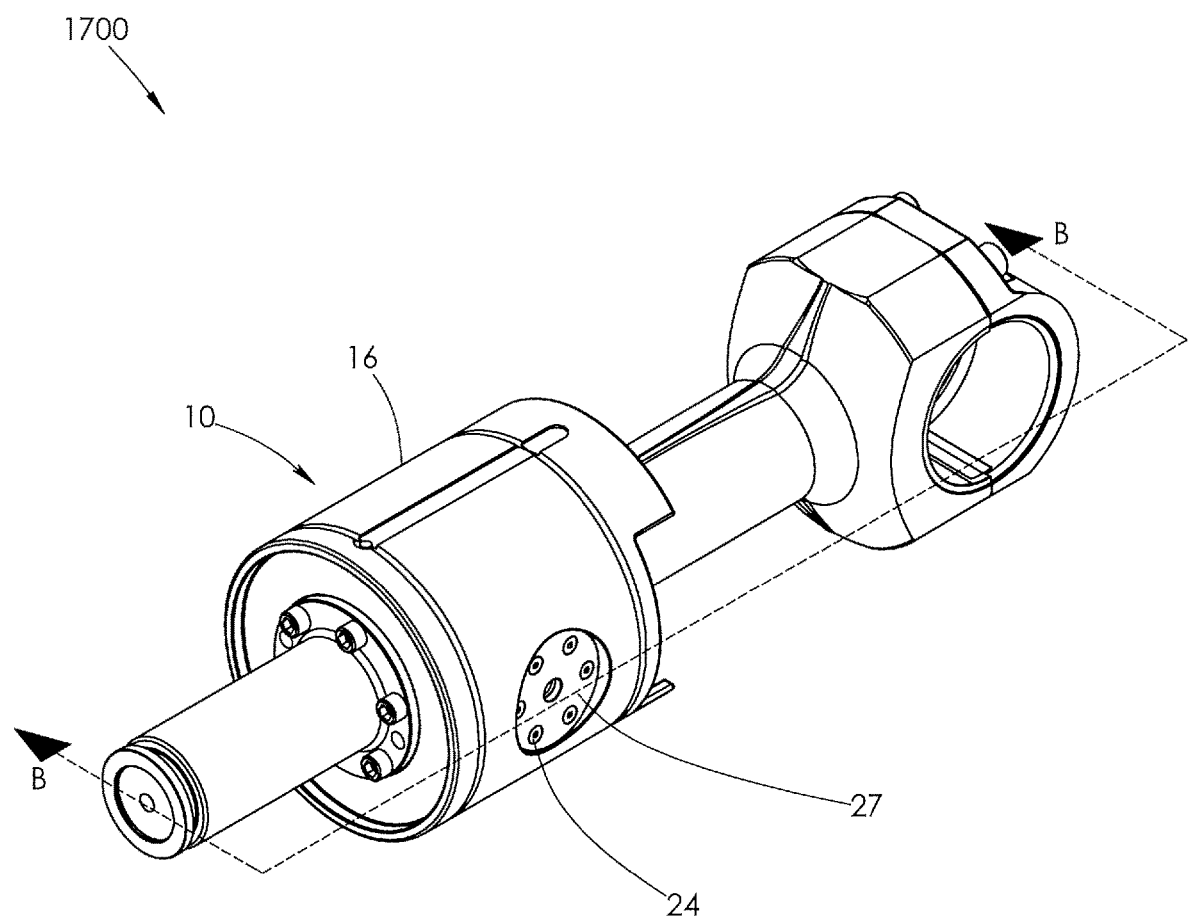
FIG. 65 is a perspective view of the crosshead assembly shown in FIG. 51 having another embodiment of a crosshead.
Figure 73:
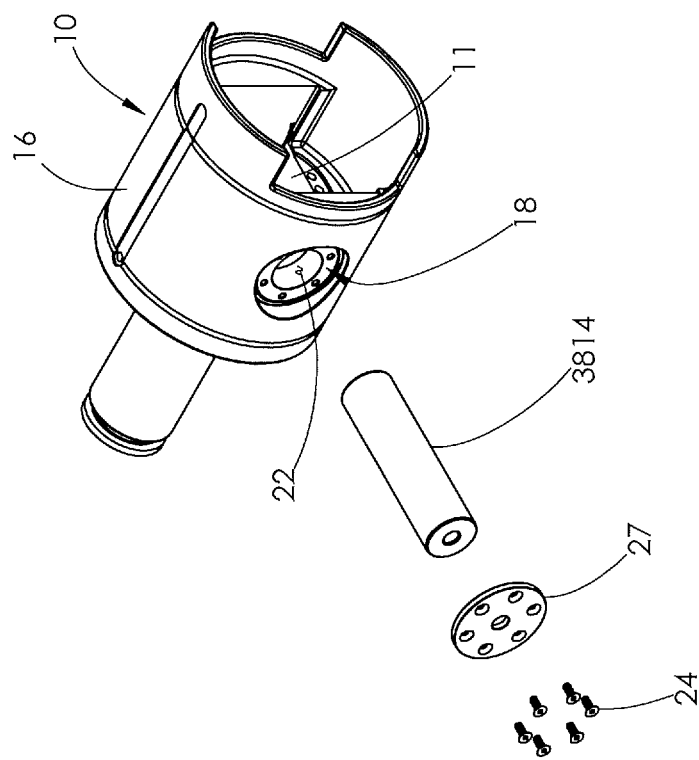
FIG. 73 is a rear perspective and exploded view of the crosshead shown in FIG. 65.
Figure 74:
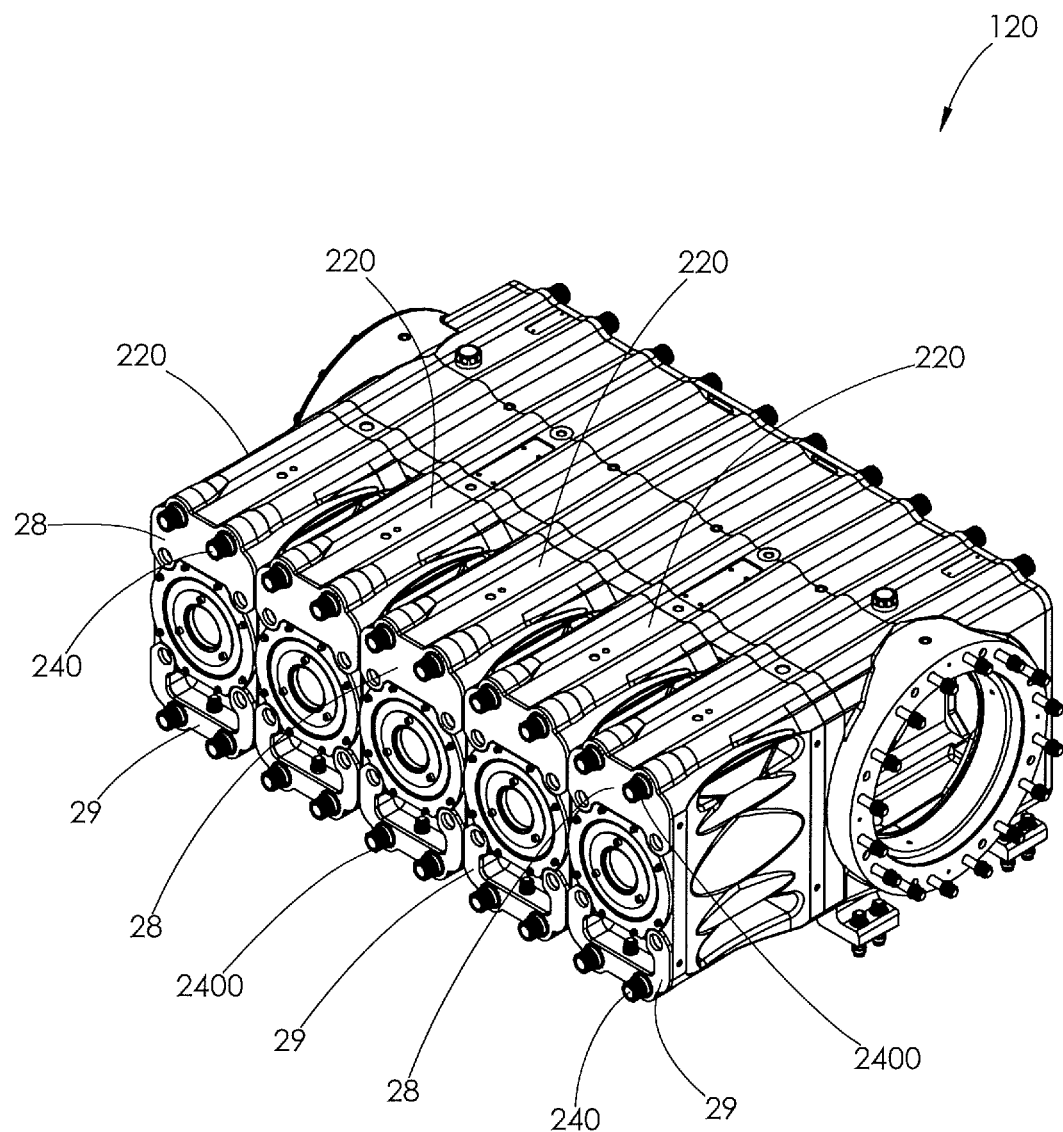
FIG. 74 is a front perspective and assembled view of the power end assembly shown in 24 but having an alternative embodiment of top and bottom front support plates.

Continuing with FIGS. 65, 66, and 73 following installation of the wrist pin 3814 within the insert 18, the insert 18 is retained in place by a bracket 27. The bracket 27 is identical to the bracket 3816 used with the crosshead 3810, as shown in FIG. 38. The bracket 27 abuts the first surface 20 of the insert 18 and is secured to the insert 18 using the fasteners 24. When assembled, the crosshead 10 functions identically to the crosshead 3810 described above.

In alternative embodiments, the crosshead insert 18 may be formed of multiple pieces. In further alternative embodiments, the crosshead insert 18 may include other configurations, such as not having the flange 25. Other methods of retaining the insert 18 within the bore 12 may also be used, such as screws or fasteners. The wrist pin bore 12 may also extend all the way through the crosshead 10 and be widened on both sides. In such case, a crosshead insert 18 may be installed within both ends of the bore 12.

With reference to FIGS. 74-79, an alternative embodiment of a top front support plate 28 and a bottom front support plate 29 for use with the power end assembly 120 are shown. The top front support plate 28 is identical to the top front support plate 204 shown in FIG. 24 but comprises a plurality of individual plates 28 positioned side-by-side, instead of a single piece. Each plate 28 corresponds with a single crosshead frame 220.

Likewise, the bottom front support plate 29 is identical to the bottom front support plate 206 shown in FIG. 24 but comprises a plurality of individual plates 29 positioned side-by-side, instead of a single piece. Each plate 29 corresponds with a single crosshead frame 220.

By using a plurality of front support plates 28 and 29, only a single top front support plate 28 and a single bottom front support plate 29 needs to be removed to remove a single crosshead frame 220. Thus, only a few first nuts 2400 need to be un-torqued and removed. In contrast, when using the front support plates 204 and 206, shown in FIG. 24, the entire plates 204 and 206 need to be removed to remove a single crosshead frame 220. To remove the entire plate 204 or 206, all of the corresponding first nuts 2400 must be un-torqued and removed.

Figure 75:
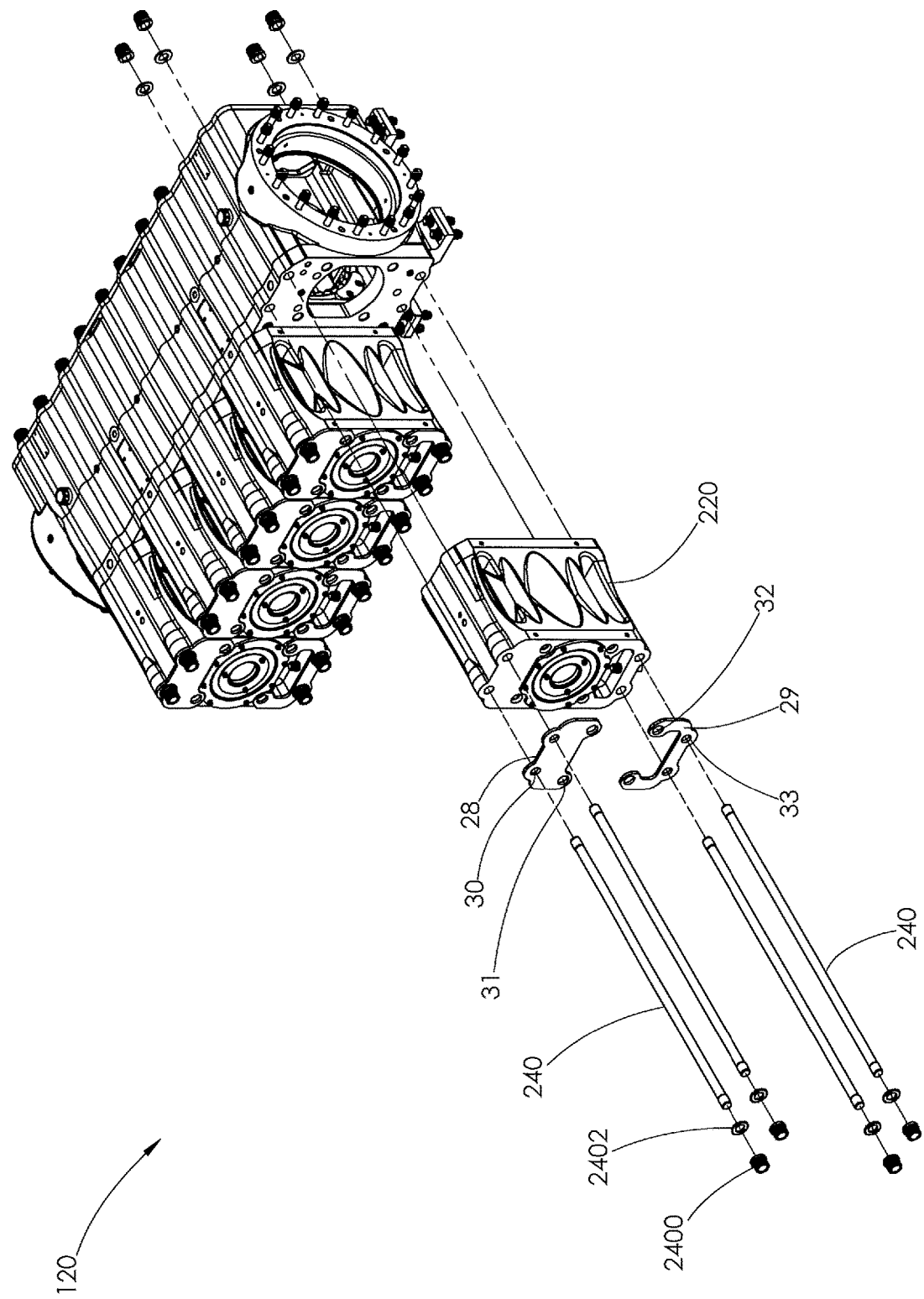
FIG. 75 is a front perspective and partially exploded view of the power end assembly shown in FIG. 74.
Figure 76:
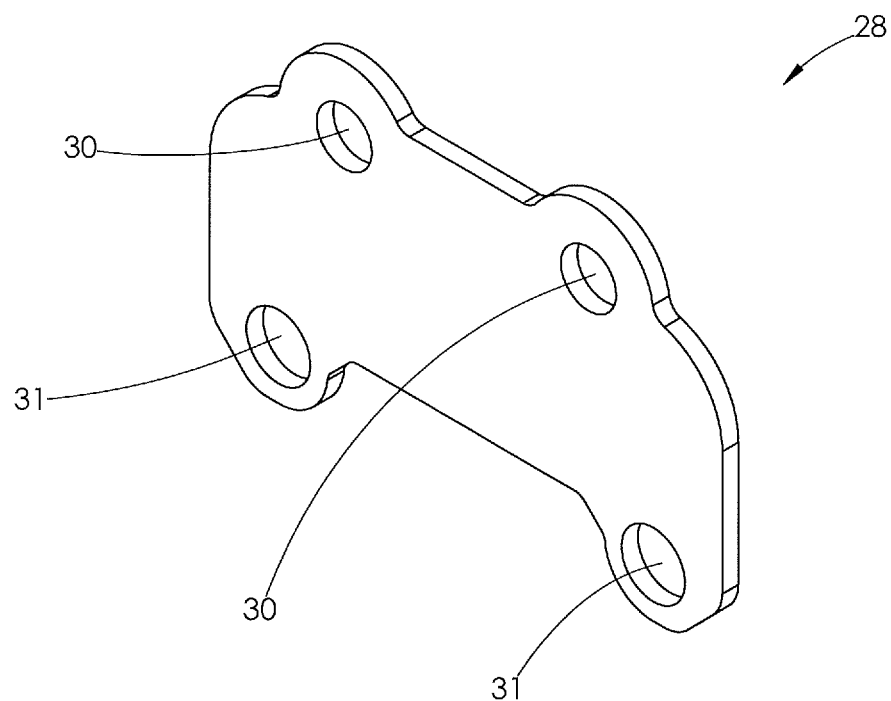
FIG. 76 is a front perspective view of one of the top front support plates shown in FIG. 74.
Figure 77:
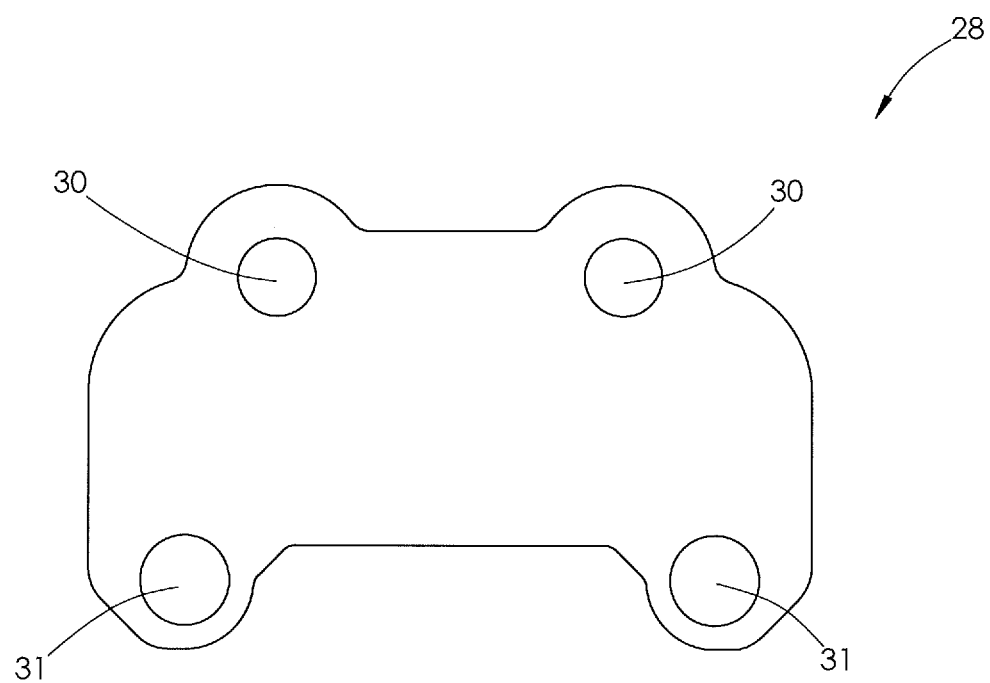
FIG. 77 is a front elevational view of the top front support plate shown in FIG. 76.

Continuing with FIGS. 75-77, each top front support plate 28 is flat and corresponds to the shape of the crosshead frame 220. Each plate 28 includes a first set of holes 30, each hole 30 configured to receive a corresponding first stay rod 240. Each plate 28 further includes a second set of holes 31, each hole 31 configured to receive a corresponding second stay rod 242, shown in FIG. 9.

Figure 78:
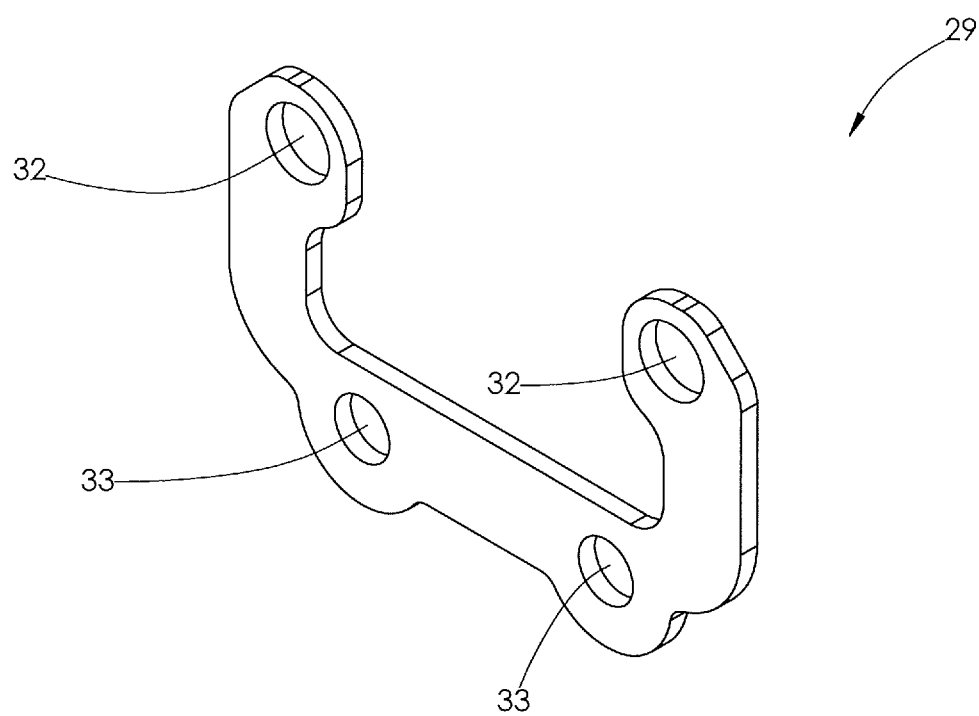
FIG. 78 is a front perspective view of one of the bottom front support plates shown in FIG. 74.
Figure 79:
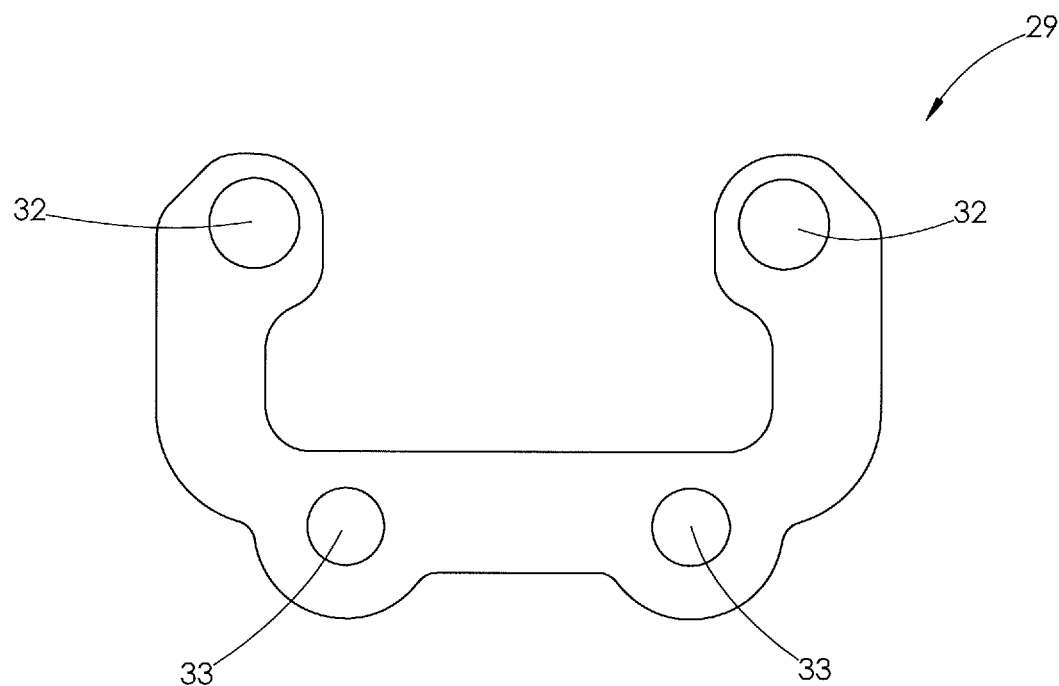
FIG. 79 is a front elevational view of the top front support plate shown in FIG. 78.
Figure 80:
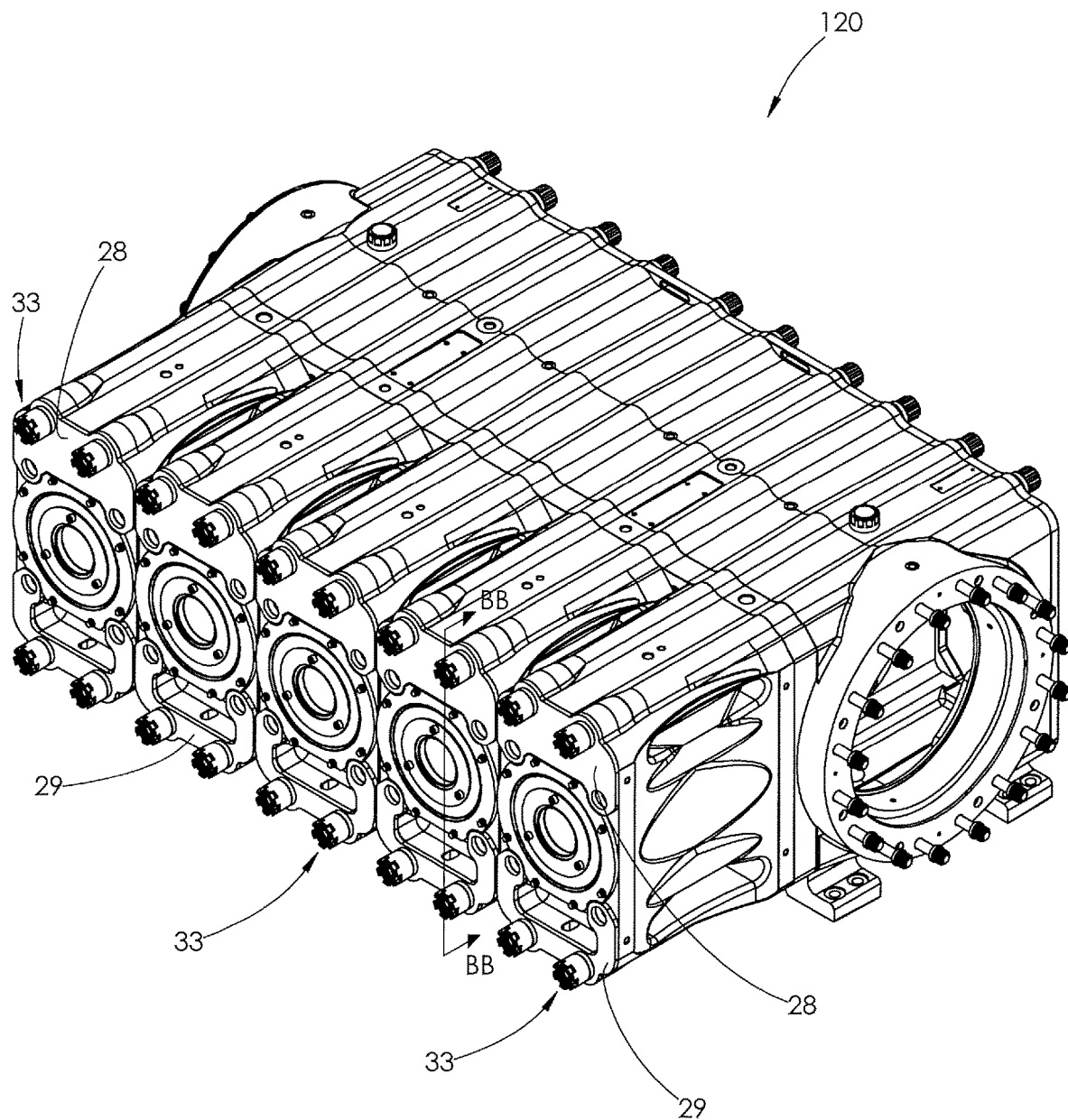
FIG. 80 is a front perspective view of the power end assembly shown in FIG. 74 having an alternative embodiment of first nuts.
Figure 81:
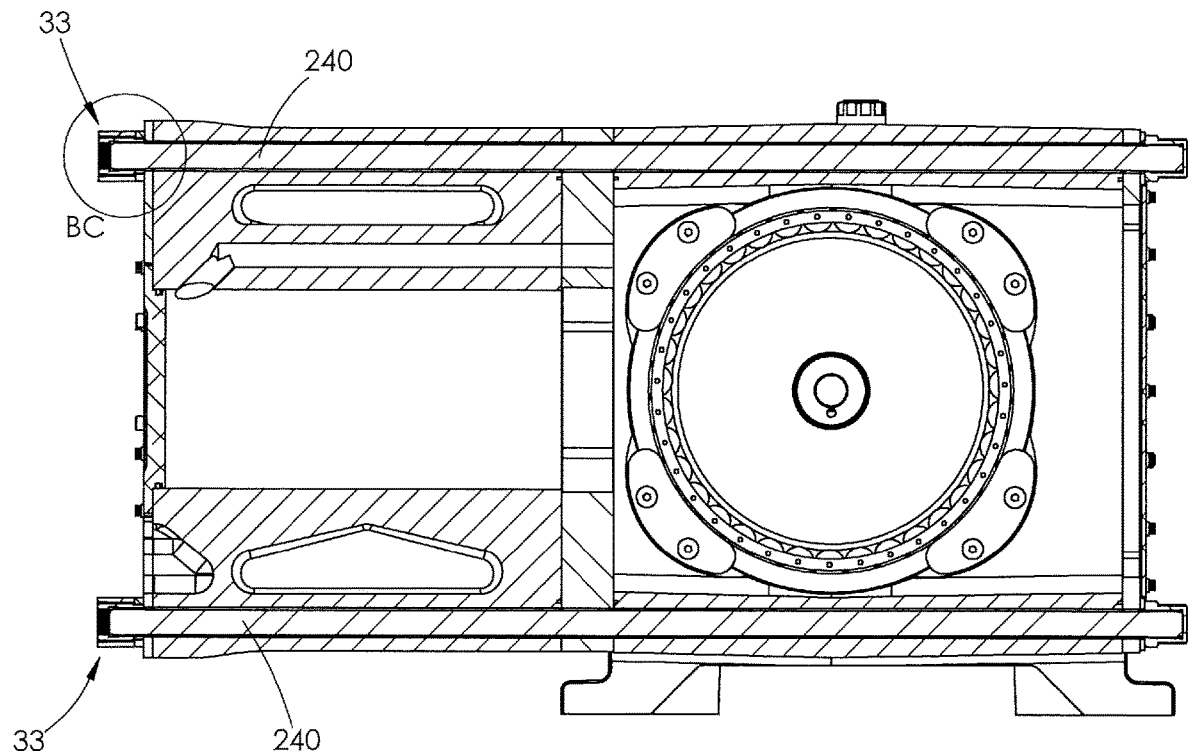
FIG. 81 is a cross-sectional view of the power end assembly shown in FIG. 80, taken along line BB-BB.

Turning to FIGS. 75, 78, and 79, each bottom front support plate 29 is flat and corresponds to the shape of the crosshead frame 220. Each plate 29 includes a first set of holes 32, each hole 32 configured to receive a corresponding second stay rod 242, shown in FIG. 9. Each plate 29 further includes a second set of holes 33, each hole 33 configured to receive a corresponding first stay rod 240.

In alternative embodiments, the plates may have other sizes or shapes, as desired. One or more plates may also be joined as a single plate, if desired. In further alternative embodiments, the one or more of the plurality of support plates may have three sets of first and second holes and span between two crosshead frames 220. In such embodiment, the support plates would connect two crosshead frames 220 together, providing more support to the power end assembly 120.

Figure 82:
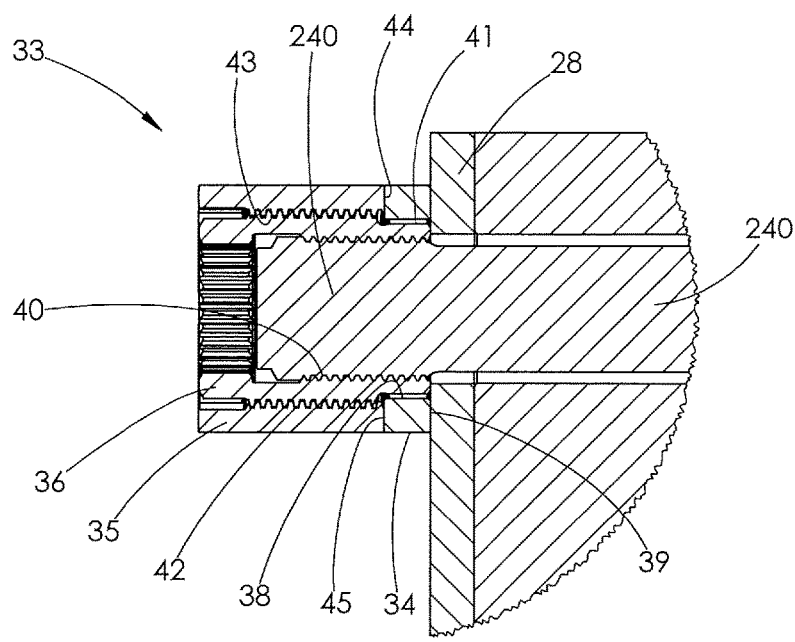
FIG. 82 in an enlarged view of arear BC shown in FIG. 81.
Figure 83:
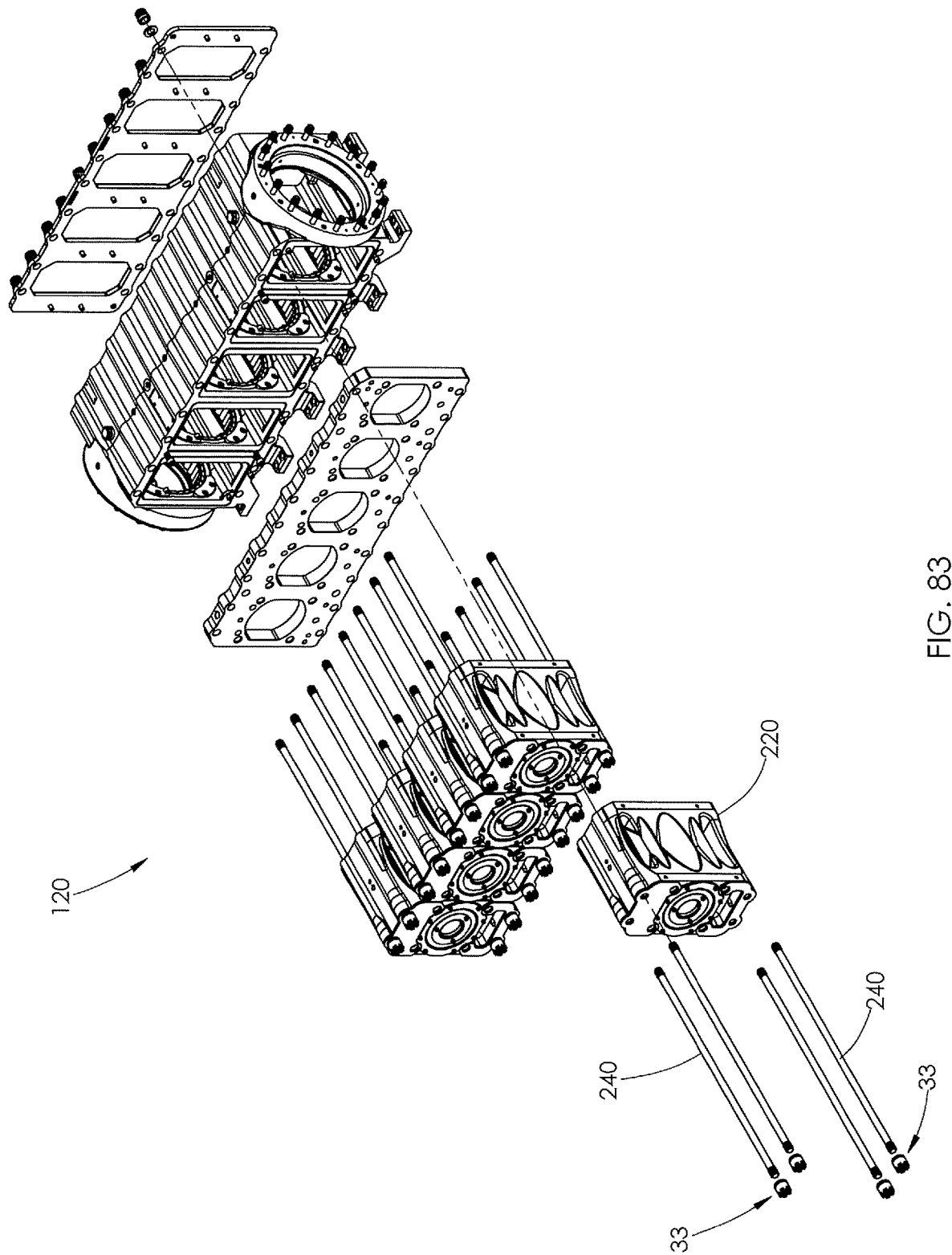
FIG. 83 is a front perspective and exploded view of the power end assembly shown in FIG. 80.
Figure 84:
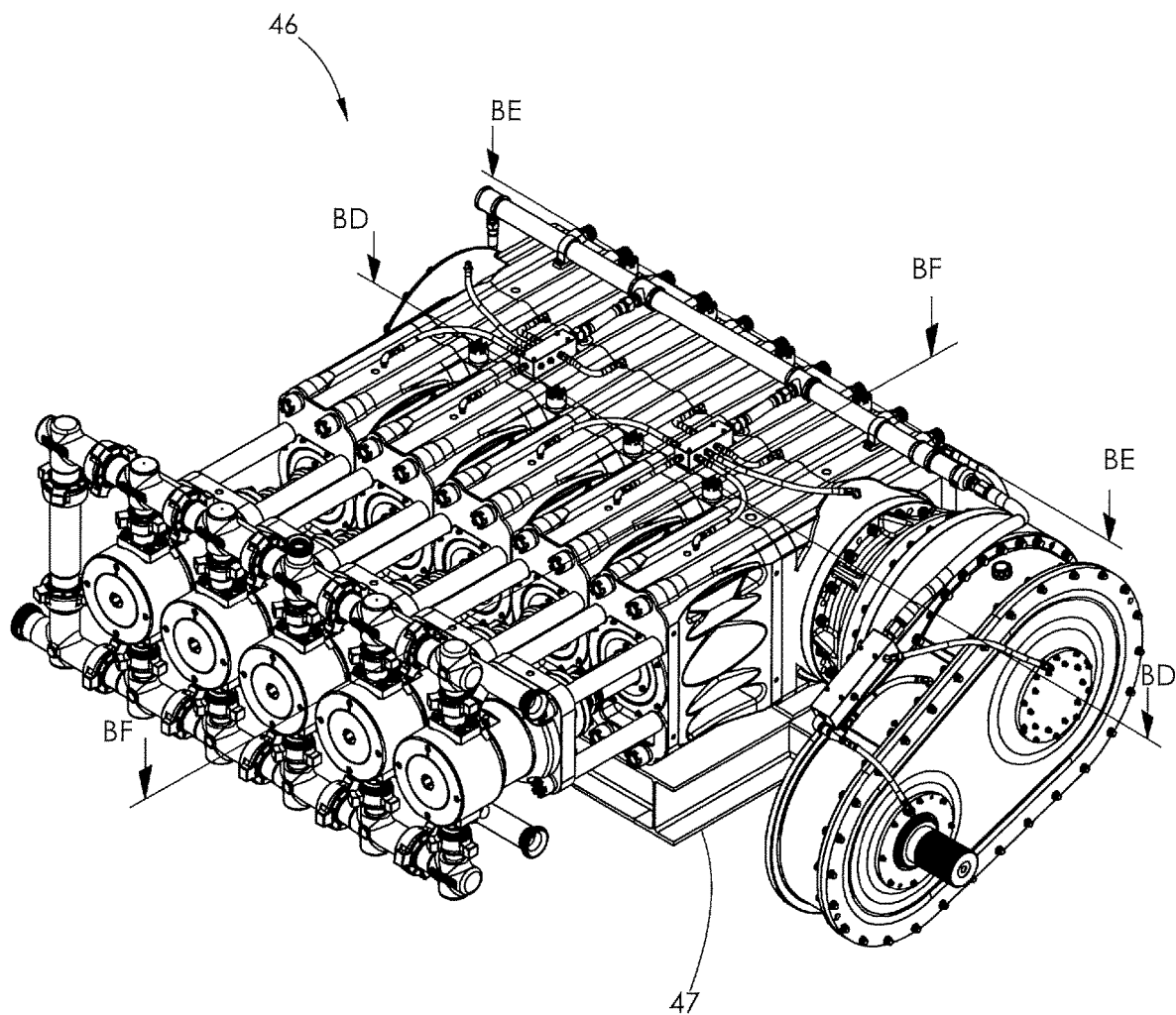
FIG. 84 is a front perspective view of an alternative embodiment of a power end assembly. The fluid end assembly shown in FIG. 1 is shown attached to the power end assembly, thereby creating another embodiment of a high pressure pump.

With reference to FIGS. 80-83, an alternative embodiment of a first nut 33 for use with the power end assembly 120 is shown. The first nut 33 functions as a three-piece fastener and comprises a washer 34, an outer castle nut 35, and an inner nut 36, as shown in FIG. 82.

Continuing with FIG. 82, the washer 34 has a flat outer surface and a splined inner surface 38. When positioned over a first stay rod 240, a flat rear surface 39 of the washer 34 abuts the top or bottom front support plates 28 or 29. In alternative embodiments, the front support plates 204 or 206, shown in FIG. 24, may be used in place of the front support plates 28 and 29.

The inner nut 36 comprises an inner threaded surface 40 that mates with outer threads on the first say rod 240. The inner nut 36 further comprises a splined outer surface 41 positioned adjacent a threaded outer surface 42. The splined outer surface 41 mates with the splined inner surface 38 of the washer 34. The outer nut 35 comprises a threaded inner surface 43 that mates with the threaded outer surface 42 of the inner nut 36. A flat rear surface 44 of the outer nut 35 abuts a flat front surface 45 of the washer 34.

In operation, as the outer nut 35 is turned, the inner nut 36 moves axially away from the front support plates 28 or 29, thereby applying a tensile load to the stay rod 240. The engagement of the splined surfaces 38 and 41 between the inner nut 36 and the washer 34 rotationally couples the inner nut 36 to the washer 34. Such coupling prevents the inner nut 36 from turning while providing a solid reaction point for turning the outer nut 35.

The construction of the first nut 33 allows the first nut 33 to load the stay rods 240 in tension with only a minimal amount of torsional stress. In contrast, the first nut 2400, shown in FIG. 24, may apply a greater amount of torsional stress to the stay rod 240 to properly secure the stay rod 240 in place. By reducing the amount of torsional stress applied to the stay rod 240, the life of the stay rod 240 is increased.

The construction of the first nut 33 also provides a more accurate application of tensile force to each of the stay rods 240. When using the first nut 2400 and the washer 2402, shown in FIG. 24, the friction between the nut 2400 and the front support plates 204 or 206 must be overcome by the applied torque. As a result, less torque is used to apply tension to the stay rod 240. Further, the friction between each nut 2400 and the plates 204 and 206 may vary greatly and defy generic application. The plurality of stay rods 240 may thus vary between rods that are overloaded or underloaded. Both situations result in a reduced operating life and potential failure. The first nut 33, in contrast, applies a repeatable tensile force to each stay rod 240 when a known torque is applied to the first nut 33.

During assembly and operation of the power end assembly 120, it is essential to apply a known clamping force to the assembly 120. Torque is preferably applied to each nut 33 or 2400 until the target clamping force is reached. The clamping force may be inferred from the torque applied to the first nuts 33 or 2400. However, the clamping force may be directly measured using methods known in the art. For example, a force washer configured to measure the force applied by the nut may be used in place of a traditional washer. Alternatively, a strain gauge may be applied directly to each stay rod 240 and the clamping force may be calculated based on the measured strain.

The clamping force may be continually monitored during operation. Any reduction in the measured clamping force during operation may indicate that a failure has occurred and the pump 100 needs to be shut down. Being able to immediately shut down the pump 100 in response to a failure helps mitigate any future damage. Further, constant monitoring of the clamping force and the knowledge accumulated from such monitoring helps an operator infer or derive various operating parameters of the pump 100. Such parameters may be used to optimize the pump's operation and life.

During assembly and operation, the amount of clamping force applied to the power end assembly 120 for proper operation is significantly high. Such high clamping force may deform the crosshead frames 220. Specifically, the central bore 4600 formed in the crosshead frame 220, shown in FIGS. 47-50, may deform, causing interference between the crosshead 3810 and frame 220 during assembly. Such interference may make installation of the crosshead 3810 into the frame 220 impossible or, if installed, cause too much friction during operation, leading to failure.

One method of solving such issue is to apply the operating clamp load to the crosshead frame 220 during manufacture of the frame's central bore 4600. In practice, the crosshead frame 220 is mounted in a machining fixture that reproduces the clamping force, and any other forces applied to the crosshead frame 220 during assembly and/or operation. Once such forces are applied, the central bore 4600 is formed within the crosshead frame 220. The central bore 4600 may be formed using any number of methods known in the art. After the central bore 4600 is formed, the crosshead frame 220 is removed from the machining fixture and may be installed within the power end assembly 120. When the same clamping force is reapplied to the crosshead frame 220 during assembly of the power end assembly 120, the central bore 4600 distorts to its desired shape. Thus, proper clearance between a frame 220 and a crosshead 3810 is achieved.

Another solution to the above deformation issue is to calculate and/or predict the expected deformation of the central bore 4600. The central bore 4600 is then formed in a traditional manner, but instead of forming the original desired shape, the bore is formed to account for the expected deformation. For example, if the desired shape of the bore 4600 is round, the bore 4600 is formed non-round, so that upon deformation of the bore 4600 during assembly, the bore is deformed into the desired round shape.

With reference to FIGS. 84-90, an alternative embodiment of a power end assembly 46 is shown. The power end assembly 46 is generally identical to the power end assembly 120, shown in FIG. 1, except for how the power end assembly 46 is attached to an alternative embodiment of a base section 47.

Figure 60:
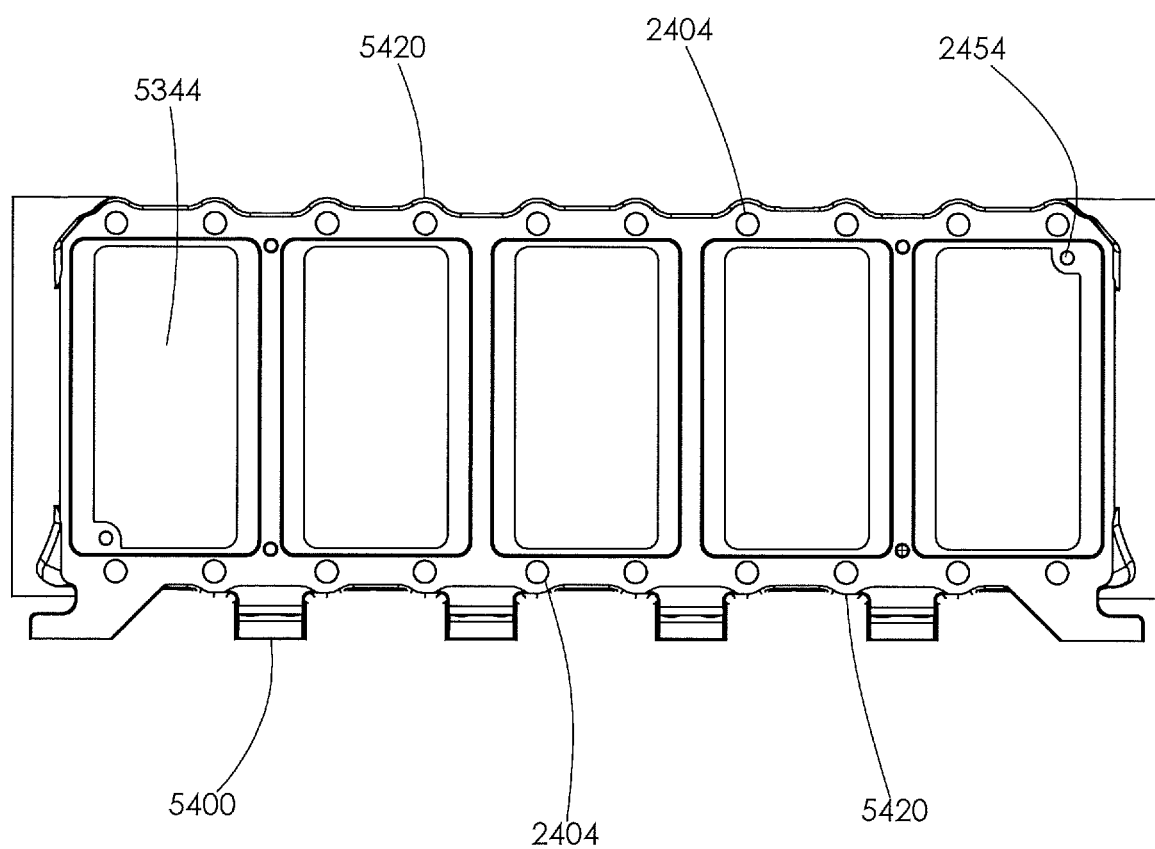
FIG. 60 is a rear elevational view of the crank frame shown in FIG. 56.
Figure 87:
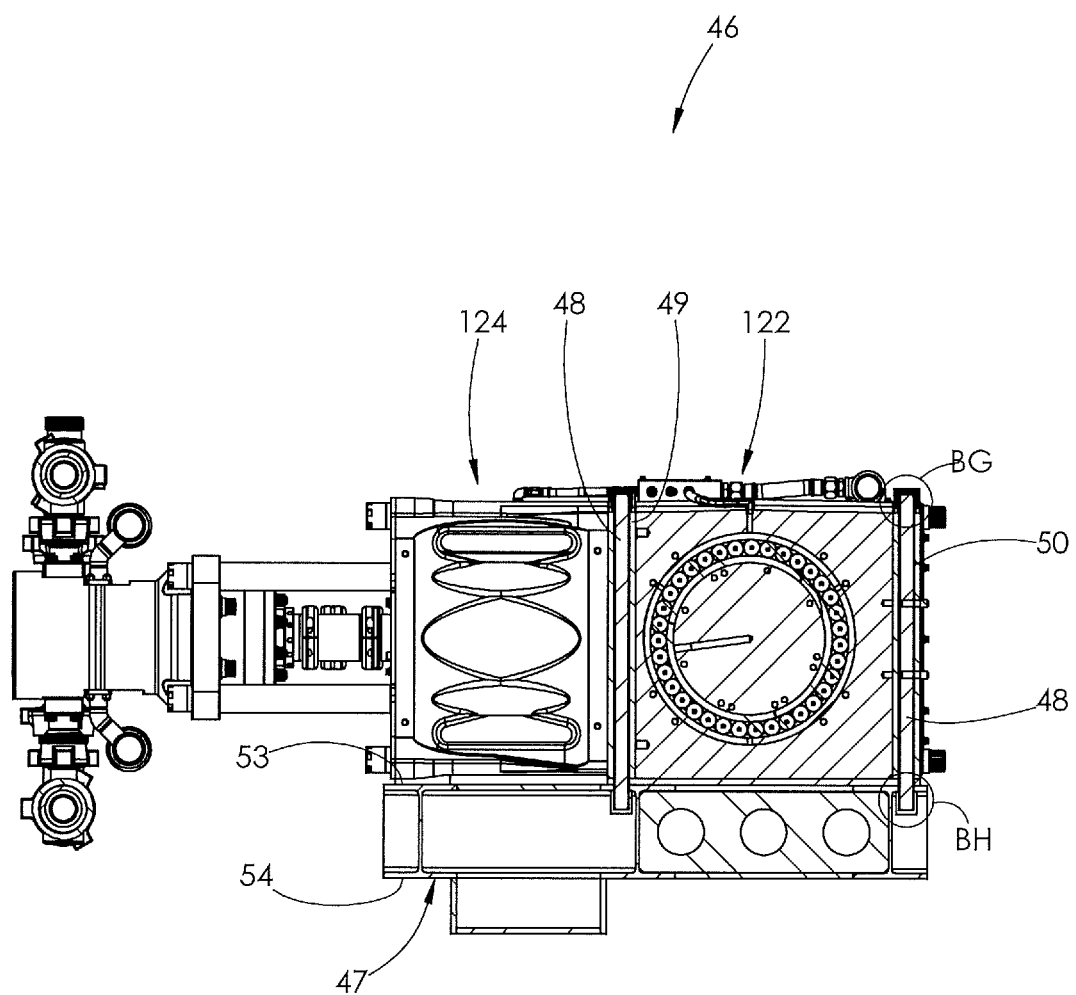
FIG. 87 is a cross-sectional view of the pump shown in FIG. 84, taken along line BF-BF.

The power end assembly 120 shown in FIG. 1 is attached to the base section 140 using a plurality of feet 5400, as shown in FIG. 60. The power end assembly 46 shown in FIG. 84 does not include any feet. Instead, a bottom surface of the crank section 122 and the crosshead section 124 are placed directly on the base section 47, as shown in FIG. 87. The crank section 122 and crosshead section 124 are secured to the base section 47 used a plurality of vertical rods 48, as shown in FIG. 87.

Figure 85:
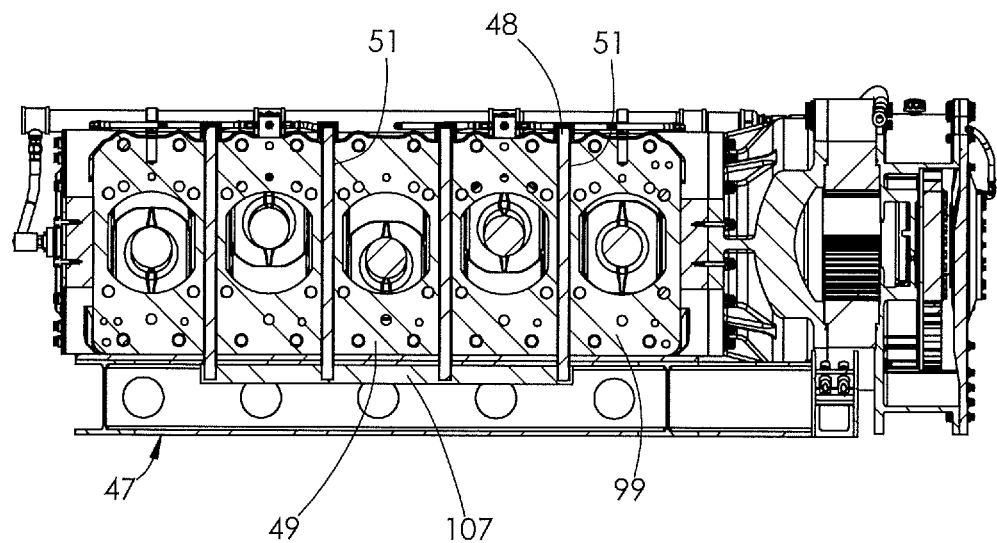
FIG. 85 is a cross-sectional view of the pump shown in FIG. 84, taken along line BD-BD.
Figure 86:
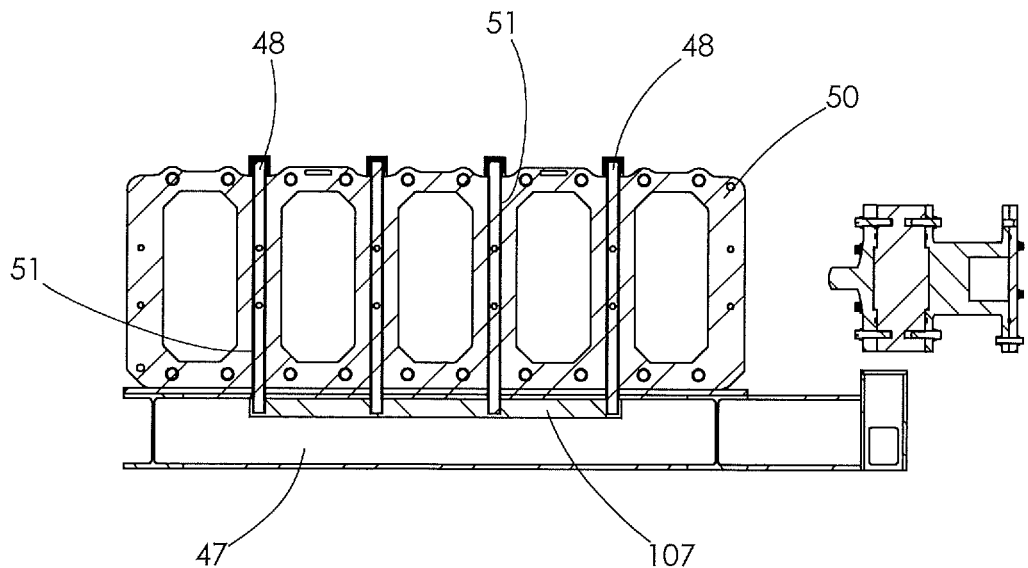
FIG. 86 is a cross-sectional view of the pump shown in FIG. 84, taken along line BE-BE.

Continuing with FIGS. 85 and 86, the vertical rods 48 are installed within alternative embodiments of a central support plate 49 and a rear support plate 50. The plates 49 and 50 are identical to the central support plate 202 and rear support plate 200 shown in FIG. 24 but include a plurality of vertical through-bores 51. Each through-bore 51 is configured to receive one of the vertical rods 48.

Figure 90:
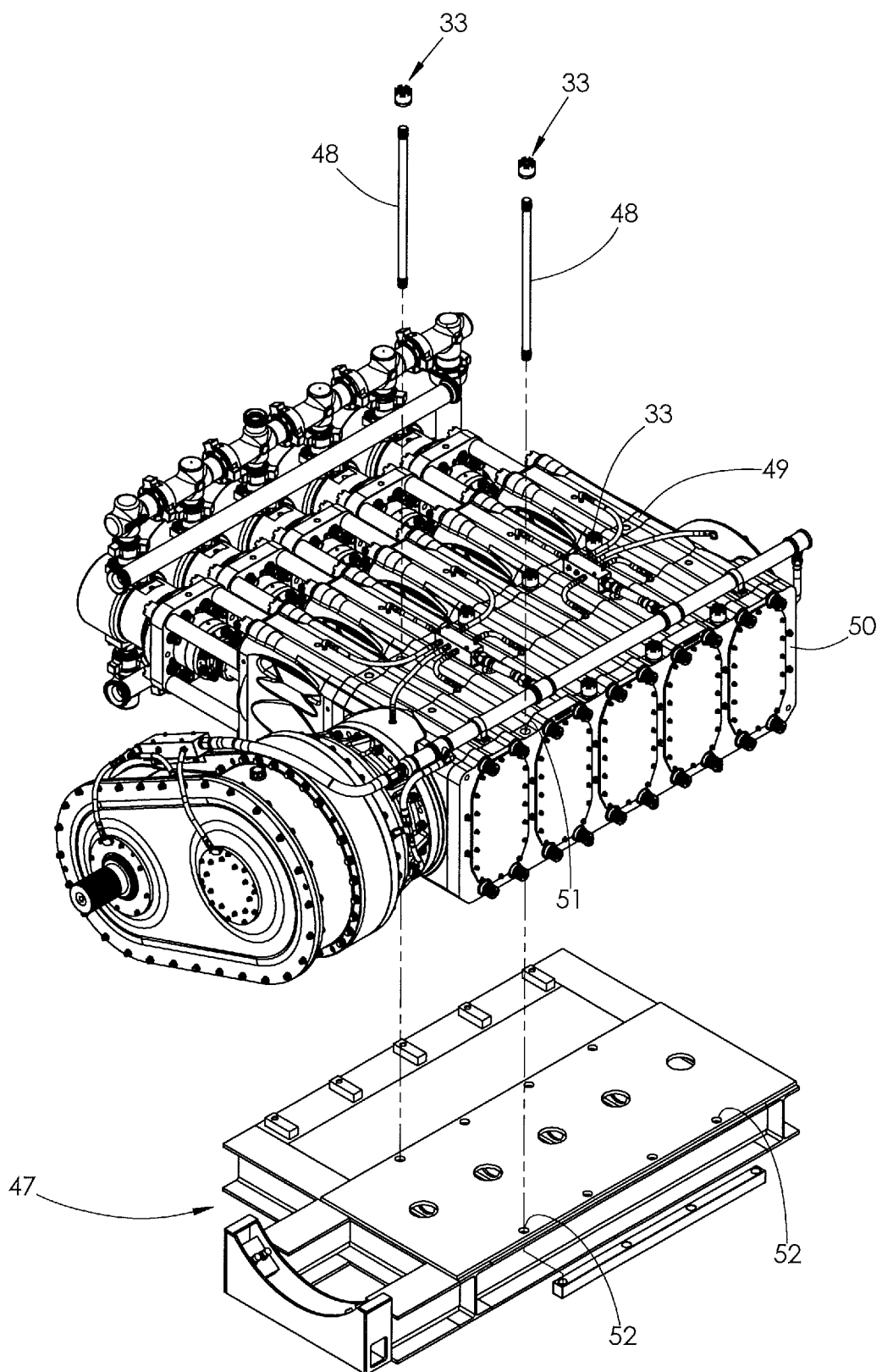
FIG. 90 is a rear perspective and partially exploded view of the pump shown in FIG. 84.
Figure 91:
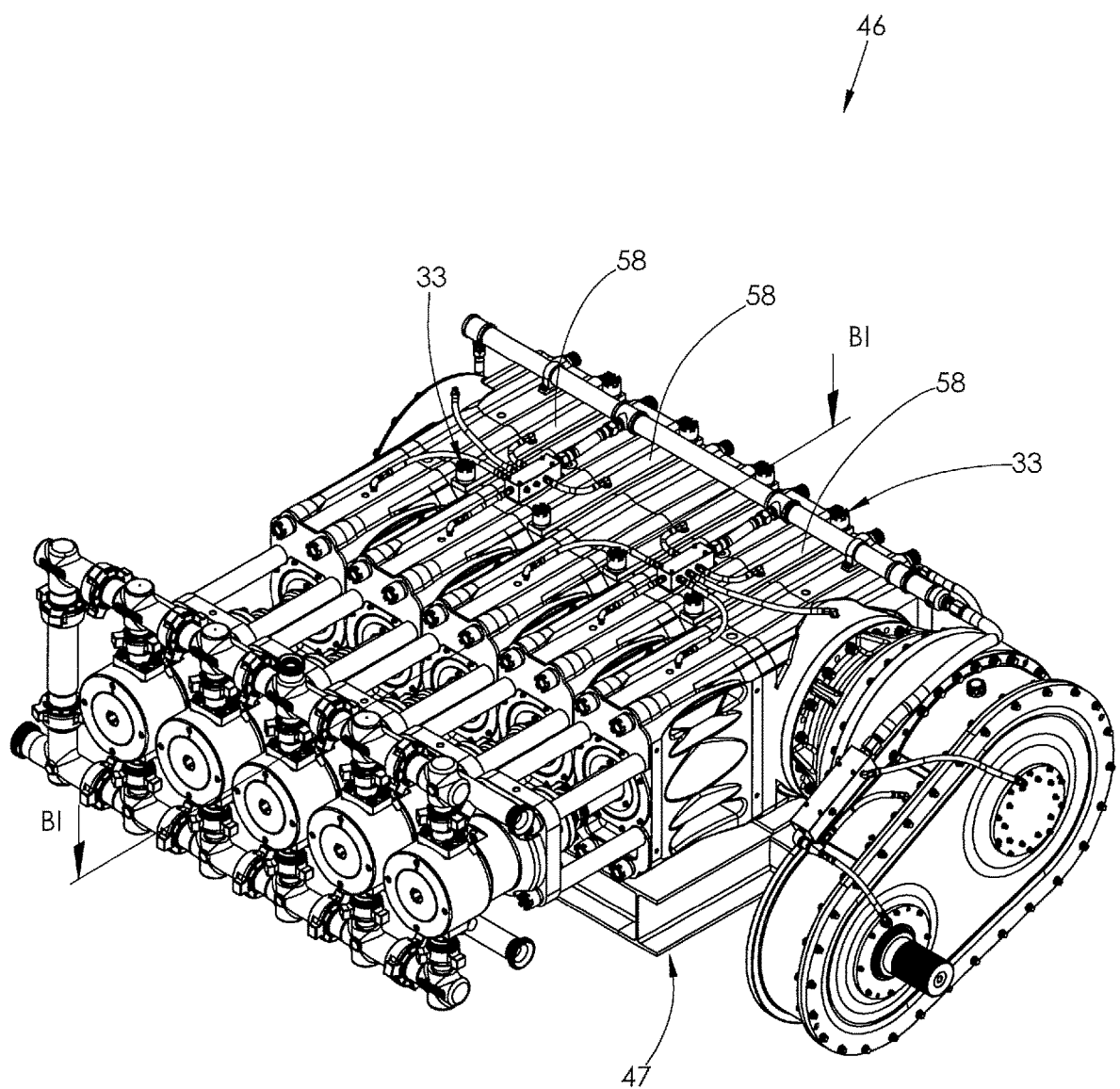
FIG. 91 is a front perspective view of the pump shown in FIG. 84 with a plurality of support bars installed on the top of the power end assembly.
Figure 92:
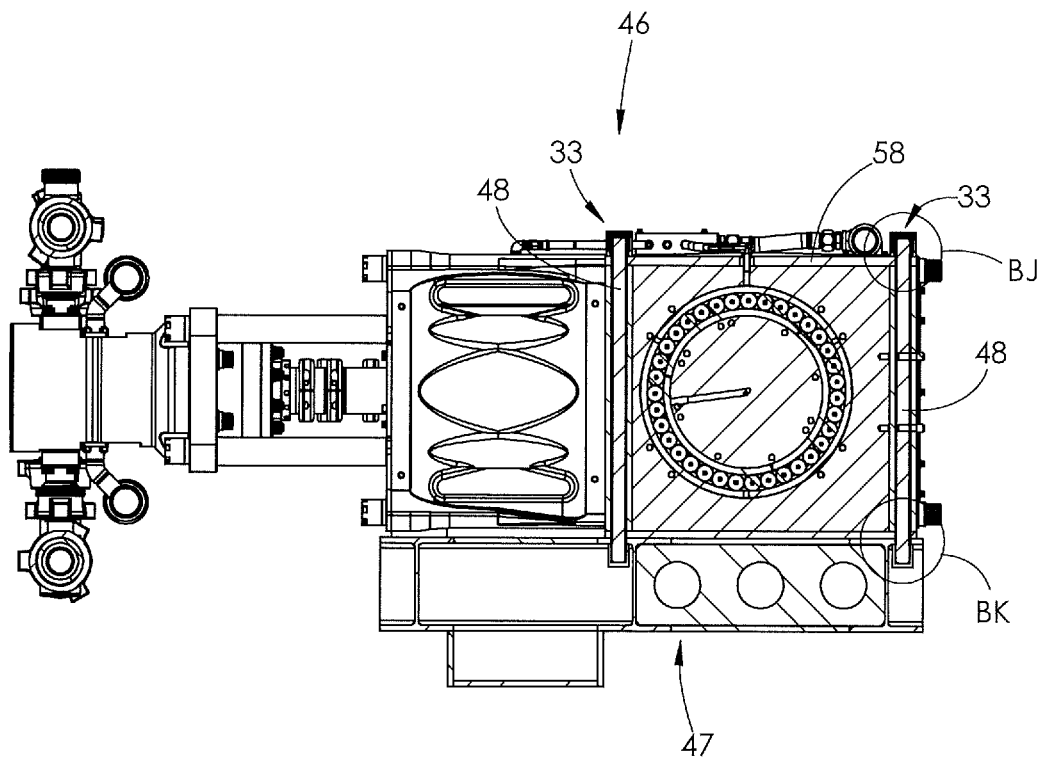
FIG. 92 is a cross-sectional view of the pump shown n FIG. 91, taken along line BI-BI.
Figure 93:
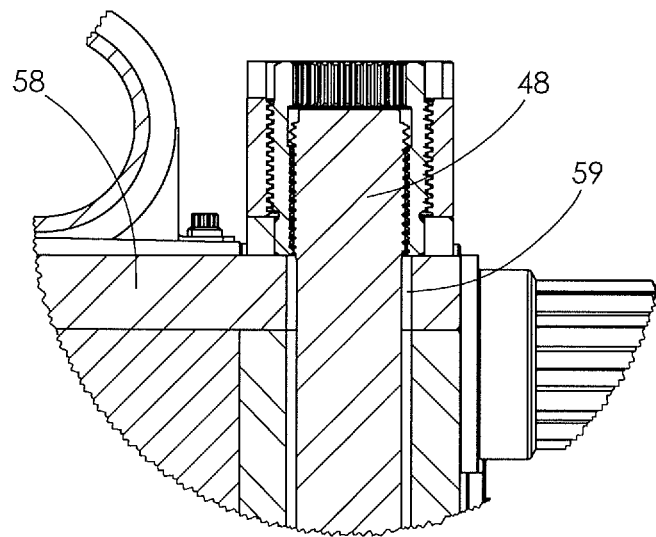
FIG. 93 is an enlarged view of area BJ shown in FIG. 92.
Figure 94:
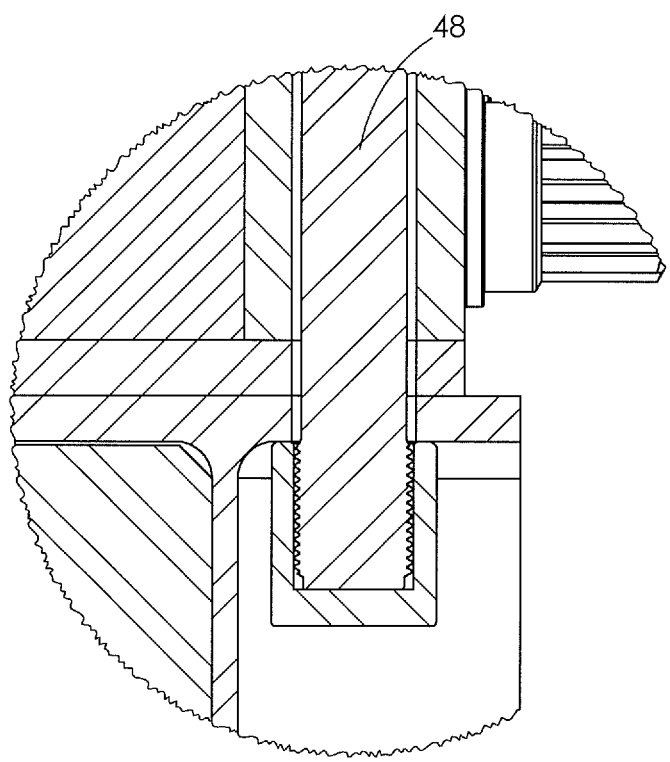
FIG. 94 is an enlarged view of area BK shown in FIG. 92.

The crank section 122 and crosshead section 124 are supported on the base section 47 such that the through-bores 51 formed in the plates 49 and 50 align with a plurality of openings 52 formed in the base section 47, as shown in FIG. 90. Once aligned, the vertical rods 48 are installed within the through-bores 51 and through a corresponding one of the openings 52, as shown in FIGS. 85-87.

Figure 89:
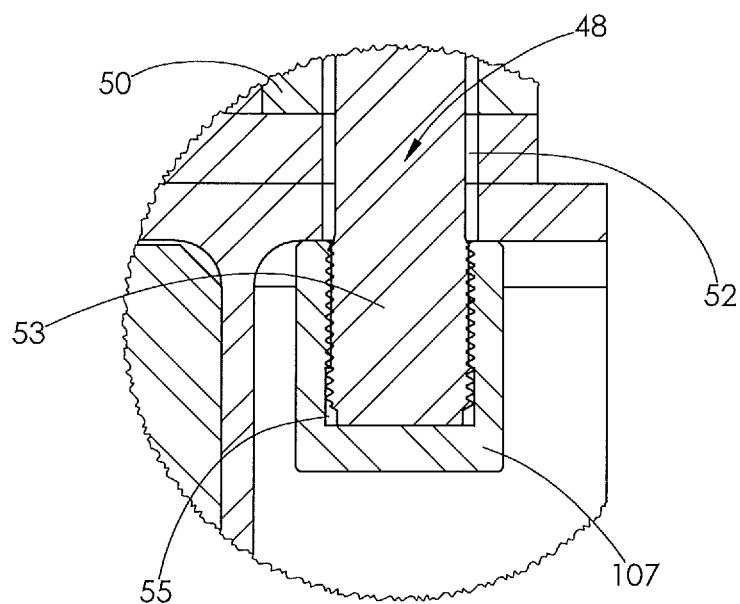
FIG. 89 is an enlarged view of area BH shown in FIG. 87.

Continuing with FIG. 89, a first end 53 of each vertical rod 48 passes through a corresponding opening 52 formed in the base section 47 and projects into an inner area between top and bottom surfaces 53 and 54 of the base section 47, as shown in FIG. 87. The first end 53 of each rod 48 threads into a blind hole 55 formed in an elongate support plate 107. The support plate 107 may be secured to an inner surface 56 of the base section 47. In alternative embodiments, a blind nut may be used with each vertical rod 48 in place of the support plate 107.

Figure 88:
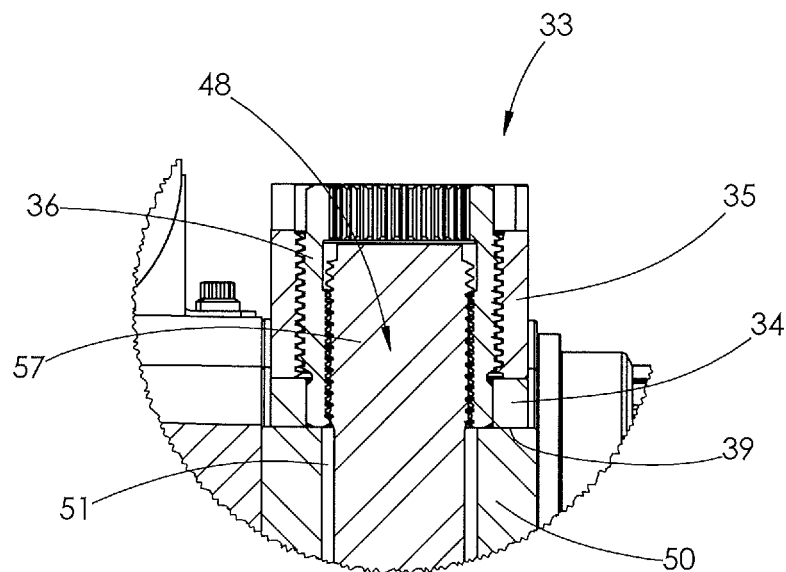
FIG. 88 is an enlarged view of area BG shown in FIG. 87.

Continuing with FIG. 88, a second end 57 of each rod 48 projects from a top surface of the central support plate 49 or the rear support plate 50. One of the nuts 33 described with reference to FIG. 82, is installed on the second end 57 of each of the rods 48 and tightened to the desired clamp force. The bottom surface 39 of the washer 34 used within each nut 33 abuts the top surface of the corresponding plate 49 or 50. Tightening of the nut 33 on the second end 57 of the rod 48 secures the crank section 122 and crosshead section 124 to the base section 47. In alternative embodiments, a traditional washer and nut may be used in place of the nut 33.

Four vertical rods 48 are shown installed within the central support plate 49 and four vertical rods 48 are shown installed within the rear support plate 50. Each vertical rod 48 is positioned between adjacent crosshead frames 220 to not interfere with the first stay rods 240. In alternative embodiments, more than four or less than four vertical rods 48 may be installed within each plate 49 and 50 and spaced as desired.

Figure 95:
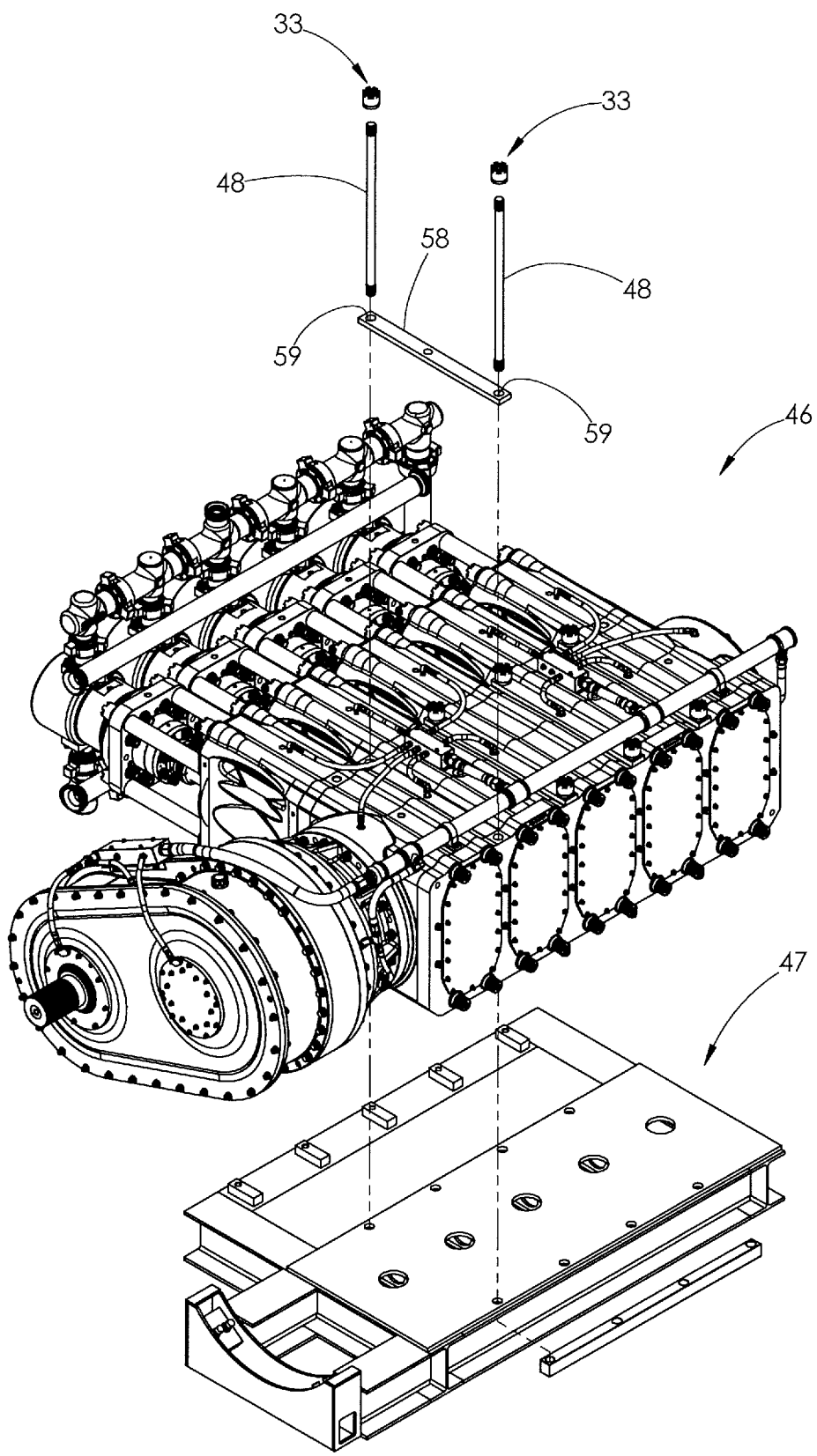
FIG. 95 is a rear perspective and partially exploded view of the pump shown in FIG. 91.
Figure 96:
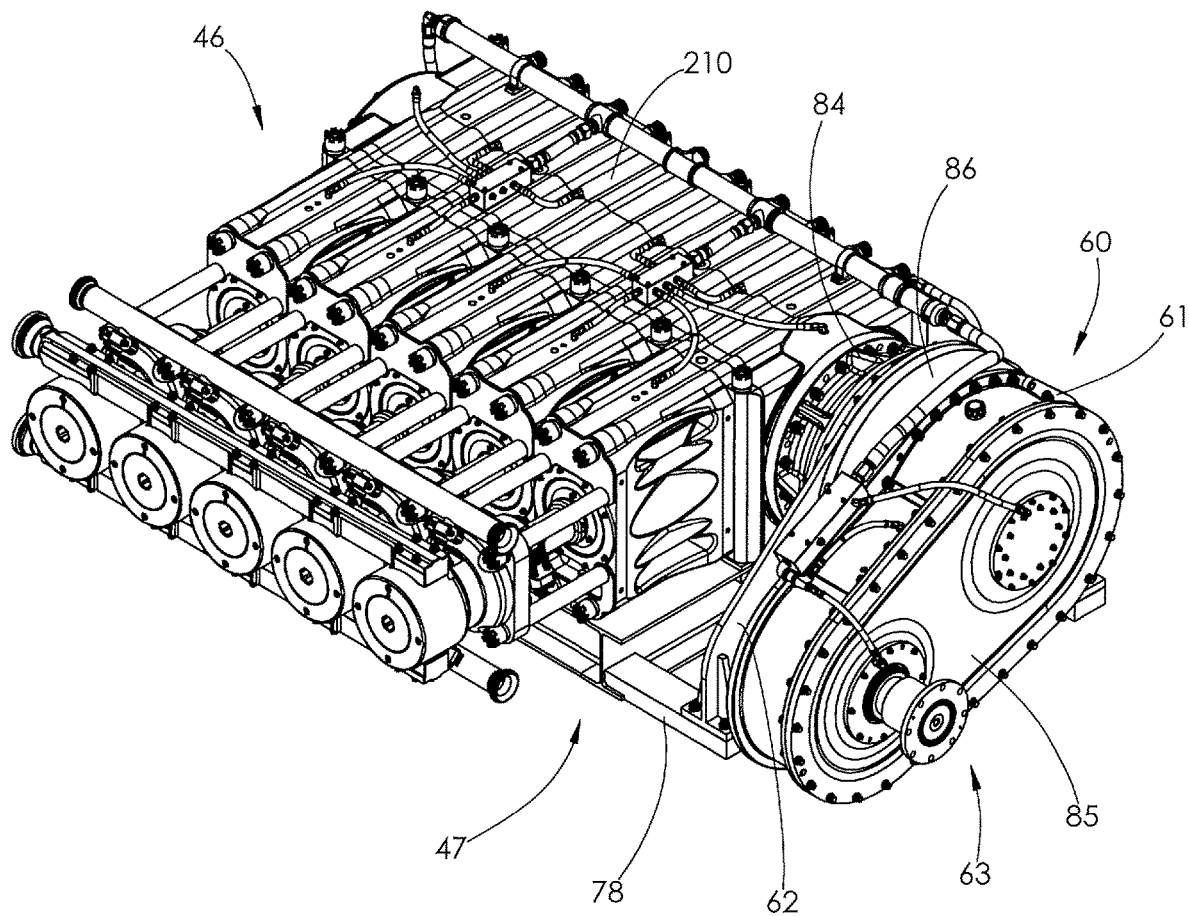
FIG. 96 is a front perspective view of the pump shown in FIG. 84 having an alternative embodiment of a drive section.

With reference to FIGS. 91-95, a pair of vertical rods 48 may be interconnected by a support bar 58. Each support bar 58 extends horizontally between one of the vertical rods 48 installed within central support plate 49 and one of the vertical rods 48 installed within the rear support plate 50. Each support bar 58 includes a pair of openings 59, each opening 59 is sized to receive a corresponding one of the vertical bars 48, as shown in FIG. 95. When the nut 33 is installed on the second end 57 of each rod 48, the bottom surface 39 of the washer 34 abuts a top surface of the corresponding support bar 58. The support bars 58 provide additional rigidity and support to the power end assembly 46.

With reference to FIGS. 95-105, the power end assembly 46 is shown with an alternative embodiment of a drive section 60. The drive section 60 may also be used with the power end assembly 120, shown in FIG. 1. The drive section 60 is generally identical to the drive section 130 shown in FIG. 1 but includes first and second torque blocks 61 and 62. The torque blocks 61 and 62 are configured to support the gearbox 63 attached to the crank frame 210. In operation, the torque blocks 61 and 62 reduce flexure in the crank frame 210 generated by torque applied by the gearbox 63. The torque blocks 61 and 62 may be used in place of the support 6420, shown in FIG. 64.

Figure 97:
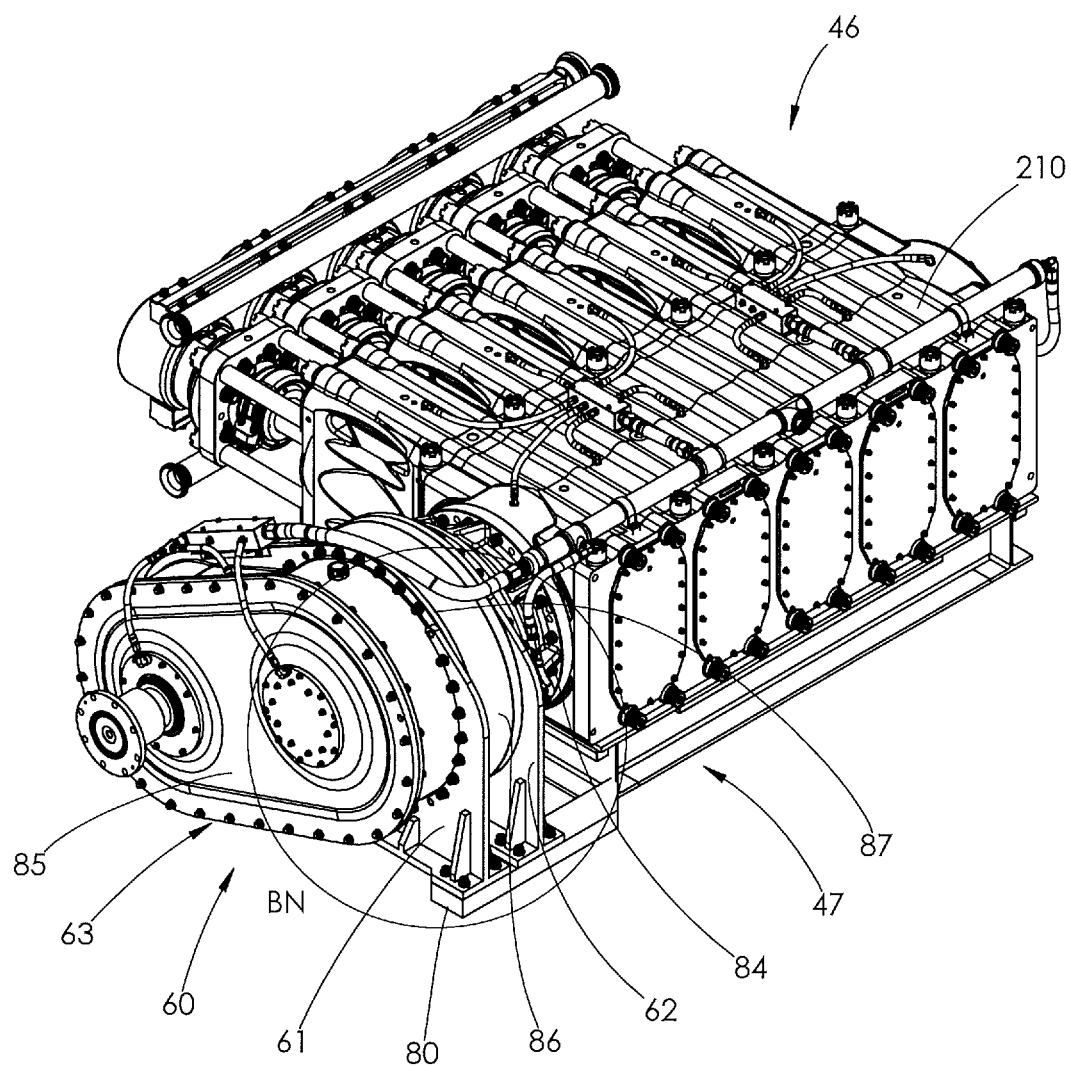
FIG. 97 is a right-side rear perspective view of the pump shown in FIG. 96.
Figure 98:
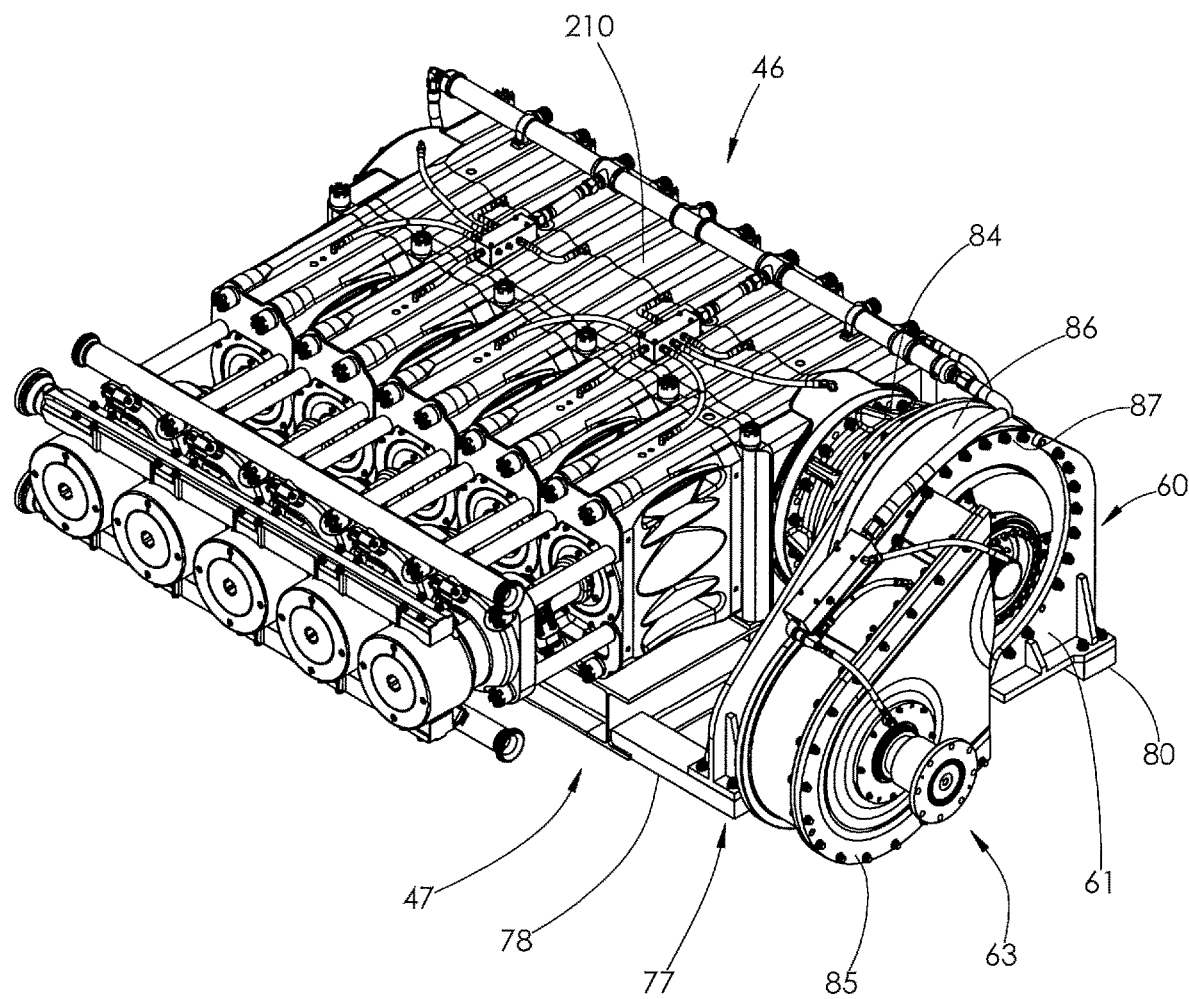
FIG. 98 is the front perspective view of the pump shown in FIG. 96 with a portion of the gearbox cutaway.
Figure 103:
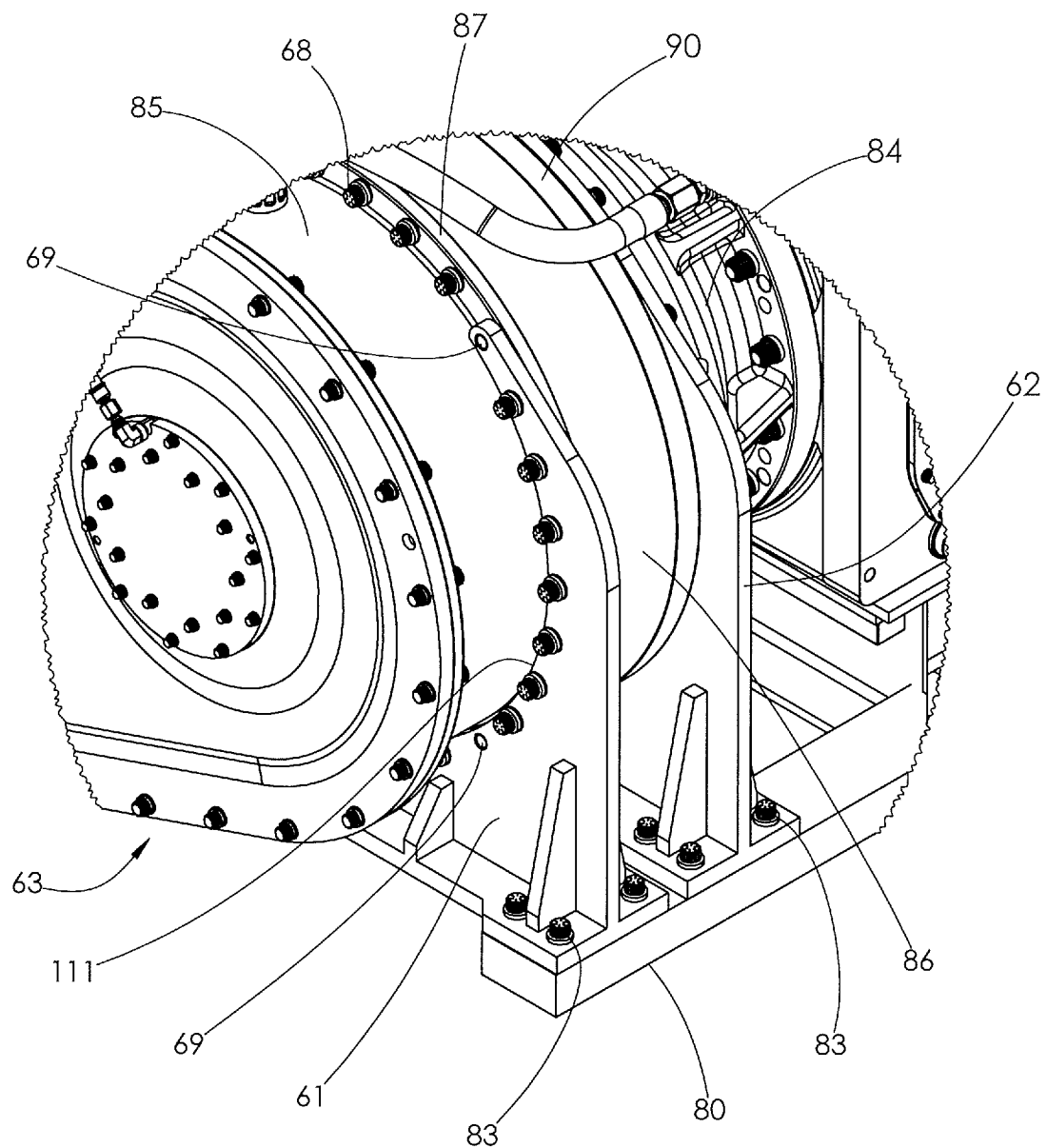
FIG. 103 is an enlarged view of area BN shown in FIG. 97.
Figure 105:
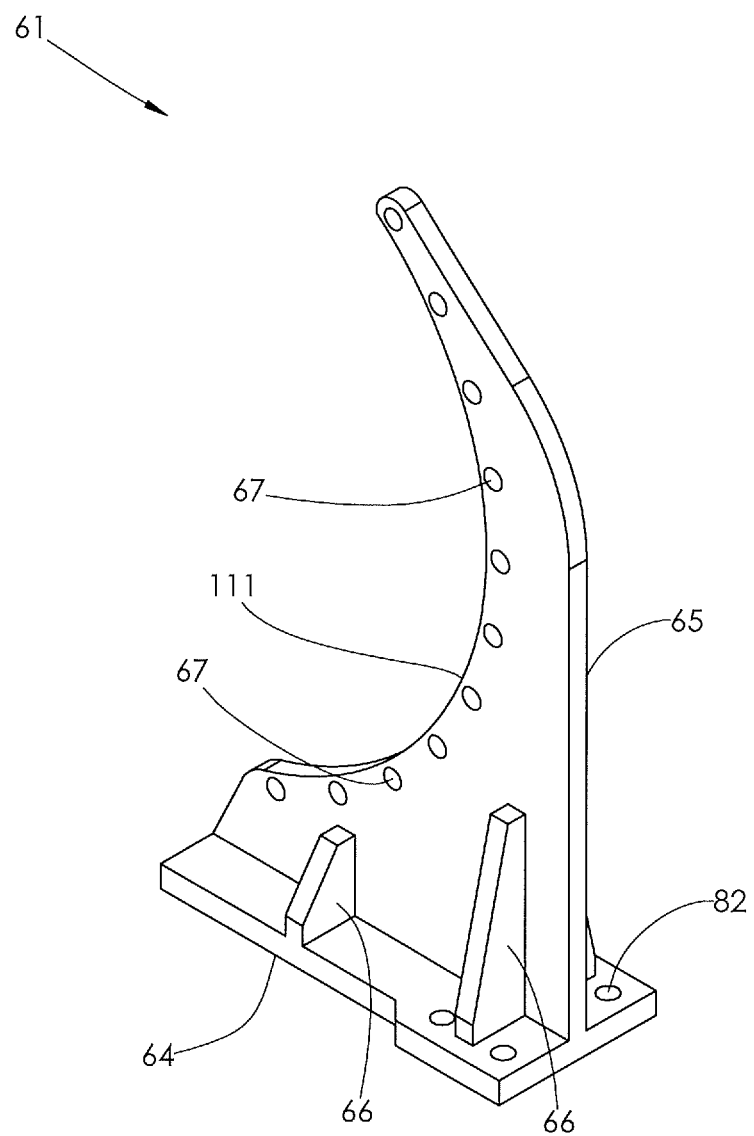
FIG. 105 is a rear perspective view of the first torque block shown in FIG. 97.

Continuing with FIGS. 97, 103, and 105, the first torque block 61 is a partial torque block. The block 61 comprises a base 64 supporting a gearbox mounting plate 65. The plate 65 is reinforced on the base 64 by a plurality of gussets 66. The mounting plate 65 comprises a mounting surface 111 having a half-moon shape. The mounting surface 111 is shaped to conform to an outer surface of the gearbox 63.

Figure 99:
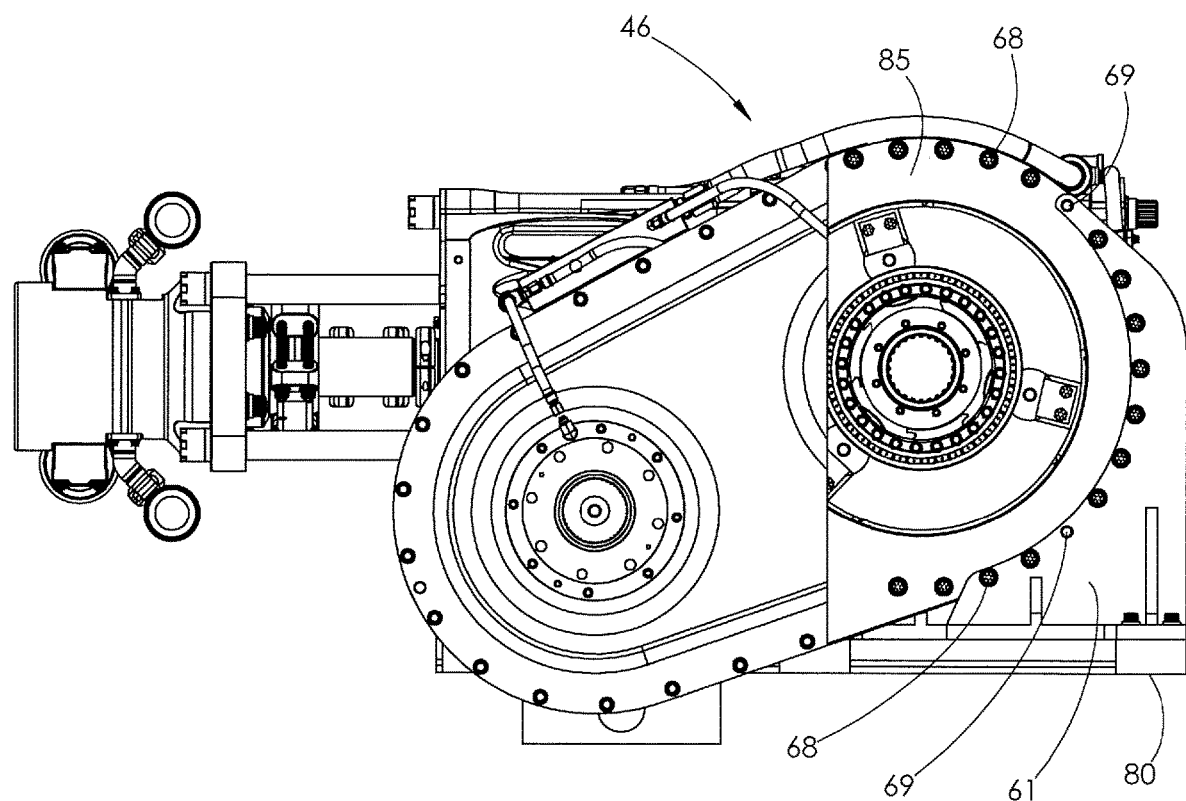
FIG. 99 is a side elevational view of the pump shown in FIG. 98.
Figure 100:
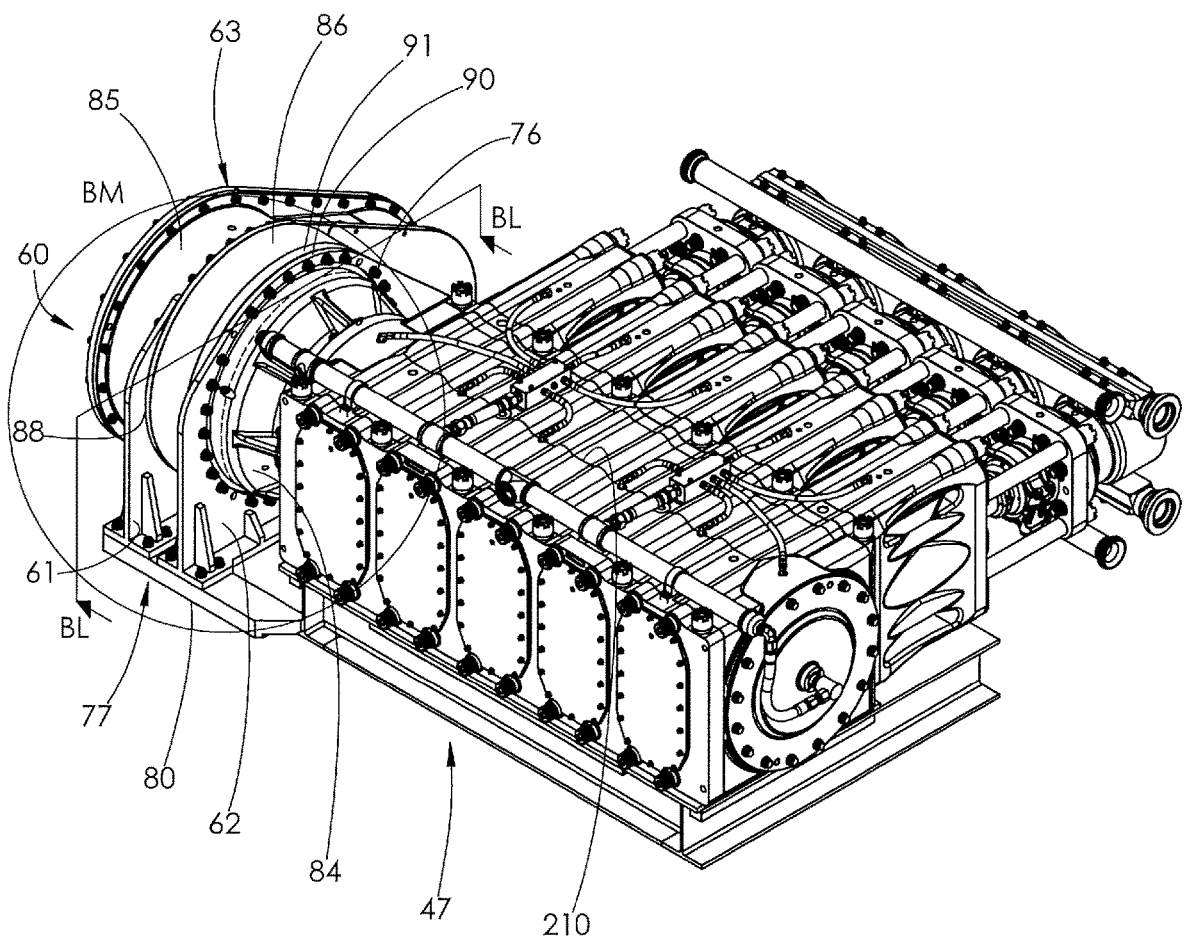
FIG. 100 is a left-side rear perspective view of the pump shown in FIG. 96.

A plurality of openings 67 are formed in the plate 65 along and adjacent to the mounting surface 111. The openings 67 may vary in size depending on the type of fastener each opening 67 is intended to receive. Some of the openings may receive a fastener 68, while other openings may receive a dowel pin. For example, dowel pin openings 69 are shown in FIG. 99.

Figure 101:
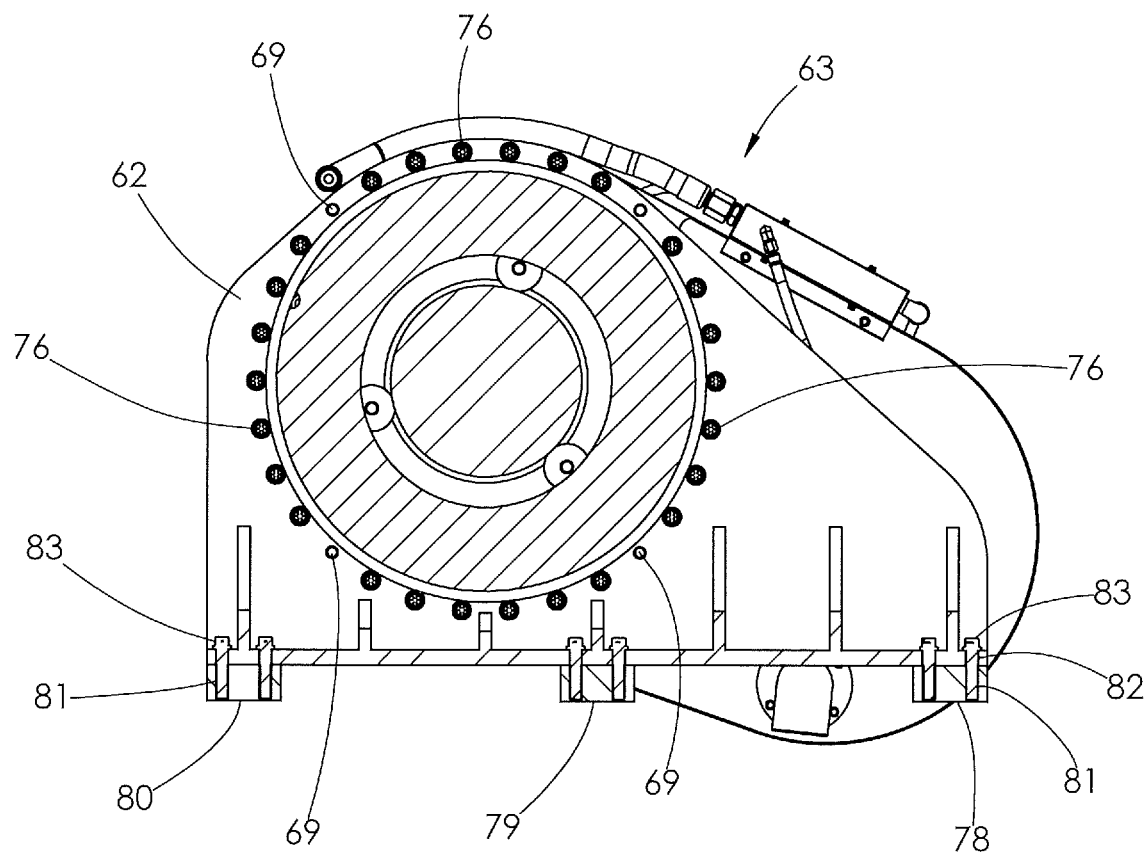
FIG. 101 is a cross-sectional view of the pump shown in FIG. 100, taken along line BL-BL.
Figure 102:
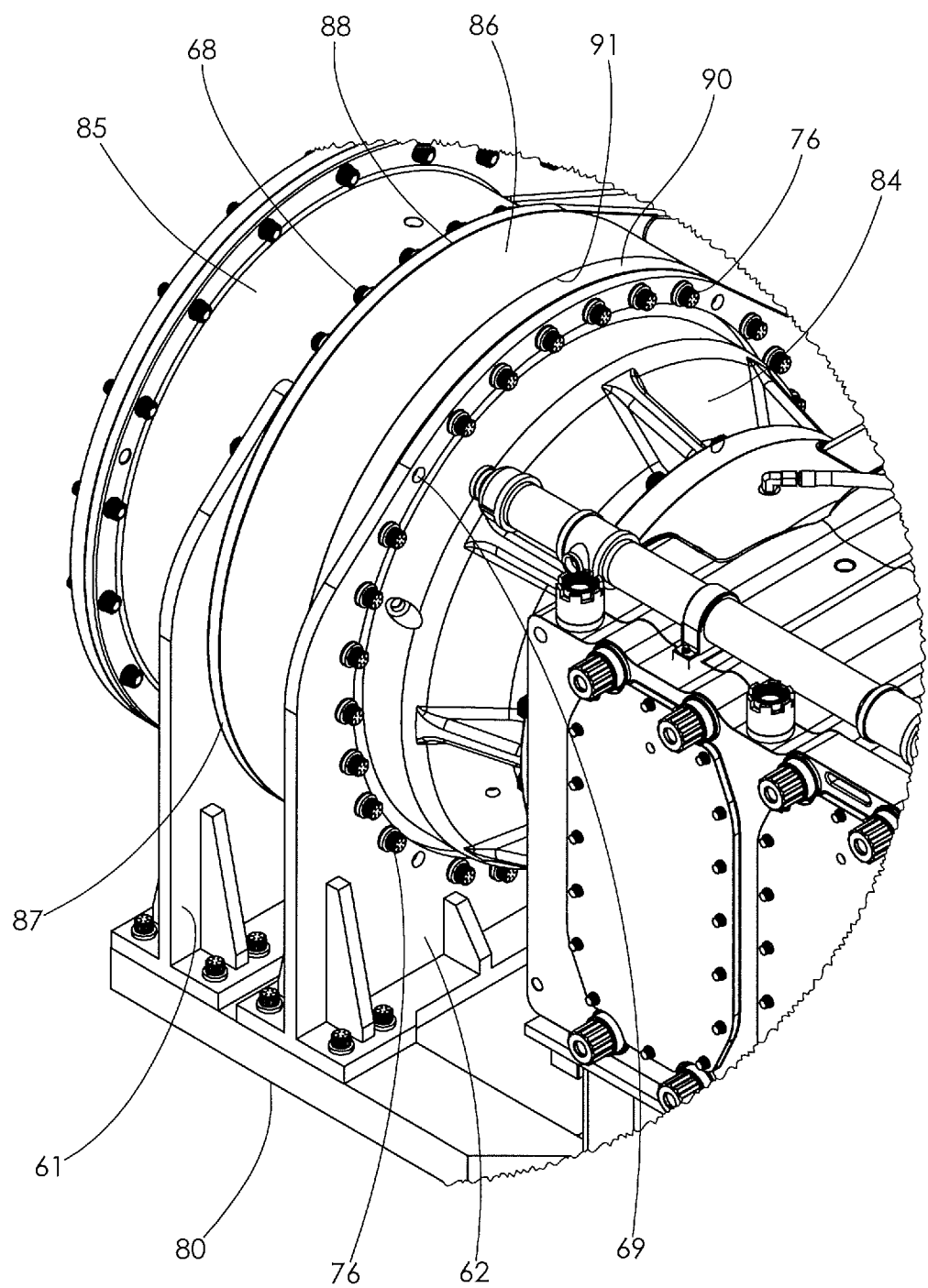
FIG. 102 is an enlarged view of area BM shown in FIG. 100.
Figure 104:
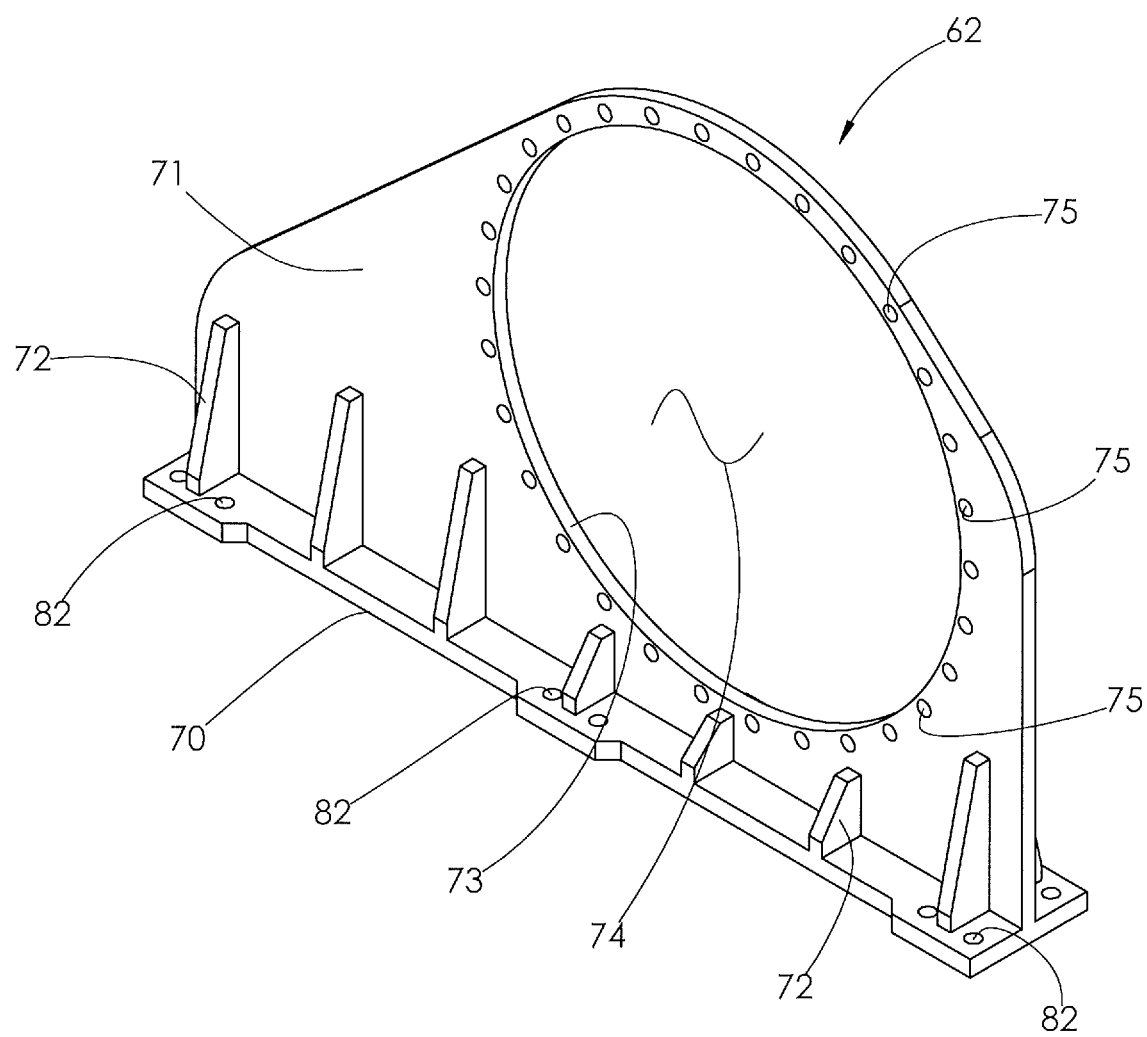
FIG. 104 is a rear perspective view of the second torque block shown in FIG. 100.

Continuing with FIGS. 101, 102, and 104, the second torque block 62 is a full torque block. The block 62 comprises a base 70 supporting a gearbox mounting plate 71. The plate 71 is reinforced on the base 70 by a plurality of gussets 72. The mounting plate 71 comprises a mounting surface 73 having a circular shape, such that the plate 71 has an opening 74. The opening 74 is shaped to conform to an outer surface of the gearbox 63.

A plurality of openings 75 are formed in the plate 71 and surround the opening 74. The openings 75 may vary in size depending on the type of fastener each opening 75 is intended to receive. Some of the openings 75 may receive a fastener 76, while other openings may receive a dowel pin. For example, dowel pin openings 69 are shown in FIG. 102.

Continuing with FIGS. 98-103, the drive section 60 further comprises a mounting base 77 that extends adjacent to the base section 47. The mounting base 77 is configured to support the first and second torque blocks 61 and 62. The mounting base 77 comprises a front, middle, and rear base 78, 79, and 80. The second torque block 62 is supported on the front, middle and rear base 78, 79, and 80, while the first torque block 61 is just supported on the rear base 80. Each base 78, 79, and 80 include a plurality of threaded openings 81 configured to align with openings 82 formed in the base 64 or 70 of the corresponding torque block 61 or 62. A plurality of fasteners 83 are installed within each aligned set of openings 81 and 82 to secure the bases 64 or 70 to the mounting base 77, as shown in FIG. 101.

Continuing with FIGS. 96-103, the gearbox 63 generally comprises a gearbox adapter 84 attached directly to the crank frame 210 and a transfer case 85 configured to receive power from a power source (not shown). The transfer case 85 has an elongated shape and is connected to the adapter 84 via a ring gear housing 86. The ring gear housing 86 has a circular shape and is configured to join the adapter 84 and the transfer case 85. A flanged surface 87 of the transfer case 85 mates with a corresponding surface 88 of the ring gear housing 86 and the surfaces are secured by the plurality of fasteners 68, as shown in FIG. 102. Likewise, a flanged surface 90 of the adapter 84 mates with a corresponding surface 91 of the ring gear housing 86 and the surfaces are secured by the plurality of fasteners 76, as shown in FIG. 102. The first and second torque blocks 61 and 62 are connected to the gearbox 63 at these flanged connections.

Continuing with FIG. 103, the first torque block 61 receives a rear portion of the transfer case 85 such that the transfer case 85 is supported by the first torque block 61 but is spaced from and does not directly contact the mounting surface 111. When the transfer case 85 is supported by the first block 61, the openings 67 in the mounting plate 65 align with the openings formed in the flanged surface 87 of the transfer case 85. The fasteners 68 may be installed within the aligned openings to secure the transfer case 85 to the first block 61. One or more dowel pins may be installed within one or more of the aligned openings to properly align the transfer case 85 on the first block 61 prior to installing and tightening the fasteners 68.

Similarly, the second torque block 62 receives a portion of the adapter 84 such that the adapter 84 is supported within the opening 74 of the mounting plate 71, but does not directly contact the mounting surface 73, as shown in FIG. 102. Thus, the adapter 84 is installed within the second torque block 62 such that it is clearance fit. When the adapter 84 is supported by the second block 62, the openings 75 in the mounting plate 71 align with the openings formed in the flanged surface 90 of the adapter 84. The fasteners 76 may be installed within the aligned openings to secure the adapter 84 to the second block 61. One or more dowel pins may be installed within one or more of the aligned openings to properly align the adapter 84 on the second block 61 prior to installing and tightening the fasteners 76.

The torque blocks 61 and 62 may be incorporated into the gearbox 63 before the components of the gearbox 63 are secured together and/or attached to the crank frame 210.

In alternative embodiments, the torque blocks may have other sizes or shapes desired. In further alternative embodiments, the torque blocks may be attached to and/or support the gearbox in different manners than those specifically described herein.

Figure 56:
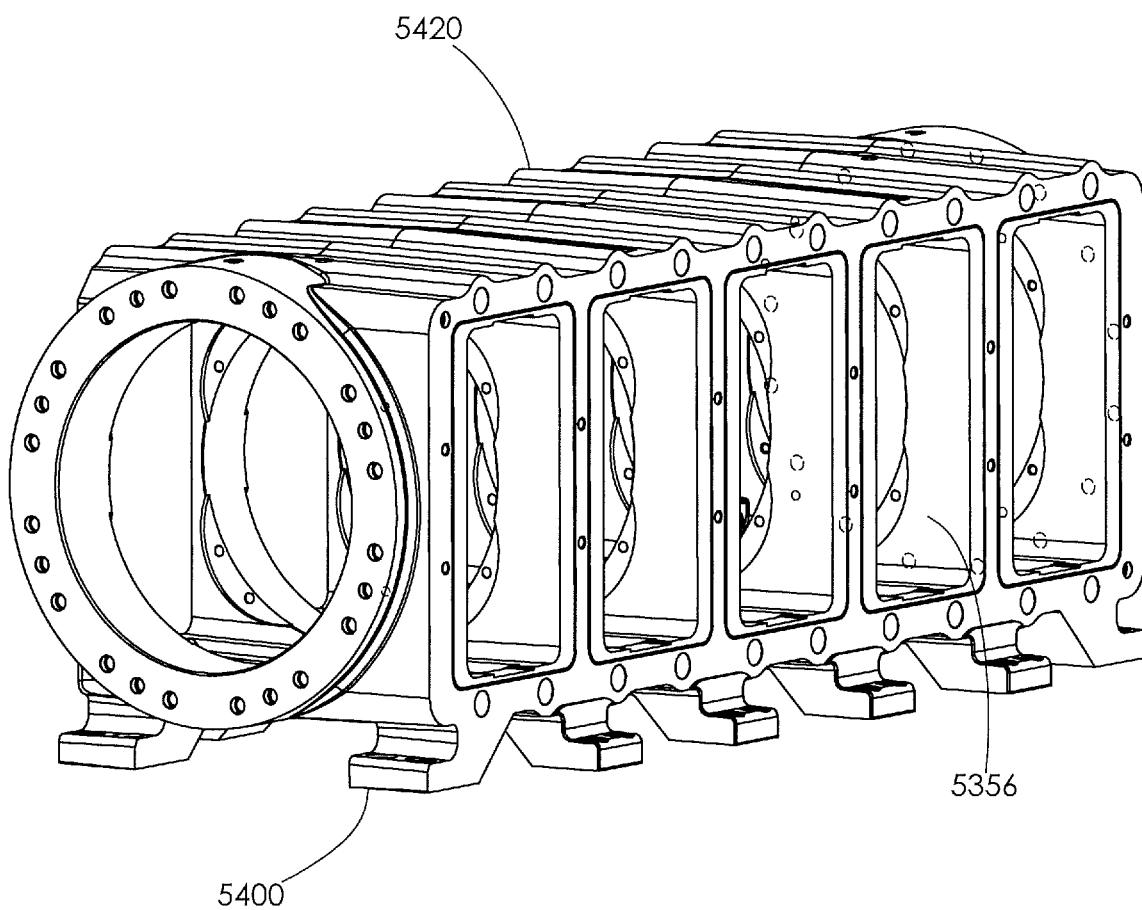
FIG. 56 is a rear perspective view of the crank frame shown in FIG. 53.
Figure 106:
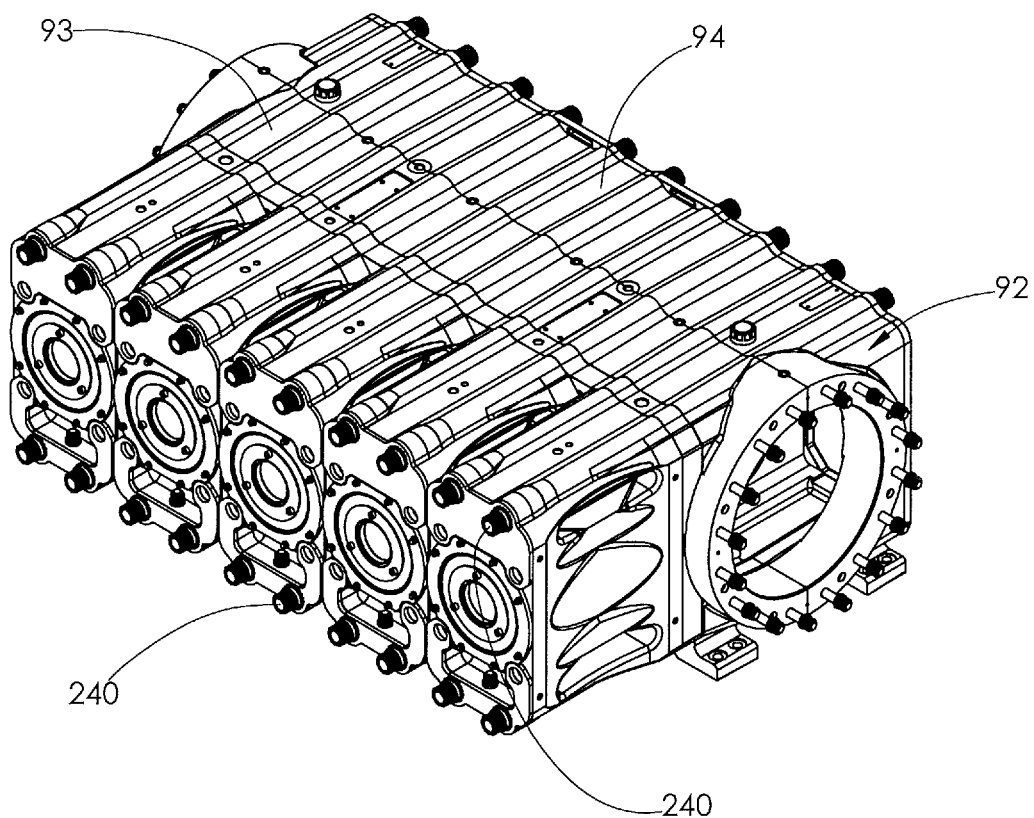
FIG. 106 is a front perspective and assembled view of the power end assembly shown in FIG. 24 having an alternative embodiment of a crank frame.
Figure 107:
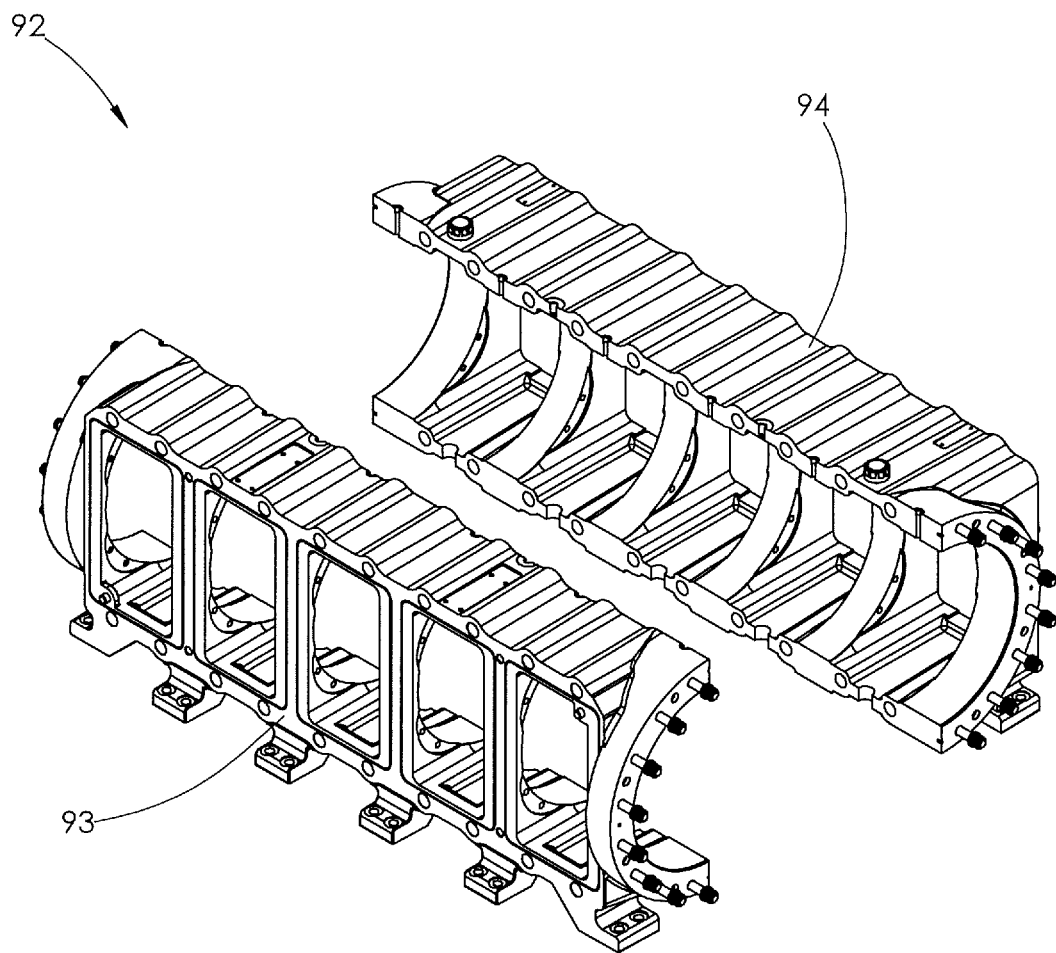
FIG. 107 is a front perspective and exploded view of the crank frame shown in FIG. 106.
Figure 108:
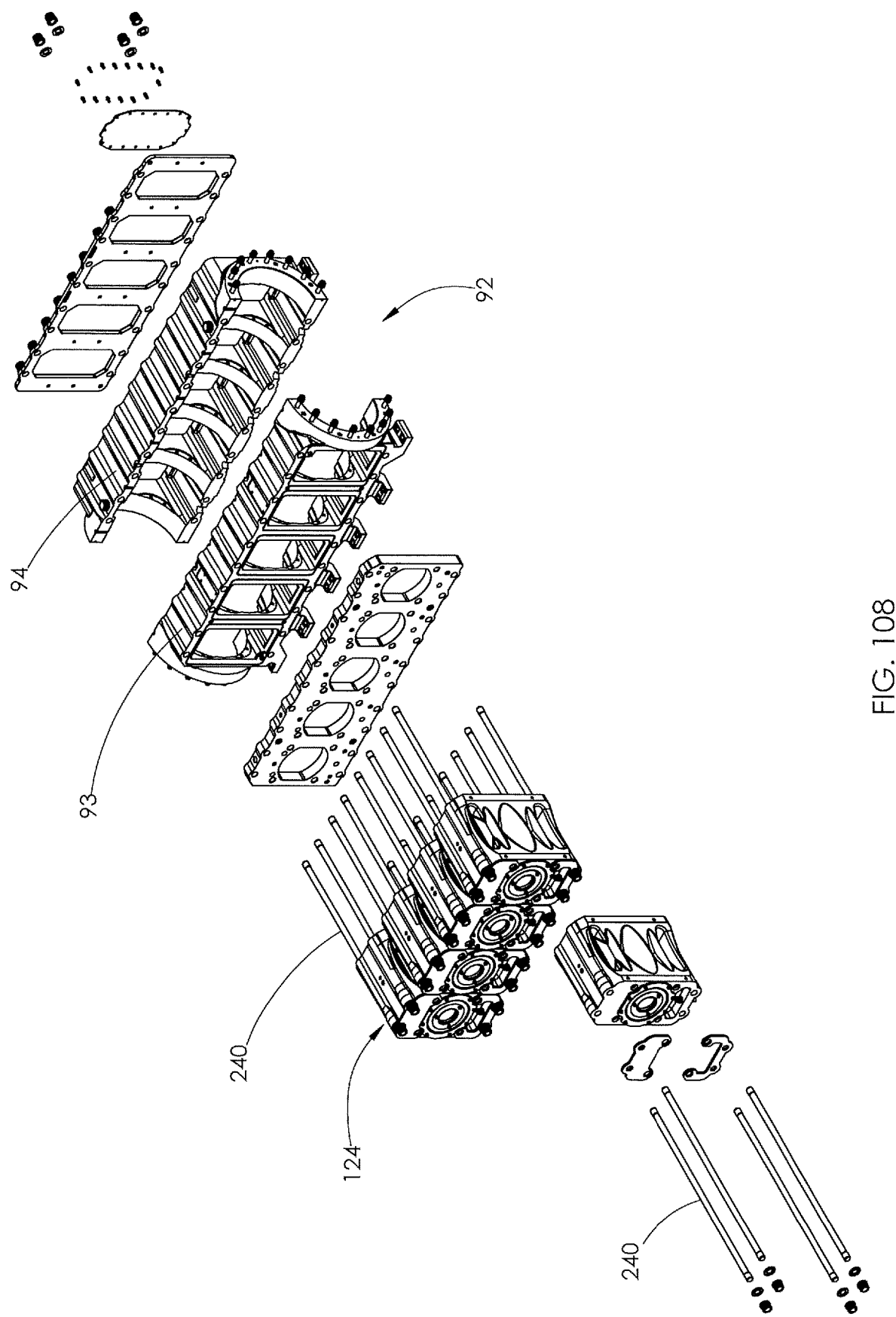
FIG. 108 is a front perspective and exploded view of the power end assembly shown in FIG. 106.

With reference to FIGS. 106-108, an alternative embodiment of a crank frame 92 is shown. The crank frame 210, shown in FIG. 56, is of single-piece construction. In contrast, the crank frame 92 comprises two pieces joined together. The crank frame 92 comprises a front section 93 joined to a rear section 94. When the sections 93 and 94 are joined, the crank frame 92 is identical to the crank frame 210. The sections 93 and 94 are held together by the stay rods 240.

Figure 109:
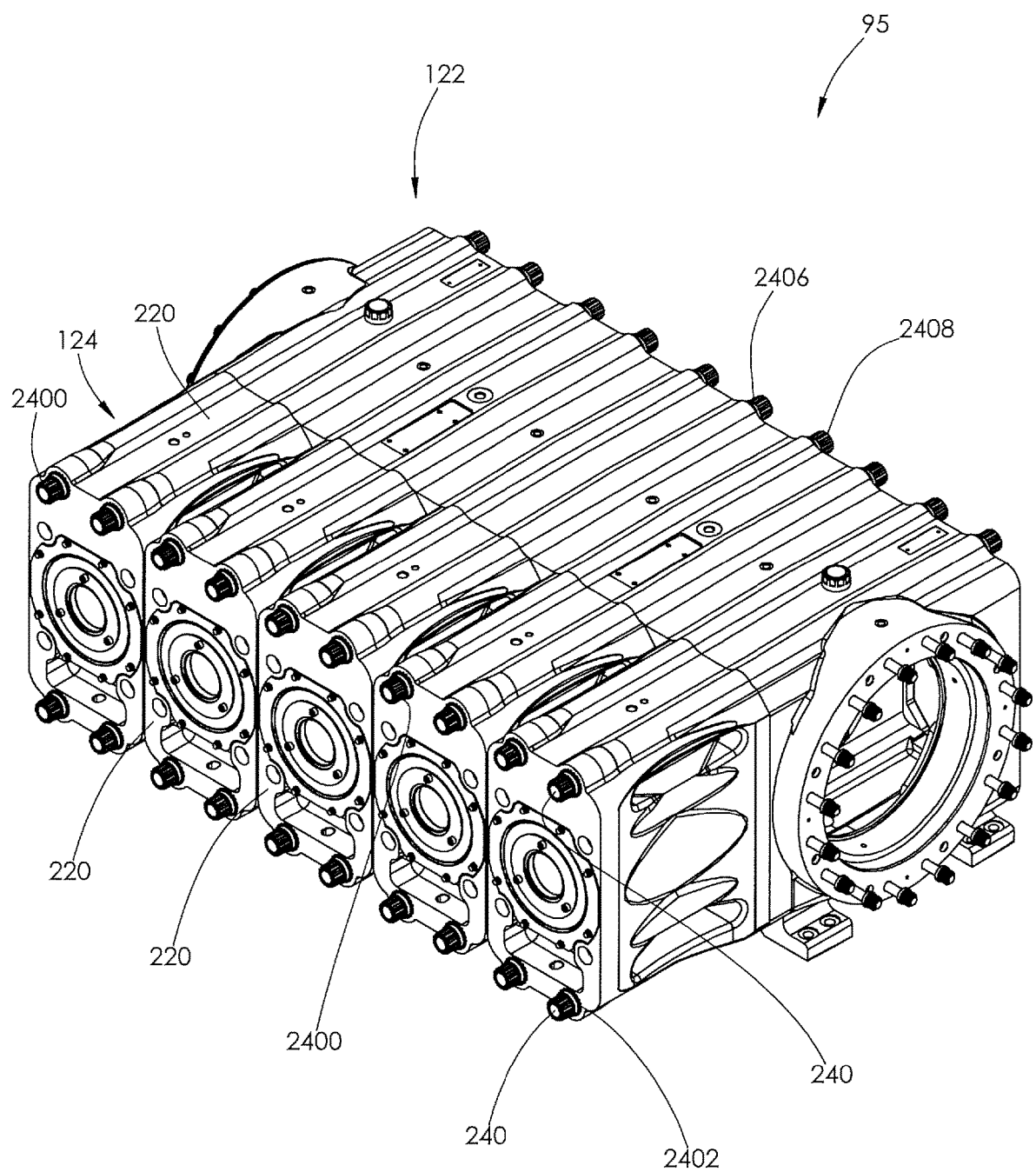
FIG. 109 is a front perspective view of another embodiment of a power end assembly.
Figure 110:
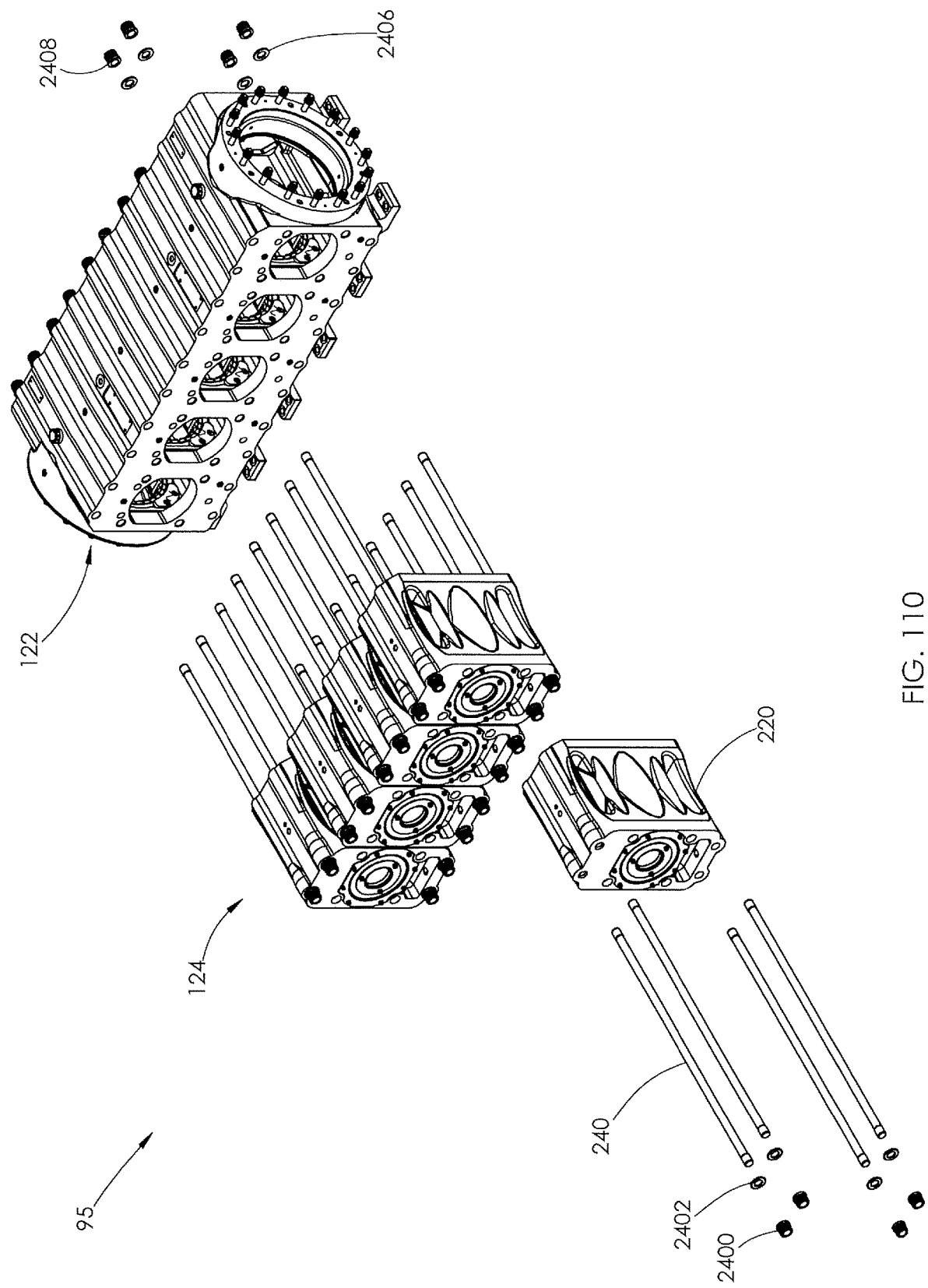
FIG. 110 is a front perspective and exploded view of the power end assembly shown in FIG. 109.

With reference to FIGS. 109 and 110, an alternative embodiment of a power end assembly 95 is shown. The power end assembly 95 is identical to the power end assembly 120, shown in FIG. 1 but does not include any support plates. Instead, the crosshead section 124 directly abuts the crank section 122. The crosshead section 124 and crank section 122 are held together by the stay rods 240. The first nut 33 or the first nut 2400 and washer 2402 directly engages the crosshead section 124, while the second nut 2408 and corresponding washer 2406 directly engages the crank section 122. In alternative embodiments, the power end assembly 95 may include at least one of the support plates 204, 206, 202 or 200, if desired.

Figure 111:
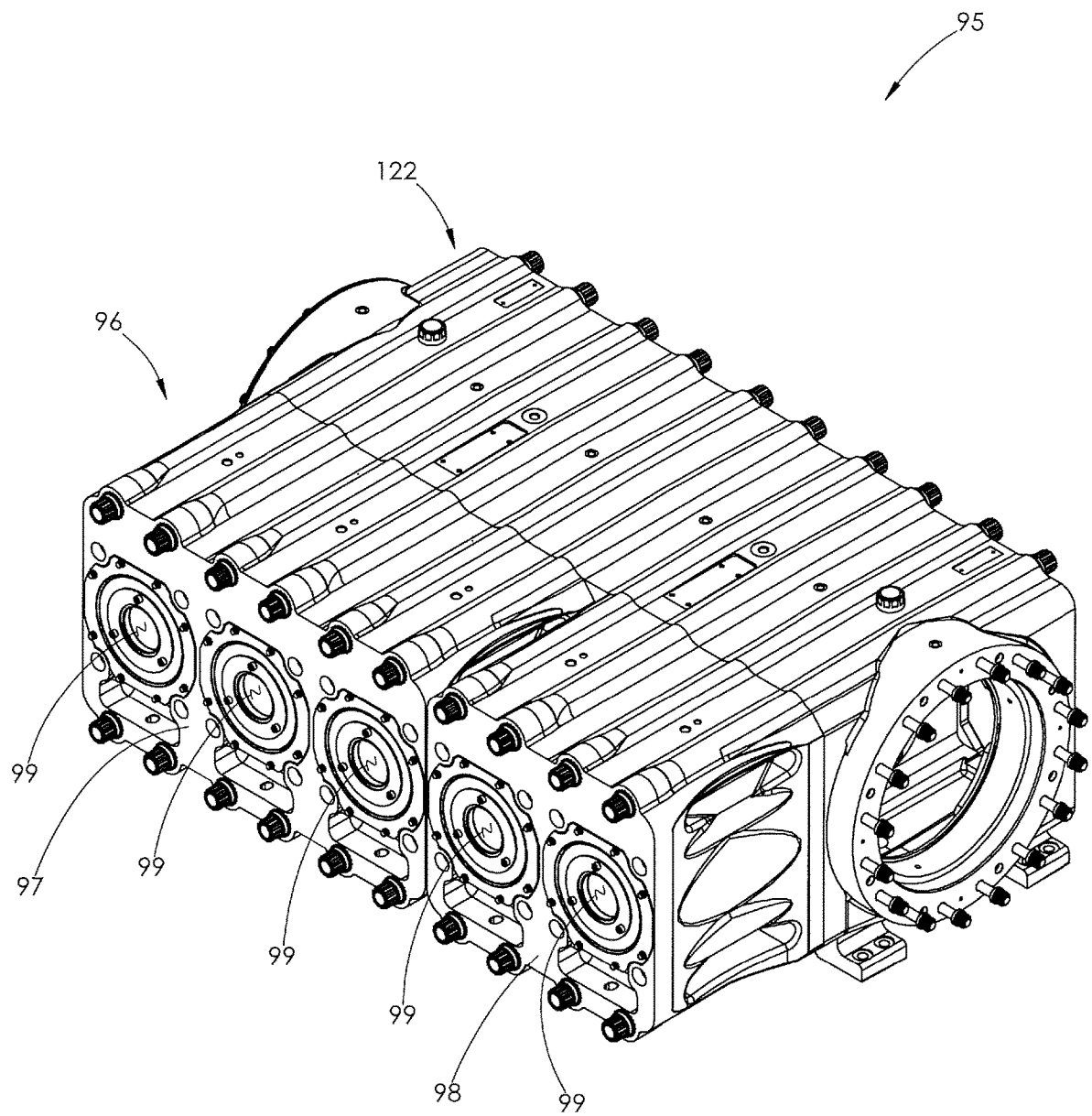
FIG. 111 is a front perspective view of the power end assembly shown in FIG. 109 having an alternative embodiment of a crosshead section.
Figure 112:
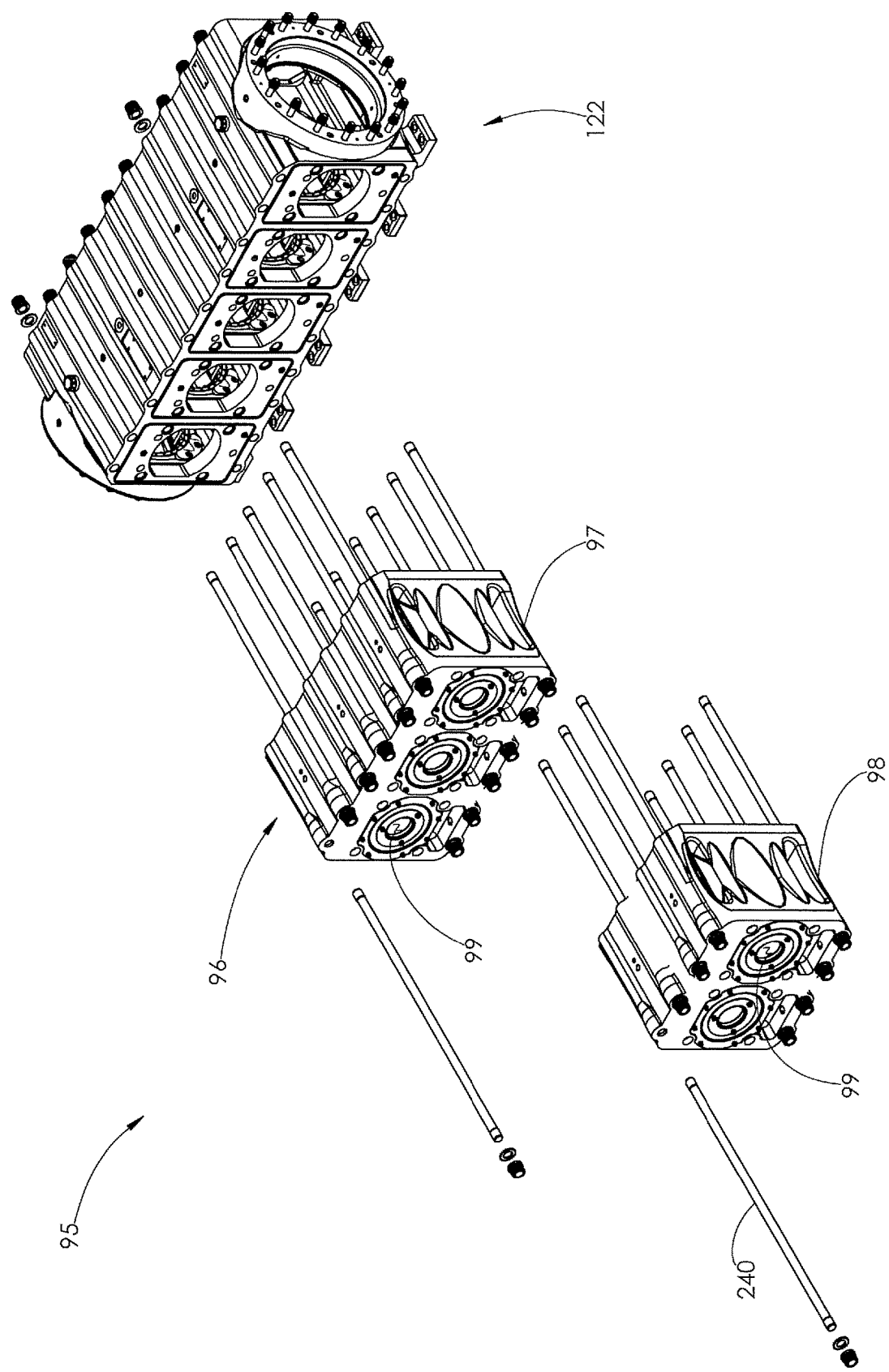
FIG. 112 is a front perspective and exploded view of the power end assembly shown in FIG. 111.

With reference to FIGS. 111 and 112, the power end assembly 95 is shown using an alternative embodiment of a crosshead section 96. The crosshead section 96 may also be used with the power end assembly 120 having the support plates 204, 206, 202 or 200.

The crosshead section 124, shown in FIG. 1, comprises a plurality of individual crosshead frames 220 positioned side-by-side. In contrast, the crosshead section 96 comprises two crosshead frames 97 and 98 positioned side-by-side. A first crosshead frame 97 comprises three piston bores 99, and a second crosshead frame 98 comprises two piston bores 99. The crosshead frames 97 and 98 are generally identical to the individual crosshead frames 220 but are joined together as a single piece.

In alternative embodiments, the crosshead section may comprise three crosshead frames-two frames having two piston bores and one frame having a single piston bore. In further alternative embodiments, the crosshead section may comprise two crosshead frames-one frame having four piston bores and one frame having one piston bores. Other configurations of crosshead frames may be used, as desired.

Figure 113:
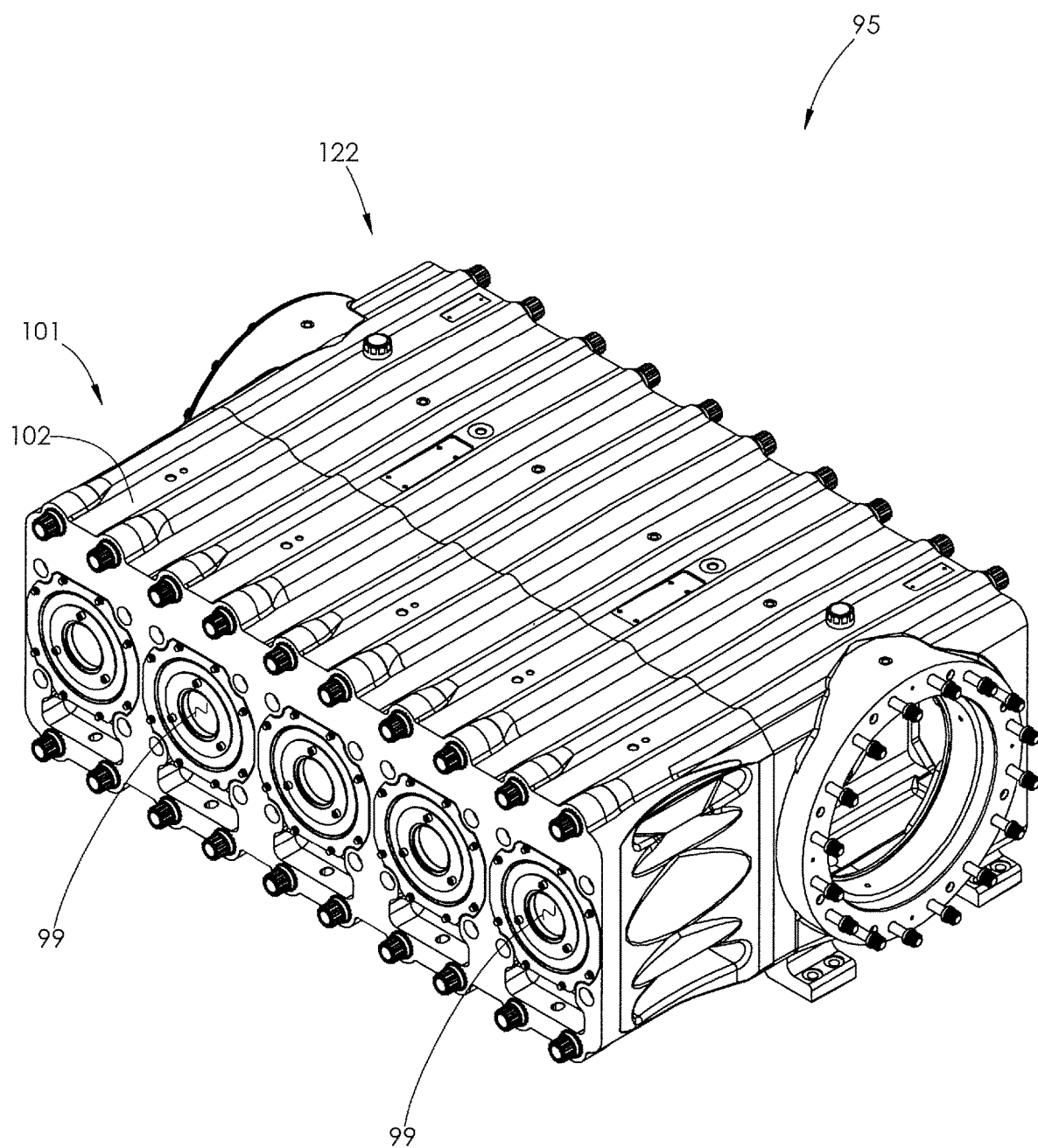
FIG. 113 is a front perspective view of the power end assembly shown in FIG. 109 having another embodiment of a crosshead section.
Figure 114:
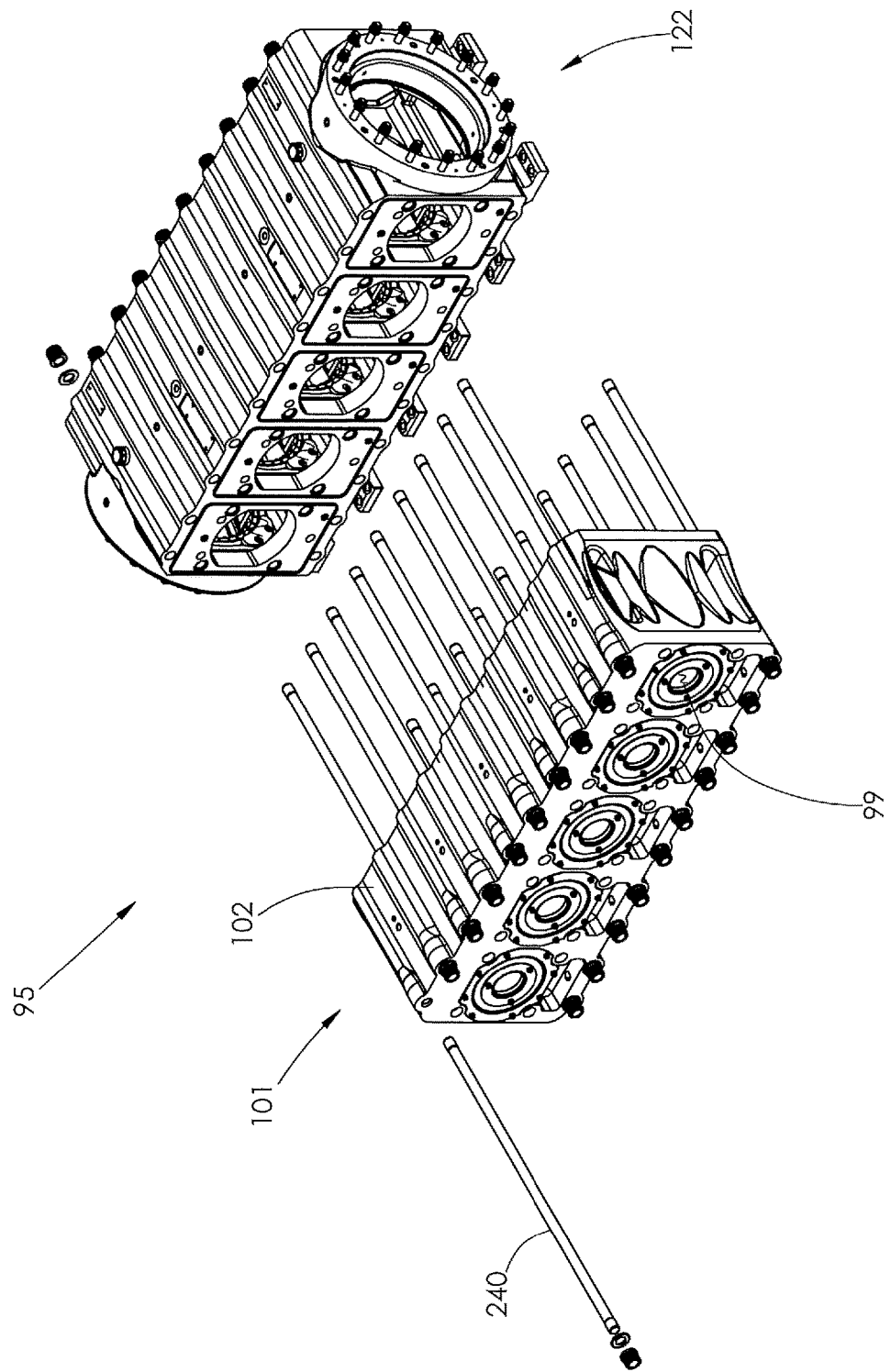
FIG. 114 is a front perspective and exploded view of the power end assembly shown in FIG. 113.
Figure 115:
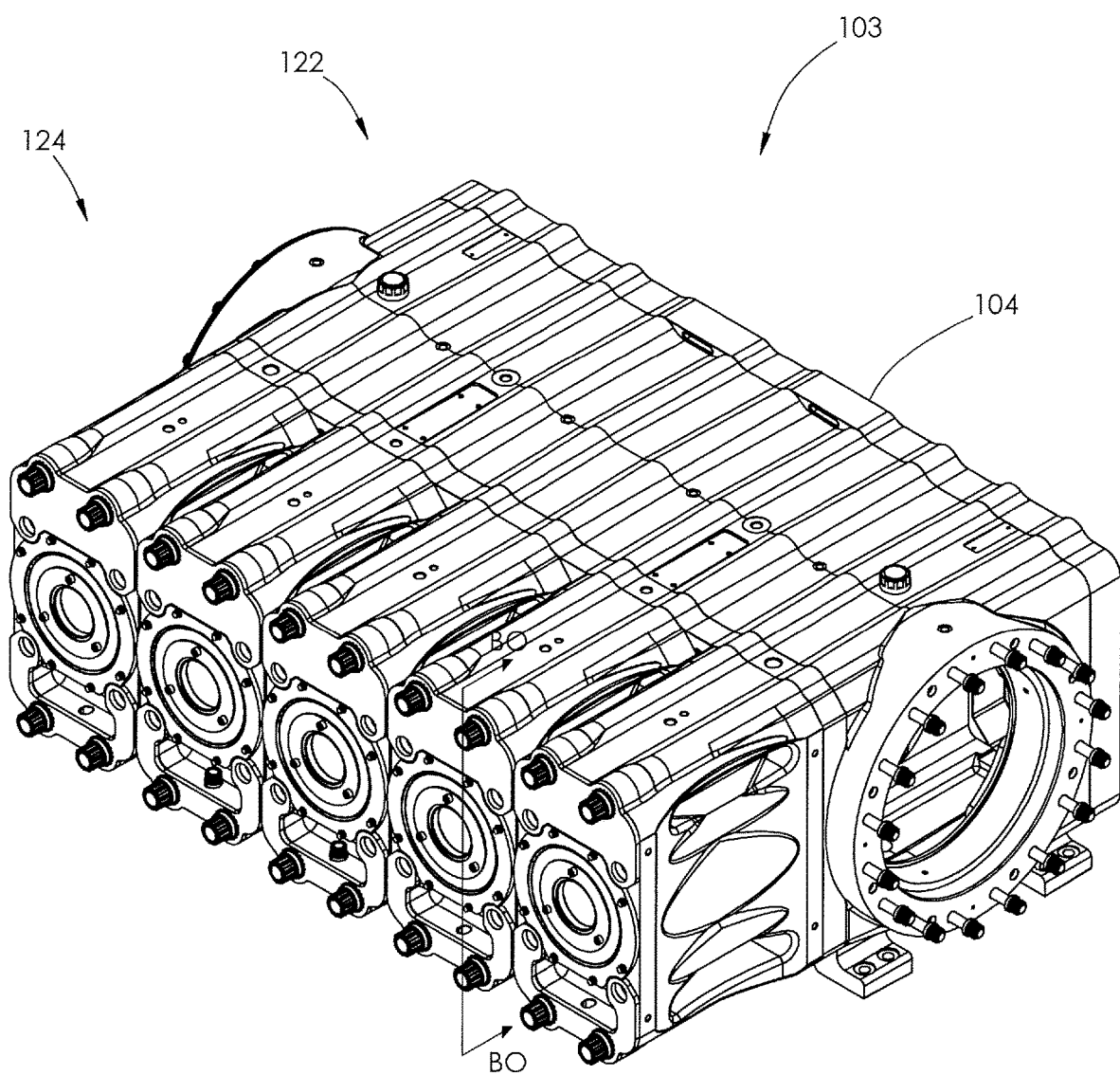
FIG. 115 is a front perspective view of the power end assembly shown in FIG. 74 having an alternative embodiment of a rear support plate.
Figure 116:
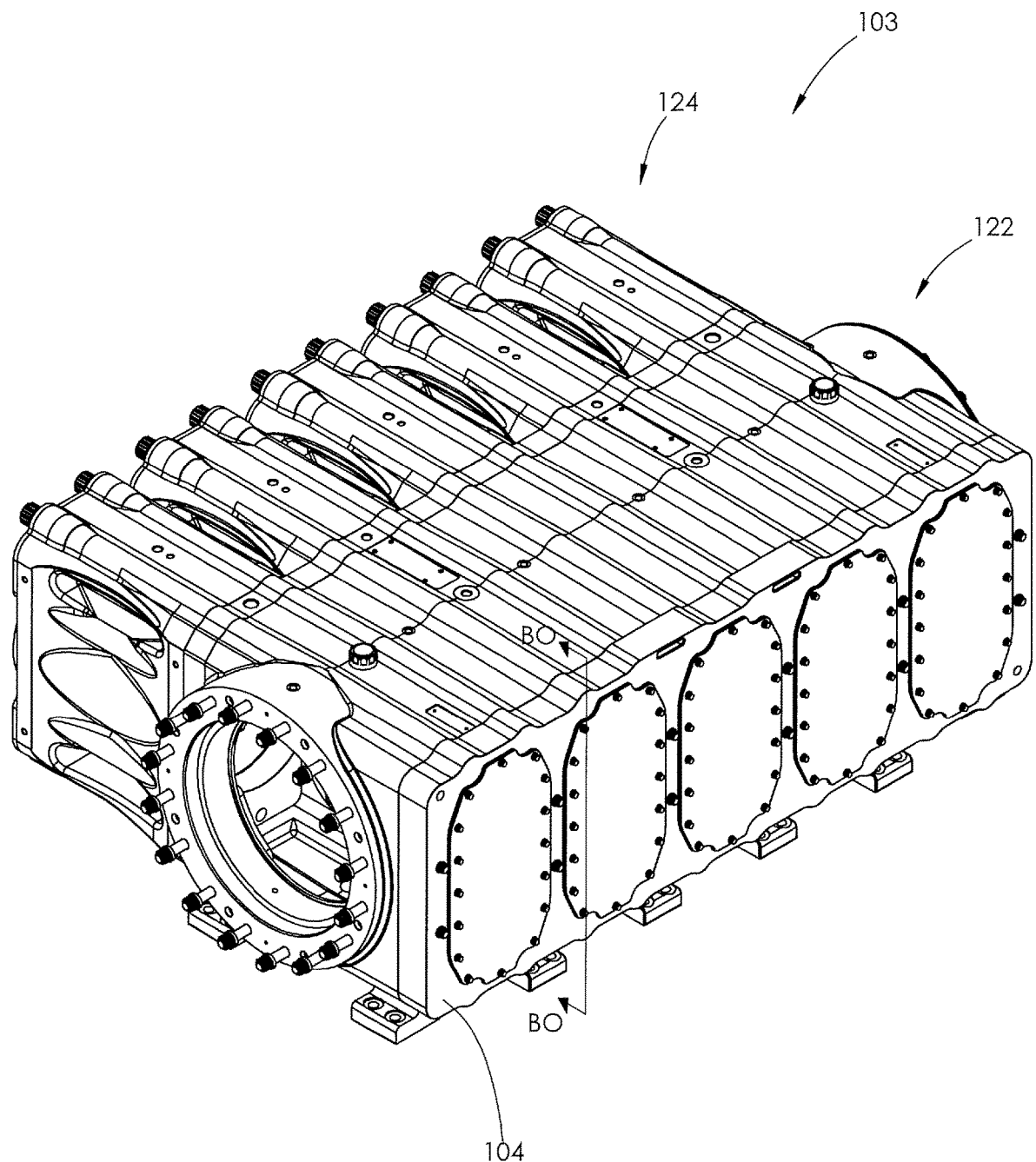
FIG. 116 is a rear perspective view of the power end assembly shown in FIG. 115.

With reference to FIGS. 113 and 114, the power end assembly 95 is shown used with another alternative embodiment of a crosshead section 101. The crosshead section 101 comprises a single crosshead frame 102 having five piston bores 99. The crosshead frame 102 is generally identical to the individual crosshead frames 220 positioned side-by-side but is formed together as a single piece.

Figure 117:
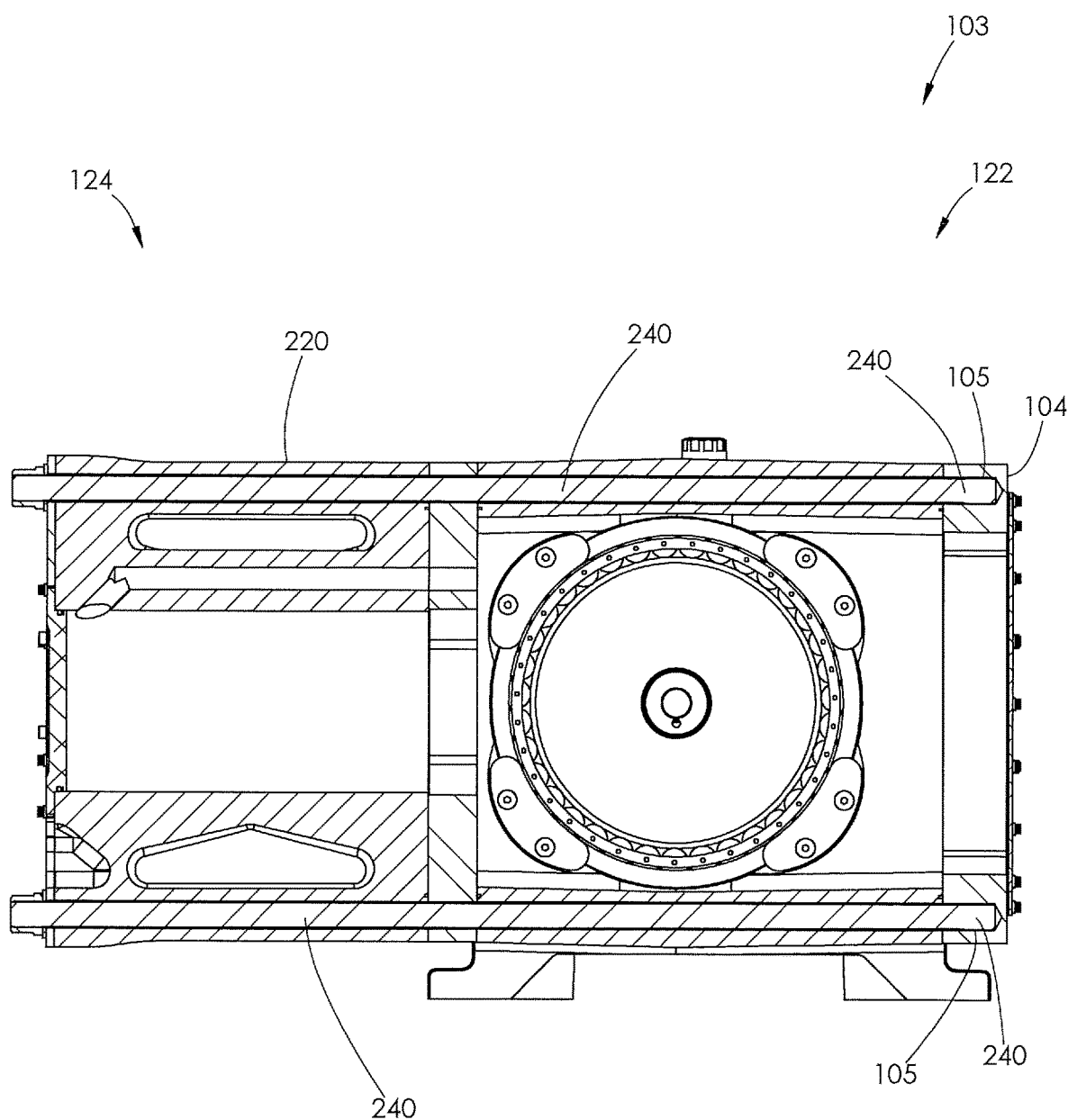
FIG. 117 is a cross-sectional view of the power end assembly shown in FIGS. 115 and 116, taken along line BO-BO.
Figure 118:
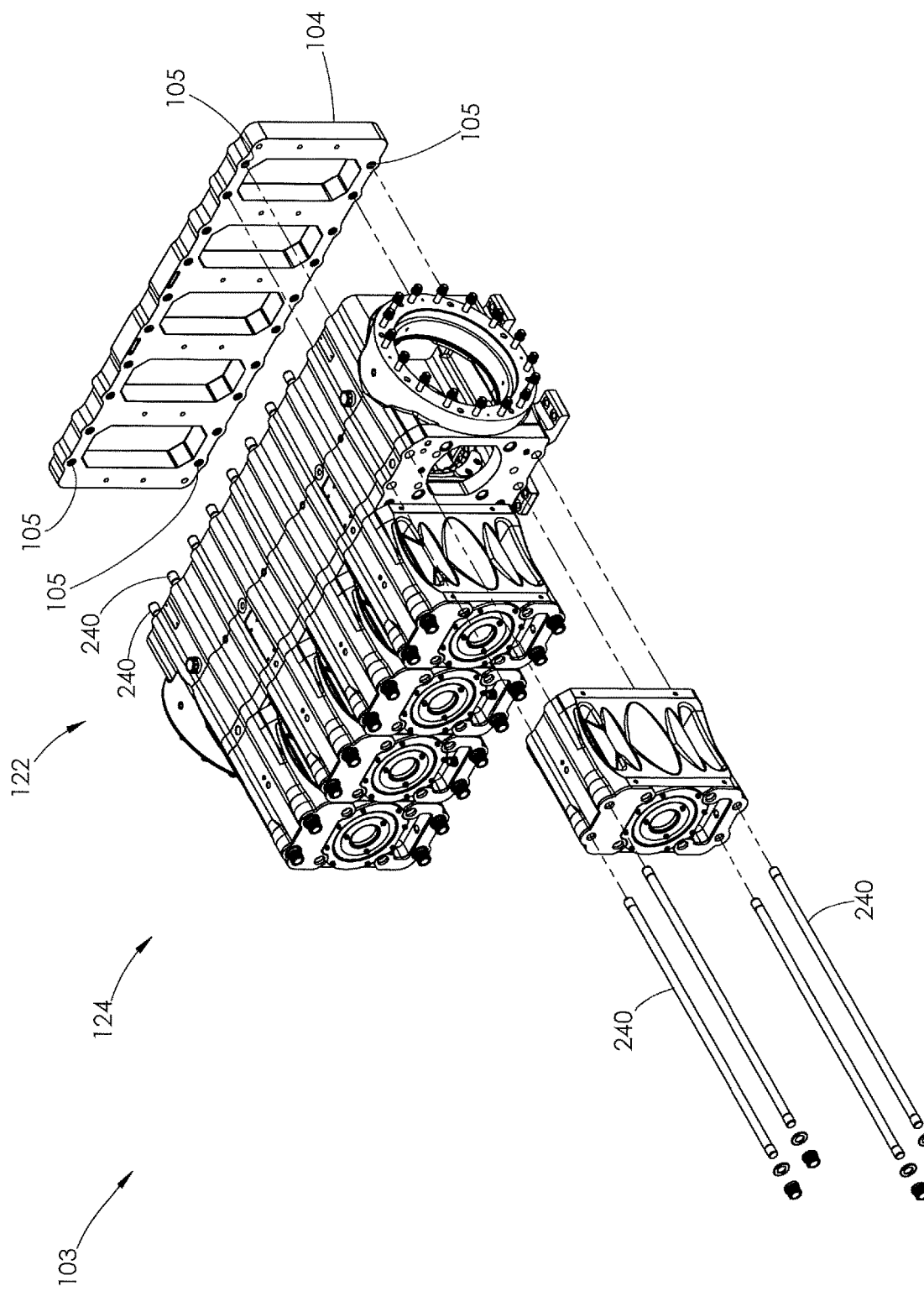
FIG. 118 is a front perspective and partially exploded view of the power end assembly shown in FIG. 115.

With reference to FIGS. 115-118, an alternative embodiment of a power end assembly 103 is shown. The power end assembly 103 is generally identical to the power end assembly 120, shown in FIG. 1 but includes an alternative embodiment of a rear support plate 104. In contrast to the rear support plate 200, shown in FIG. 54, the openings for receiving the stay rods 240 do not pass entirely through the support plate 104. Instead, the openings are threaded blind openings 105, each opening configured to receive a threaded end of one of the stay rods 240, as shown in FIG. 117.

The threaded end of each stay rod 240 threads into a corresponding opening 105 formed in the rear support plate 104. Thus, no second nut 2408 or washer 2406, shown in FIG. 27, is needed with the power end assembly 103. To accommodate the blind openings 105, the rear support plate 104 may be thicker than the support plate 200, shown in FIG. 54. The other features of the rear support plate 104 may be identical to the rear support plate 200.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed. Changes may be made in the construction, operation and arrangement of the various parts, elements, steps and procedures described herein without departing from the spirit and scope of the invention as described in the following claims.

The invention claimed is:

1. An apparatus, comprising:
    a power end assembly, comprising:
        a crank section comprising a crankshaft;
        a crosshead section offset from the crank section and configured to be positioned offset from a connector section, the crosshead section comprising a plurality of crosshead frames positioned in a side-by-side relationship, each crosshead frame housing a crosshead;
        a plurality of support plates, each support plate positioned on a crosshead frame in a one-to-one relationship;
        a central plate positioned between the crank section and the crosshead section;
        a first set of stay rods that traverse the plurality of support plates, the crank section, the central plate, and the crosshead section, but not the connector section;
        a second set of stay rods that traverse the plurality of support plates and the crosshead section, but not the crank section and are configured to be attached to the connector section; in which each of the second stay rods is attached to the central plate.

2. The apparatus of claim 1, in which the plurality of support plates comprises:
    a plurality of upper support plates; and
    a plurality of lower support plates;
    in which one of the plurality of upper support plates and one of the plurality of lower support plates are positioned on a single crosshead frame.

3. The apparatus of claim 1, in which the power end assembly further comprises:
    a drive section comprising:
        a gearbox attached to the crank section and supported on a mounting base;
        at least one torque block supporting at least a portion of the gearbox and attached to the mounting base, the at least one torque block comprising a mounting plate having a mounting surface, the mounting surface shaped to conform to at least a portion of the outer surface of the gearbox.

4. The apparatus of claim 3, in which the mounting surface of the at least one torque block has a circular shape.

5. The apparatus of claim 3, in which the mounting surface of the at least one torque block has a semi-circular shape.

6. The apparatus of claim 1, in which each of the crossheads comprises:
    a housing having a bore formed therein; the bore configured to receive a wrist pin;
    an insert installed within at least a portion of the bore and having a central passage sized to receive at least a portion of the wrist pin; and
    a bracket positioned over the insert and configured to retain the wrist pin within the housing.

7. The apparatus of claim 1, in which the power end assembly further comprises:
    a plurality of nuts, each nut installed on an end of each of the first set of stay rods; each nut comprising an outer nut threaded onto an inner nut.

8. The apparatus of claim 6, in which the power end assembly further comprises:
    a plurality of washers, each washer installed on the end of each of the first set of stay rods and having an inner splined surface engaging an outer splined surface of the inner nut.

9. The apparatus of claim 1, in which the power end assembly further comprises:
    a connector section attached to the second set of stay rods, the connector section comprising:
        a plurality of connect plates.

10. The apparatus of claim 1, in which the power end assembly further comprises:
    a connector section attached to the second set of stay rods, the connector section comprising:
        a support structure configured to support a fluid end assembly.

11. The apparatus of claim 1, in which each of the plurality of crosshead frames is not directly attached to an adjacent crosshead frame.

12. The apparatus of claim 1, in which the power end assembly further comprises:
    a sleeve disposed around each of the second set of stay rods and positioned between the crosshead section and the connector section.

* * * * *

UNITED STATES PATENT AND TRADEMARK OFFICE
CERTIFICATE OF CORRECTION

PATENT NO. : 11,635,068 B2
APPLICATION NO. : 17/550453
DATED : April 25, 2023
INVENTOR(S) : Foster et al.

It is certified that error appears in the above-identified patent and that said Letters Patent is hereby corrected as shown below:

In the Specification

Column 8, Line 64, please delete "no" and substitute therefor "110".
Column 8, Line 65, please delete "no" and substitute therefor "110".
Column 9, Line 6, please delete "no" and substitute therefor "110".
Column 9, Line 8, please delete "no" and substitute therefor "110".
Column 15, Line 36, please delete "no" and substitute therefor "110".

Signed and Sealed this
Thirtieth Day of May, 2023

Katherine Kelly Vidal
*Director of the United States Patent and Trademark Office*